US012282287B2

(12) United States Patent
Jimba et al.

(10) Patent No.: US 12,282,287 B2
(45) Date of Patent: Apr. 22, 2025

(54) DEVELOPER SUPPLY CONTAINER AND DEVELOPER SUPPLYING SYSTEM

(71) Applicant: CANON KABUSHIKI KAISHA, Tokyo (JP)

(72) Inventors: Manabu Jimba, Toride (JP); Ayatomo Okino, Moriya (JP); Katsuya Murakami, Toride (JP); Toshiaki Nagashima, Moriya (JP); Fumio Tazawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/402,858

(22) Filed: Jan. 3, 2024

(65) Prior Publication Data

US 2024/0134310 A1 Apr. 25, 2024
US 2024/0231270 A9 Jul. 11, 2024

Related U.S. Application Data

(60) Division of application No. 18/075,708, filed on Dec. 6, 2022, now Pat. No. 11,906,926, which is a division
(Continued)

(30) Foreign Application Priority Data

Jun. 6, 2011 (JP) ................................ 2011-126137

(51) Int. Cl.
*G03G 21/16* (2006.01)
*G03G 15/08* (2006.01)

(52) U.S. Cl.
CPC ..... *G03G 21/1676* (2013.01); *G03G 15/0872* (2013.01); *G03G 15/0879* (2013.01); *G03G 15/0886* (2013.01)

(58) Field of Classification Search
CPC .......... G03G 21/1676; G03G 15/0865; G03G 15/087; G03G 15/0872; G03G 2215/0663; G03G 2215/0665; G03G 2215/0668
See application file for complete search history.

(56) References Cited

U.S. PATENT DOCUMENTS 5,593,068 A 1/1997 Kitayama et al.
5,649,270 A 7/1997 Omata et al.
(Continued)

FOREIGN PATENT DOCUMENTS

AU 2010232164 B2 5/2014
CA 2 892 185 A 10/2010
(Continued)

OTHER PUBLICATIONS

Feb. 28, 2022 Office Action in Indian Patent Application No. 201848031018.
(Continued)

*Primary Examiner* — Erika J. Villaluna
(74) *Attorney, Agent, or Firm* — Venable LLP

(57) ABSTRACT

A developer supply container includes a developer accommodating body that is rotatable about a rotational axis relative to a developer discharging body. A shutter is movable relative to the developer discharging body between an open position wherein a discharge opening is open and a closed position wherein the discharge opening is closed by the shutter. The developer accommodating body is provided with a gear portion provided about the rotational axis. The developer discharging body is provided with a shutter support movably supporting the shutter. As viewed in a direction towards the bottommost side of the container, the
(Continued)

shutter support extends at least from the discharge opening toward the developer accommodating body but does not to overlap the gear.

11 Claims, 98 Drawing Sheets

Related U.S. Application Data of application No. 17/398,112, filed on Aug. 10, 2021, now Pat. No. 11,687,027, which is a division of application No. 14/088,760, filed on Nov. 25, 2013, now Pat. No. 11,137,714, which is a continuation of application No. PCT/JP2012/065062, filed on Jun. 6, 2012.

(56) References Cited

U.S. PATENT DOCUMENTS

| | | | |
|---|---|---|---|
| 5,734,953 | A | 3/1998 | Tatsumi et al. |
| 5,828,935 | A | 10/1998 | Tatsumi et al. |
| 5,832,343 | A | 11/1998 | Kobayashi et al. |
| 6,014,536 | A | 1/2000 | Ban et al. |
| 6,097,903 | A | 8/2000 | Yahata et al. |
| 6,292,644 | B1 | 9/2001 | Goto et al. |
| 6,314,261 | B1 | 11/2001 | Omata et al. |
| 6,418,292 | B1 | 7/2002 | Isobe et al. |
| 6,438,345 | B1 | 8/2002 | Ban et al. |
| 6,591,077 | B2 | 7/2003 | Yanagisawa et al. |
| 6,766,133 | B1 | 7/2004 | Ban et al. |
| 6,829,193 | B2 | 12/2004 | Ishizuka et al. |
| 6,934,494 | B2 | 8/2005 | Yamada et al. |
| 6,947,690 | B2 | 9/2005 | Tazawa et al. |
| 6,985,686 | B2 | 1/2006 | Okino et al. |
| 7,039,347 | B2 | 5/2006 | Yamada et al. |
| 7,079,788 | B2 | 7/2006 | Ban et al. |
| 7,266,330 | B2 | 9/2007 | Murakami et al. |
| 7,325,385 | B2 | 2/2008 | Nagashima et al. |
| 7,352,975 | B2 | 4/2008 | Fujiwara et al. |
| 7,369,798 | B2 | 5/2008 | Sasae et al. |
| 7,412,192 | B2 | 8/2008 | Nakajima et al. |
| 7,450,890 | B2 | 11/2008 | Murakami et al. |
| 7,483,660 | B2 | 1/2009 | Tazawa et al. |
| 7,486,915 | B2 | 2/2009 | Koyama et al. |
| 7,738,817 | B2 | 6/2010 | Sasae et al. |
| 7,822,372 | B2 | 10/2010 | Nagashima et al. |
| 7,836,921 | B2 | 11/2010 | Isomura et al. |
| 7,848,685 | B2 | 12/2010 | Nagashima et al. |
| 7,937,018 | B2 | 5/2011 | Murakami et al. |
| 7,957,679 | B2 | 6/2011 | Nakajima et al. |
| 7,962,069 | B2 | 6/2011 | Kurenuma et al. |
| 7,970,321 | B2 | 6/2011 | Yamada et al. |
| 8,160,471 | B2 | 4/2012 | Jimba et al. |
| 8,180,259 | B2 | 5/2012 | Murikami et al. |
| 8,190,068 | B2 | 5/2012 | Nagashima et al. |
| 8,244,162 | B2 | 8/2012 | Yoshizawa et al. |
| 8,244,163 | B2 | 8/2012 | Yoshizawa et al. |
| 8,380,111 | B2 | 2/2013 | Murakami et al. |
| 8,565,649 | B2 | 10/2013 | Murakami et al. |
| 8,649,711 | B2 | 2/2014 | Nakajima et al. |
| 8,755,721 | B2 | 6/2014 | Oshikawa et al. |
| 8,792,809 | B2 | 6/2014 | Kenji et al. |
| 8,918,030 | B2 | 12/2014 | Kimura et al. |
| 9,213,262 | B2 | 12/2015 | Nagashima et al. |
| 9,229,368 | B2 | 1/2016 | Okino et al. |
| 10,209,667 | B2 | 2/2019 | Jimba et al. |
| 10,289,060 | B2 | 5/2019 | Jimba et al. |
| 10,289,061 | B2 | 5/2019 | Jimba et al. |
| 10,295,957 | B2 | 5/2019 | Jimba et al. |
| 10,488,814 | B2 | 11/2019 | Jimba et al. |
| 10,496,032 | B2 | 12/2019 | Jimba et al. |
| 10,496,033 | B2 | 12/2019 | Jimba et al. |
| 10,514,654 | B2 | 12/2019 | Jimba et al. |
| 10,520,881 | B2 | 12/2019 | Jimba et al. |
| 10,520,882 | B2 | 12/2019 | Jimba et al. |
| 2004/0009016 | A1 | 1/2004 | Kato et al. |
| 2005/0191094 | A1 | 9/2005 | Kato et al. |
| 2006/0182469 | A1 | 8/2006 | Koyama et al. |
| 2007/0122205 | A1 | 5/2007 | Taguchi et al. |
| 2007/0223947 | A1 | 9/2007 | Ohkawa et al. |
| 2008/0124133 | A1 | 5/2008 | Yoshizawa et al. |
| 2008/0199224 | A1 | 8/2008 | Isomura et al. |
| 2008/0286012 | A1 | 11/2008 | Saito et al. |
| 2009/0129813 | A1 | 5/2009 | Nagashima et al. |
| 2010/0067957 | A1 | 3/2010 | Tazawa |
| 2010/0122773 | A1 | 5/2010 | Noh |
| 2010/0129118 | A1 | 5/2010 | Kimura et al. |
| 2010/0209141 | A1 | 8/2010 | Ikado |
| 2011/0058824 | A1 | 3/2011 | Morimoto et al. |
| 2011/0058857 | A1 | 3/2011 | Hori et al. |
| 2011/0200357 | A1 | 8/2011 | Murakami et al. |
| 2012/0014713 | A1 | 1/2012 | Murakami et al. |
| 2012/0014722 | A1 | 1/2012 | Okino et al. |
| 2013/0011159 | A1 | 1/2013 | Yamada et al. |
| 2013/0209134 | A1 | 8/2013 | Okino et al. |
| 2013/0209140 | A1 | 8/2013 | Murakami et al. |
| 2013/0216259 | A1 | 8/2013 | Nakajima et al. |
| 2014/0016967 | A1 | 1/2014 | Murakami et al. |
| 2014/0119776 | A1 | 5/2014 | Nakajima et al. |
| 2014/0153974 | A1 | 6/2014 | Jimba et al. |
| 2014/0233986 | A1 | 8/2014 | Murakami et al. |
| 2015/0227285 | A1 | 10/2015 | Okino et al. |
| 2016/0378054 | A1 | 12/2016 | Sato |

FOREIGN PATENT DOCUMENTS

| | | | |
|---|---|---|---|
| CN | 101634827 | A | 1/2010 |
| CN | 101639650 | A | 2/2010 |
| CN | 101661250 | A | 3/2010 |
| CN | 101740347 | A | 6/2010 |
| CN | 101750939 | A | 6/2010 |
| CN | 101872140 | A | 10/2010 |
| CN | 102012655 | A | 4/2011 |
| CN | 102012656 | A | 4/2011 |
| CN | 1322973 | A | 11/2011 |
| EP | 0661 608 | B1 | 10/2006 |
| EP | 2 624 068 | A1 | 8/2013 |
| EP | 2 624 069 | A1 | 8/2013 |
| EP | 2 720 088 | A1 | 4/2014 |
| FR | 2 767 393 | A | 2/1999 |
| JP | 04-63363 | A | 2/1992 |
| JP | 0659605 | A | 3/1994 |
| JP | H06-059605 | A | 3/1994 |
| JP | 08-110692 | A | 4/1996 |
| JP | H08-286940 | A | 11/1996 |
| JP | 09-160366 | | 6/1997 |
| JP | H09-160366 | A | 6/1997 |
| JP | H10-333426 | A | 12/1998 |
| JP | 2005-107141 | A | 4/2005 |
| JP | 2006-047811 | A | 2/2006 |
| JP | 2006-221079 | A | 8/2006 |
| JP | 2007-286202 | A | 11/2007 |
| JP | 2008-112109 | A | 5/2008 |
| JP | 2009-036952 | A | 2/2009 |
| JP | 2010-145618 | A | 7/2010 |
| JP | 2010-256894 | A | 11/2010 |
| JP | 2011-008144 | A | 1/2011 |
| JP | 2011-126137 | A | 6/2011 |
| JP | 2012-093736 | A | 5/2012 |
| JP | 2012-150319 | A | 8/2012 |
| JP | 2017-009668 | A | 1/2017 |
| KR | 10-1995-0027520 | A | 10/1995 |
| KR | 10-2008-0077922 | A | 8/2008 |
| KR | 10-2008-0101638 | A | 11/2008 |
| KR | 10-2009-0015984 | A | 2/2009 |
| KR | 10-2010-0132083 | A | 12/2010 |
| KR | 10-2014-0041599 | A | 4/2014 |
| KR | 10-2356867 | A | 1/2022 |
| RU | 2 398 257 | C2 | 6/2006 |
| RU | 2 414 734 | C2 | 3/2011 |
| TW | 517179 | B | 1/2003 |

(56) References Cited

FOREIGN PATENT DOCUMENTS

| | | | |
|---|---|---|---|
| TW | 201111177 | A | 4/2011 |
| WO | 2010/114153 | A1 | 10/2010 |
| WO | 2010/0114154 | A1 | 10/2010 |

OTHER PUBLICATIONS

Feb. 28, 2022 Office Action in Indian Patent Application No. 201848031034.
Feb. 28, 2022 Office Action in Indian Patent Application No. 201848031017.
Mar. 11, 2022 Office Action in Korean Patent Application No. 10-2022-7002660.
Nov. 19, 2021 Office Action in Taiwanese Patent Application No. 110105981.
May 20, 2022 Decision on Grant in Russian Patent Application No. 2021126935.
May 30, 2022 Office Action in Chinese Patent Application No. 201810571336.1.
Jun. 21, 2022 Office Action in Japanese Patent Application No. 2021-124511.
Nov. 1, 2022 Notice of Allowance in Korean Patent Application No. 10-2022-7002660.
Office Action 18, 2022 Office Action in Australian Patent Application No. 202023714.
Office Action in Chinese Patent Application No. 201610467083.4, dated Feb. 3, 2019 (with English translation).
Feb. 20, 2019 Notice of Allowance in Korean Patent Application No. 10-2013-7034597.
Examination Report in Canadian Patent Application No. 2,837,690, mailed Feb. 19, 2019.
Nov. 5, 2019 Office Action in Brazilian Patent Application No. BR122015013207-0 (with parial English translation).
Apr. 28, 2020 Office Action in Chinese Patent Application No. 201810571327.2 (with partial English translation).
Jan. 21, 2020 Decision to Grant in Russian Patent Application No. 2019125147 (with English transation).
Apr. 13, 2021 Office Actions in Egyptian Patent Application Nos. D22013111786.
May 6, 2021 Notice of Allowance in Korean Patent Application No. 10-2021-7003811.
Decision to Grant in Russian Patent Application No. 2017129879, mailed May 30, 2019 (with English translation).
PCT International Search Report and the Written Opinion inn PCT/JP2012/065026, dated Jul. 17, 2012.
Australian Office Action dated May 19, 2014, in related Australian Patent Application No. 2012267805.
European Search Report dated Jan. 13, 2015, in related European Patent Application No. 12797466.5.
European Search Report dated May 19, 2015, in related European Patent Application No. 12797466.5.
Malaysian Office Action dated Sep. 15, 2015, in related Malaysian Patent Application No. P1 2013702359.
Australian Office Action dated Feb. 26, 2016, in related Australian Patent Application No. 2015202693.
Eurasian Office Action dated Apr. 11, 2016, in related Eurasian Application No. 201391799 (with English translation).
Russian Office Action dated Apr. 19, 2016, in related Russian Patent Application No. 2013158314 (with English translation).
Decision on Grant in Russian Patent Application No. 2013158314, mailed Apr. 12, 2017 (with English translation).
U.S. Appl. No. 14/187,750, filed Feb. 24, 2014, Toshiaki Nagashima, et al.
Office Action in Australian Patent Application No. 201701268, dated Nov. 29, 2017.
Nov. 12, 2024 Office Action in Mexican Patent Application No. MX/E/2024/044812.
Office Action in Japanese Patent Application No. 2012-126954, dated Aug. 9, 2016.
Chinese Office Action dated Oct. 25, 2016, in related Chinese Patent Application No. 201280036697.7 (with English Translation).
Office Action in German Patent Application No. 11 2012 002 369.2, dated Feb. 15, 2017 (with English translation).
Jul. 19, 2017 Search and Examination Report in United Arab Emirates Patent Application No. 1267/2013.
Office Action in Mexican Patent Application No. MX/a/2016/001512, mailed Aug. 15, 2017 (with partial English translation).
Office Action in India Patent Application No. 10344/CHENP/2013, mailed Nov. 20, 2017.
Office Action in Taiwanese Patent Application No. 106132662, mailed Apr. 23, 2018.
Office Action in Russian Patent Application No. 2017129879, dated May 8, 2018 (with English translation).
Communication in European Patent Application No. 12 797 466.5, dated Jul. 30, 2018.
Office Action in Japanese Patent Application No. 2012-126954, dated Mar. 22, 2016 (with excerpt translation).
Office Action in Japanese Patent Application No. 2017-006548, dated Jan. 30, 2018 (with excerpt translation).
Apr. 13, 2021 Office Actions in Egyptian Patent Application No. D22013111786.
May 14, 2021 Notice of Allowance in Korean Patent Application No. 10-2021-7003811.
Nov. 10, 2020 Office Action in Japanese Patent Application No. 2019-165856 (with translation).
Dec. 4, 2020 Decision on Grant in Russian Patent Application No. 2020113205 (with English translation).
Apr. 29, 2020 Office Action in Egyptian Patent Application No. D22013111786.
May 4, 2020 Office Action in Egyptian Patent Application No. D22013111786 (with English translation).
Sep. 30, 2020 Office Action in Egyptian Patent Application No. D22013111786.
Oct. 26, 2020 Office Action in Egyptian Patent Application No. D22013111786 (with English translation).
Jul. 30, 2020 Office Action in Taiwanese Patent Application No. 108111335.
Nov. 5, 2020 Notice of Allowance in Korean Patent Application No. 10-2020-7023150.
Jun. 3, 2020 Office Action in Chinese Patent Application No. 201810582962.0 (with English translation).
Jun. 3, 2020 Office Action in Chinese Patent Application No. 201810582969.2 (with English translation).
Jul. 1, 2020 Office Action in Chinese Patent Application No. 201810582965.4 (with English translation).
Jun. 25, 2020 Office Action in German Patent Application No. 11 2012 002 369.2 (with English translation).
Nov. 5, 2019 Office Action in Brazilian Patent Application No. BR112013031300-5 (with partial English translation).
Nov. 5, 2019 Office Action in Brazilian Patent Application No. BR122015013202-9 (with partial English translation).
Nov. 5, 2019 Office Action in Brazilian Patent Application No. BR122015013207-0 (with partial English translation).
Apr. 28, 2020 Office Action in Chinese Patent Application No. 2018105713272.2 (with partial English translation).
Dec. 17, 2019 Office Action in Russian Patent Application No. 2019125147 (with English translation).
Jan. 21, 2020 Decision to Grant in Russian Patent Application No. 2019125147 (with English translation).
May 27, 2020 Notice of Allowance in Korean Patent Application No. 10-2019-7014194.
Dec. 11, 2019 Examination Report in United Arab Emirates Patent Application No. UAE/P/1267/2013.
Office Action in Korean Patent Application No. 10-2019-7014194, mailed Jul. 15, 2019.
Office Action in Australian Patent Application No. 2018271333, dated Aug. 27, 2019.
Office Action in Brazilian Patent Application No. 122015013212-6, dated Sep. 17, 2019 (with partial English translation).
Office Action in Brazilian Patent Application No. 122015013206-1 dated Sep. 17, 2019 (with partial English translation).

(56) References Cited

OTHER PUBLICATIONS

Office Action in Brazilian Patent Application No. 122015013213-4, dated Sep. 17, 2019 (with partial English translation).
Jul. 14, 2021 Decision to Grant in Russian Patent Application No. 2021103103, with English translation.
Oct. 25, 2021 Notice of Allowance in Korean Patent Application No. 10-2021-7024634.
Oct. 19, 2021 Office Action in Australian Patent Application No. 2020223714.
Nov. 7, 2022 Office Action in Taiwanese Patent Application No. 111131535.
Jan. 25, 2023 Office Action in Indian Patent Application No. 202248069695.
Apr. 11, 2023 Extended Search Report in European Patent Application No. 22 208 214.1.
Aug. 9, 2023 Extended Search Report in European Patent Application No. 22 208 215.8.
Aug. 11, 2023 Office Action in Taiwanese Patent Application No. 112123923.
Sep. 29, 2023 Examination Report in Australian Patent Application No. 2022256128.
Oct. 30, 2023 Extended Search Report in European Patent Application No. 2 317 2493.1.
Nov. 3, 2023 Extended Search Report in European Patent Application No. 2 317 2494.9.
Jan. 20, 2025 Notice of Allowance in Korean Patent Application Pub. No. 10-2023-7003699.
Mar. 10, 2025 Extended Search Report in European Patent Application No. 24 208 293.1.

(a)

(b)

(c)

(a)

(b)

(a)

(b)

(a)

(b)

(c)

(d)

(a)

(b)

(a)

(b)

(c)

(a)

(b)

(c)

(d)

(a)

(b)

(a)

(b)

(a)

(b)

(a)

(b)

DEVELOPER SUPPLY CONTAINER AND DEVELOPER SUPPLYING SYSTEM

FIELD OF THE INVENTION

The present invention relates to a developer supply container detachably mountable to a developer receiving apparatus.

Such a developer supply container is usable with an image forming apparatus of an electrophotographic type such as a copying machine, a facsimile machine, a printer or a complex machine having a plurality of functions of them.

BACKGROUND ART

Conventionally, an image forming apparatus of an electrophotographic type such as an electrophotographic copying machine uses a developer (toner) of fine particles. In such an image forming apparatus, the developer is supplied from the developer supply container with the consumption thereof by the image forming operation.

Since the developer is very fine powder, it may scatter in the mounting and demounting of the developer supply container relative to the image forming apparatus. Under the circumstances, various connecting types between the developer supply container and the image forming apparatus have been proposed and put into practice.

One of conventional connecting types is disclosed in Japanese Laid-open Patent Application Hei 08-110692, for example.

With the device disclosed in Japanese Laid-open Patent Application Hei 08-110692, a developer supplying device (so-called hopper) drawn out of the image forming apparatus receives the developer from a developer accommodating container, and then is reception reset into the image forming apparatus.

When the developer supplying device is set in the image forming apparatus, an opening of the developer supplying device takes the position right above the opening of a developing device. In the developing operation, the entirety of the developing device is lifted up to closely contact the developing device to the developer supplying device (openings of them are in fluid communication with each other). By this, the developer supply from the developer supplying device into the developing device can be properly carried out, so that the developer leakage can be suppressed properly.

On the other hand, in the non-developing operation period, the entirety of the developing device is lowered, so that the developer supplying device is spaced from the developing device.

As will be understood, the device disclosed in the Japanese Laid-open Patent Application Hei 08-110692 requires a driving source and a drive transmission mechanism for automatically moving up a down the developing device.

DISCLOSURE OF THE INVENTION

However, the device of Japanese Laid-open Patent Application Hei 08-11069 necessitates the driving source and the drive transmission mechanism for moving the entirety of the developing device up and down, and therefore, the structure of the image forming apparatus side is complicated, and the cost will increase.

It is a further object of the present invention to provide an developer supply container capable of simplifying the mechanism for connecting the developer receiving portion with the developer supply container by displacing the developer receiving portion.

It is a further object of the present invention to provide a developer supply container with which the developer supply container and the developer receiving apparatus can be connected properly with each other.

According to an aspect of the present invention, there is provided a developer supply container for supplying a developer through a developer receiving portion displaceably provided in a developer receiving apparatus to which said developer supply container is detachably mountable, said developer supply container comprising a developer accommodating portion for accommodating a developer; and an engaging portion, engageable with said developer receiving portion, for displacing said developer receiving portion toward said developer supply container with a mounting operation of said developer supply container to establish a connected state between said developer supply container and said developer receiving portion.

According to another aspect of the present invention, there is provided a developer supply container for supplying a developer through a developer receiving portion displaceably provided in a developer receiving apparatus to which said developer supply container is detachably mountable, said developer supply container comprising a developer accommodating portion for accommodating a developer; and an inclined portion, inclined relative to an inserting direction of said developer supply container, for engaging with said developer receiving portion with a mounting operation of said developer supply container to displace said developer receiving portion toward said developer supply container.

According to the present invention, a mechanism for displacing the developer receiving portion to connect with the developer supply container can be simplified.

In addition, using the mounting operation of the developer supply container, the connecting state between the developer supply container and the developer receiving portion can be made proper.

Figure 85:
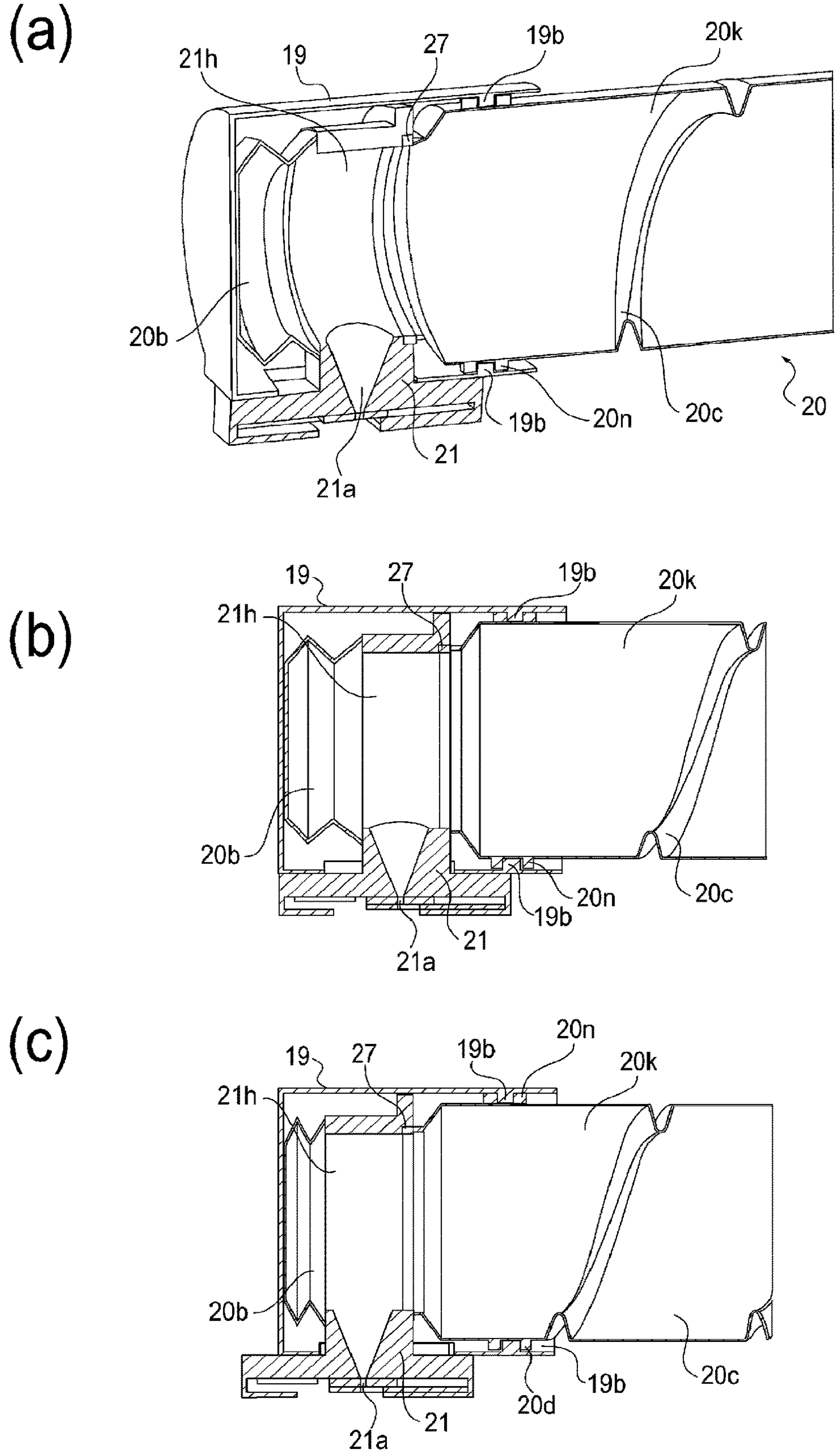

Part (a) of FIG. 85 is a sectional perspective view illustrating a structure of a developer supply container according to Embodiment 15, (b) and (c) are sectional views illustrating suction and discharging operations of a pump portion.

Figure 86:
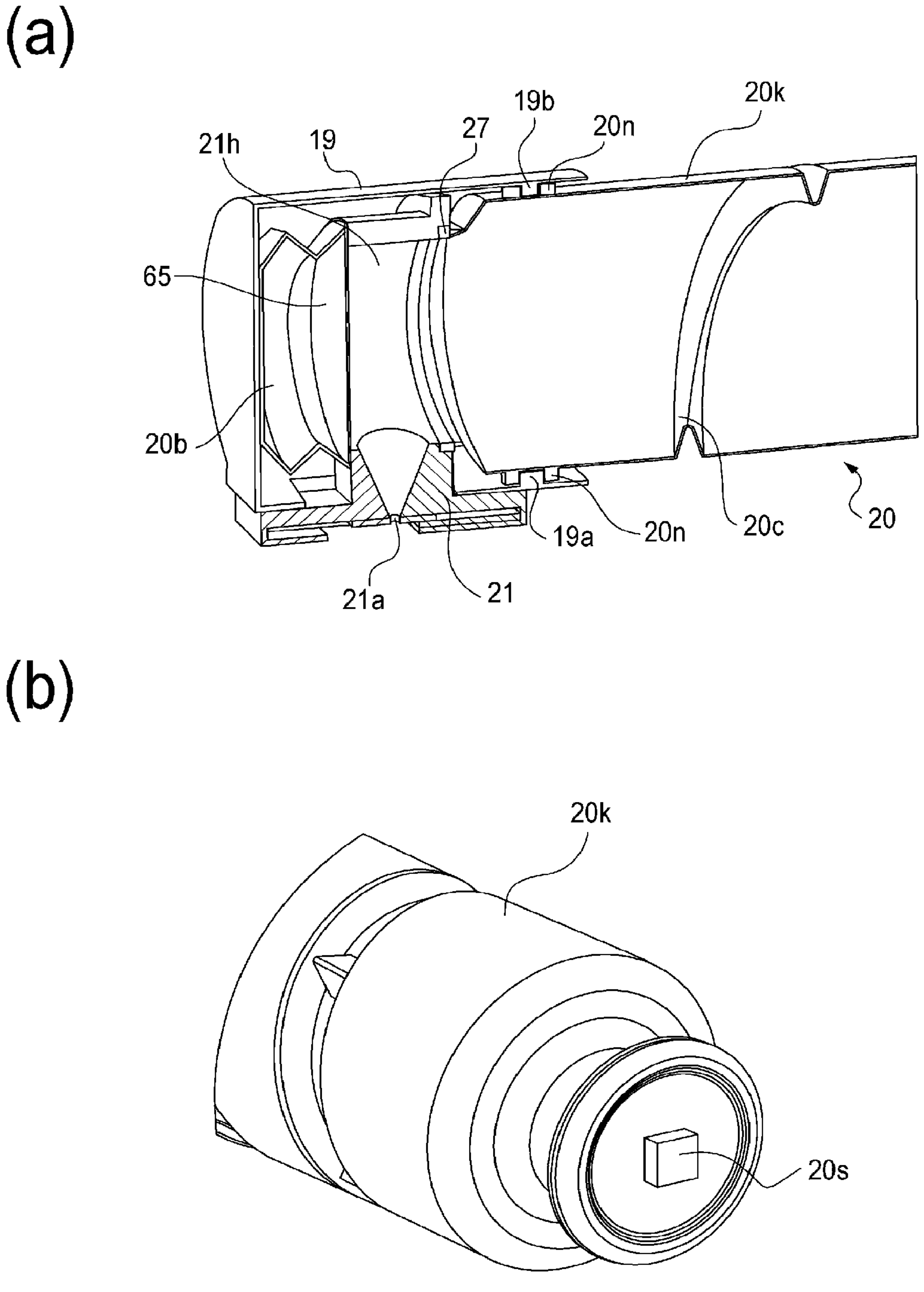

In FIG. 86, (a) is a perspective view of another example of the developer supply container of Embodiment 15, and (b) illustrates a coupling portion of the developer supply container.

Figure 87:
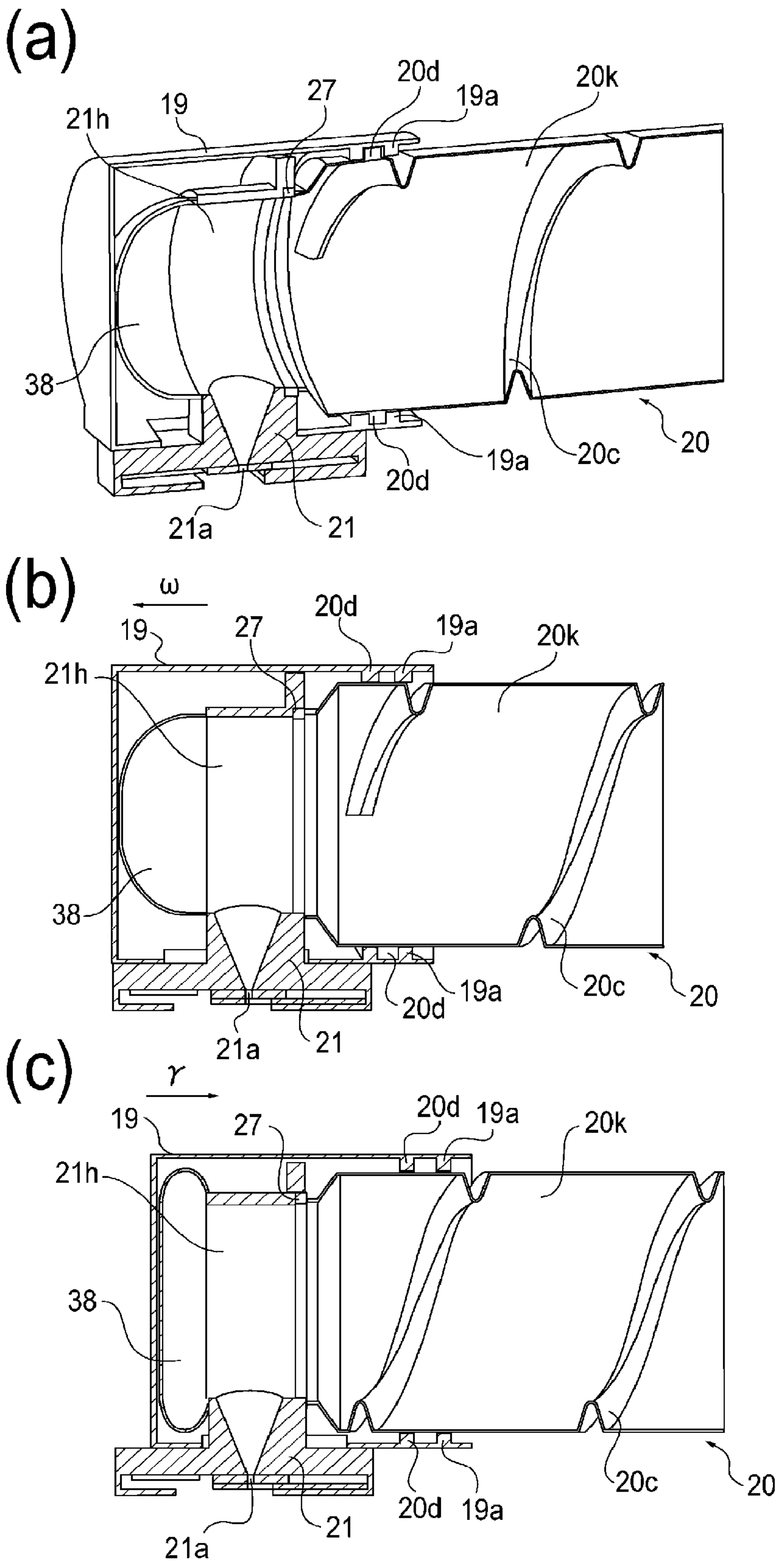

In FIG. 87, (a) is a perspective view of a section of a developer supply container according to Embodiment 16, and (b) and (c) are a sectional view illustrating a state of suction and discharging operations of the pump portion.

Figure 88:
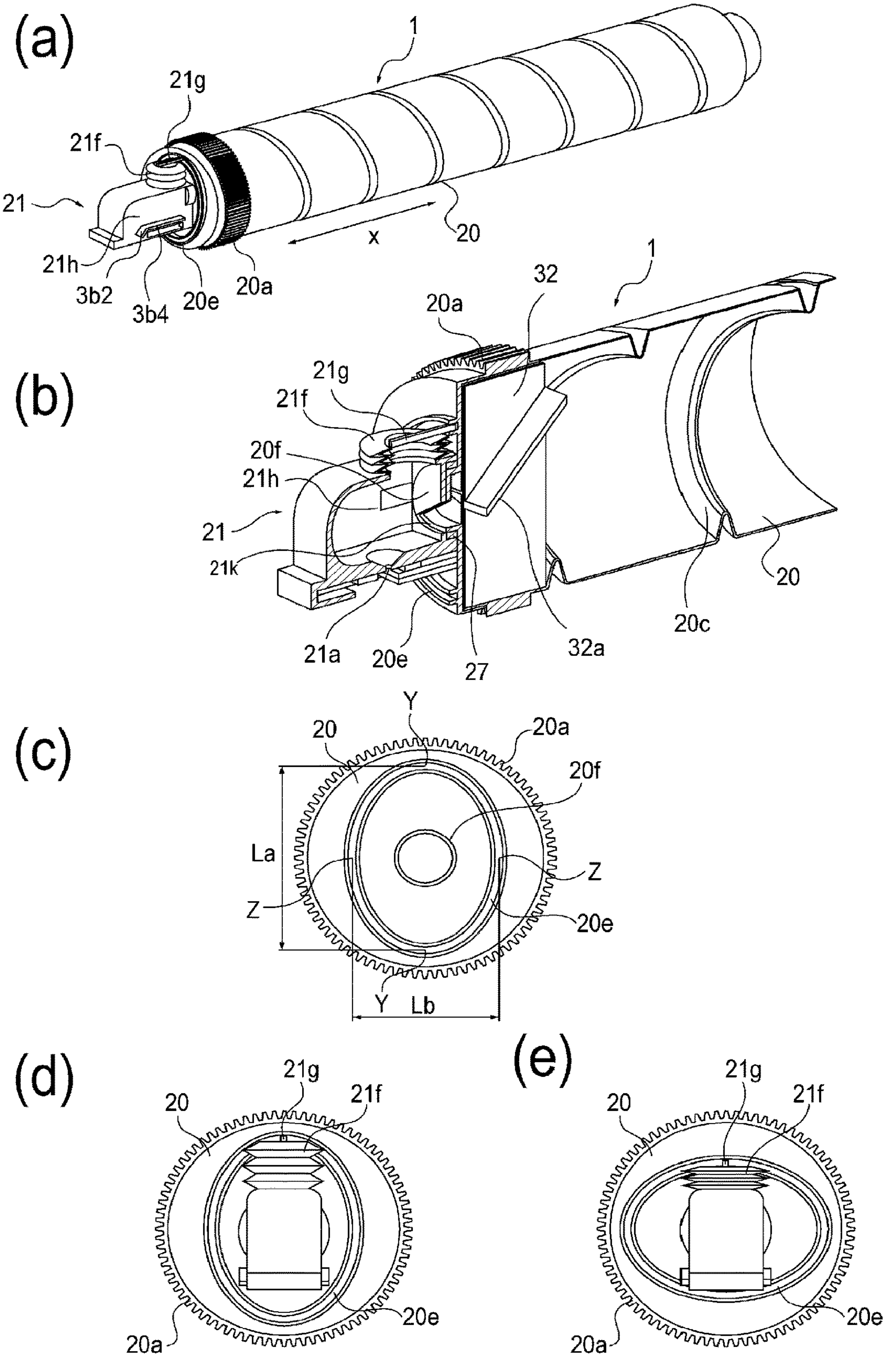

In FIG. 88, (a) is a perspective view of a structure of a developer supply container according to Embodiment 17, (b) is a perspective view of a section of the developer supply container, (c) illustrates an end portion of a developer accommodating portion, and (d) and (e) illustrate a state in the suction and discharging operations of a pump portion.

Figure 89:
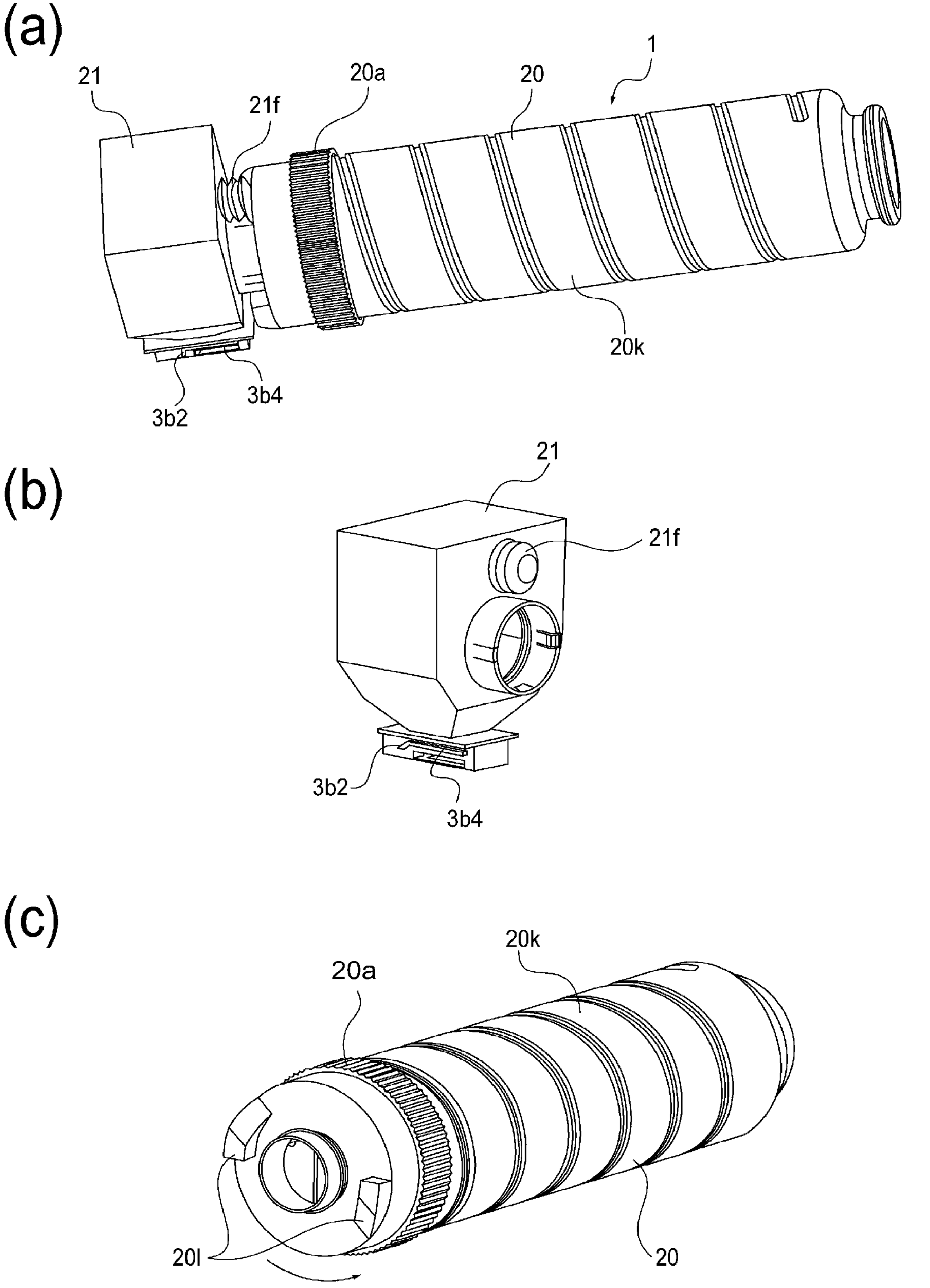

In FIG. 89, (a) is a perspective view of a structure of a developer supply container according to Embodiment 18, (b) is a perspective view of a flange portion, and (c) is a perspective view of a structure of a cylindrical portion.

Figure 90:
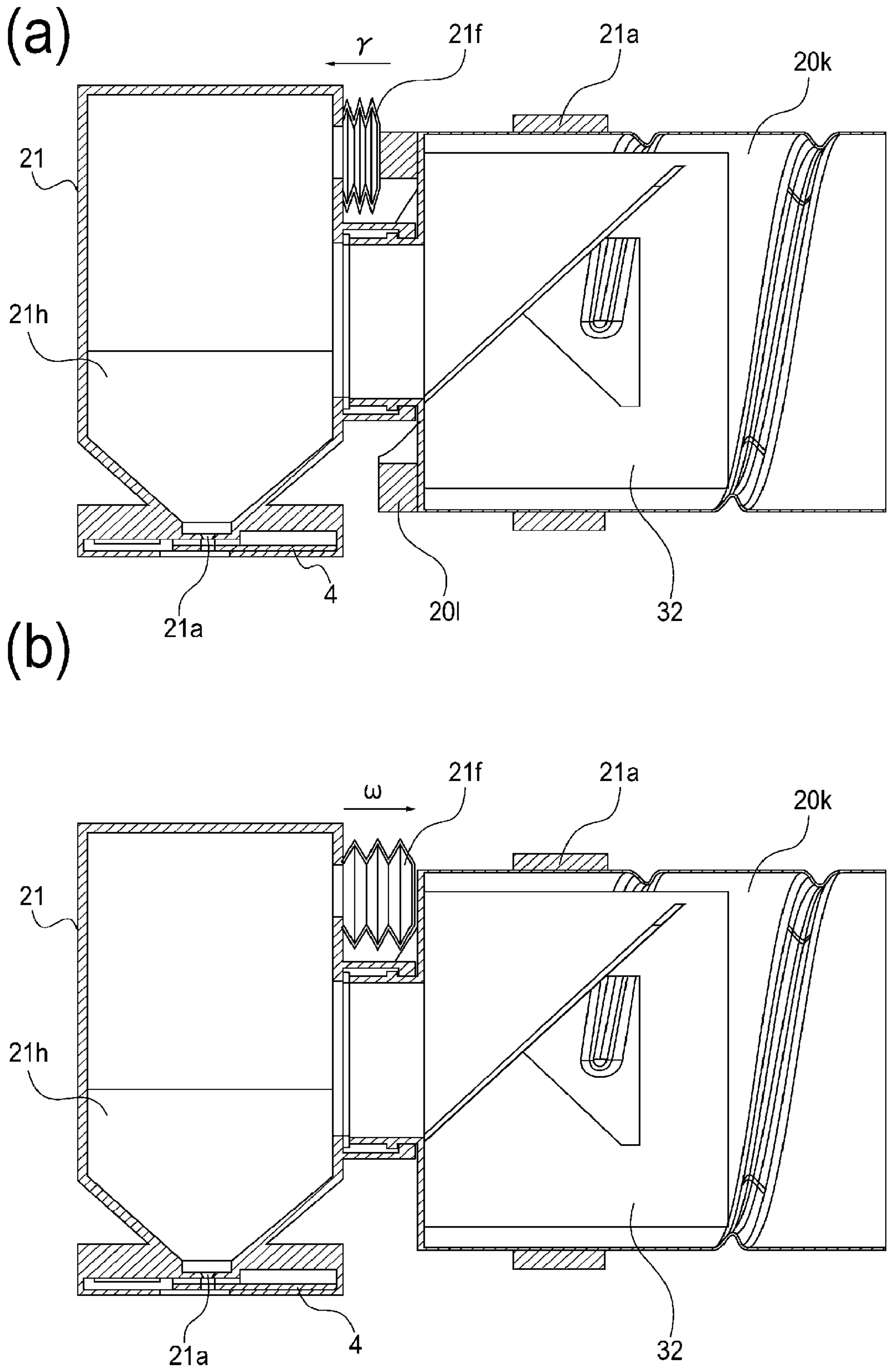

In FIG. 90, (a) and (b) are sectional views illustrating a state of suction and discharging operations of a pump portion of a developer supply container according to Embodiment 18.

Figure 91:
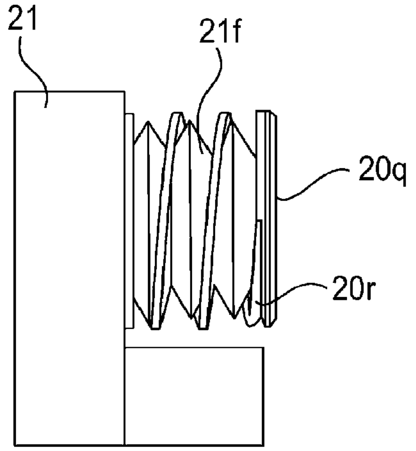

FIG. 91 illustrate a structure of the pump portion of the developer supply container according to Embodiment 18.

Figure 92:
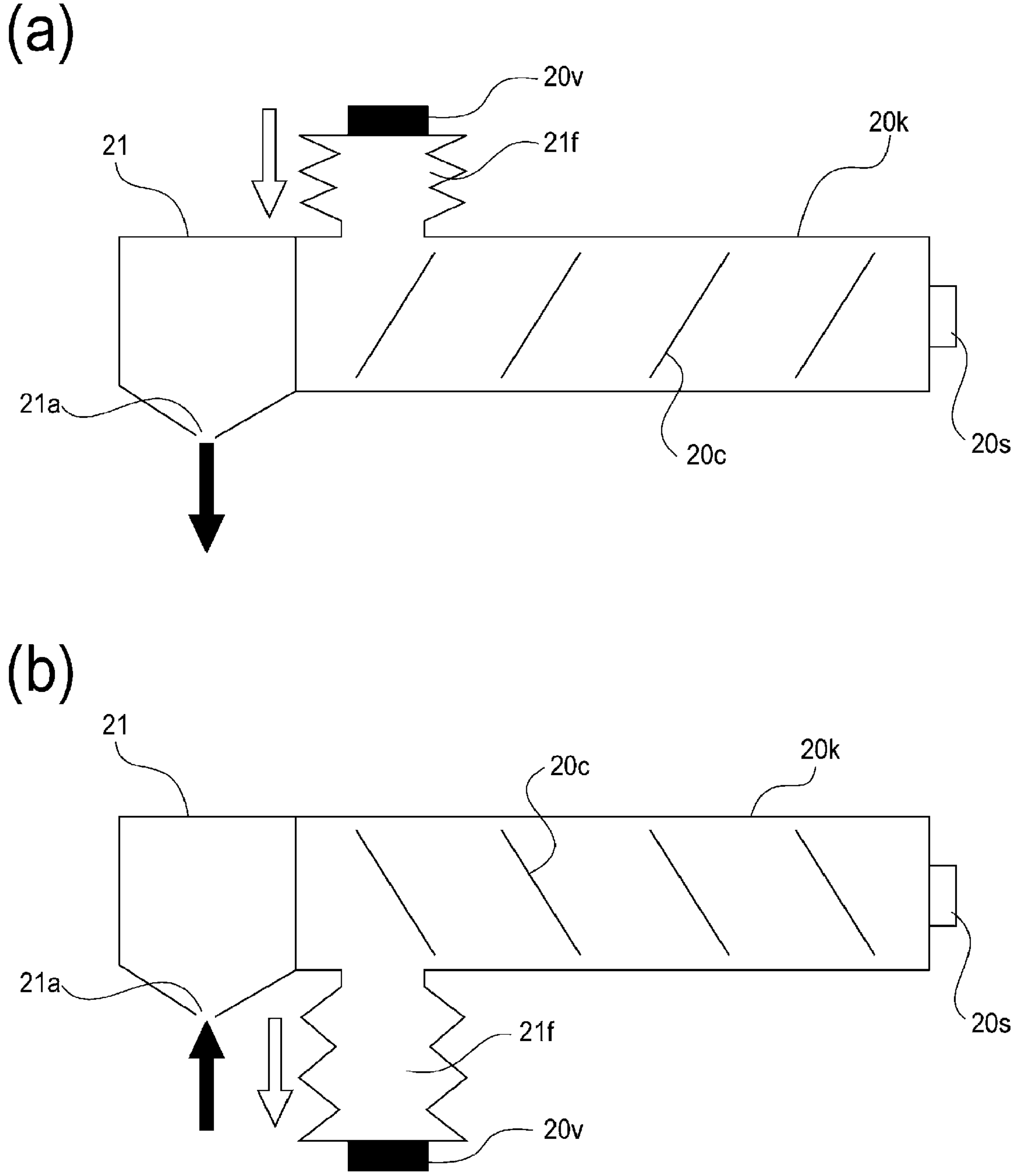

In FIG. 92, (a) and (b) are schematic sectional views of a structure of a developer supply container according to Embodiment 19.

Figure 93:
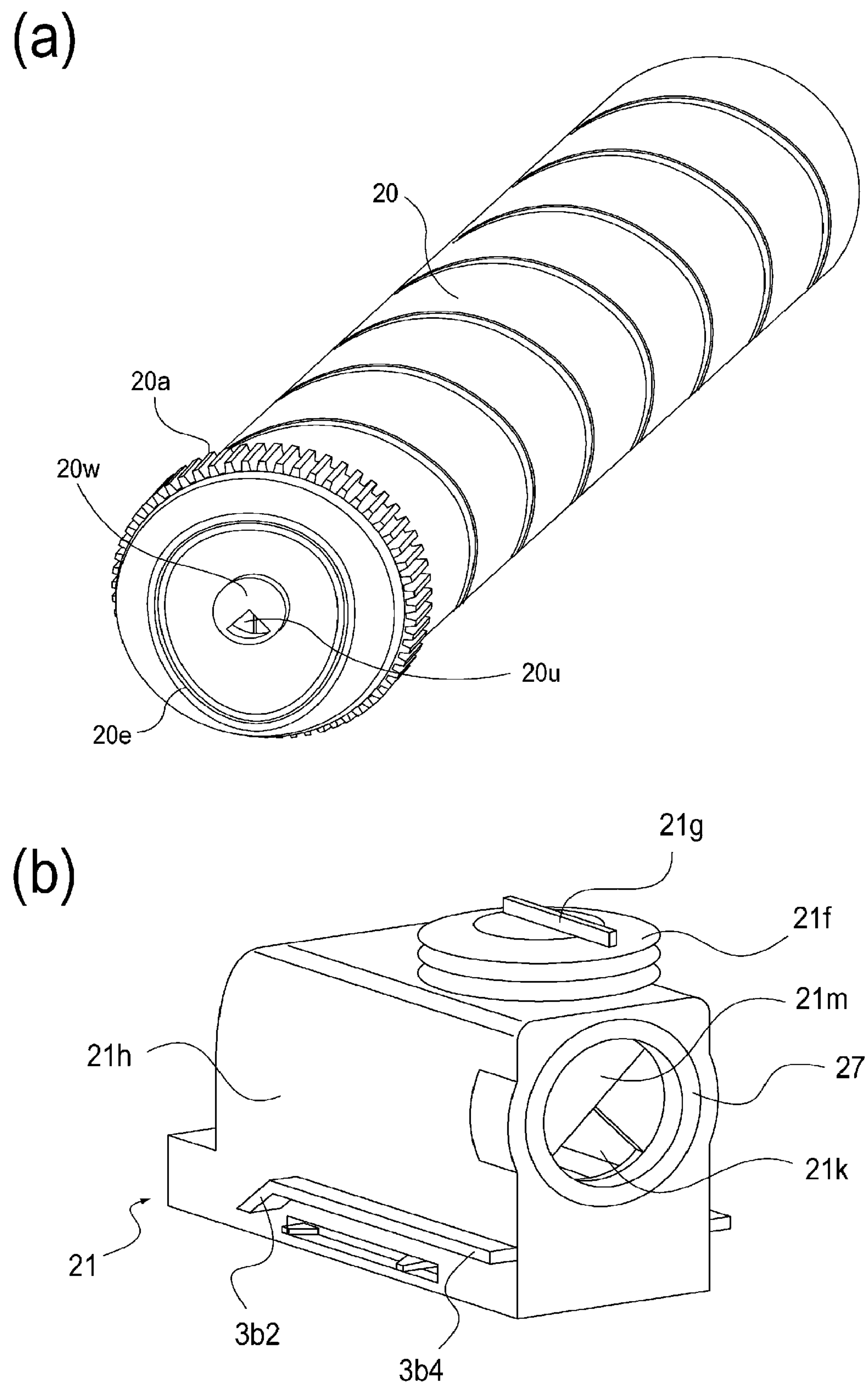

In FIG. 93, (a) and (b) are perspective views of a cylindrical portion and a flange portion of a developer supply container according to Embodiment 20.

Figure 94:
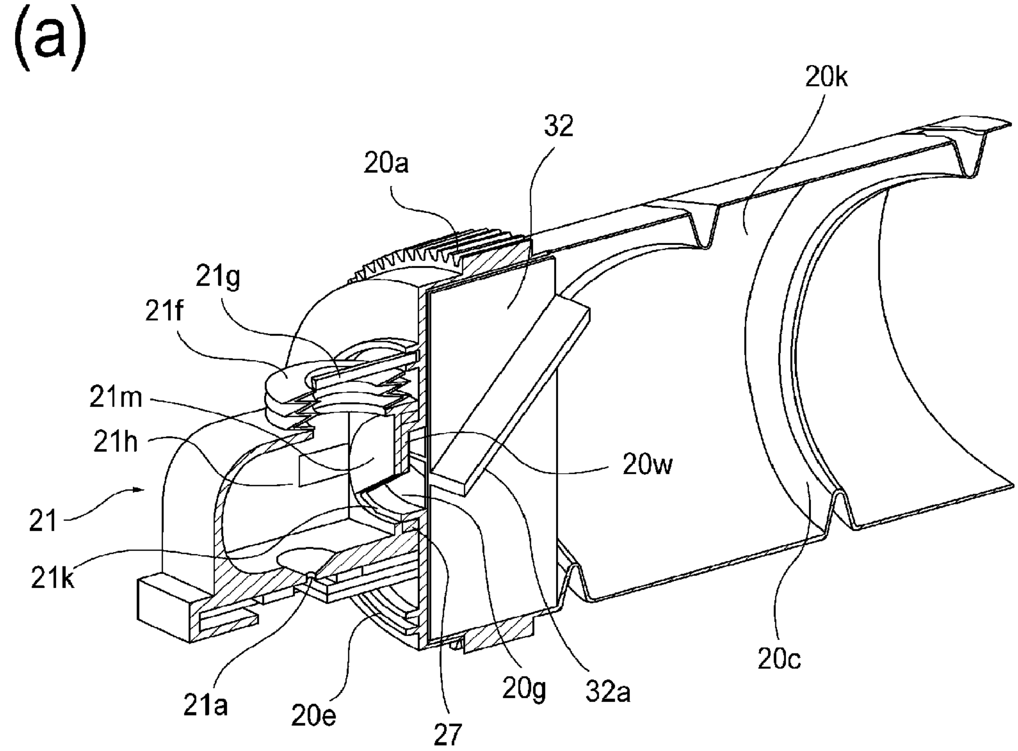
Figure 94:
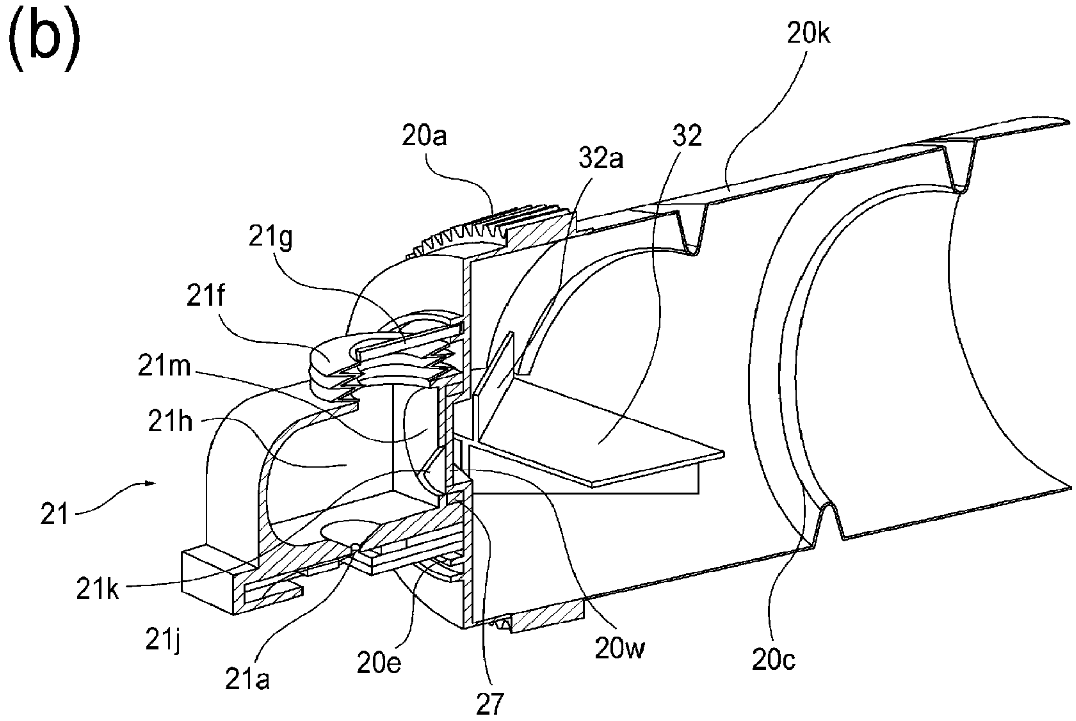

In FIG. 94, (a) and (b) are perspective views of a partial section of a developer supply container according to Embodiment 20.

Figure 95:
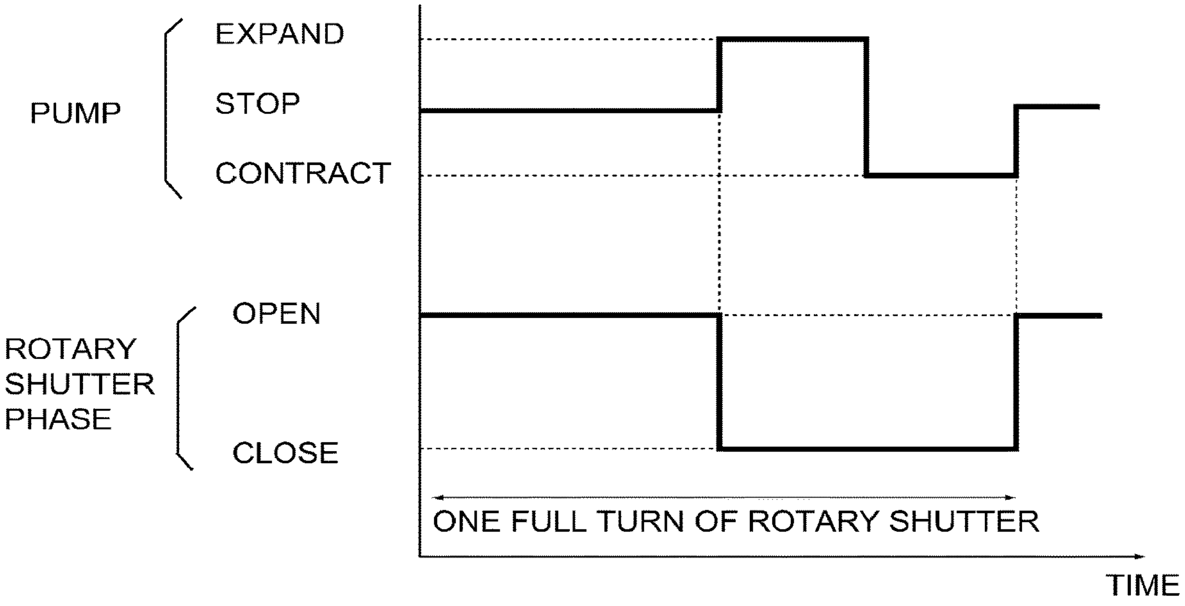

FIG. 95 is a time chart illustrating a relation between an operation state of a pump according to Embodiment 20 and opening and closing timing of a rotatable shutter.

Figure 96:
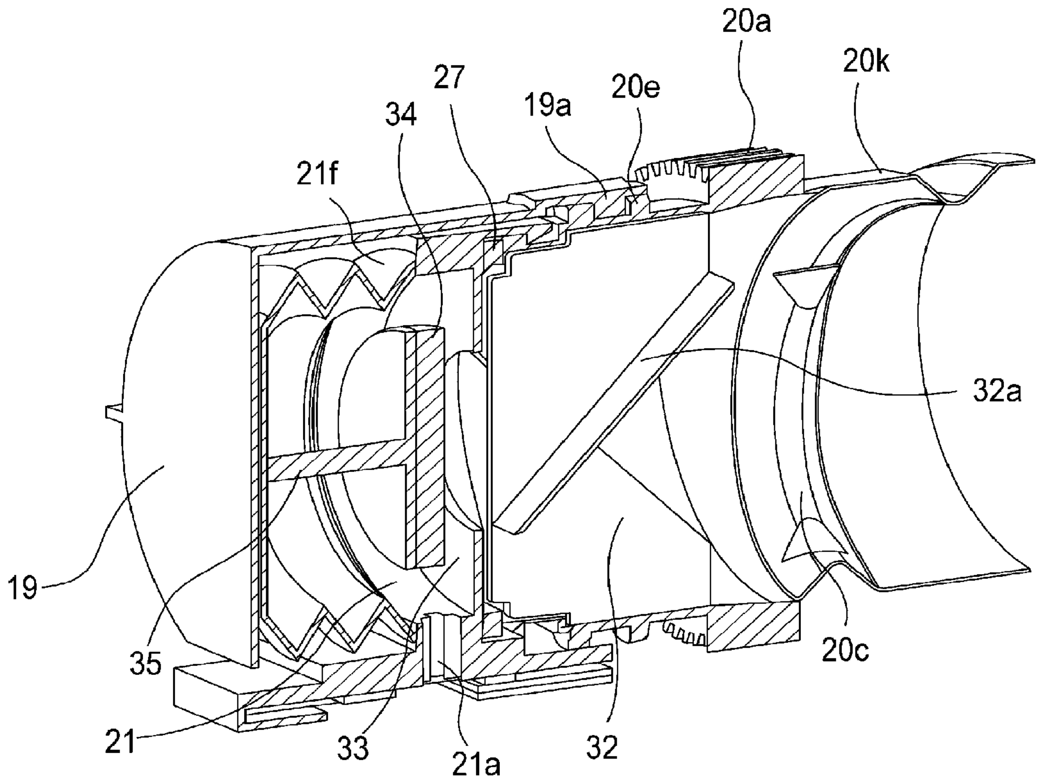

FIG. 96 is a partly sectional perspective view illustrating a developer supply container according to Embodiment 21.

Figure 97:
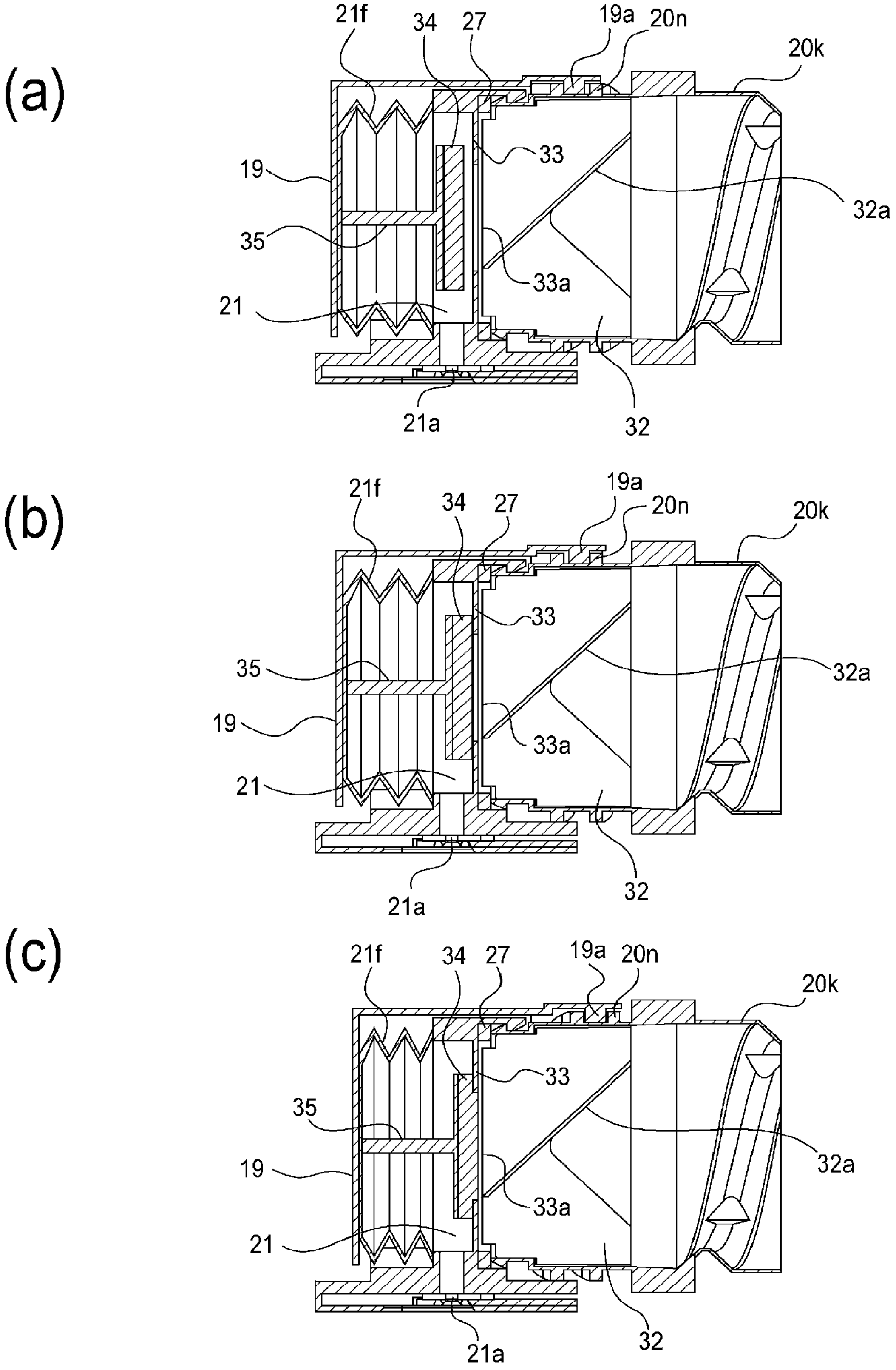

In FIG. 97, (a)-(c) are partially sectional views illustrating an operation state of a pump portion in Embodiment 21.

Figure 98:
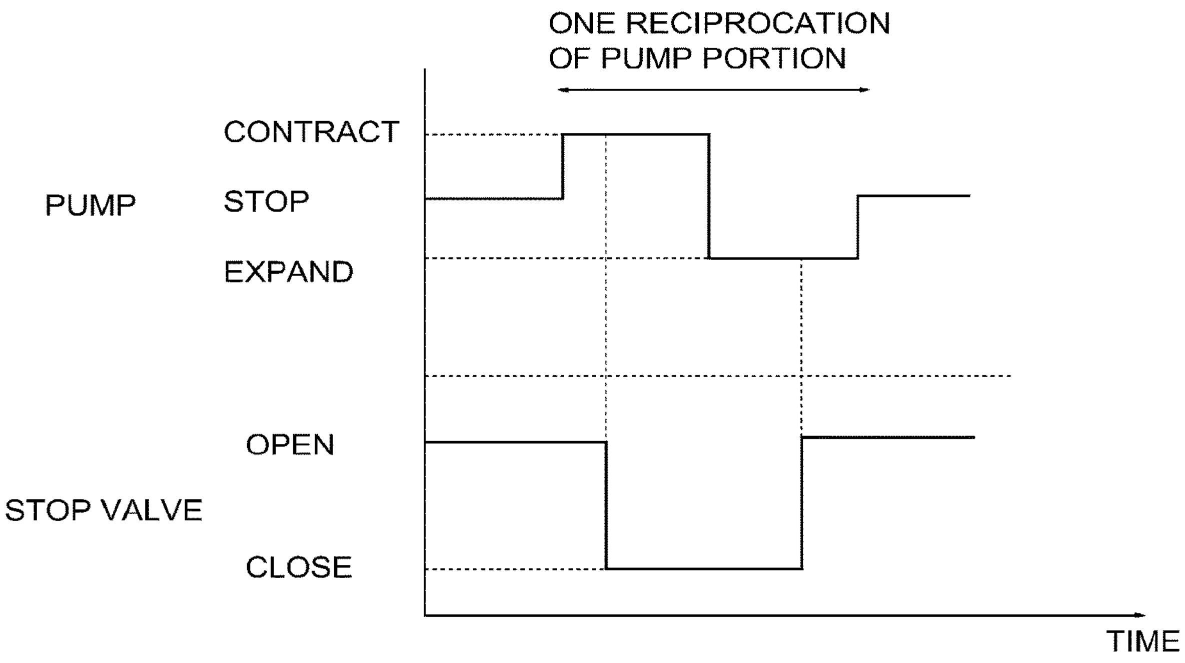

FIG. 98 is a time chart illustrating a relation between an operation state of a pump according to Embodiment 21 and opening and closing timing of a stop valve.

Figure 99:
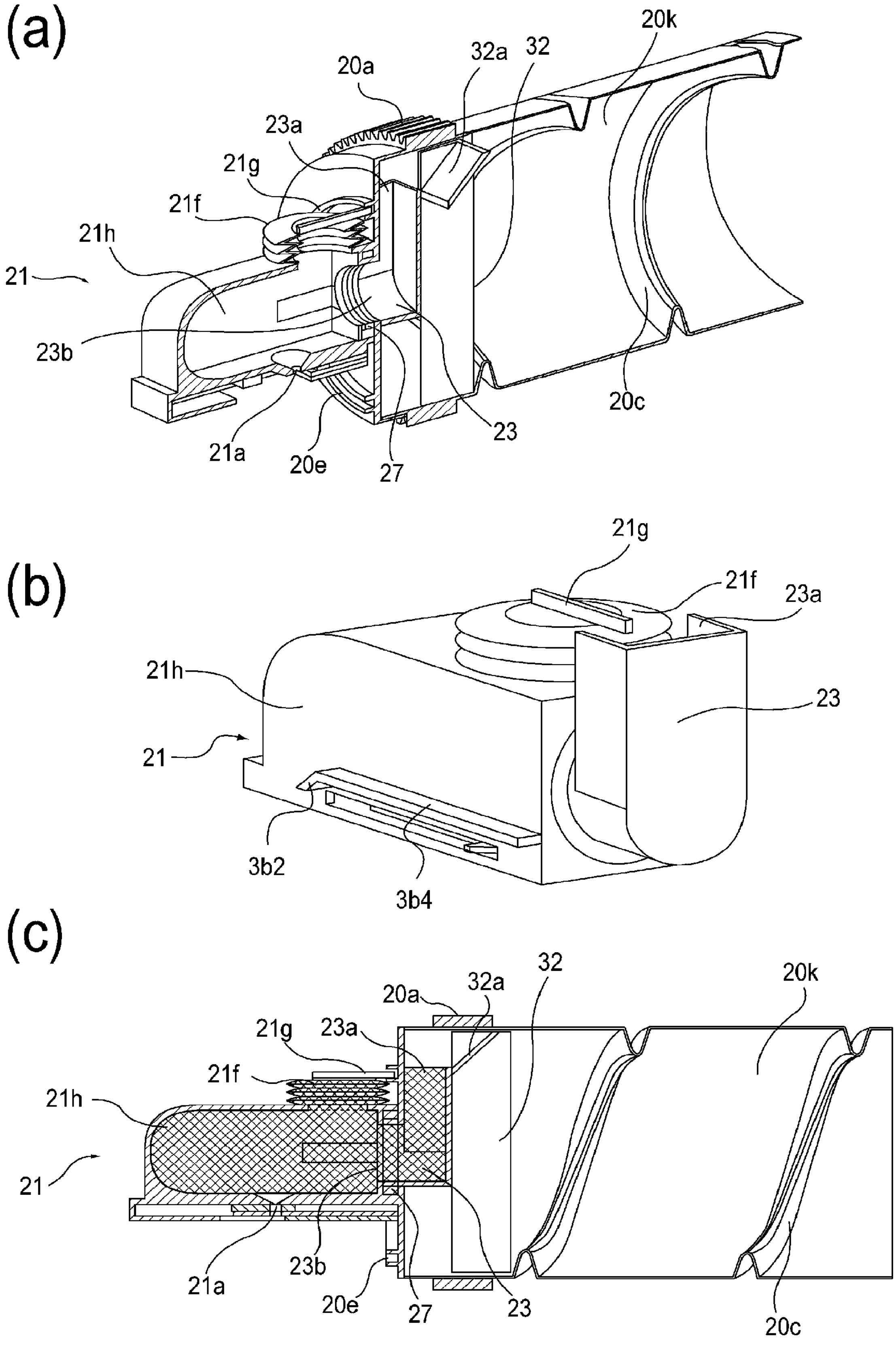

In FIG. 99, (a) is a perspective view of a portion of a developer supply container according to Embodiment 22, (b) is a perspective view of a flange portion, and (c) is a sectional view of the developer supply container.

Figure 100:
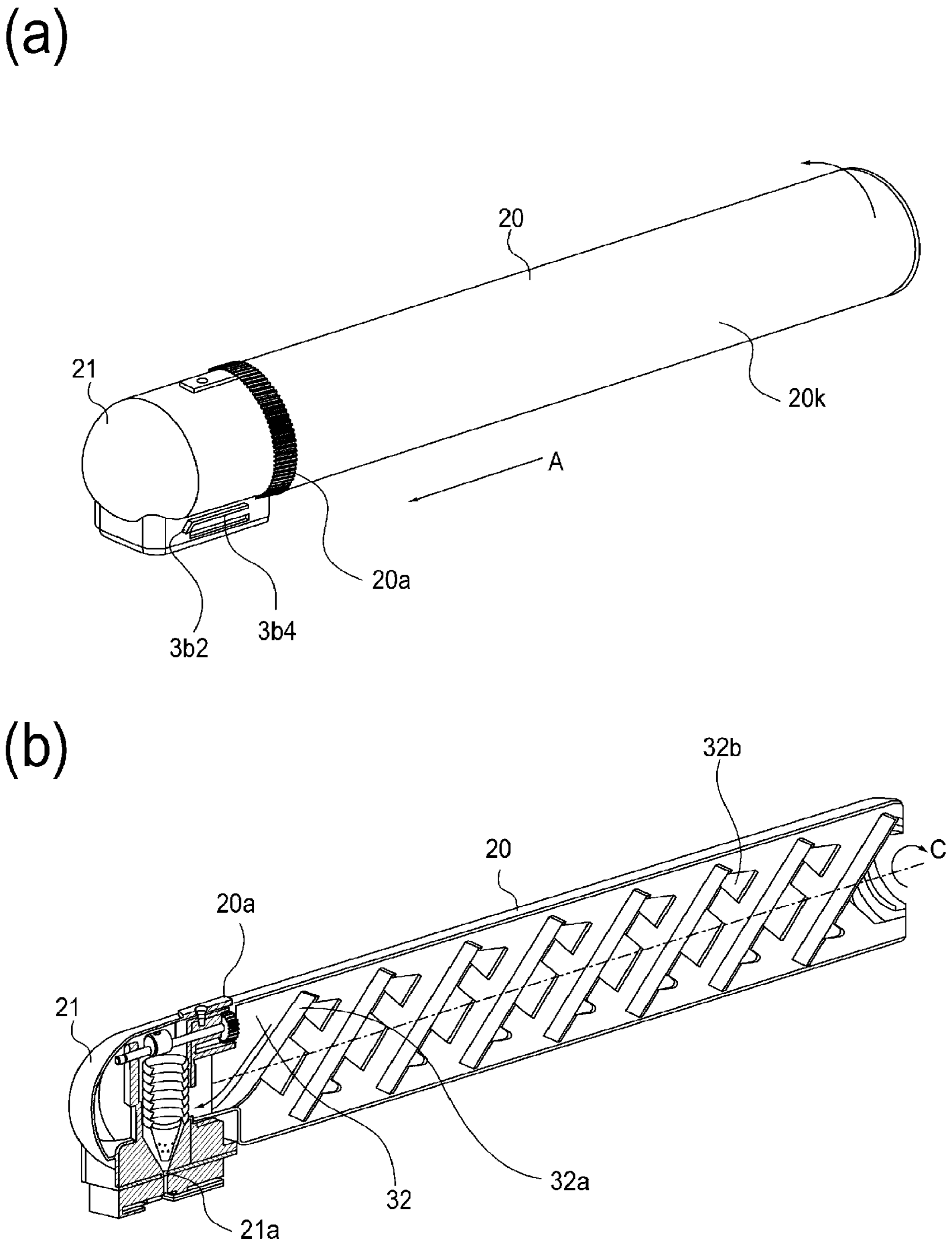

In FIG. 100, (a) is a perspective view of a structure of a developer supply container according to Embodiment 23, (b) is a perspective view of a section of the developer supply container.

Figure 101:
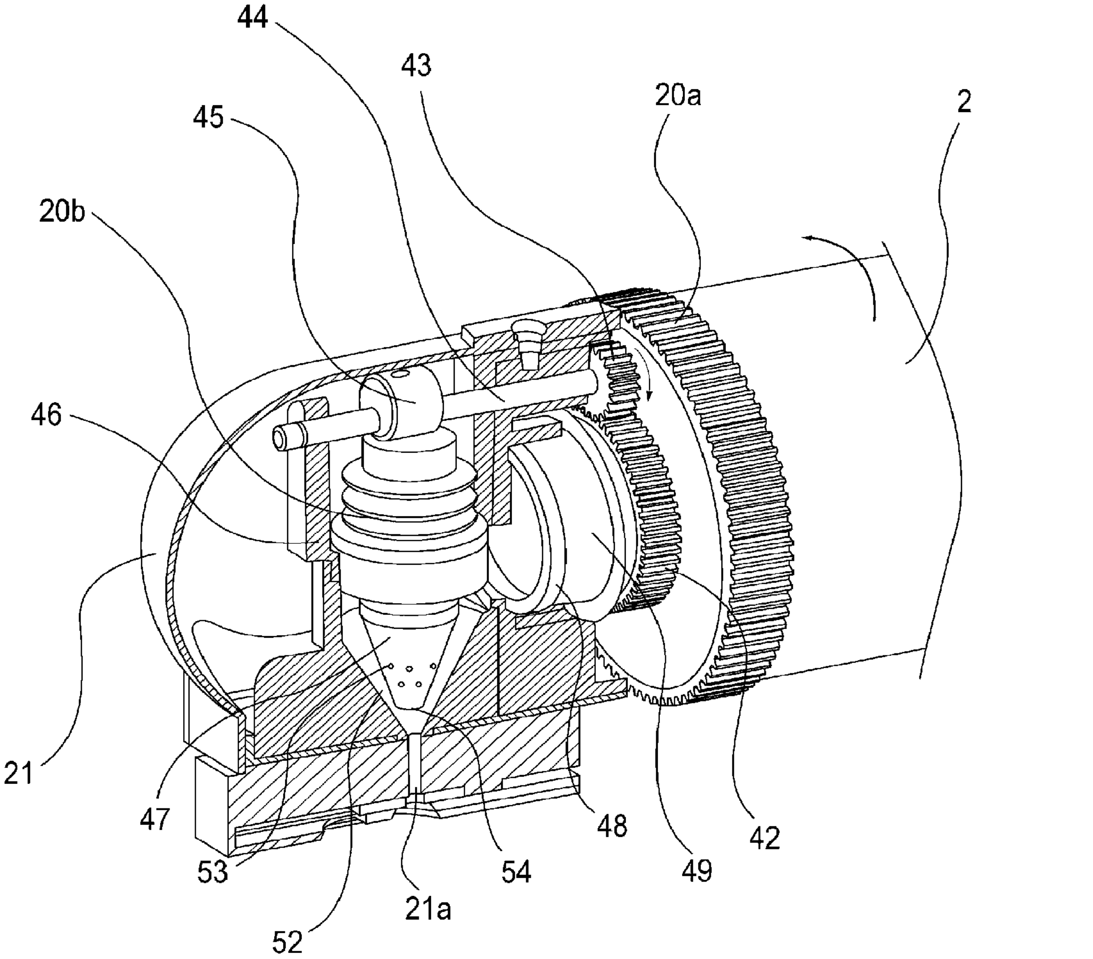

FIG. 101 is a partly sectional perspective view illustrating a structure of a developer supply container according to Embodiment 23.

Figure 102:
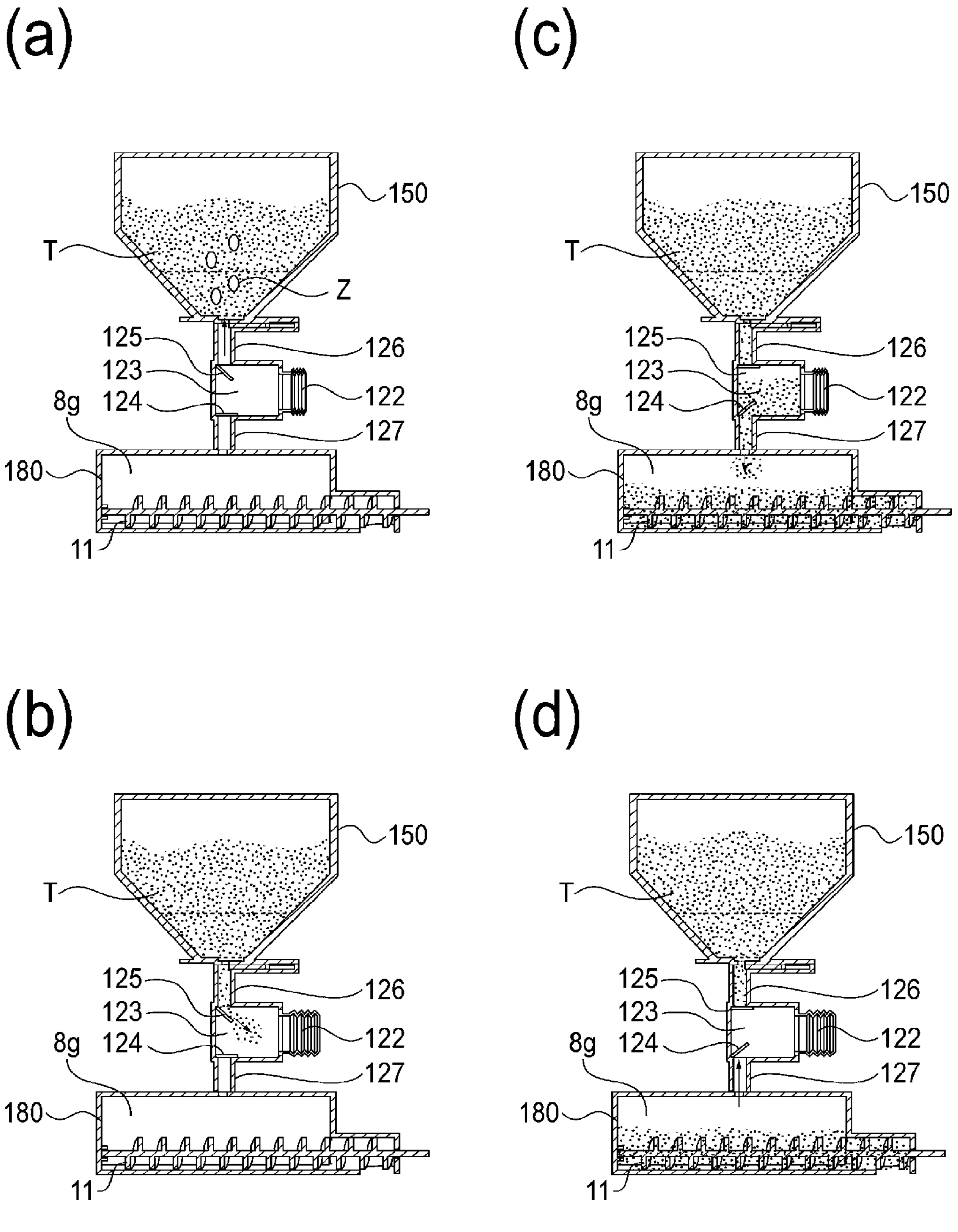

In FIG. 102, (a)-(d) are sectional views of a developer supply container and a developer receiving apparatus of a comparison example, illustrating a flow of developer supplying steps.

Figure 103:
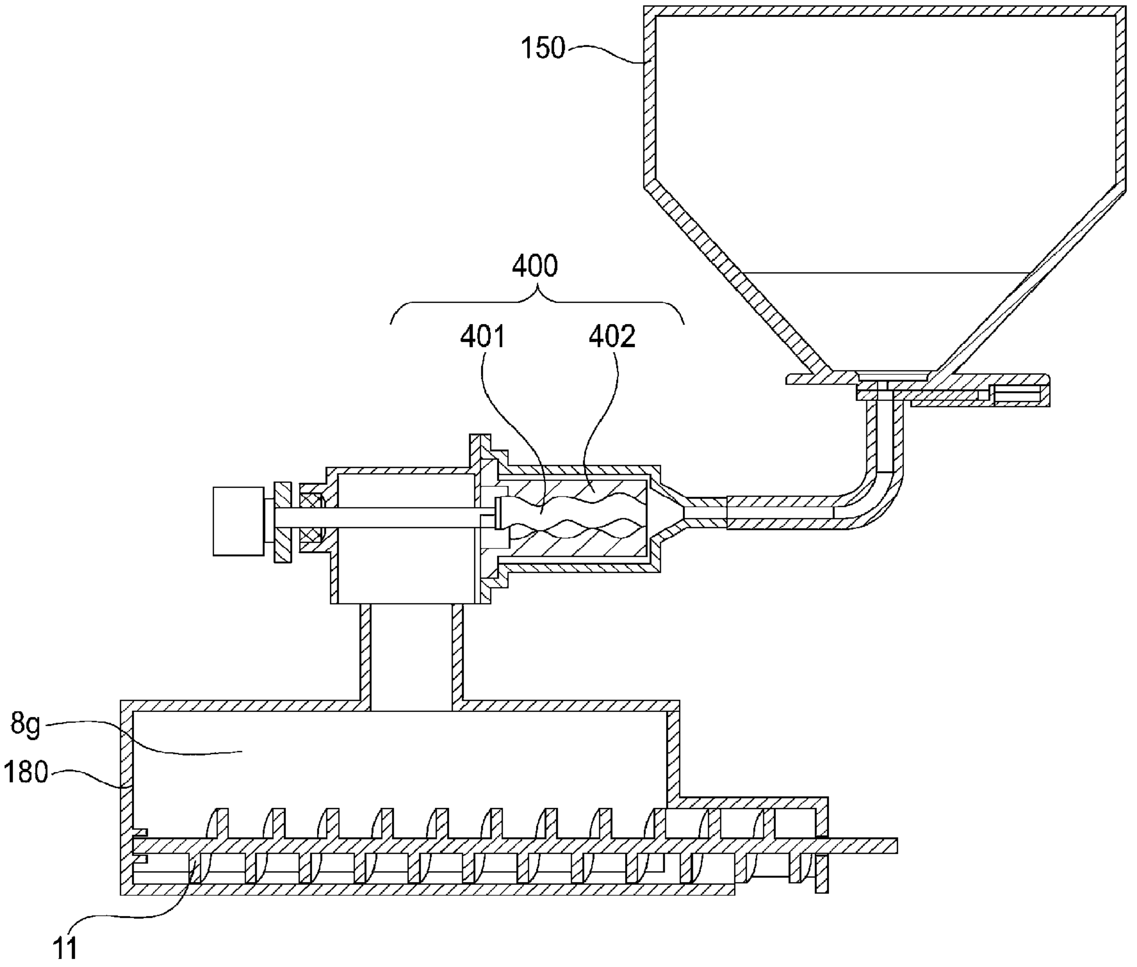

FIG. 103 is a sectional view illustrating a developer supply container and a developer receiving apparatus of another comparison example.

PREFERRED EMBODIMENTS OF THE INVENTION

The description will be made as to a developer supply container and a developer supplying system according to the present invention. In the following description, various structures of the developer supply container may be replaced with other known structures having similar functions within the scope of the concept of invention unless otherwise stated. In other words, the present invention is not limited to the specific structures of the embodiments which will be described hereinafter, unless otherwise stated.

Embodiment 1

First, basic structures of an image forming apparatus will be described, and then, a developer receiving apparatus and a developer supply container constituting a developer supplying system used in the image forming apparatus will be described.

(Image Forming Apparatus)

Figure 1:
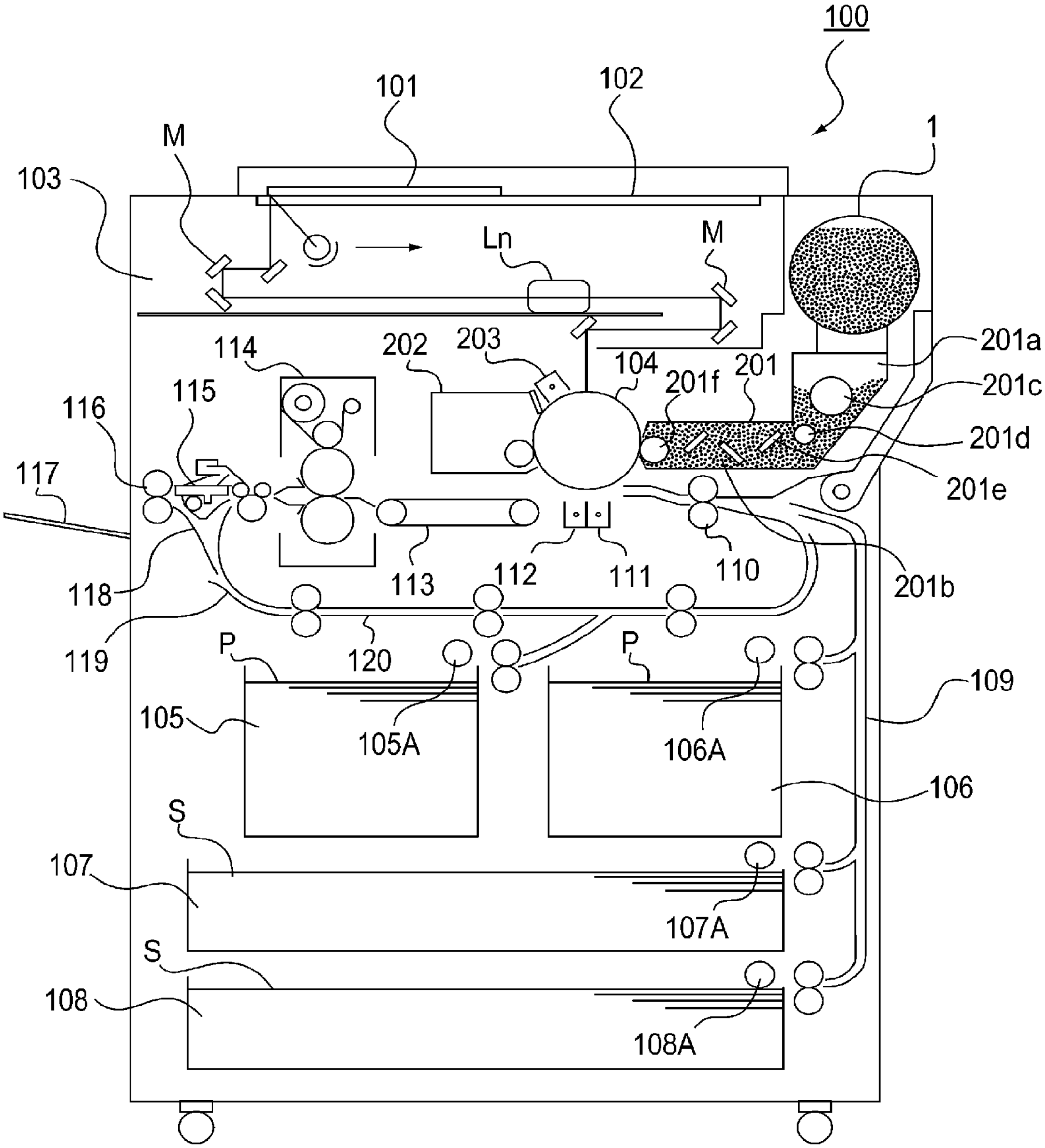
FIG. 1 is a sectional view of a main assembly of the image forming apparatus.

Referring to FIG. 1, the description will be made as to a structure of a copying machine (electrophotographic image forming apparatus) of an electrophotographic type as an example of an image forming apparatus comprising a developer receiving apparatus to which a developer supply container (so-called toner cartridge) is detachably (removably) mounted.

In the FIGURE, designated by 100 is a main assembly of the copying machine (main assembly of the image forming apparatus or main assembly of the apparatus). Designated by 101 is an original which is placed on an original supporting platen glass 102. A light image corresponding to image information of the original is imaged on an electrophotographic photosensitive member 104 (photosensitive member) by way of a plurality of mirrors M of an optical portion 103 and a lens Ln, so that an electrostatic latent image is formed. The electrostatic latent image is visualized with toner (one component magnetic toner) as a developer (dry powder) by a dry type developing device (one component developing device) 201*a*.

In this embodiment, the one component magnetic toner is used as the developer to be supplied from a developer supply container 1, but the present invention is not limited to the example and includes other examples which will be described hereinafter.

Specifically, in the case that a one component developing device using the one component non-magnetic toner is employed, the one component non-magnetic toner is supplied as the developer. In addition, in the case that a two component developing device using a two component developer containing mixed magnetic carrier and non-magnetic toner is employed, the non-magnetic toner is supplied as the developer. In such a case, both of the non-magnetic toner and the magnetic carrier may be supplied as the developer.

As described hereinbefore, the developing device 201 of FIG. 1 develops, using the developer, the electrostatic latent image formed on the photosensitive member 104 as an image bearing member on the basis of image information of the original 101. The developing device 201 is provided with a developing roller 201*f* in addition to the developer hopper portion 201*a*. The developer hopper portion 201*a* is provided with a stirring member 201*c* for stirring the developer supplied from the developer supply container 1. The developer stirred by the stirring member 201*c* is fed to the feeding member 201*e* by a feeding member 201*d*.

The developer having been fed by the feeding members 201*e*, 201*b* in the order named is supplied finally to a developing zone relative to the photosensitive member 104 while being carried on the developing roller 201*f*.

In this example, the toner as the developer is supplied from the developer supply container 1 to the developing device 201, but another system may be used, and the toner and the carrier functioning developer may be supplied from the developer supply container 1, for example.

Of the sheet S stacked in the cassettes 105-108, an optimum cassette is selected on the basis of a sheet size of the original 101 or information inputted by the operator (user) from a liquid crystal operating portion of the copying machine. The recording material is not limited to a sheet of paper, but OHP sheet or another material can be used as desired.

One sheet S supplied by a separation and feeding device 105A-108A is fed to registration rollers 110 along a feeding portion 109, and is fed at timing synchronized with rotation of a photosensitive member 104 and with scanning of an optical portion 103.

Designated by 111, 112 are a transfer charger and a separation charger. An image of the developer formed on the photosensitive member 104 is transferred onto the sheet S by a transfer charger 111.

Thereafter, the sheet S fed by the feeding portion 113 is subjected to heat and pressure in a fixing portion 114 so that the developed image on the sheet is fixed, and then passes through a discharging/reversing portion 115, in the case of one-sided copy mode, and subsequently the sheet S is discharged to a discharging tray 117 by discharging rollers 116. The trailing end thereof passes through a flapper 118, and a flapper 118 is controlled when it is still nipped by the discharging rollers 116, and the discharging rollers 116 are rotated reversely, so that the sheet S is refed into the apparatus. Then, the sheet S is fed to the registration rollers 110 by way of re-feeding portions 119, 120, and then conveyed along the path similarly to the case of the one-sided copy mode and is discharged to the discharging tray 117.

In the main assembly 100 of the apparatus, around the photosensitive member 104, there are provided image forming process equipment such as a developing device 201*a* as the developing means a cleaner portion 202 as a cleaning means, a primary charger 203 as charging means. The developing device 201 develops the electrostatic latent image formed on the photosensitive member 104 by the optical portion 103 in accordance with image information of the 101, by depositing the developer onto the latent image. The primary charger 203 uniformly charges a surface of the photosensitive member for the purpose of forming a desired electrostatic image on the photosensitive member 104. The cleaner portion 202 removes the developer remaining on the photosensitive member 104.

Figure 2:
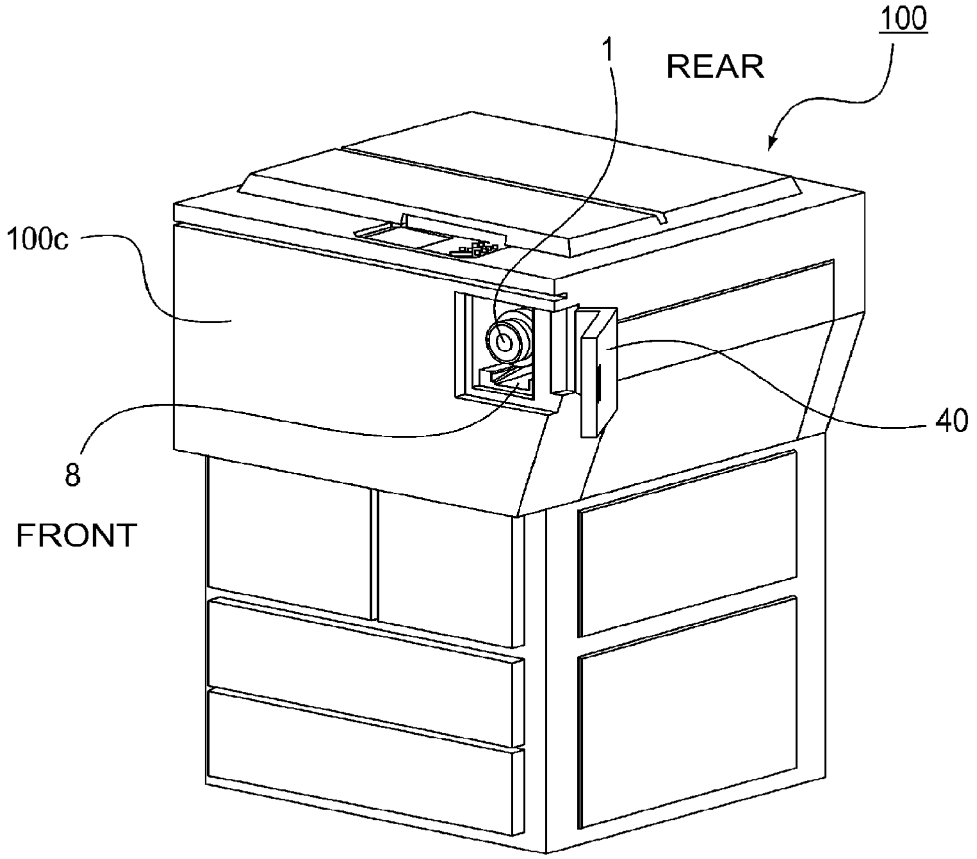
FIG. 2 is a perspective view of the main assembly of the image forming apparatus.

FIG. 2 is an outer appearance of the image forming apparatus. When an exchange cover 40 which is a part of an outer casing of the image forming apparatus, a part of a developer receiving apparatus 8 which will be described hereinafter is exposed.

By inserting (mounting) the developer supply container 1 into the developer receiving apparatus 8, the developer supply container 1 is set in the state capable of supplying the developer into the developer receiving apparatus 8. On the other hand, when the operator exchanges the developer supply container 1 the developer supply container 1 is taken out (disengaged) from the developer receiving apparatus 8 through the operation reciprocal to the mounting operation, and a new developer supply container 1 is set. Here, the exchange cover 40 is exclusively for mounting and demounting (exchange) of the developer supply container 1, and is opened and closed for mounting and demounting the developer supply container 1. For other maintenance operations for the main assembly of the apparatus 100, a front cover 100*c* is opened and closed. The exchange cover 40 and the front cover 100*c* may be made integral with each other, and in this case, the exchange of the developer supply container 1 and the maintenance of the main assembly of the apparatus 100 are carried out with opening and closing of the integral cover (unshown).

(Developer Receiving Apparatus)

Figure 3:
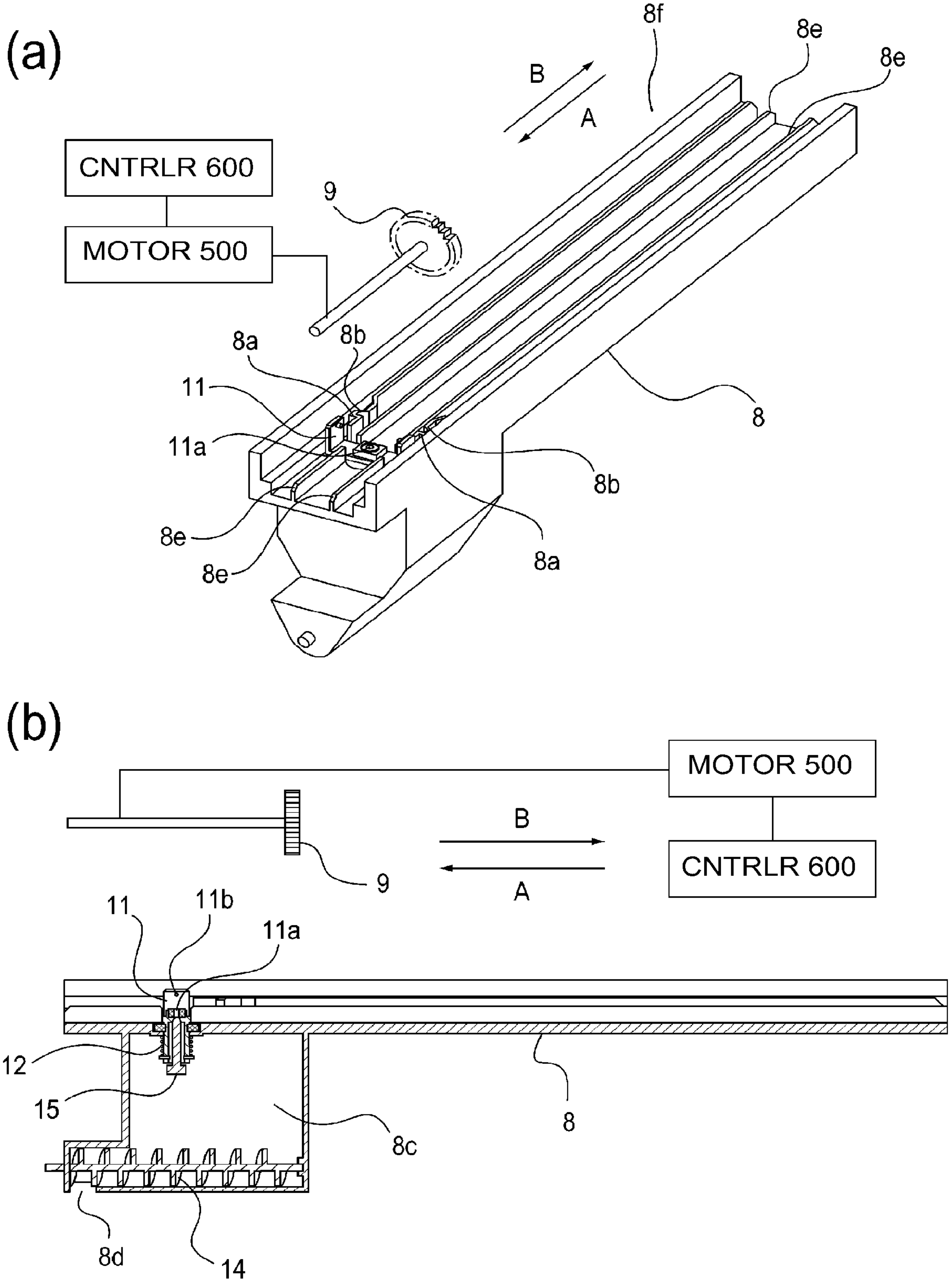
In FIG. 3, (a) is a perspective view of a developer receiving apparatus, and (b) is a sectional view of the developer receiving apparatus.
Figure 4:
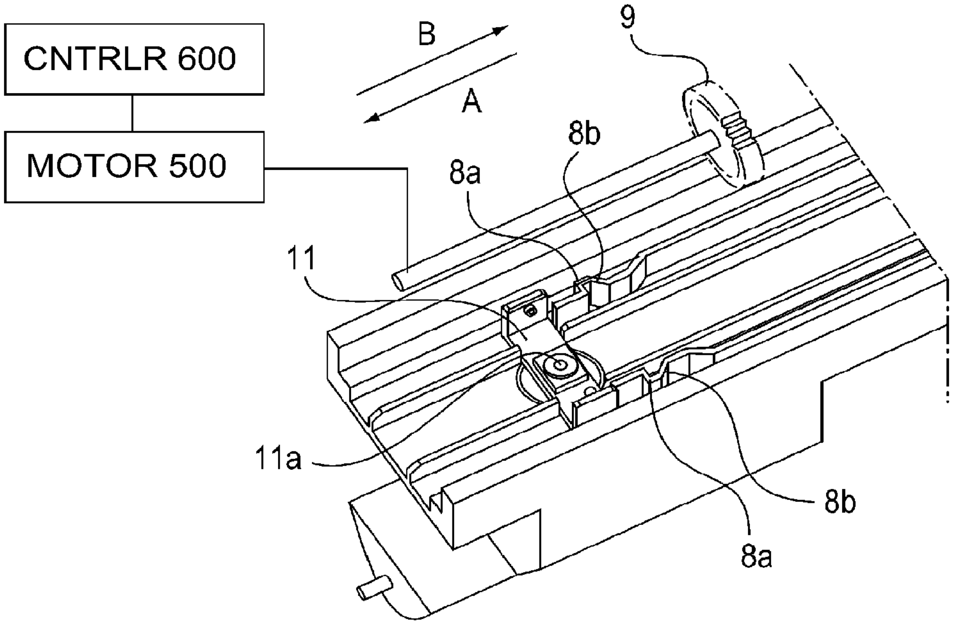
In FIG. 4, (a) is a partial enlarged perspective view of the developer receiving apparatus, (b) is a partial enlarged sectional view of the developer receiving apparatus, and (c) is a perspective view of a developer receiving portion.
Figure 4:
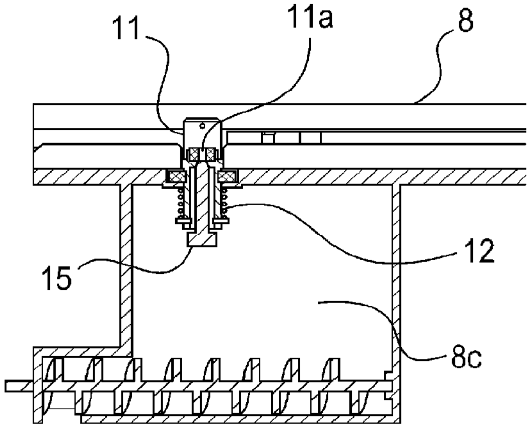
Figure 4:
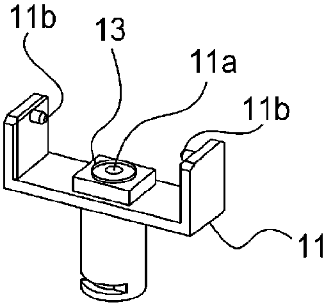

Referring to FIGS. 3 and 4 the developer receiving apparatus 8 will be described. Part (a) of FIG. 3 is a schematic perspective view of the developer receiving apparatus 8, and part (b) of FIG. 3 is a schematic sectional view of the developer receiving apparatus 8. Part (a) of FIG. 4 is a partial enlarged perspective view of the developer receiving apparatus 8, part (b) of FIG. 4 is a partial enlarged sectional view of the developer receiving apparatus 8, and a part (c) of FIG. 4 is a perspective view of a developer receiving portion 11.

As shown in part (a) of FIG. 3, the developer receiving apparatus 8 is provided with a mounting portion (mounting space) 8*f* into which the developer supply container 1 is removably (detachably) mounted. It is also provided with a developer receiving portion 11 for receiving the developer discharged through a discharge opening 3*a*4 (part (b) of FIG. 7), which will be described hereinafter, of the developer supply container 1. The developer receiving portion 11 is mounted so as to be movable (displaceable) relative to the developer receiving apparatus 8 in the vertical direction. As shown in part (c) of FIG. 4, the developer receiving portion 11 is provided with a main assembly seal 13 having a developer receiving port 11*a* at the central portion thereof. The main assembly seal 13 is made of an elastic member, a foam member or the like, and is close-contacted with an opening seal 3*a*5 (part (b) of FIG. 7) having a discharge opening 3*a*4 of the developer supply container 1, by which the developer discharged through the discharge opening 3*a*4 is prevented from leaking out of a developer feeding path including developer receiving port 11*a*.

In order to prevent the contamination in the mounting portion 8*f* by the developer as much as possible, a diameter of the developer receiving port 11*a* is desirably substantially the same as or slightly larger than a diameter of the discharge opening 3*a*4 of the developer supply container 1. This is because if the diameter of the developer receiving port 11*a* is smaller than the diameter of the discharge opening 3*a*4, the developer discharged from the developer supply container 1 is deposited on the upper surface of the main assembly seal 13 having the developer receiving port 11*a*, and the deposited developer is transferred onto the lower surface of the developer supply container 1 during the dismounting operation of the developer supply container 1, with the result of contamination with the developer. In addition, the developer transferred onto the developer supply container 1 may be scattered to the mounting portion 8*f* with the result of contamination of the mounting portion 8*f* with the developer. On the contrary, if the diameter of the developer receiving port 11*a* is quite larger than the diameter of the discharge opening 3*a*4, an area in which the developer scattered from the developer receiving port 11*a* is deposited around the discharge opening 3*a*4 formed in the opening seal 3*a*5 is large. That is, the contaminated area of the developer supply container 1 by the developer is large, which is not preferable. Under the circumstances, the difference between the diameter of the developer receiving port 11*a* and the diameter of the discharge opening 3*a*4 is preferably substantially 0 to approx. 2 mm.

In this example, the diameter of the discharge opening 3*a*4 of the developer supply container 1 is approx. Φ2 mm (pin hole), and therefore, the diameter of the developer receiving port 11*a* is approx. φ3 mm.

As shown in part (b) of FIG. 3, the developer receiving portion 11 is urged downwardly by an urging member 12. When the developer receiving portion 11 moves upwardly, it has to move against an urging force of the urging member 12.

As shown in part (b) of FIG. 3, below the developer receiving apparatus 8, there is provided a sub-hopper 8*c* for temporarily storing the developer. In the sub-hopper 8*c*, there are provided a feeding screw 14 for feeding the developer into the developer hopper portion 201*a* which is a part of the developing device 201, and an opening 8*d* which is in fluid communication with the developer hopper portion 201*a*.

Figure 13:
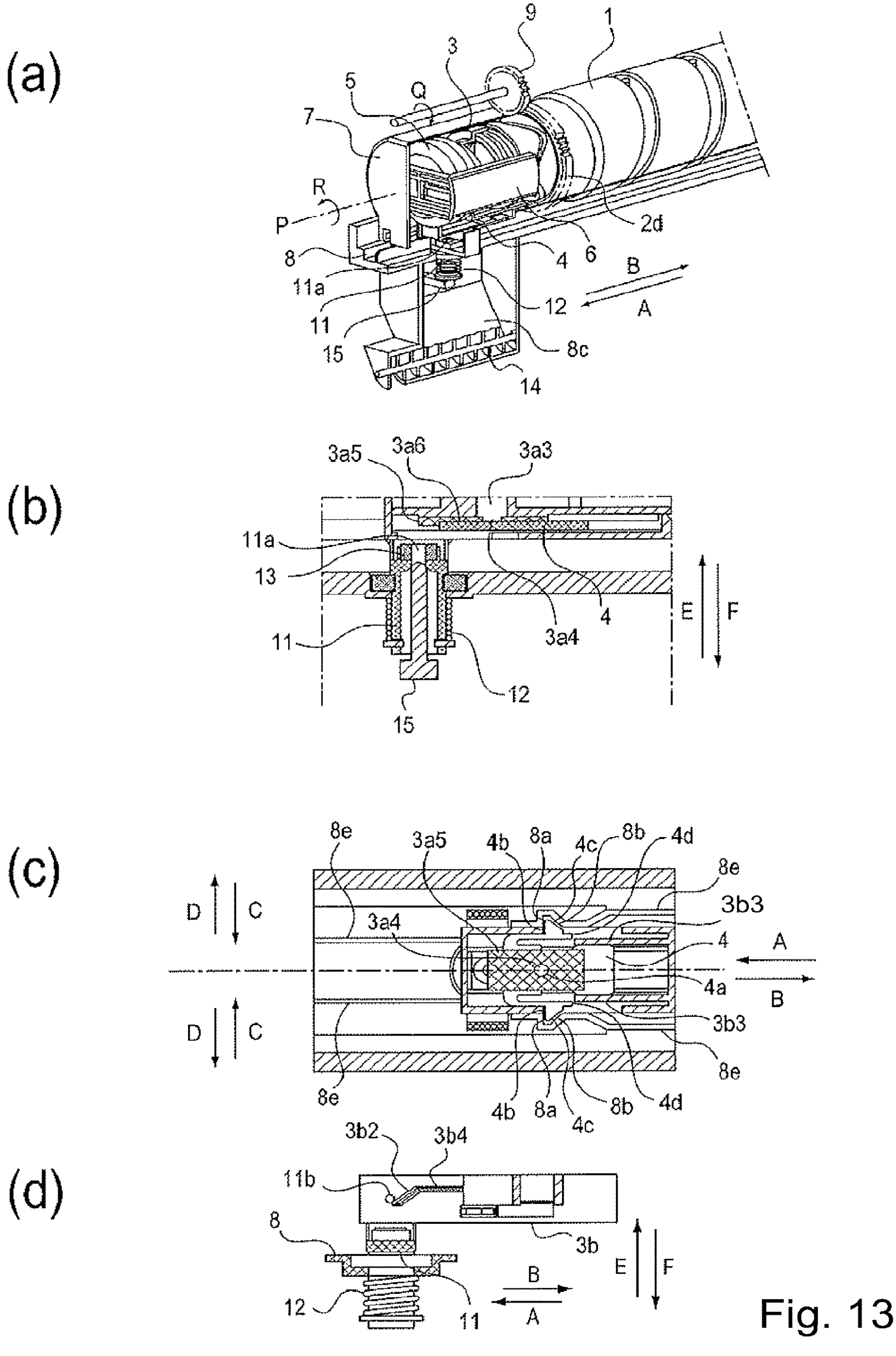
FIG. 13 is a perspective view (a) of a partial section, a front view (b) of the partial section, a top plan view (c), an interrelation relation view (d) of the lower flange portion with developer receiving portion, illustrating a mounting and demounting operation of the developer supply container in Embodiment 1.

As shown in part (b) of FIG. 13, the developer receiving port 11*a* is closed so as to prevent foreign matter and/or dust entering the sub-hopper 8*c* in a state that the developer supply container 1 is not mounted. More specifically, the developer receiving port 11*a* is closed by a main assembly shutter 15 in the state that the developer receiving portion 11 is away to the upside. The developer receiving portion 11 moves upwardly (arrow E) from the position shown in part (b) of FIG. 13 toward the developer supply container 1. By this, as shown in part (b) of FIG. 15, the developer receiving port 11*a* and the main assembly shutter 15 are spaced from each other so that the developer receiving port 11*a* is open. With this open state, the developer is discharged from the developer supply container 1 through the discharge opening 3*a*4, so that the developer received by the developer receiving port 11*a* is movable to the sub-hopper 8*c*.

As shown in part (c) of FIG. 4, a side surface of the developer receiving portion 11 is provided with an engaging portion 11*b*. The engaging portion 11*b* is directly engaged with an engaging portion 3*b*2, 3*b*4 (FIG. 8) provided on the developer supply container 1 which will be described hereinafter, and is guided thereby so that the developer receiving portion 11 is raised toward the developer supply container 1.

As shown in part (a) of FIG. 3, the mounting portion 8*f* of the developer receiving apparatus 8 is provided with an insertion guide 8*e* for guiding the developer supply container 1 in the mounting and demounting direction, and by the insertion guide 8*e*, the mounting direction of the developer supply container 1 is made along the arrow A. The dismounting direction of the developer supply container 1 is the opposite (arrow B) to the direction of the arrow A.

As shown in part (a) of FIG. 3, the developer receiving apparatus 8 is provided with a driving gear 9 functioning as a driving mechanism for driving the developer supply container 1.

The driving gear 9 receives a rotational force from a driving motor 500 through a driving gear train, and functions to apply a rotational force to the developer supply container 1 which is set in the mounting portion 8*f*.

As shown in FIGS. 3 and 4, the driving motor 500 is controlled by a control device (CPU) 600.

(Developer Supply Container)

Figure 5:
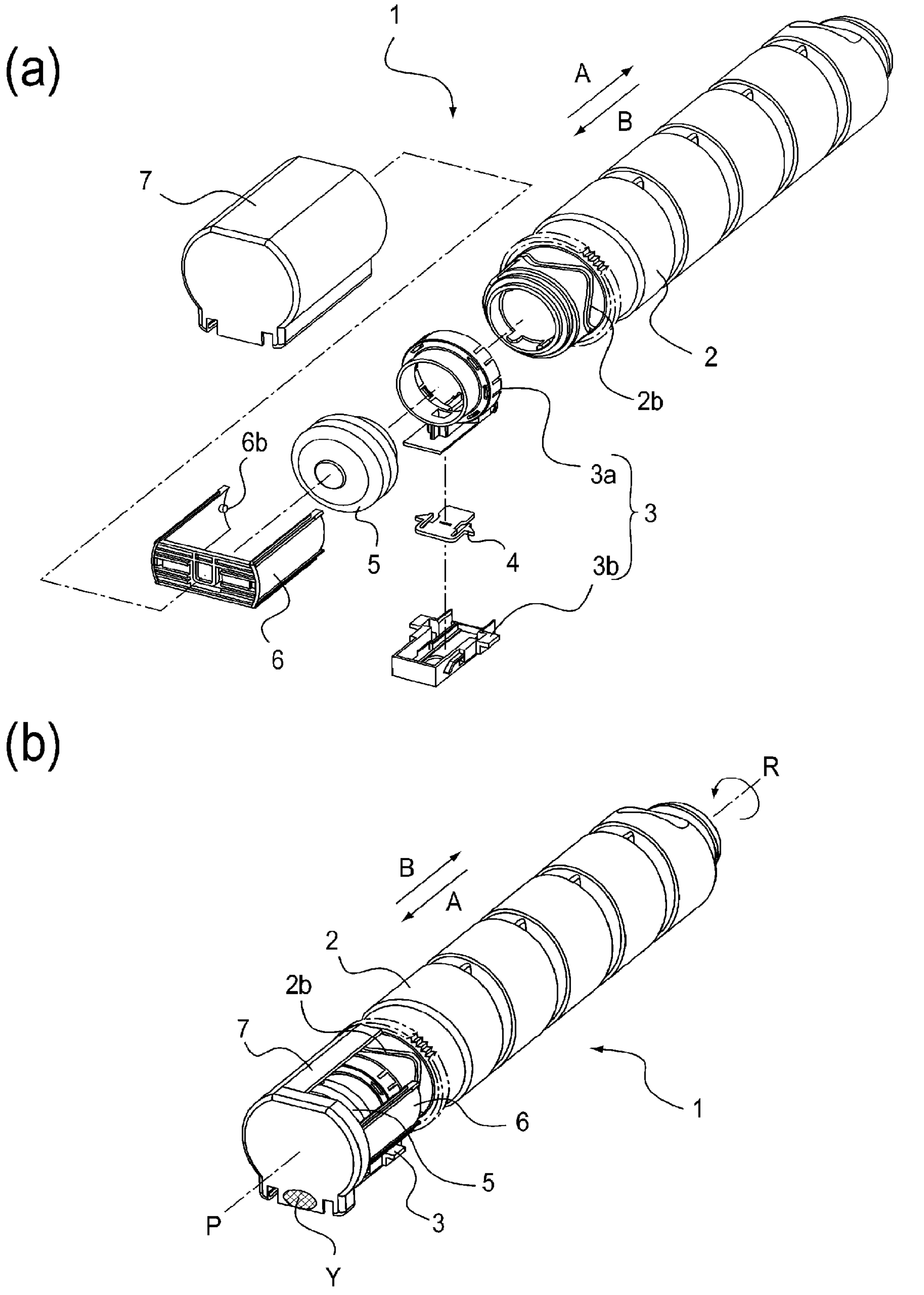
In FIG. 5, (a) is an exploded perspective view of a developer supply container according to Embodiment 1, (b) is a perspective view of the developer supply container of Embodiment 1.

Referring to FIG. 5, the developer supply container 1 will be described. Part (a) of FIG. 5 a schematic exploded perspective view of the developer supply container 1, and part (b) of FIG. 5 is a schematic perspective view of the developer supply container 1. In the part (b) of FIG. 5, a cover 7 is partly broken for better understanding.

As shown in part (a) of FIG. 5, the developer supply container 1 mainly comprises a container body 2, a flange portion 3, a shutter 4, a pump portion 5, a reciprocating member 6 and the cover 7. The developer supply container 1 is rotated about a rotational axis P shown in part (b) of FIG. 5 in a direction of an arrow R in the developer receiving apparatus 8, by which the developer is supplied into the developer receiving apparatus 8. Each element of the developer supply container 1 will be described in detail.

(Container Body)

Figure 6:
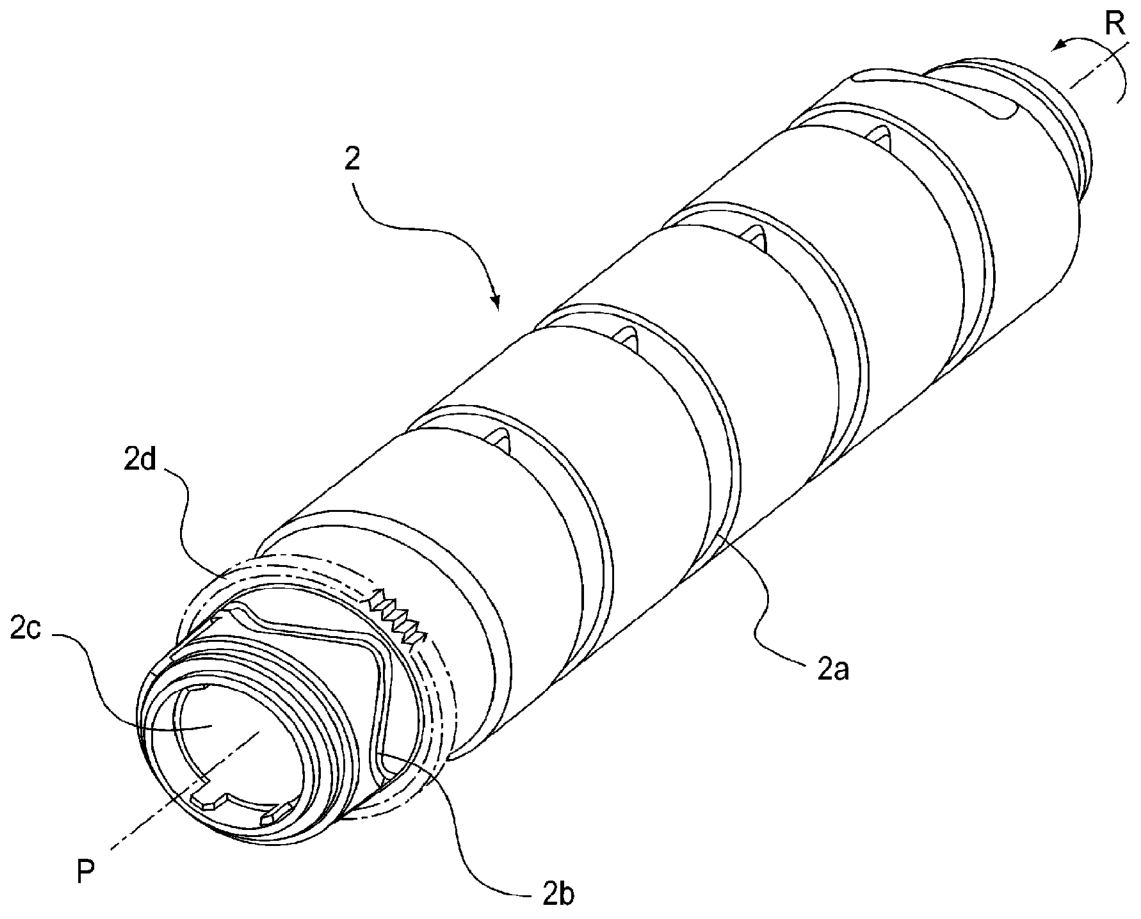
FIG. 6 is a perspective view of a container body.

FIG. 6 is a perspective view of a container body. As shown in FIG. 6, the container body (developer feeding chamber) 2 mainly comprises a developer accommodating portion 2*c* for accommodating the developer, and a helical feeding groove 2*a* (feeding portion) for feeding the developer in the developer accommodating portion 2*c* by rotation of the container body 2 about a rotational axis P in the direction of the arrow R. As shown in FIG. 6, a cam groove 2*b* and drive receiving portion (drive inputting portion) for receiving the drive from the main assembly side are formed integrally with the body 2, over the full circumference at one end portion of the container body 2. In this example, the cam groove 2*b* and the drive receiving portion 2*d* are integrally formed with the container body 2, but the cam groove 2*b* or the drive receiving portion 2*d* may be formed as another member, and may be mounted to the container body 2. In this example, the developer containing the toner having a volume average particle size of 5 μm-6 μm is accommodated in the developer accommodating portion 2*c* of the container body 2. In this example, the developer accommodating portion (developer accommodating space) 2*c* is provided not only by the container body 2 but also by the inside space of the flange portion 3 and the pump portion 5.

(Flange Portion)

Figure 7:
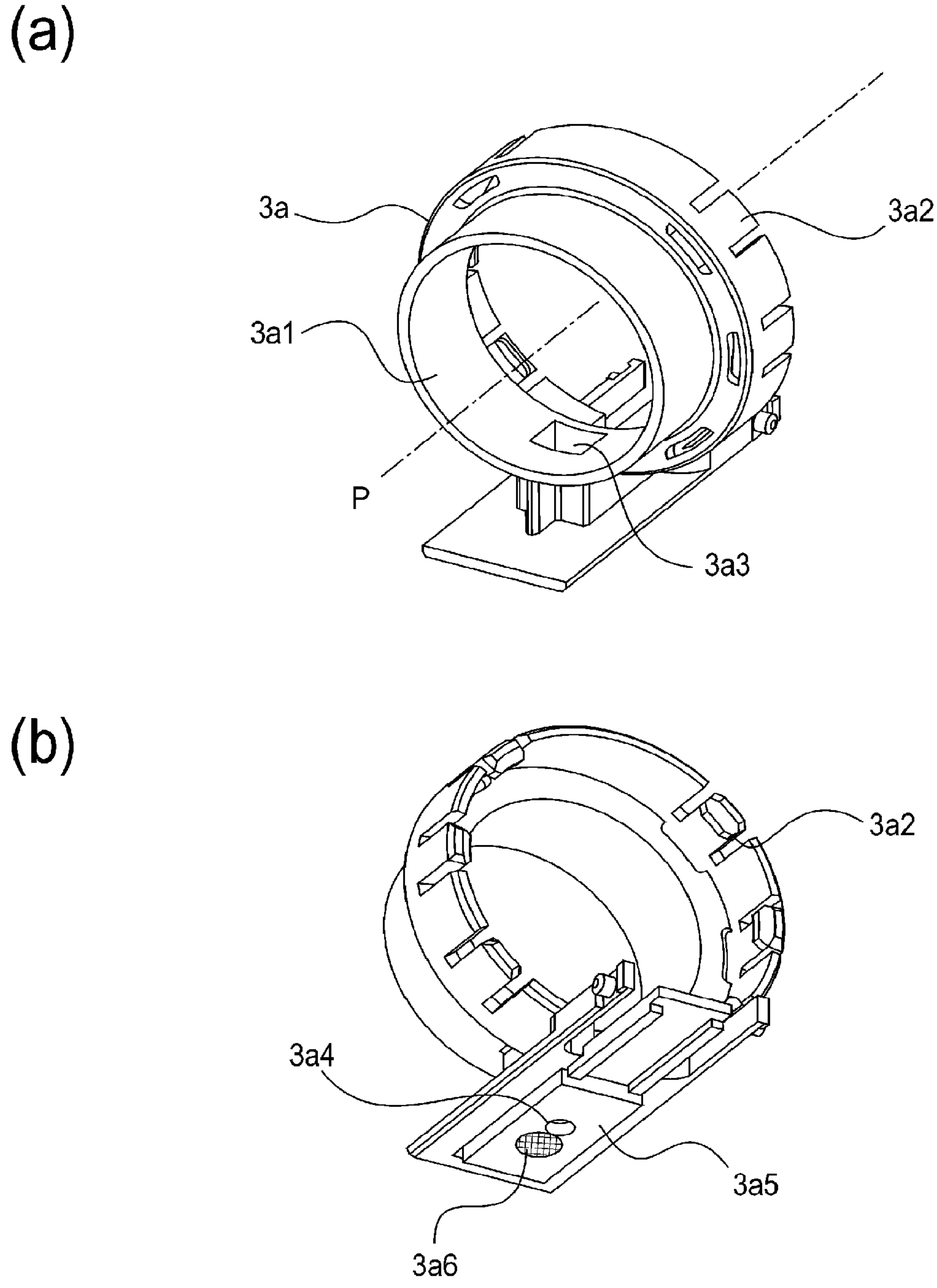
In FIG. 7, (a) is a perspective view (top side) of an upper flange portion, (b) is a perspective view (bottom side) of the upper flange portion.

Referring to FIG. 5, the flange portion 25 will be described. As shown in part (b) of FIG. 5, the flange portion (developer discharging chamber) 3 is rotatably the rotational axis P relative to the container body 2, and when the developer supply container 1 is mounted to the developer receiving apparatus 8, it is not rotatable in the direction of the arrow R relative to the mounting portion 8*f* (part (a) of FIG. 3). In addition, it is provided with the discharge opening 3*a*4 (FIG. 7). As shown in part (a) of FIG. 5, the flange portion 3 is divided into an upper flange portion 3*a*, a lower flange portion 3*b* taking into account an assembling property, and the pump portion 5, the reciprocating member 6, the shutter 4 and the cover 7 are mounted thereto. As shown in part (a) of FIG. 5, the pump portion 5 is connected with one end portion side of—the upper flange portion 3*a* by screws, and the container body 2 is connected with the other end portion side through a sealing member (unshown). The pump portion 5 is sandwiched between the reciprocating members 6, and engaging projections 6*b* (FIG. 11) of the reciprocating member 6 are fitted in the cam groove 2*b* of the container body 2. Furthermore, the shutter 4 is inserted into a gap between the upper flange portion 3*a* and the lower flange portion 3*b*. For protection of the reciprocating member 6 and the pump portion 5 and for better outer appearance, the cover 7 is integrally provided so as to cover the entirety of the flange portion 3, the pump portion 5 and the reciprocating member 6.

(Upper Flange Portion)

FIG. 7 illustrates the upper flange portion 3*a*. Part (a) of FIG. 7 is a perspective view of the upper flange portion 3*a* as seen obliquely from an upper portion, and part (b) of FIG. 7 is a perspective view of the upper flange portion 3*ea* as seen obliquely from bottom. The upper flange portion 3*a* includes a pump connecting portion 3*a*1 (screw is not shown) shown in part (a) of FIG. 7 to which the pump portion 5 is threaded, a container body connecting portion 3*a*2 shown in part (b) of FIG. 7 to which the container body 2 is connected, and a storage portion 3*a*2 shown in part (a) of FIG. 7 for storing the developer fed from the container body 2. As shown in part (b) of FIG. 7, there are provided a circular discharge opening (opening) 3*a*4 for permitting discharging of the developer into the developer receiving apparatus 8 from the storage portion 3*a*3, and a opening seal 3*a*5 forming a connecting portion 3*a*6 connecting with the developer receiving portion 11 provided in the developer receiving apparatus 8. The opening seal 3*a*5 is stuck on the bottom surface of the upper flange portion 35*a* by a double coated tape and is nipped by shutter 4 which will be described hereinafter and the flange portion 3*a* to prevent leakage of the developer through the discharge opening 3*a*4. In this example, the discharge opening 3*a*4 is provided to opening seal 3*a*5 which is unintegral with the flange portion 3*a*, but the discharge opening 3*a*4 may be provided directly in the upper flange portion 35*a*.

As described above, the diameter of the discharge opening 3*a*4 is approx. 2 mm for the purpose of minimizing the contamination with the developer which may be unintentionally discharged by the opening and closing of the shutter 4 in the mounting and demounting operation of the developer supply container 1 relative to the developer receiving apparatus 8. In this example, the discharge opening **3*a*4 is provided in the lower surface of the developer supply container 1, that is, the lower surface of the upper flange portion 3*a*, but the connecting structure of this example can be accomplished if it is fundamentally provided in a side except for an upstream side end surface or a downstream side end surface with respect to the mounting and dismounting direction of the developer supply container 1 relative to the developer receiving apparatus 8. The position of the discharge opening 25*a*4 may be properly selected taking situation of the specific apparatus into account. A connecting operation between the developer supply container 1 and the developer receiving apparatus 8** in this example will be described hereinafter.

(Lower Flange Portion)

Figure 8:
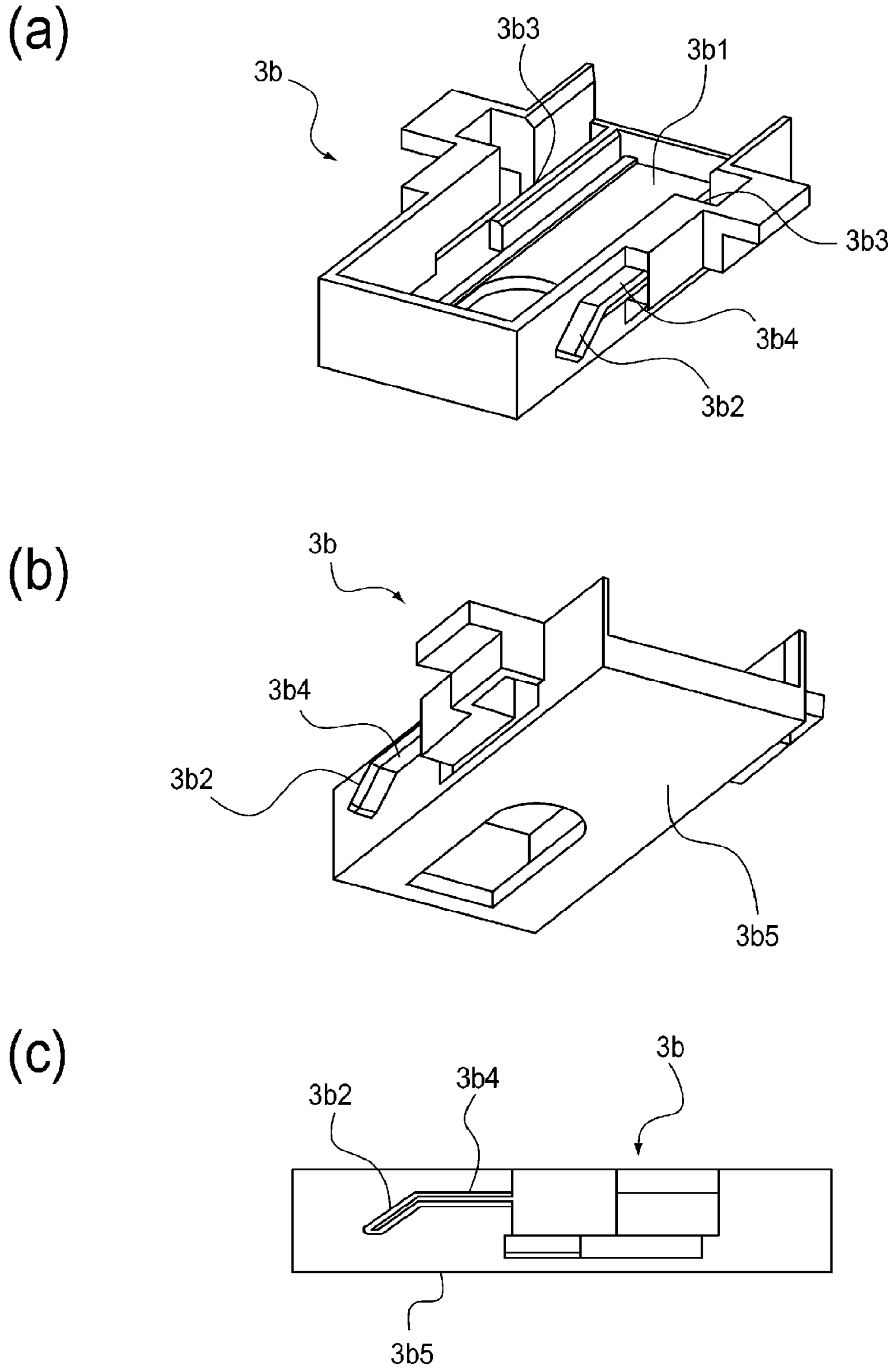
In FIG. 8, (a) is a perspective view (top side) of a lower flange portion in Embodiment 1, (b) is a perspective view (bottom side) of the lower flange portion in Embodiment 1, and (c) is a front view of the lower flange portion in Embodiment 1.

FIG. 8 shows the lower flange portion **25*b*. Part (a) of FIG. 8 is a perspective view of the lower flange portion 3*b* as seen obliquely from an upper position, part (b) of FIG. 8 is a perspective view of the lower flange portion 3*b* as seen obliquely from a lower position, and part (c) of FIG. 8 is a front view. As shown in part (a) of FIG. 8, the lower flange portion 3*b* is provided with a shutter inserting portion 3*b*1 into which the shutter 4 (FIG. 9) is inserted. The lower flange portion 3*b* is provided with engaging portions 3*b*2, 3*b*4 engageable with the developer receiving portion 11 (FIG. 4**).

The engaging portions **3*b*2, 3*b*4 displace the developer receiving portion 11 toward the developer supply container 1 with the mounting operation of the developer supply container 1 so that the connected state is established in which the developer supply from the developer supply container 1 to the developer receiving portion 11 is enabled. The engaging portions 3*b*2, 3*b*4 guide the developer receiving portion 11 to space away from the developer supply container 1 so that the connection between the developer supply container 1 and the developer receiving portion 39 is broken with the dismounting operation of the developer supply container1**.

A first engaging portion **3*b*2 of the engaging portions 3*b*2, 3*b*4 displaces the developer receiving portion 11 in the direction crossing with the mounting direction of the developer supply container 1 for permitting an unsealing operation of the developer receiving portion 1. In this example, the first engaging portion 3*b*2 displaces the developer receiving portion 11 toward the developer supply container 1 so that the developer receiving portion 11 is connected with the connecting portion 3*a*6 formed in a part of the opening seal 3*a*5 of the developer supply container1 with the mounting operation of the developer supply container 1. The first engaging portion 3*b*2 extends in the direction crossing with the mounting direction of the developer supply container1**.

The first engaging portion **3*b*2 effects a guiding operation so as to displace the developer receiving portion 11 in the direction crossing with the dismounting direction of the developer supply container 1 such that the developer receiving portion 11 is resealed with the dismounting operation of the developer supply container 1. In this example, the first engaging portion 3*b*2 effects the guiding so that the developer receiving portion 11 is spaced away from the developer supply container 1 downwardly, so that the connection state between the developer receiving portion 11 and the connecting portion 3*a*6 of the developer supply container 1 is broken with the dismounting operation of the developer supply container 1**.

On the other hand, a second engaging portion **3*b*4 maintains the connection stated between the opening seal 3*a*5 and a main assembly seal 13 during the developer supply container 1 moving relative to the shutter 4 which will be described hereinafter, that is, during the developer receiving port 11*a* moving from the connecting portion 3*a*6 to the discharge opening 3*a*4, so that the discharge opening 3*a*4 is brought into communication with a developer receiving port 11*a* of the developer receiving portion 11 accompanying the mounting operation of the developer supply container 1. The second engaging portion 3*b*4 extends in parallel with the mounting direction of the developer supply container 1**.

The second engaging portion **3*b*4 maintains the connection between the main assembly seal 13 and the opening seal 3*a*5 during the developer supply container 1 moving relative to the shutter 4, that is, during the developer receiving port 11*a* moving from the discharge opening 3*a*4 to the connecting portion 3*a*6, so that the discharge opening 3*a*4 is resealed accompanying the dismounting operation of the developer supply container 1**.

A configuration of the first engaging portion **3*b*2 desirably includes an inclined surface (inclined portion) crossing the inserting direction of the developer supply container 1, and it is not limited to the linear inclined surface as shown in part (a) of FIG. 8. The configuration of the first engaging portion 3*b*2 may be a curved and inclined surface as shown in part (a) of FIG. 18, for example. Furthermore, as shown in part (b) of FIG. 18, may be stepped including a parallel surface and an inclined surface. The configuration of the first engaging portion 3*b*2 is not limited to the configuration shown in parts (a) or (b) of FIGS. 8 and 18, if it can displace the developer receiving portion 11 toward the discharge opening 3*a*4, but a linear inclined surface is desirable from the standpoint of constant manipulating force required by the mounting and dismounting operation of the developer supply container 1. An inclination angle of the first engaging portion 3*b*2 relative to the mounting and dismounting direction of the developer supply container 1** is desirably approx. 10-50 degrees in view of the situation which will be described hereinafter. In this example, the angle is approx. 40 degrees.

Figure 18:
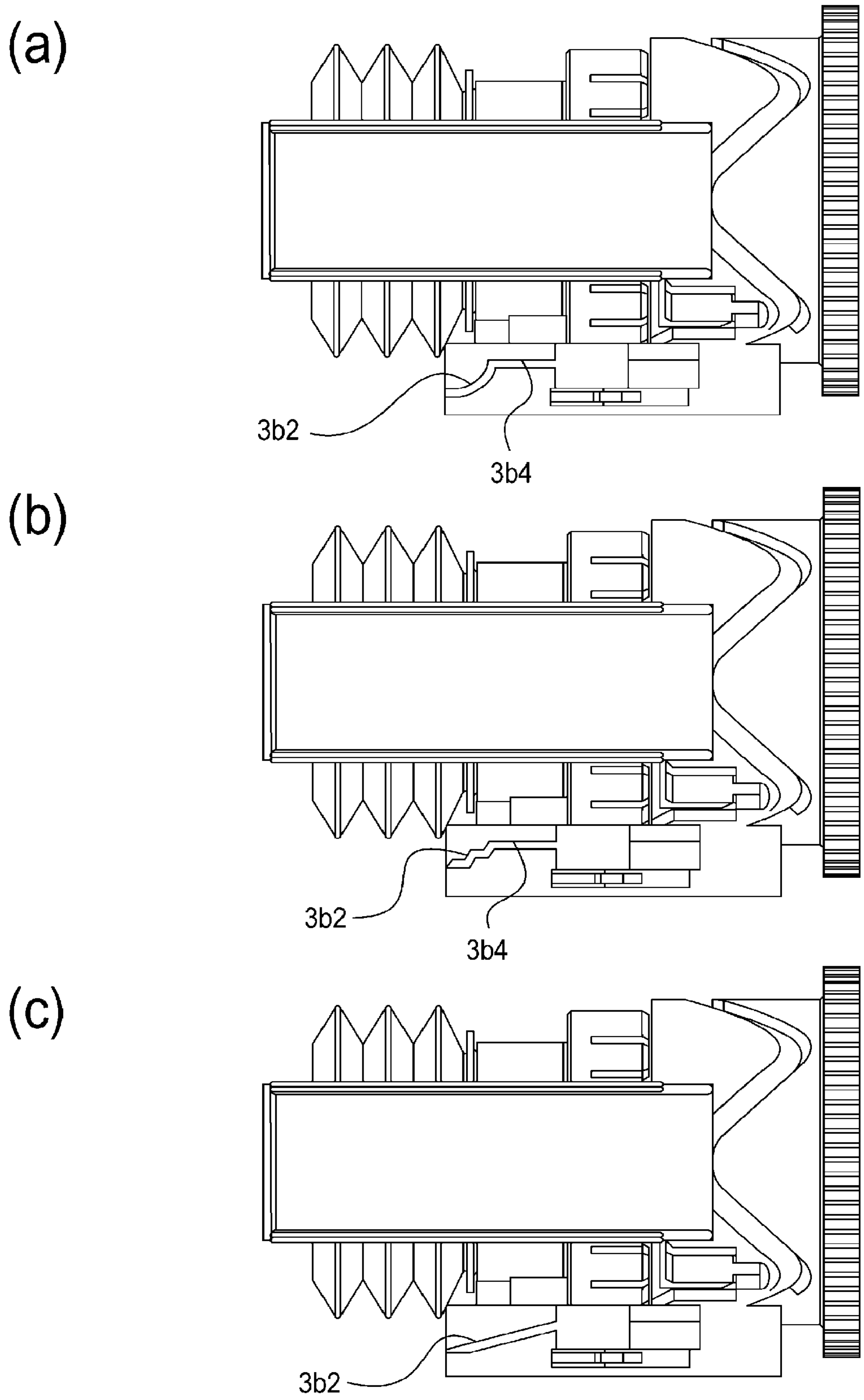
In FIG. 18, (a), (b) and (c) illustrate modified examples of an engaging portion of the developer supply container.

In addition, as shown in part (c) of FIG. 18, the first engaging portion **3*b*2 and the second engaging portion 3*b*4 may be unified to provide a uniformly linear inclined surface. In this case, with the mounting operation of the developer supply container 1, the first engaging portion 3*b*2 displaces the developer receiving portion to connect the main assembly seal 13 with the shield portion 3*b*6 developer receiving portion 11 in the direction crossing with the mounting direction of the developer supply container 1. Thereafter, it displaces the developer receiving portion 11 while compressing the main assembly seal 13 and the opening seal 3*a*5, until the developer receiving port 11*a* and the discharge opening 3*a*4** are brought into fluid communication with each other.

Here, when such a first engaging portion **3*b*2 is used, the developer supply container 1 always receives a force in the direction of B (part (a) of FIG. 16) by the relationship between the first engaging portion 3*b*2 and the engaging portion 11*b* of the developer receiving portion 11 in the completed position of the mounting of the developer supply container 1 which will be described hereinafter. Therefore, the developer receiving apparatus 8 is required to have a holding mechanism for holding the developer supply container 1 in the mounting completed position, with the result of increase in cost and/or increase in the number of parts. Therefore, this standpoint, it is preferable that the developer supply container 1 is provided with the above-described second engaging portion 3*b*4 so that the force in the B direction is not applied to the developer supply container 1 in the mounting completed position, thus stabilizing the connection state between the main assembly seal 13 and the opening seal 3*a*5**.

The first engaging portion 3*b*2 shown in part (c) of FIG. 18 has a linear inclined surface, but similar to the part (a) of FIG. 18 or part (b) of FIG. 18, for example, a curved or stepped configuration is usable, although the linear inclined surface is preferable from the standpoint of constant manipulating force in the mounting and dismounting operations of the developer supply container 1, as described hereinbefore.

The lower flange portion 3*b* is provided with a regulation rib (regulating portion) 3*b*3 (part (a) of FIG. 3) for preventing or permitting an elastic deformation of a supporting portion 4*d* of the shutter 4 which will be described hereinafter, with the mounting or dismounting operation of the developer supply container 1 relative to the developer receiving apparatus 8. The regulation rib 3*b*3 protrudes upwardly from an insertion surface of the shutter inserting portion 3*b*1 and extends along the mounting direction of the developer supply container 1. In addition, as shown in part (b) of FIG. 8, the protecting portion 3*b*5 is provided to protect the shutter 4 from damage during transportation and/or mishandling of the operator. The lower flange portion 3*b* is integral with the upper flange portion 3*a* in the state that the shutter 4 is inserted in the shutter inserting portion 3*b*1.

(Shutter)

Figure 9:
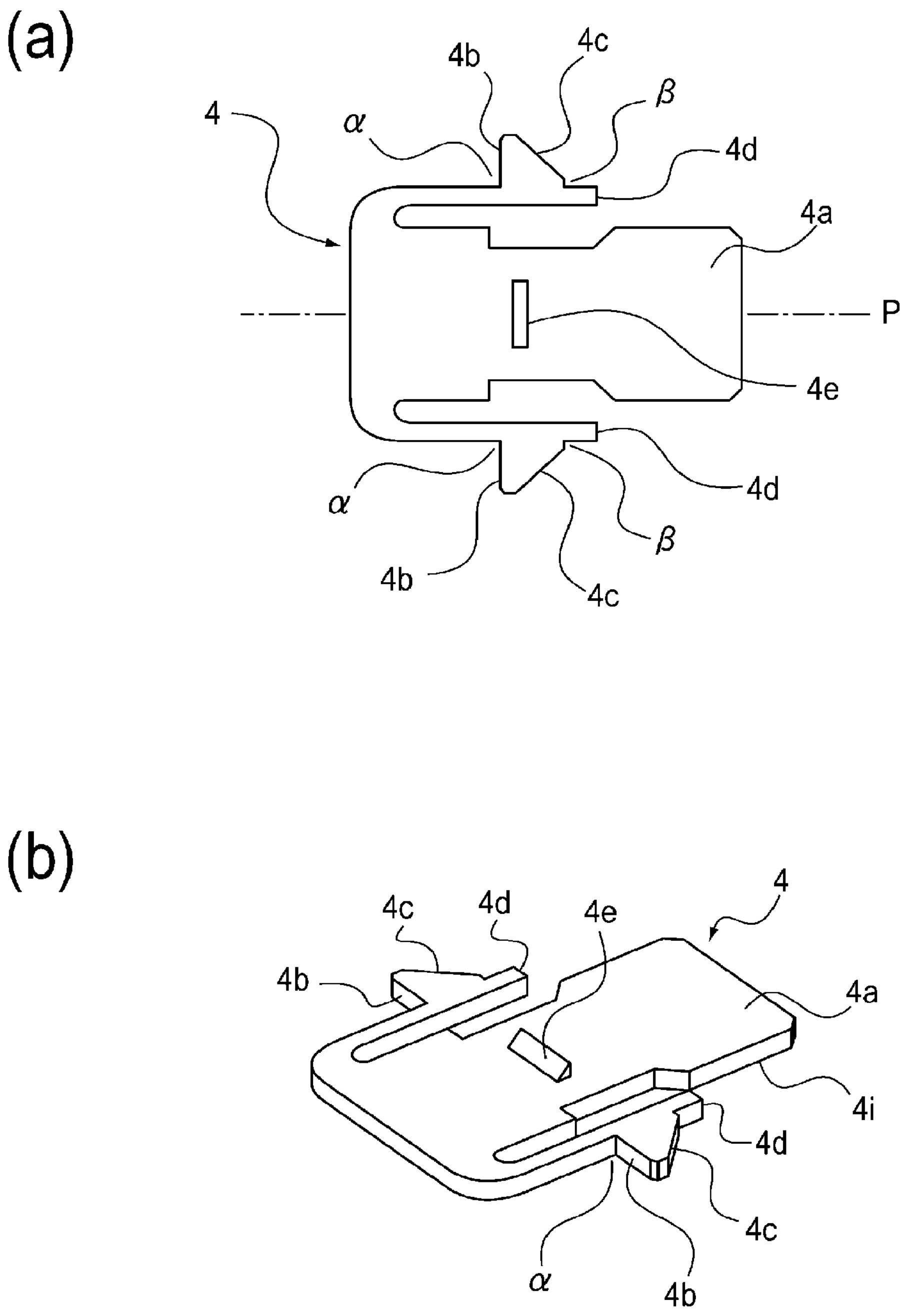
In FIG. 9, (a) is a top plan view of a shutter in Embodiment 1, and (b) is a perspective view of the shutter in Embodiment 1.

FIG. 9 shows the shutter 4. Part (a) of FIG. 9 is a top plan view of the shutter 4, and part (b) of FIG. 9 is a perspective view of shutter 4 as seen obliquely from an upper position. The shutter 4 is movable relative to the developer supply container 1 to open and close the discharge opening 3*a*4 with the mounting operation and the dismounting operation of the developer supply container 1. The shutter 4 is provided with a developer sealing portion 4*a* for preventing leakage of the developer through the discharge opening 3*a*4 when the developer supply container 1 is not mounted to the mounting portion 8*f* of the developer receiving apparatus 8, and a sliding surface 4*i* which slides on the shutter inserting portion 3*b*1 of the lower flange portion 3*b* on the rear side (back side) of the developer sealing portion 4*a*.

Shutter 4 is provided with a stopper portion (holding portion) 4*b*, 4*c* held by shutter stopper portions 8*n*, 8*p* (part (a) of FIG. 4) of the developer receiving apparatus 8 with the mounting and dismounting operations of the developer supply container 1 so that the developer supply container 1 moves relative to the shutter 4. A first stopper portion 5*b* of the stopper portions 4*b*, 4*c* engages with a first shutter stopper portion 8*n* of the developer receiving apparatus 8 to fix the position of the shutter 4 relative to the developer receiving apparatus 8 at the time of mounting operation of the developer supply container 1. A second stopper portion 4*c* engages with a second shutter stopper portion 8*b* of the developer receiving apparatus 8 at the time of the dismounting operation of the developer supply container 1.

The shutter 4 is provided with a supporting portion 4*d* so that the stopper portions 4*b*, 4*c* are displaceable. The supporting portion 4*d* extends from the developer sealing portion 4*a* and is elastically deformable to displaceably support the first stopper portion 4*b* and the second stopper portion 4*c*. The first stopper portion 4*b* is inclined such that an angle α formed between the first stopper portion 4*b* and the supporting portion 4*d* is acute. On the contrary, the second stopper portion 4*c* is inclined such that an angle β formed between the second stopper portion 4*c* and the supporting portion 4*d* is obtuse.

The developer sealing portion 4*a* of the shutter 4 is provided with a locking projection 4*e* at a position downstream of the position opposing the discharge opening 3*a*4 with respect to the mounting direction when the developer supply container 1 is not mounted to the mounting portion 8*f* of the developer receiving apparatus 8. A contact amount of the locking projection 4*e* relative to the opening seal 3*a*5 (part (b) of FIG. 7) is larger than relative to the developer sealing portion 4*a* so that a static friction force between the shutter 4 and the opening seal 3*a*5 is large. Therefore, an unexpected movement (displacement) of the shutter 4 due to a vibration during the transportation or the like can be prevented. Therefore, an unexpected movement (displacement) of the shutter 4 due to a vibration during the transportation or the like can be prevented. The entirety of the developer sealing portion 4*a* may correspond to the contact amount between the locking projection 4*e* and the opening seal 3*a*5, but in such a case, the dynamic friction force relative to the opening seal 3*a*5 at the time when the shutter 4 moves is large as compared with the case of the locking projection 4*e* provided, and therefore, a manipulating force required when the developer supply container 1 is mounted to the developer replenishing apparatus 8 is large, which is not preferable from the standpoint of the usability. Therefore, it is desired to provide the locking projection 4*e* in a part as in this example.

(Pump Portion)

Figure 10:
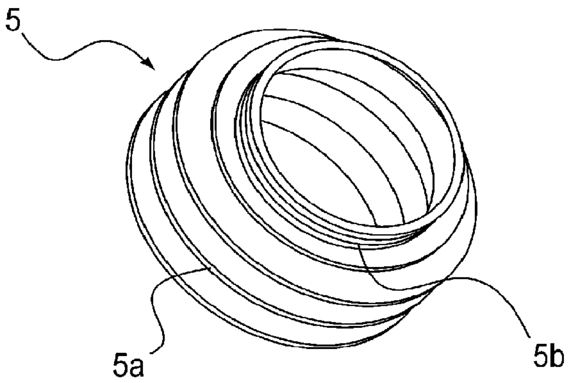
In FIG. 10, (a) is a perspective view of a pump, and (b) is a front view of the pump.
Figure 10:
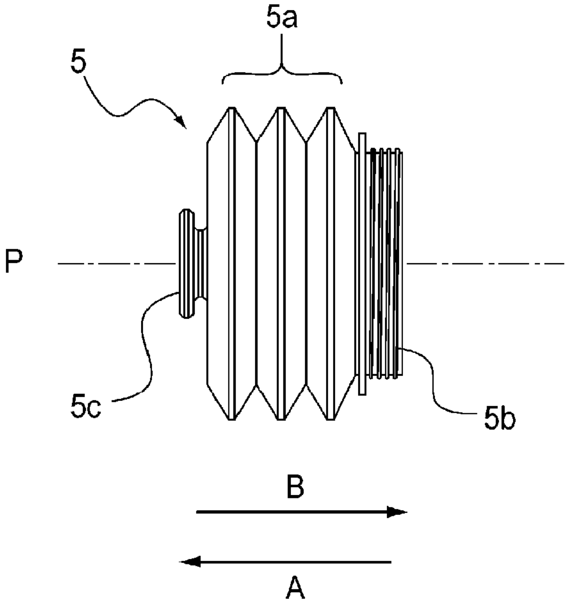

FIG. 10 shows the pump portion 5. Part (a) of FIG. 10 is a perspective view of the pump portion 5, and part (b) is a front view of the pump portion 5. The pump portion 5 is operated by the driving force received by the drive receiving portion (drive inputting portion) 2*d* so as to alternately produce a state in which the internal pressure of the developer accommodating portion 2*c* is lower than the ambient pressure and a state in which it is higher than the ambient pressure.

In this example, the pump portion 5 is provided as a part of the developer supply container 1 in order to discharge the developer stably from the small discharge opening 3*a*4. The pump portion 5 is a displacement type pump in which the volume changes. More specifically, the pump includes a bellow-like expansion-and-contraction member. By the expanding-and-contracting operation of the pump portion 5, the pressure in the developer supply container 1 is changed, and the developer is discharged using the pressure. More specifically, when the pump portion 5 is contracted, the inside of the developer supply container 1 is pressurized so that the developer is discharged through the discharge opening 3*a*4. When the pump portion 5 expands, the inside of the developer supply container 1 is depressurized so that the air is taken in through the discharge opening 3*a*4 from the outside. By the take-in air, the developer in the neighborhood of the discharge opening 3*a*4 and/or the storage portion 3*a*3 is loosened so as to make the subsequent discharging smooth. By repeating the expanding-and-contracting operation described above, the developer is discharged.

As shown in part (b) of FIG. 110, the pump portion 5 of this modified example has the bellow-like expansion-and-contraction portion (bellow portion, expansion-and-contraction member) 5*a* in which the crests and bottoms are periodically provided. The expansion-and-contraction portion 5*a* expands and contracts in the directions of arrows A and B. When the bellow-like pump portion 5 as in this example, a variation in the volume change amount relative to the amount of expansion and contraction can be reduced, and therefore, a stable volume change can be accomplished.

In addition, in this example, the material of the pump portion 2 is polypropylene resin material (PP), but this is not inevitable. The material of the pump portion 5 may be any if it can provide the expansion and contraction function and can change the internal pressure of the developer accommodating portion by the volume change. The examples includes thin formed ABS (acrylonitrile, butadiene, styrene copolymer resin material), polystyrene, polyester, polyethylene materials. Alternatively, other expandable-and-contractable materials such as rubber are usable.

In addition, as shown in part (a) of FIG. 10, the opening end side of the pump portion 5 is provided with a connecting portion 5*b* connectable with the upper flange portion 3*a*. Here, the connecting portion 5*b* is a screw. Furthermore, as shown in part (b) of FIG. 10 the other end portion side is provided with a reciprocating member engaging portion 5*c* engaged with the reciprocating member 5 to displace in synchronism with the reciprocating member 6 which will be described hereinafter.

(Reciprocating Member)

Figure 11:
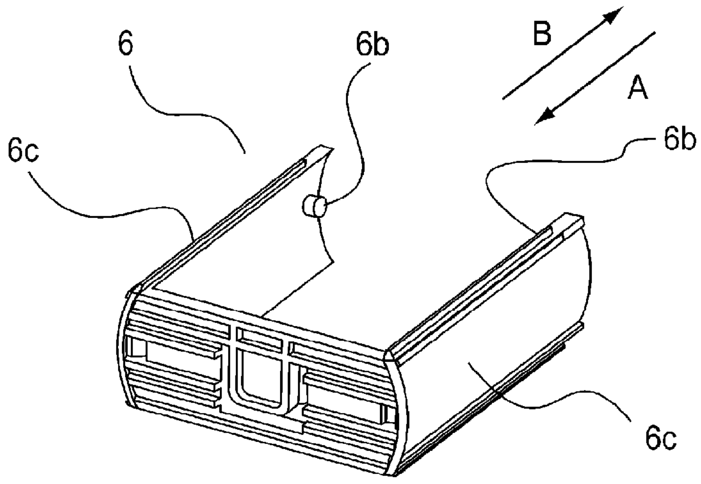
In FIG. 11, (a) is a perspective view (top side) of a reciprocating member, (b) is a perspective view (bottom side) of the reciprocating member.
Figure 11:
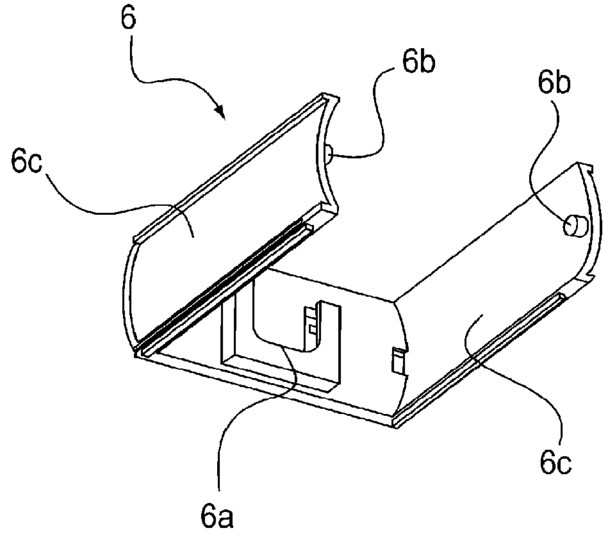

FIG. 11 shows the reciprocating member 6. Part (a) of FIG. 11 is a perspective view of the reciprocating member 6 as seen obliquely from an upper position, and part (b) is perspective view of the reciprocating member 6 as seen obliquely from a lower position.

As shown in part (b) of FIG. 11, the reciprocating member 6 is provided with a pump engaging portion 6*a* engaged with the reciprocating member engaging portion 5*c* provided on the pump portion 5 to change the volume of the pump portion 5 as described above. Furthermore, as shown in part (a) and part (b) of FIG. 11 the reciprocating member 6 is provided with the engaging projection 6*b* fitted in the above-described cam groove 2*b* (FIG. 5) when the container is assembled. The engaging projection 6*b* is provided at a free end portion of the arm 6*c* extending from a neighborhood of the pump engaging portion 6*a*. Rotation displacement of the reciprocating member 6 about the axis P (part (b) of FIG. 5) of the arm 6*c* is prevented by a reciprocating member holding portion 7*b* (FIG. 12) of the cover 7 which will be described hereinafter. Therefore, when the container body 2 receives the drive from the drive receiving portion 2*d* and is rotated integrally with the cam groove 20*n* by the driving gear 9, the reciprocating member 6 reciprocates in the directions of arrows An and B by the function of the engaging projection 6*b* fitted in the cam groove 2*b* and the reciprocating member holding portion 7*b* of the cover 7. Together with this operation, the pump portion 5 engaged through the pump engaging portion 6*a* of the reciprocating member 6 and the reciprocating member engaging portion 5*c* expands and contracts in the directions of arrows An and B.

(Cover)

Figure 12:
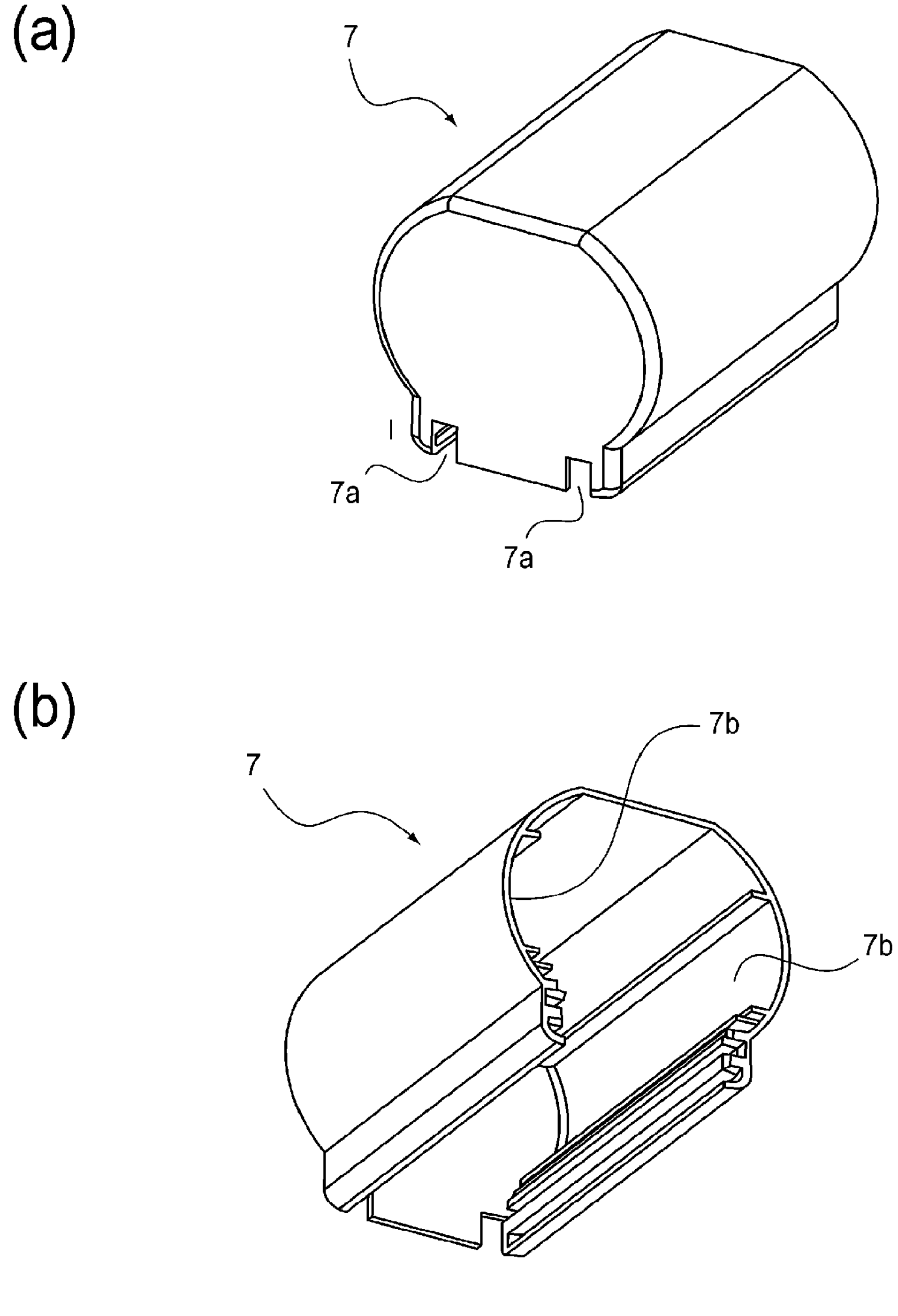
In FIG. 12, (a) is a perspective view (top side) of a cover, (b) is a perspective view (bottom side) of the cover.

FIG. 12 shows the cover 7. Part (a) of FIG. 12 is a perspective view of the cover 7 as seen obliquely from a upper position, and part (b) is a perspective view of the cover 7 as seen obliquely from a lower position.

Figure 69:
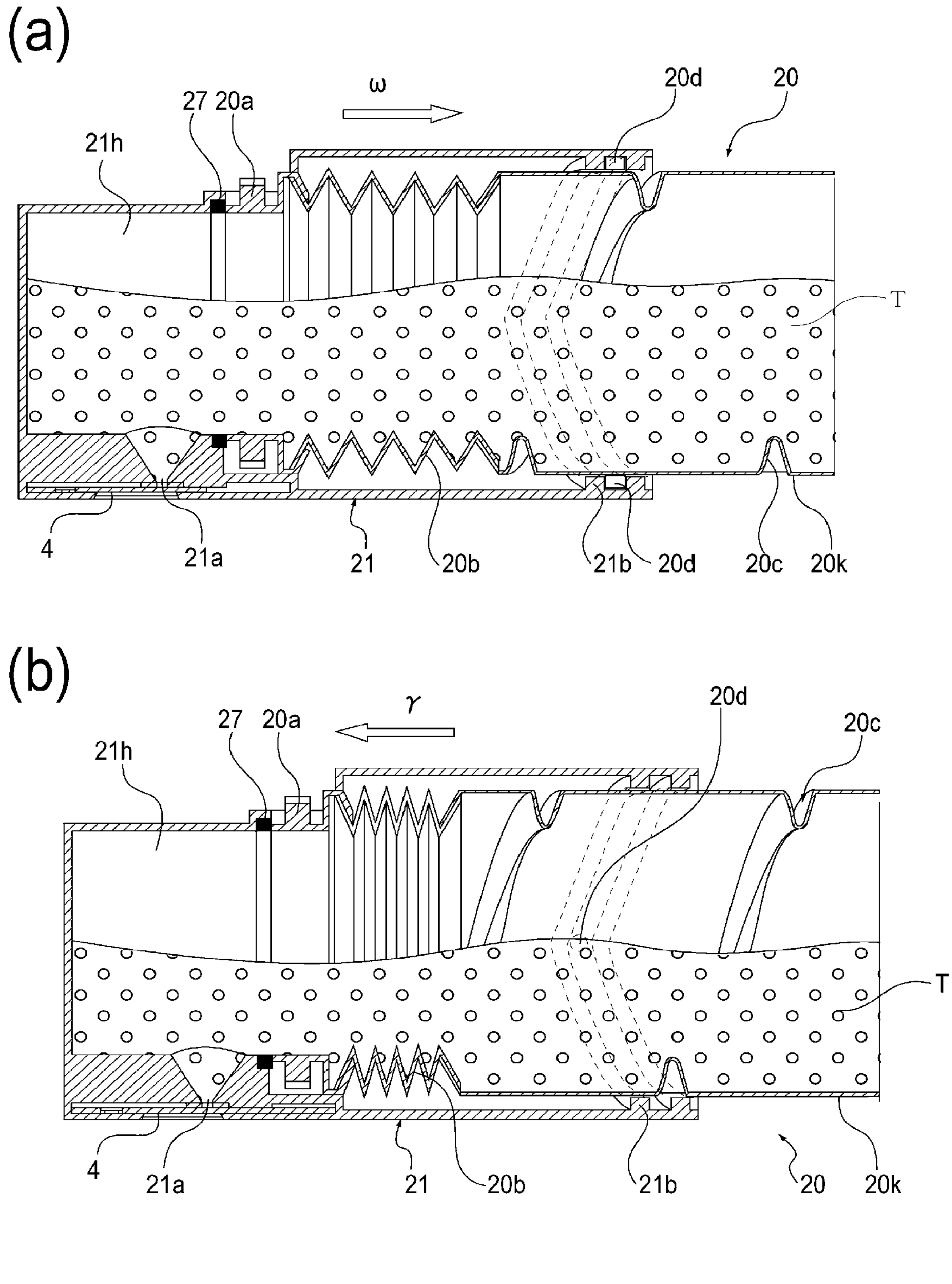
In FIG. 69, (a) and (b) are sectional views illustrating a behavior in suction and discharging operation of a pump portion at the developer supply container of Embodiment 8.

The cover 24 is provided as shown in part (b) of FIG. 69 in order to protect the reciprocating member 38 and/or the pump portion 2 and to improve the outer appearance. In more detail, as shown in part (b) of FIG. 5, the cover 7 is provided integrally with the upper flange portion 3*a* and/or the lower flange portion 3*b* and so on by a mechanism (unshown) so as to cover the entirety of the flange portion 3, the pump portion 5 and the reciprocating member 6. In addition, the cover 7 is provided with a guide groove 7*a* to be guided by the insertion guide 8*e* (part (a) of FIG. 3) of the developer receiving apparatus 8. In addition, the cover 7 is provided with a reciprocating member holding portion 7*b* for regulating a rotation displacement about the axis P (part (b) of FIG. 5) of the reciprocating member 6 as described above.

Mounting Operation of Developer Supply Container)

Figure 15:
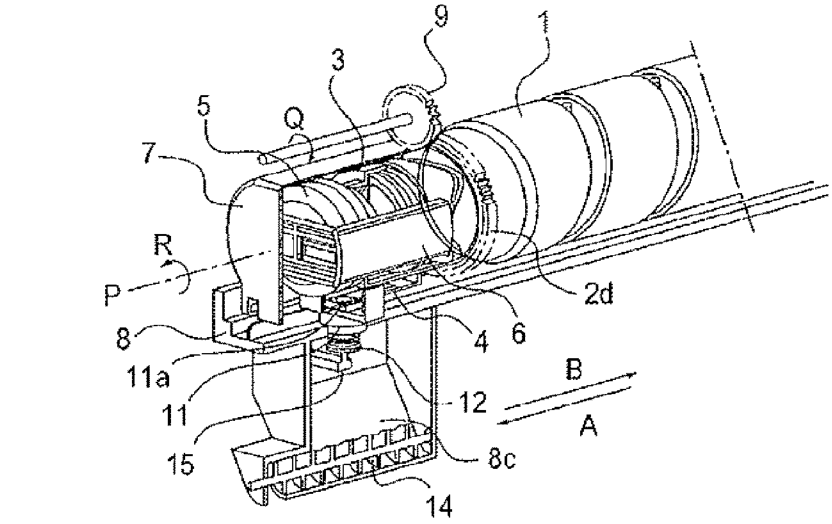
FIG. 15 is a perspective view (a) of a partial section, a front view (b) of the partial section, a top plan view (c), an interrelation relation view (d) of the lower flange portion with developer receiving portion, illustrating a mounting and demounting operation of the developer supply container in Embodiment 1.
Figure 15:
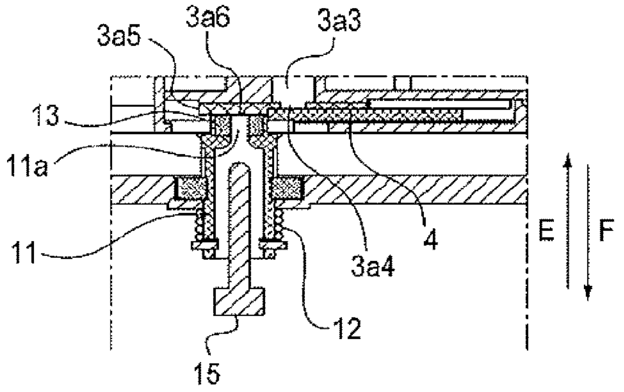
Figure 15:
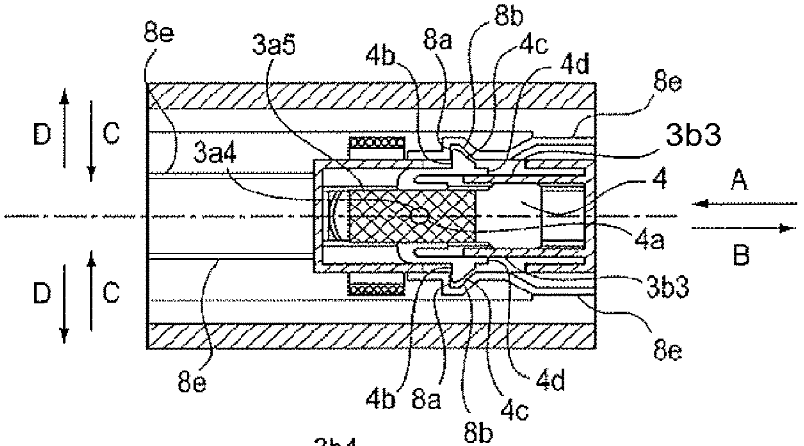
Figure 15:
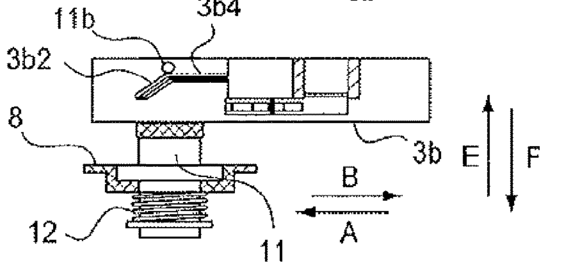
Figure 16:
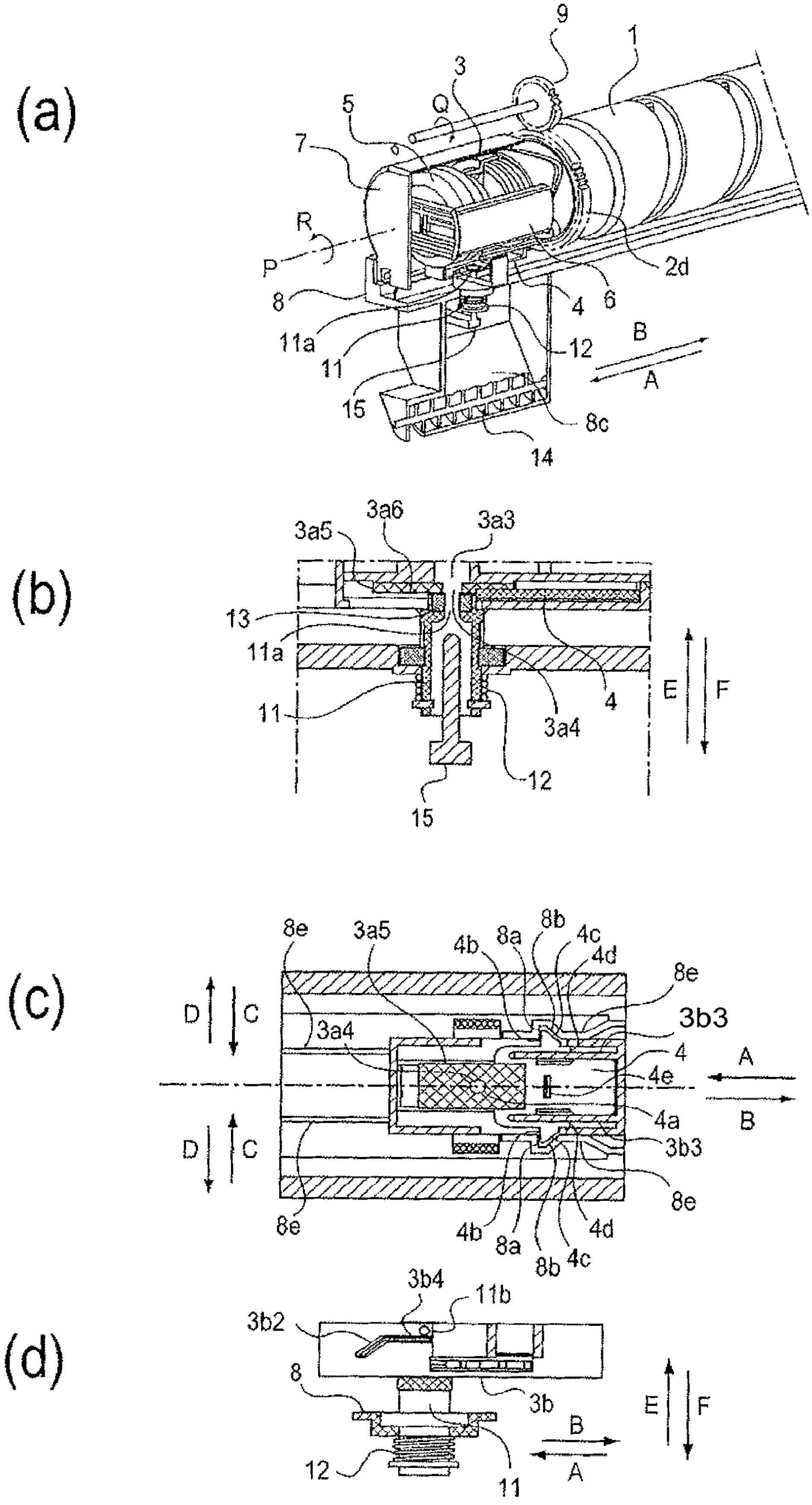
FIG. 16 is a perspective view (a) of a partial section, a front view (b) of the partial section, a top plan view (c), an interrelation relation view (d) of the lower flange portion with developer receiving portion, illustrating a mounting and demounting operation of the developer supply container in Embodiment 1.
Figure 17:
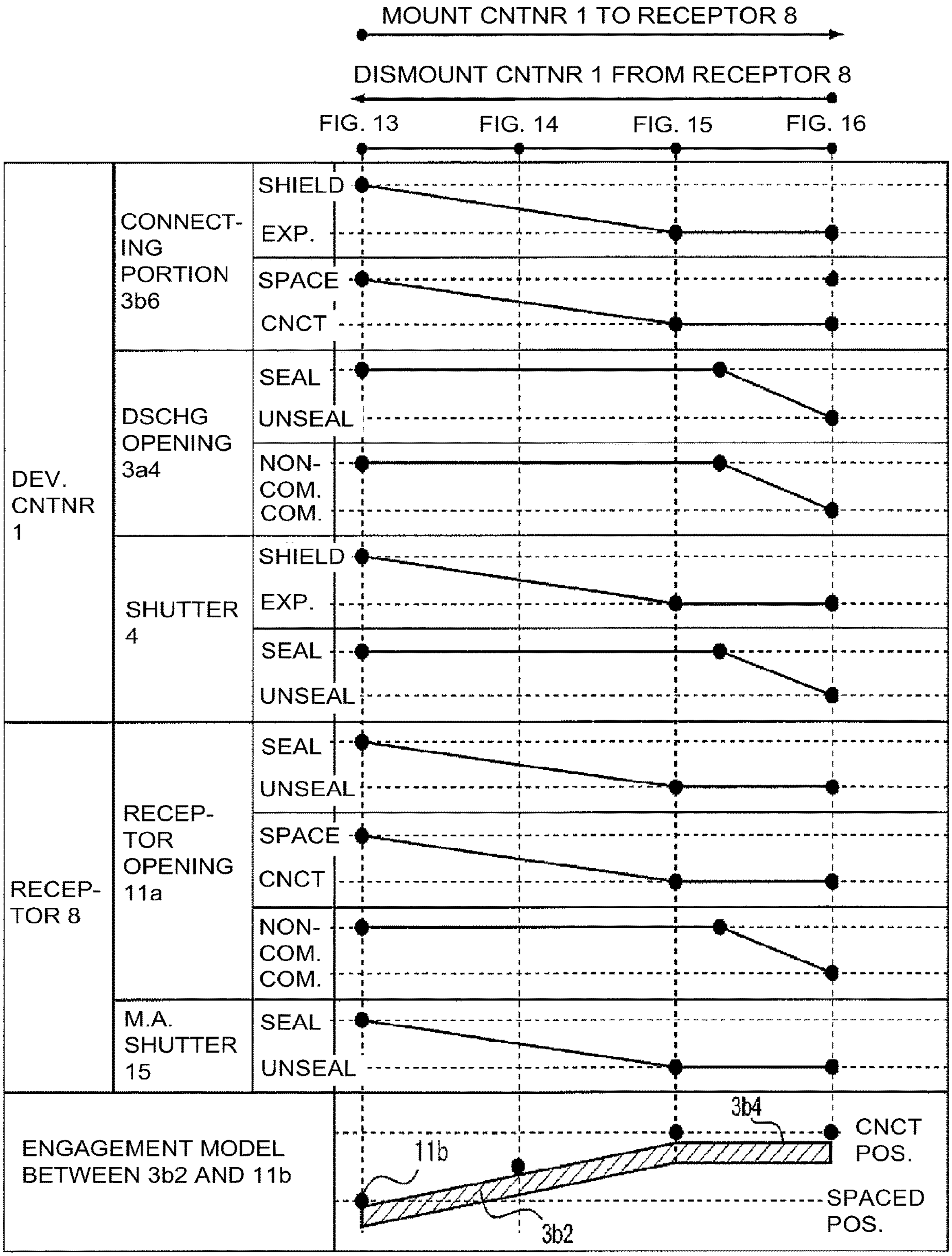
FIG. 17 is a timing chart view of the mounting and demounting operation of the developer supply container in Embodiment 1.

Referring to FIGS. 13, 14, 15, 16 and 17 in the order of operation, mounting operation of the developer supply container 1 to the developer receiving apparatus 8 will be described in detail. Parts (a)-(d) of FIGS. 13-FIG. 16 show the neighborhood of the connecting portion between the developer supply container 1 and the developer receiving apparatus 8. Parts (a) of FIG. 13-FIG. 16 are perspective view of a partial section, (b) is a front view of the partial section, (c) is a top plan view of (b), and (d) show the relation between the lower flange portion 3*b* and the developer receiving portion 11, particularly. FIG. 17 is a timing chart of operations of each elements relating to the mounting operation of the developer supply container 1 to the developer receiving apparatus 8 as shown in FIG. 13-FIG. 16. The mounting operation is the operation until the developer becomes able to be supplied to the developer receiving apparatus 8 from the developer supply container 1.

FIG. 13 shows a connection starting position (first position) between the first engaging portion 3*b*2 of the developer supply container 1 and the engaging portion 11*b* of the developer receiving portion 11.

As shown in part (a) of FIG. 13, the developer supply container 1 is inserted into the developer receiving apparatus 8 in the direction of an arrow A.

First, as shown in part (c) of FIG. 13, the first stopper portion 4*b* of the shutter 4 contacts the first shutter stopper portion 8*a* of developer receiving apparatus 8, so that the position of the shutter 4 relative to the developer receiving apparatus 8 is fixed. In this state, the relative position between the lower flange portion 3*b* and the upper flange portion 3*a* of the flange portion 3 and the shutter 4 remains unchanged, and therefore, the discharge opening 3*a*4 is sealed assuredly by the developer sealing portion 4*a* of the shutter 4. As shown in part (b) of FIG. 13, the connecting portion 3*a*6 of the opening seal 3*a*5 is shielded by the shutter 4.

As shown in part (c) of FIG. 13, the supporting portion 4*d* of the shutter 4 is displaceable in the direction of arrows C and D, since the regulation rib 3*b*3 of the lower flange portion 3*b* does not enter the supporting portion 4*d*. As has been described above, the first stopper portion 4*b* is inclined such that the angle α (part (a) of FIG. 9) relative to the supporting portion 4*d* is acute, and the first shutter stopper portion 8*a* is also inclined, correspondingly. In this example, the inclination angle α is approx. 80 degrees. Therefore, when the developer supply container 1 is inserted further in the arrow A direction, the first stopper portion 4*b* receives a reaction force in the arrow B direction from the first shutter stopper portion 8*a*, so that the supporting portion 4*d* is displaced in an arrow D direction. That is, the first stopper portion 4*b* of the shutter 4 displaces in the direction of holding the engagement state with the first shutter stopper portion 8*a* of the developer receiving apparatus 8, and therefore, the position of the shutter 4 is held assuredly relative to the developer receiving apparatus 8.

In addition, as shown in part (d) of FIG. 13, the positional relation between the engaging portion 11*b* of the developer receiving portion 11 and the first engaging portion **3*b*2 of the lower flange portion 3*b* is such that they start engagement with each other. Therefore, the developer receiving portion 11 remains in the initial position in which it is spaced from the developer supply container 1. More specifically, as shown in part (b) of FIG. 13, the developer receiving portion 11 is spaced from the connecting portion 3*a*6 formed on a part of the opening seal 3*a*5. As shown in part (b) of FIG. 13, the developer receiving port 11*a* is in the sealed state by the main assembly shutter 15. In addition, the driving gear 9 of the developer receiving apparatus 8 and the drive receiving portion 2*d* of the developer supply container 1** are not connected with each other, that is, in the non-transmission state.

In this example, the distance between the developer receiving portion 11 and the developer supply container 1 is approx. 2 mm. When the distance is too small, not more than approx. 1.5 mm, for example, the developer deposited on the surface of the main assembly seal 13 provided on the developer receiving portion 11 may be scattered by air flow produced locally by the mounting and dismounting operation of the developer supply container 1, the scattered developer may be deposited on the lower surface of the developer supply container 1. On the other hand, the distance is too large, a stroke required to displace the developer receiving portion 11 from the spacing position to the connected position is large with the result of upsizing of the image forming apparatus. Or, the inclination angle of the first engaging portion **3*b*2 of the lower flange portion 3*b* is steep relative to the mounting and dismounting direction of the developer supply container 1 with the result of increase of the load required to displace the developer receiving portion 11. Therefore, the distance between the developer supply container 1 and the developer receiving portion 11 is properly determined taking the specifications of the main assembly or the like into account. As described above, in this example, the inclination angle of the first engaging portion 3*b*2 relative to the mounting and dismounting direction of the developer supply container 1** is approx. 40 degrees. The same applies to the following embodiments.

Figure 14:
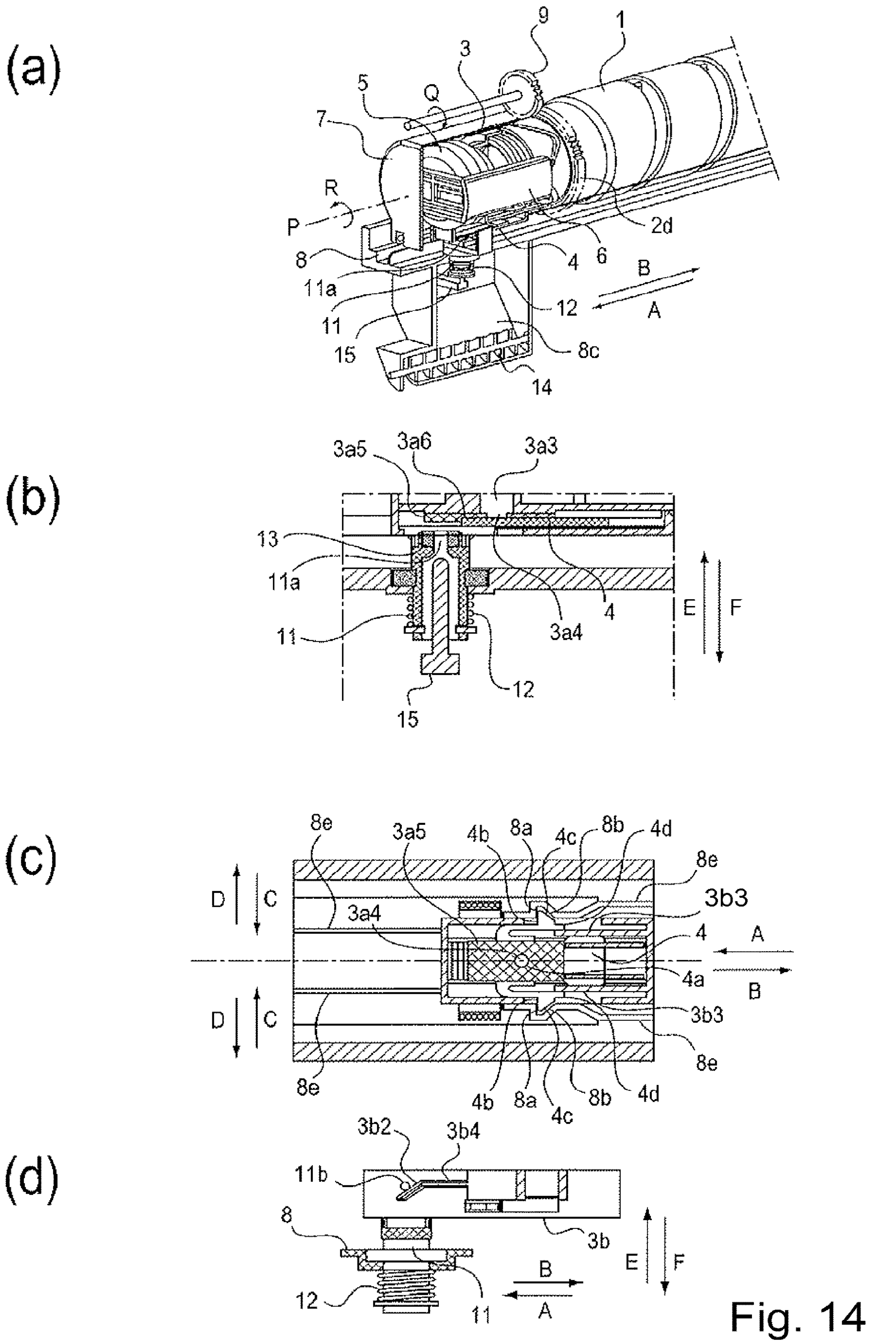
FIG. 14 is a perspective view (a) of a partial section, a front view (b) of the partial section, a top plan view (c), an interrelation relation view (d) of the lower flange portion with developer receiving portion, illustrating a mounting and demounting operation of the developer supply container in Embodiment 1.

Then, as shown in part (a) of FIG. 14, the developer supply container 1 is further inserted in the direction of the arrow A. As shown in part (c) of FIG. 14, the developer supply container 1 moves relative to the shutter 4 in the direction of the arrow A, since the position of the shutter 4 is held relative to the developer receiving apparatus 8. At this time, as shown in part (b) of FIG. 14, a part of the connecting portion **3*a*6 of the opening seal 3*a*5 is exposed through the shutter 4. Further, as shown in part (d) of FIG. 14, the first engaging portion 3*b*2 of the lower flange portion 3*b* directly engages with the engaging portion 11*b* of the developer receiving portion 11 so that the engaging portion 11*b* is displaced in the direction of the arrow E by the first engaging portion 3*b*2. Therefore, the developer receiving portion 11 is displaced in the direction of the arrow E against the urging force of the urging member 12 (arrow F) to the position shown in part (b) of FIG. 14, so that the developer receiving port 11*a* is spaced from the main assembly shutter 15, thus starting to unseal. Here, in the position of FIG. 14, the developer receiving port 11*a* and the connecting portion 3*a*6 are spaced from each other. Further, as shown in part (c) of FIG. 14, the regulation rib 3*b*3 of the lower flange portion 3*b* enters of supporting portion 4*d* of the shutter 4, so that the supporting portion 4*d* can not displace in the direction of arrow C or arrow D. That is, the elastic deformation of the supporting portion 4*d* is limited by the regulation rib 3*b*3**.

Then, as shown in part (a) of FIG. 15, the developer supply container 1 is further inserted in the direction of the arrow A. Then, as shown in part (c) of FIG. 15, the developer supply container 1 moves relative to the shutter 4 in the direction of the arrow A, since the position of the shutter 4 is held relative to the developer receiving apparatus 8. At this time, the connecting portion **3*a*6 formed on the part of the opening seal 3*a*5 is completely exposed from the shutter 4. In addition, the discharge opening 3*a*4 is not exposed from the shutter 4, so that it is still sealed by the developer sealing portion 4*a***.

Furthermore, as described hereinbefore, the regulation rib **3*b*3 of the lower flange portion 3*b* enters the supporting portion 4*d* of the shutter 4, by which the supporting portion 4*d* can not displace in the direction of arrow C or arrow D. At this time, as shown in part (d) of FIG. 15, the directly engaged engaging portion 11*b* of the developer receiving portion 11 reaches the upper end side of the first engaging portion 3*b*2. The developer receiving portion 11 is displaced in the direction of the arrow E against the urging force (arrow F) of the urging member 12, to the position shown in part (b) of FIG. 15, so that the developer receiving port 11*a* is completely spaced from the main assembly shutter 15** to be unsealed.

At this time, the connection is established in the state that the main assembly seal 13 having the developer receiving port **11*a* is close-contacted to the connecting portion 3*a*6 of the opening seal 3*a*5. In other words, by the developer receiving portion 11 directly engaging with the first engaging portion 3*b*2 of the developer supply container 1, the developer supply container 1 can be accessed by the developer receiving portion 11 from the lower side in the vertical direction which is crossed with the mounting direction. Thus, the above-described the structure, can avoid the developer contamination at the end surface Y (part (b) of FIG. 5) in the downstream side with respect to the mounting direction of the developer supply container 1, the developer contamination having been produced in the conventional structure in which the developer receiving portion 11 accesses the developer supply container 1** in the mounting direction. The conventional structure will be described hereinafter.

Subsequently, as shown in part (a) of FIG. 16, when the developer supply container 1 is further inserted in the direction of the arrow A to the developer receiving apparatus 8, the developer supply container 1 moves relative to the shutter 4 in the direction of the arrow A similar to the forgoing, up to a supply position (second position). In this position, the driving gear 9 and the drive receiving portion **2*d* are connected with each other. By the driving gear 9 rotating in the direction of an arrow Q, the container body 2 is rotated in the direction of the arrow R. As a result, the pump portion 5 is reciprocated by the reciprocation of the reciprocating member 6 in interrelation with the rotation of the container body 2. Therefore, the developer in the developer accommodating portion 2*c* is supplied into the sub-hopper 8*c* from the storage portion 3*a*3 through the discharge opening 3*a*4 and the developer receiving port 11*a* by the reciprocation of the pump portion 5** described above.

In addition, as shown in part (d) of FIG. 16, when the developer supply container 1 reaches the supply position relative to the developer receiving apparatus 8, the engaging portion **11*b* of the developer receiving portion 11 is engaged with the second engaging portion 3*b*4 by way of the engaging relation with the first engaging portion 3*b*2 of the lower flange portion 3*b*. And, the engaging portion 11*b*** is brought into the state of being urged to the second engaging portion 3*b*4 by the urging force of the urging member 12 in the direction of the arrow F. Therefore, the position of the developer receiving portion 11 in the vertical direction is stably maintained. Furthermore, as shown in part (b) of FIG. 16, the discharge opening 3*a*4 is unsealed by the shutter 4, and the discharge opening 3*a*4 and the developer receiving port 11*a* are brought into fluid communication with each other.

At this time, the developer receiving port 11*a* slides on the opening seal 3*a*5 to communicate with the discharge opening 3*a*4 while keeping the close-contact state between the main assembly seal 13 and the connecting portion 3*a*6 formed on the opening seal 3*a*5. Therefore, the amount of the developer falling from the discharge opening 3*a*4 and scattering to the position other than the developer receiving port 11*a*. Thus, the contamination of the developer receiving apparatus 8 by the scattering of the developer is less.

(Dismounting Operation of Developer Supply Container)

Referring mainly to FIG. 13-FIGS. 16 and 17, the operation of dismounting of the developer supply container 1 from the developer receiving apparatus 8 will be described. FIG. 17 is a timing chart of operations of each elements relating to the dismounting operation of the developer supply container 1 from the developer receiving apparatus 8 as shown in FIG. 13-FIG. 16. The dismounting operation of the developer supply container 1 is a reciprocal of the above-described mounting operation. Thus, the developer supply container 1 is dismounted from the developer receiving apparatus 8 in the order from FIG. 16 to FIG. 13. The dismounting operation (removing operation) is the operation to the state in which the developer supply container 1 can be take out of the developer receiving apparatus 8.

The amount of the developer in the developer supply container 1 placed in the supply position shown in FIG. 16 decreases, a message promoting exchange of the developer supply container 1 is displayed on the display (unshown) provided in the main assembly of the image forming apparatus 100 (FIG. 1). The operator prepares a new developer supply container 1 opens the exchange cover 40 provided in the main assembly of the image forming apparatus 100 shown in FIG. 2, and extracts the developer supply container 1 in the direction of the arrow B shown in part (a) of FIG. 16.

In this process, as described hereinbefore, the supporting portion 4*d* of the shutter 4 can not displace in the direction of arrow C or arrow D by the limitation of the regulation rib 3*b*3 of the lower flange portion 3*b*. Therefore, as shown in part (a) of FIG. 16, when the developer supply container 1 tends to move in the direction of the arrow B with the dismounting operation, the second stopper portion 4*c* of the shutter 4 abuts to the second shutter stopper portion 8*b* of the developer receiving apparatus 8, so that the shutter 4 does not displace in the direction of the arrow B. In other words, the developer supply container 1 moves relative to the shutter 4.

Thereafter, when the developer supply container 1 is drawn to the position shown in FIG. 15, the shutter 4 seals the discharge opening 3*a*4 as shown in part (b) of FIG. 15. Further, as shown in part (d) of FIG. 15, the engaging portion 11*b* of the developer receiving portion 11 displaces to the downstream lateral edge of the first engaging portion 3*b*2 from the second engaging portion 3*b*4 of the lower flange portion 3*b* with respect to the dismounting direction. As shown in part (b) of FIG. 15, the main assembly seal 13 of the developer receiving portion 11 slides on the opening seal 3*a*5 from the discharge opening 3*a*4 of the opening seal 3*a*5 to the connecting portion 3*a*6, and maintains the connection state with the connecting portion 3*a*6.

Similarly to the foregoing, as shown in part (c) of FIG. 15, the supporting portion 4*d* is in engagement with the regulation rib 3*b*3, so that it can not displace in the direction of the arrow B in the FIGURE. Thus, when the developer supply container 1 is taken out from the position of FIG. 15 to the position of FIG. 13, the developer supply container 1 moves relative to the shutter 4, since the shutter 4 can not displace relative to the developer receiving apparatus 8.

Subsequently, the developer supply container 1 is drawn from the developer receiving apparatus 8 to the position shown in part (a) of FIG. 14. Then, as shown in part (d) of FIG. 14, the engaging portion 11*b* slides down on the first engaging portion 3*b*2 to the position of the generally middle point of the first engaging portion 3*b*2 by the urging force of the urging member 12. Therefore, the main assembly seal 13 provided on the developer receiving portion 11 downwardly spaces from the connecting portion 3*a*6 of the opening seal 3*a*5, thus releasing the connection between the developer receiving portion 11 and the developer supply container 1. At this time, the developer is deposited substantially on the connecting portion 3*a*6 of the opening seal 3*a*5 with which the developer receiving portion 11 has been connected.

Subsequently, the developer supply container 1 is drawn from the developer receiving apparatus 8 to the position shown in part (a) of FIG. 13. Then, as shown in part (d) of FIG. 13, the engaging portion 11*b* slides down on the first engaging portion 3*b*2 to reach the upstream lateral edge with respect to dismounting direction of the first engaging portion 3*b*2, by the urging force of the urging member 12. Therefore, the developer receiving port 11*a* of the developer receiving portion 11 released from the developer supply container 1 is sealed by the main assembly shutter 15. By this, it is avoided that foreign matter or the like enters through the developer receiving port 11*a* and that the developer in the sub-hopper 8*c* (FIG. 4) scatters from the developer receiving port 11*a*. The shutter 4 displaces to the connecting portion 3*a*6 of the opening seal 3*a*5 with which the main assembly seal 13 of the developer receiving portion 11 has been connected to shield the connecting portion 3*a*6 on which the developer is deposited.

Further, with the above-described dismounting operation of the developer supply container 1, the developer receiving portion 11 is guided by the first engaging portion 3*b*2, and after the completion of the spacing operation from the developer supply container 1, the supporting portion 4*d* of the shutter 4 is disengaged from the regulation rib 3*b*3 so as to be elastically deformable. The configurations of the regulation rib 3*b*3 and/or the supporting portion 4*d* are properly selected so that the position where the engaging relation is released is substantially the same as the position where the shutter 4 enters when developer supply container 1 is not mounted to the developer receiving apparatus 8. Therefore, when the developer supply container 1 is further drawn in the direction of the arrow B shown in part (a) of FIG. 13, the second stopper portion 4*c* of the shutter 4 abuts to the second shutter stopper portion 8*b* of the developer receiving apparatus 8, as shown in part (c) of FIG. 13. By this, the second stopper portion 4*c* of the shutter 4 displaces (elastically deforms) in the direction of arrow C along a taper surface of the second shutter stopper portion 8*b*, so that the shutter 4 becomes displaceable in the direction of the arrow B relative to the developer receiving apparatus 8 together with the developer supply container 1. That is, when the developer supply container 1 is completely taken out of the developer receiving apparatus 8, the shutter 4 returns to the position taken when the developer supply container 1 is not mounted to the developer receiving apparatus 8. Therefore, the discharge opening **3*a*4 is assuredly sealed by the shutter 4, and therefore, the developer is not scattered from the developer supply container 1 demounted from the developer receiving apparatus 8. Even if the developer supply container 1 is mounted to the developer receiving apparatus 8**, again, it can be mountable without any problem.

FIG. 17 shows flow of the mounting operation of the developer supply container 1 to the developer receiving apparatus 8 (FIGS. 13-16) and the flow of the dismounting operation of the developer supply container 1 from the developer receiving apparatus 8. When the developer supply container 1 is mounted to the developer receiving apparatus 8, the engaging portion **11*b* of the developer receiving portion 11 is engaged with the first engaging portion 3*b*2 of the developer supply container 1, by which the developer receiving port displaces toward the developer supply container. On the other hand, when the image material supply container 1 is dismounted from the developer receiving apparatus 8, the engaging portion 11*b* of the developer receiving portion 11 engages with the first engaging portion 3*b*2 of the developer supply container 1**, by which the developer receiving port displaces away from the developer supply container.

As described in the foregoing, according to this example, the mechanism for connecting and spacing the developer receiving portion 11 relative to the developer supply container 1 by displacement of the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

In a conventional structure, a large space is required to avoid an interference with the developing device in the upward and downward movement, but according to this example, such a large space is unnecessary so that the upsizing of the image forming apparatus can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

The developer supply container 1 of this example can cause the developer receiving portion 11 to connect upwardly and space downwardly in the direction crossing with the mounting direction of developer supply container 1, using the engaging portions **3*b*2, 3*b*4 of the lower flange portion 3*b* with the mounting and demounting operation to the developer receiving apparatus 8. The developer receiving portion 11 is sufficiently small relative to developer supply container 1, and therefore, the developer contamination of the downstream side end surface Y (part (b) of FIG. 5) of the developer supply container 1 with respect to the mounting direction, with the simple and space saving structure. In addition, the developer contamination by the main assembly seal 13 slides on the protecting portion 3*b*5 of the lower flange portion 3*b* and the sliding surface (lower surface of the shutter) 4*i***.

Furthermore, according to this example, after the developer receiving portion 11 is connected to the developer supply container 1 with the mounting operation of the developer supply container 1 to the developer receiving apparatus 8, the discharge opening **3*a*4 is exposed from the shutter 4 so that the discharge opening 3*a*4 and the developer receiving port 11*a* can be brought into communication with each other. In other words, the timing of each step is controlled by the engaging portions 3*b*2, 3*b*4 of the developer supply container 1**, and therefore, the scattering of the developer can be suppressed assuredly with a simple and easy structure, without the being influenced by the way of operation by the operator.

In addition, after the discharge opening **3*a*4 is sealed and the developer receiving portion 11 is spaced from the developer supply container 1 with the dismounting operation of the developer supply container 1 from the developer receiving apparatus 8, the shutter 4 can shield the developer deposition portion of the opening seal 3*a*5. In other words, the timing of each step in the dismounting operation can be controlled by the engaging portions 3*b*2 and 3*b*4 of the developer supply container 1**, and therefore, the scattering of the developer can be suppressed, and the developer deposition portion can be prevented from the exposing to the outside.

In the prior-art structure, the connection relation between the connecting portion and the connected portion is established indirectly through another mechanism, and therefore, it is difficulty to control the connection relation with high precision, However, in this example, the connection relation can be established by the directly engagement between the connecting portion (developer receiving portion 11) and the connected portion (developer supply container 1). More specifically, the timing of the connection between the developer receiving portion 11 and the developer supply container 1 can be controlled easily by the positional relation, in the mounting direction, among the engaging portion **11*b* of the developer receiving portion 11, the first and second engaging portions 3*b*2 and 3*a*4 of the lower flange portion 3*b* of the developer supply container 1 and discharge opening 3*a*4. In other words, the timing may deviate within the tolerances of the three elements, and therefore, very high accuracy control can be performed. Therefore, the connecting operation of the developer receiving portion 11 to the developer supply container 1 and the spacing operation from the developer supply container 1 can be carried out assuredly, with the mounting operation and the dismounting operation of the developer supply container 1**.

Regarding the displacement amount of the developer receiving portion 11 in the direction crossing with the mounting direction of the developer supply container 1 can be controlled by the positions of the engaging portion **11*b* of the developer receiving portion 11 and the second engaging portion 3*b*4 of the lower flange portion 3*b*. Similarly to the foregoing, the deviation of the displacement amount may deviate within the tolerances of the two elements, and therefore, very high accuracy control can be performed. Therefore, for example, close-contact state (amount of sealing compression or the like) between the main assembly seal 13 and the discharge opening 3*a*4 can be controlled easily, so that the developer discharged from the discharge opening 3*a*4 can be fed into the developer receiving port 11*a*** assuredly.

Embodiment 2

Figure 19:
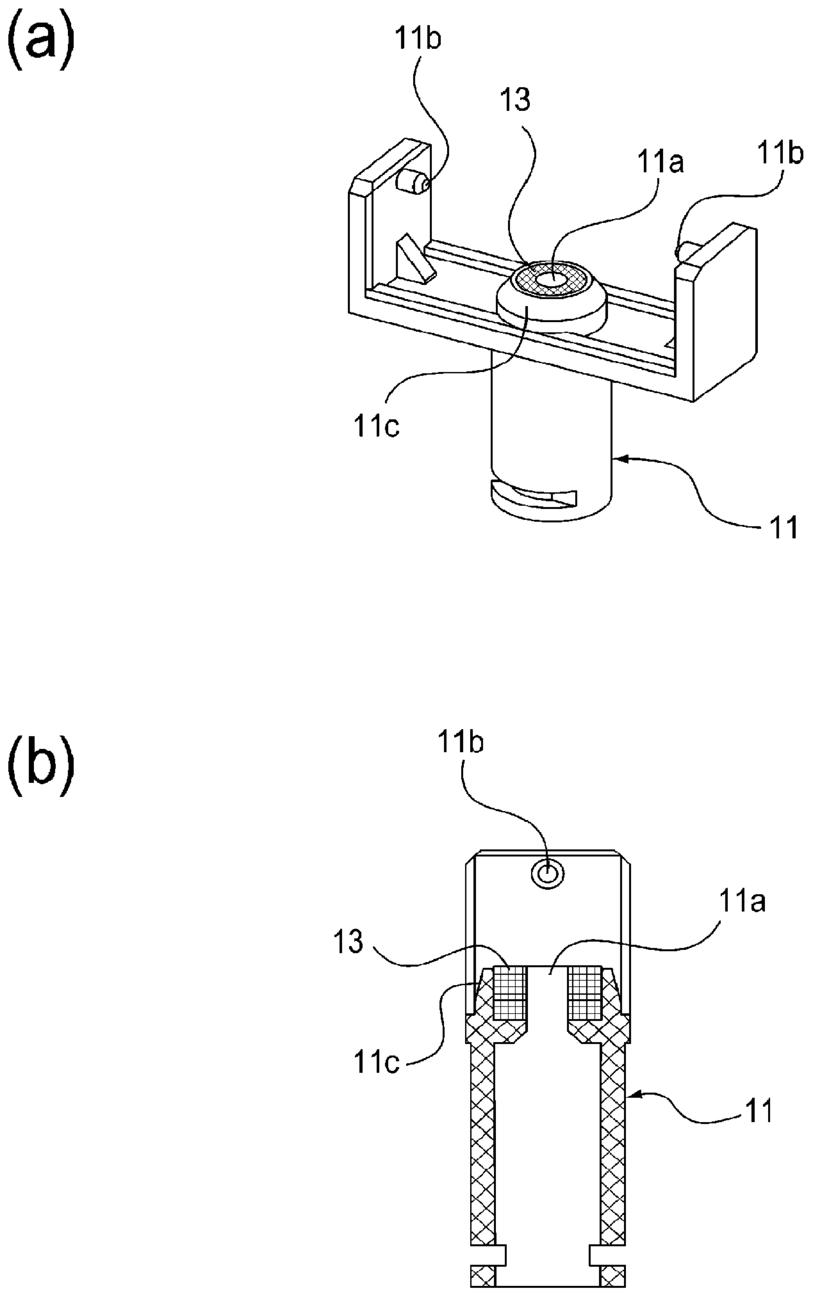
In FIG. 19, (a) is a perspective view of a developer receiving portion according to Embodiment 2, and (b) is a sectional view of the developer receiving portion of Embodiment 2.
Figure 32:
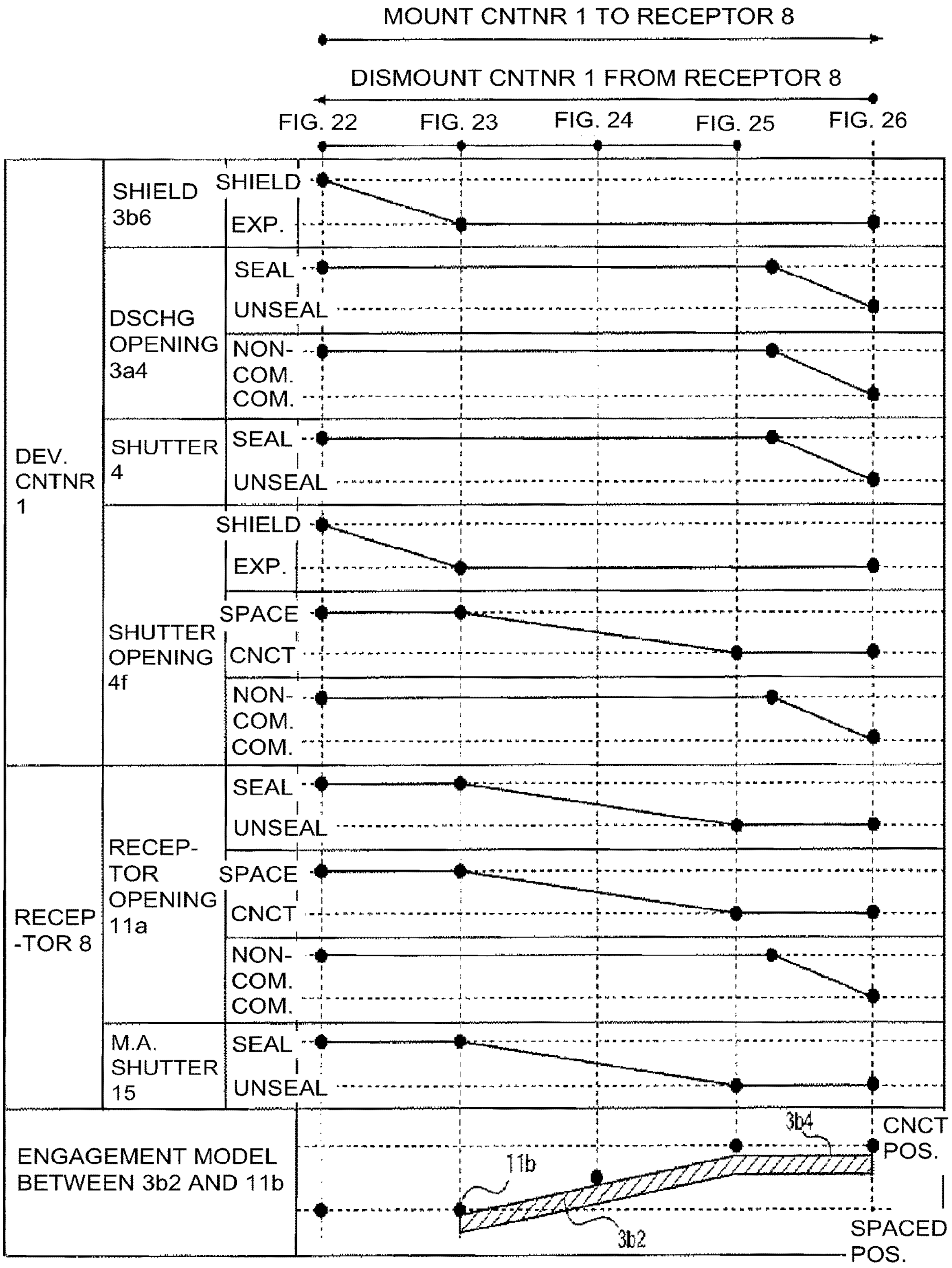
FIG. 32 is a timing chart view of the mounting and demounting operation of the developer supply container in Embodiment 2.

Referring to FIG. 19 FIG. 32, Embodiment 2 will be described. Embodiment 2 is partly different from Embodiment 1 in the configuration and structure developer receiving portion 11, the shutter 4, the lower flange portion 3*b*, and the mounting and demounting operations of the developer supply container 1 to the developer receiving apparatus 8 are partly different, correspondingly. Of other structures are substantially the same as Embodiment 1. In this example, the same reference numerals as in the foregoing embodiments are assigned to the elements having the corresponding functions in this embodiment, and the detailed description thereof is omitted.

(Developer Receiving Portion)

FIG. 19 shows the developer receiving portion 11 of Embodiment 2. Part (a) of FIG. 19 is a perspective view of the developer receiving portion 11, and part (b) of FIG. 19 is a sectional view of the developer receiving portion 11.

As shown in part (a) of FIG. 19, the developer receiving portion 11 of Embodiment 2 is provided with a tapered portion 11*c* for misalignment prevention at the end portion of the downstream side with respect to the connecting direction to the developer supply container 1, and the end surface continuing from the tapered portion 11*c* is substantially annular. The misalignment prevention tapered portion 11*c* is engaged with a misalignment prevention taper engaging portion 4*g* (FIG. 21) provided on the shutter 4, as will be described hereinafter. The misalignment prevention tapered portion 11*c* is provided in order to prevent a misalignment between the developer receiving port 11*a* and a shutter opening 4*f* (FIG. 21) of the shutter 4 due to a vibration by a driving source inner the image forming apparatus and/or a deformation of a part. The detail of the engaging relation (contact relation) between the misalignment prevention tapered portion 11*c* and the misalignment prevention taper engaging portion 4*g* will be described hereinafter. The material and/or configuration and dimensions of the main assembly seal 13 such as a width and/or height or the like are properly selected so that the leakage of the developer can be prevented in relation with a configuration of a close-contact portion 4*h* provided around the shutter opening 4*f* of the shutter 4 which will be described hereinafter, to which the main assembly seal 13 is connected with the mounting operation of the developer supply container 1.

(Lower Flange)

Figure 20:
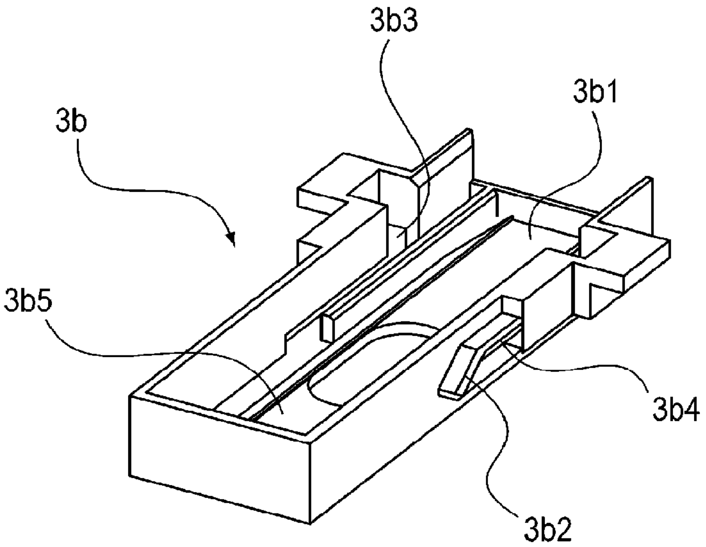
In FIG. 20, (a) is a perspective view (top side) of a lower flange portion in Embodiment 2, and (b) is a perspective view (bottom side) of the lower flange portion in Embodiment 2.
Figure 20:
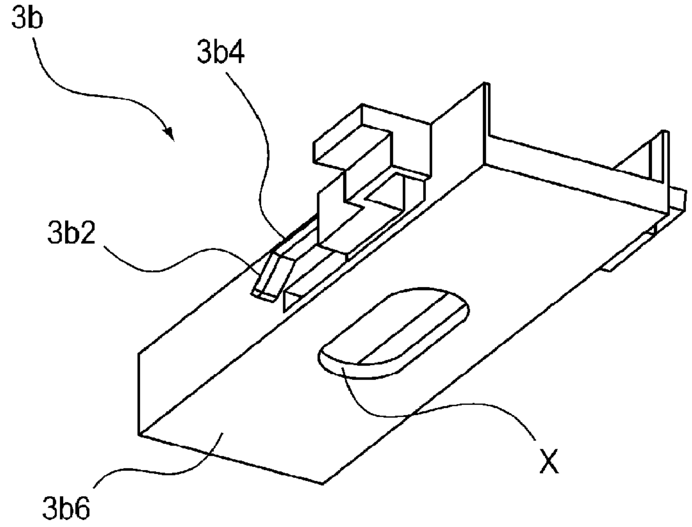

FIG. 20 shows the lower flange portion 3*b* in Embodiment 2. Part (a) of FIG. 20 is a perspective view (upward direction) of the lower flange portion 3*b*, and part (b) of FIG. 20 is a perspective view (downward direction) of lower flange portion 3*b*. The lower flange portion 3*b* in this embodiment is provided with a shielding portion 3*b*6 for shielding the shutter opening 4*f* which will be described hereinafter, when the developer supply container 1 is not mounted to the developer receiving apparatus 8. The provision of the shielding portion 3*b*6 is different from the above-described lower flange portion 3*b* of Embodiment 1. In this embodiment, the shielding portion 3*b*6 is provided in the downstream side of the lower flange portion 3*b* with respect to the mounting direction of the developer supply container 1.

Also in this example, similarly to the above-described embodiment, the lower flange portion 3*b* is provided with engaging portions 3*b*2 and 3*b*4 engageable with an engaging portion 11*b* (FIG. 19) of the developer receiving portion 11 as shown in FIG. 20.

In this example, of the engaging portions 3*b*2 and 3*b*4, the first engaging portion 3*b*2 displaces the developer receiving portion 11 toward the developer supply container 1 so that the main assembly seal 13 provided in the developer receiving portion 11 is connected with the shutter 4 which will be described hereinafter, with the mounting operation of the developer supply container 1. The first engaging portion 3*b*2 displaces the developer receiving portion 11 toward the developer supply container 1 with the mounting operation of the developer supply container 1 so that the developer receiving port 11*a* formed in the developer receiving portion 11 is connected with the shutter opening (communication port) 4*f*.

In addition, the first engaging portion 3*b*2 guides the developer receiving portion 11 away from the developer supply container 1 so that the connection state between the developer receiving portion 11 and the shutter opening 4*f* of the shutter 4 is broken, with the dismounting operation of the developer supply container 1.

On the other hand, a second engaging portion 3*b*4 holds the connected state between the shutter 4 and the main assembly seal 13 of the developer receiving portion 11 in the movement of the developer supply container 1 relative to the shutter 4, so that a discharge opening 3*a*4 is brought into fluid communication with the developer receiving port 11*a* of the developer receiving portion 11, with the mounting operation of the developer supply container 1. The second engaging portion 3*b*4 maintains the connected state between the developer receiving port 11*a* and the shutter opening 4*f* in the movement of the lower flange portion 3*b* relative to the shutter 4 with the mounting operation of the developer supply container 1, so that the discharge opening 3*a*4 is brought into fluid communication with the shutter opening 4*f*.

In addition, the second engaging portion 3*b*4 holds the connected state between the developer receiving portion 11 and the shutter 4 in the movement of the developer supply container 1 relative to the shutter 4 so that the discharge opening 3*a*4 is resealed, with the dismounting operation of the developer supply container 1.

(Shutter)

Figure 21:
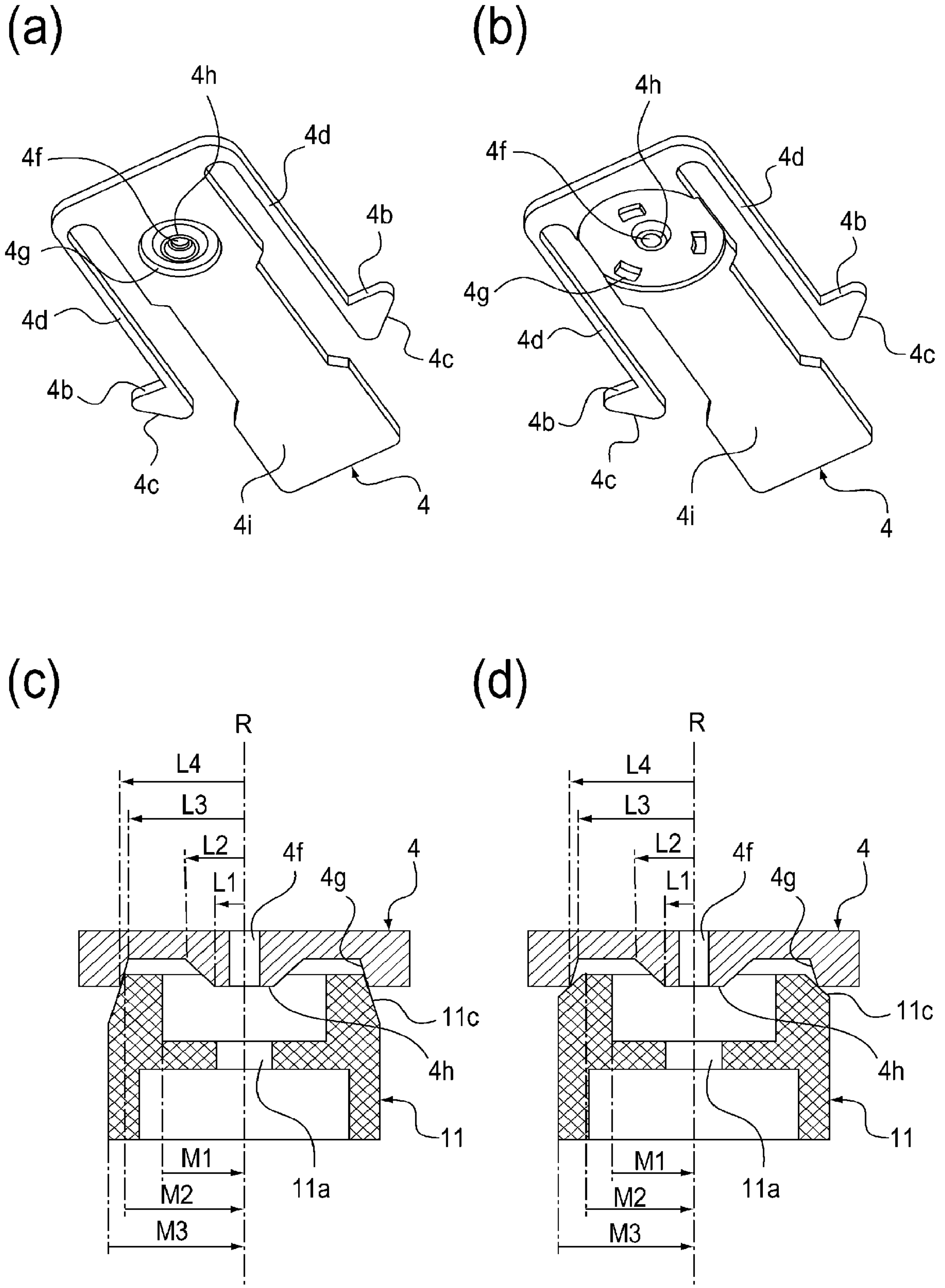
In FIG. 21, (a) is a perspective view of a shutter in Embodiment 2, (b) is a perspective view of an according to modified example 1, and (c) and (d) are schematic views of the shutter and the developer receiving portion.

FIG. 21-FIG. 25 show the shutter 4 in Embodiment 2. Part (a) of FIG. 21 is a perspective view of the shutter 4, part (b) of FIG. 21 illustrates a modified example 1 of the shutter 4, part (c) of FIG. 21 illustrates a connection relation between the shutter 4 and the developer receiving portion 11, part (d) of FIG. 21 is a illustration similar to the part (c) of FIG. 21.

As shown in part (a) of FIG. 21, the shutter 4 of Embodiment 2 is provided with the shutter opening (communication port) 4*f* communicatable with the discharge opening 3*a*4. Further, the shutter 4 is provided with a close-contact portion (projected portion, projection) 4*h* surrounding an outside of the shutter opening 4*f*, and the misalignment prevention taper engaging portion 4*g* further outside the close-contact portion 4*h*. The close-contact portion 4*h* has a projection height such that it is lower than a sliding surface 4*i* of the shutter 4, and a diameter of the shutter opening 4*f* is approx. Φ2 mm. The size is selected for the same reason as with Embodiment 1, and therefore, the explanation is omitted for simplicity.

Figure 26:
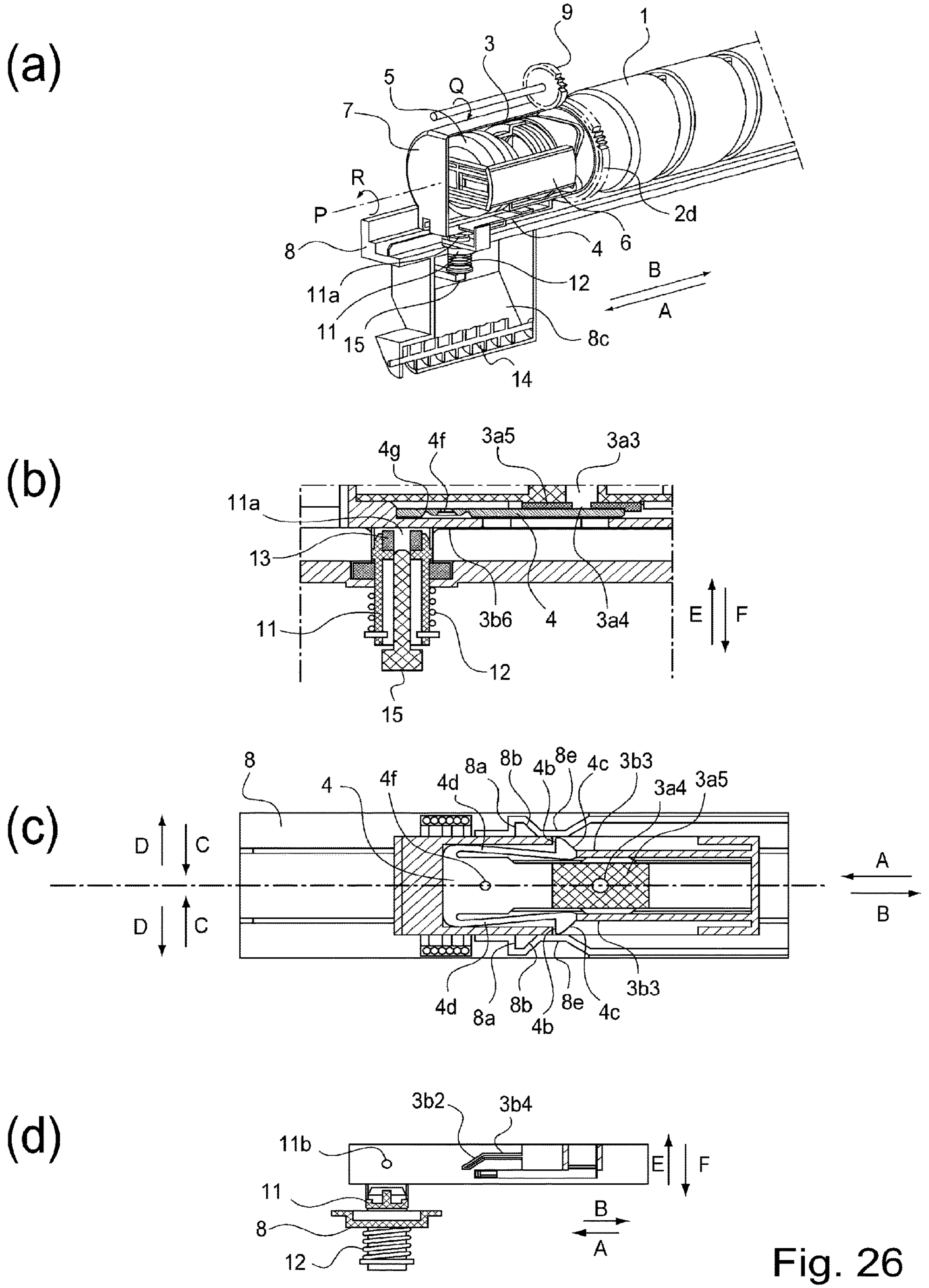
FIG. 26 is a perspective view (a) of a partial section, a front view (b) of the partial section, a top plan view (c), an interrelation relation view (d) of the lower flange portion with developer receiving portion, illustrating a mounting and demounting operation of the developer supply container in Embodiment 2.

The shutter 4 is provided with a recess at a substantially central portion with respect to the longitudinal direction of the shutter 4, as a retraction space for the supporting portion 4*d* at the time when the supporting portion 4*d* of shutter 4 displaces in the direction C (part (c) of FIG. 26) with the dismounting operation. A gap between the recessed configuration and the supporting portion 4*d* is larger than an amount of overlapping between the first stopper portion 4*b* and a first shutter stopper portion 8*a* of the developer replenishing apparatus 8, so that the shutter 4 can be engaged with and disengaged from the developer receiving apparatus 8 smoothly.

Figure 22:
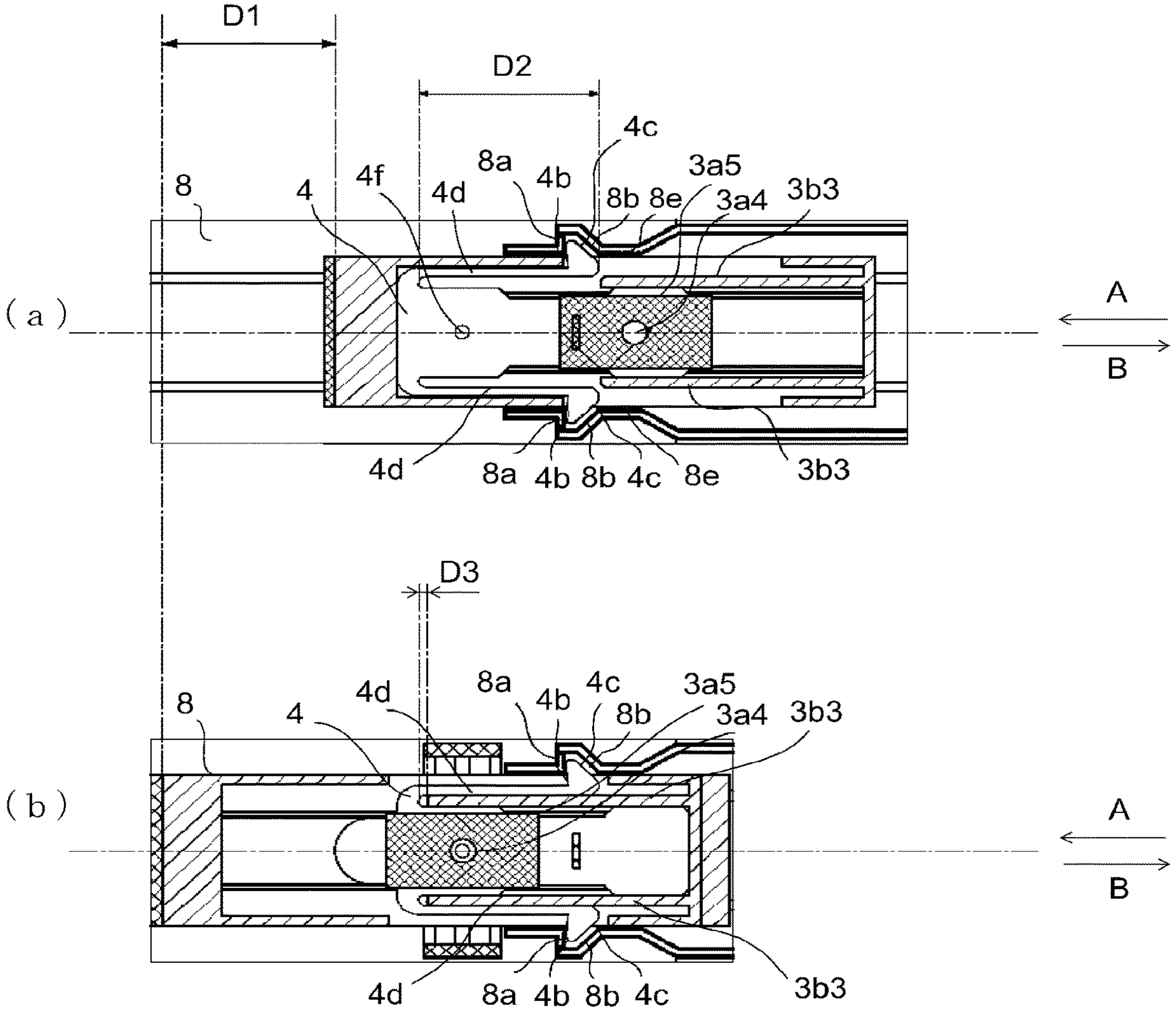
In FIG. 22, (a) and (b) are sectional views illustrating a shutter operation in Embodiment 2.
Figure 23:
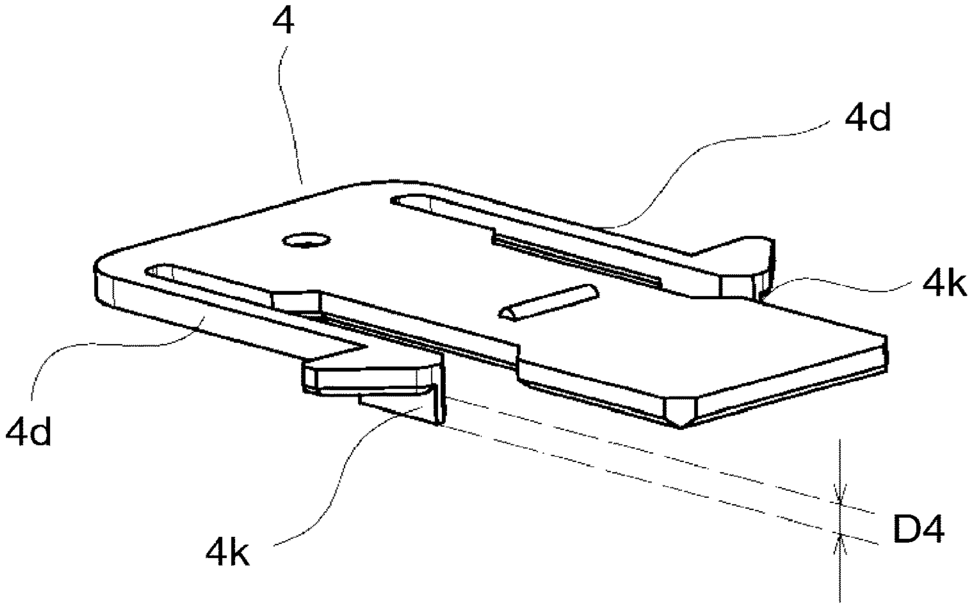
FIG. 23 is a perspective view of the shutter in Embodiment 2.
Figure 24:
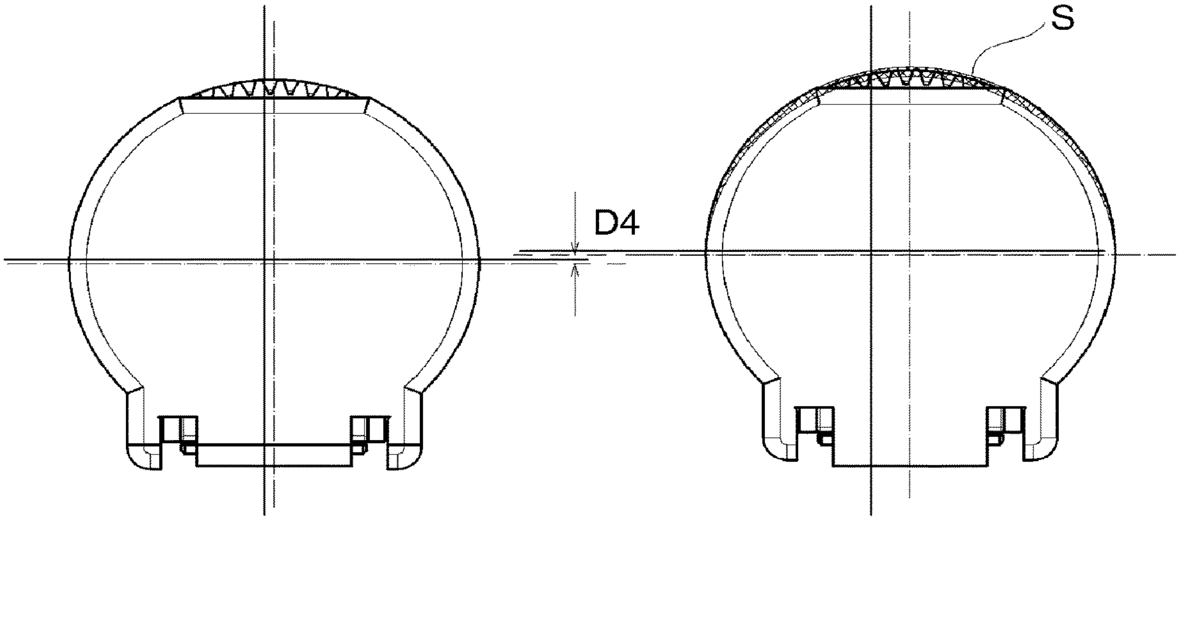
FIG. 24 is a front view of the developer supply container according to Embodiment 2.

Referring to FIG. 22-FIG. 24, the configuration of the shutter 4 will be described. Part (a) of FIG. 22 shows a position (the same position as FIG. 27) where the developer supply container 1 is engaged with the developer receiving apparatus 8, which will be described hereinafter, and part (b) of FIG. 22 shows a position (the same position as FIG. 31) where the developer supply container 1 is completely mounted to the developer receiving apparatus 8.

As shown in FIG. 22, a length D2 of supporting portion 4*d* is set such that it is larger than a displacement amount D1 of the developer supply container 1 with the mounting operation of the developer supply container 1 (D1≤D2). The displacement amount D1 is the amount of the displacement of the developer supply container 1 relative to the shutter in the mounting operation of the developer supply container 1. That is, it is the displacement amount of the developer supply container 1 in the state (part (a) of FIG. 22) in which stopper portions (holding portions) 4*b* and 4*c* of the shutter 4 is in engagement with shutter stopper portions 8*a* and 8*b* of the developer receiving apparatus 8. With such a structure, the interference between a regulation rib 3*b*3 of the lower flange 3*b* and the supporting portion 4*d* of the shutter 4 in the process of mounting of the developer supply container 1 can be reduced.

On the other hand, for the case in which D2 is smaller than D1, the supporting portion 4*d* of the shutter 4 may be provided with a regulated projection (projection) 4*k* positively engageable with the regulation rib 3*b*3 as shown in FIG. 23 to prevent the interference between the supporting portion 4*d* and the regulation rib 3*b*3. With such a structure, the developer supply container 1 can be mounted to the developer receiving apparatus 8 irrespective of the size relation between the displacement amount D1 in the mounting operation of the developer supply container 1 and the length D2 of the supporting portion 4*d* of the shutter 4. On the other hand, when the structure shown in FIG. 23 is used, the size of the developer supply container 1 is larger only a height D4 of the regulated projection 4*k*. FIG. 23 is a perspective view of the shutter 4 for the developer supply container 1 when D1>D2. Therefore, if the position of the developer receiving apparatus 8 inner the main assembly of the image forming apparatus 100 is the same, a cross-sectional area is larger by S than of the developer supply container 1 of this embodiment as shown in FIG. 24, and therefore, a corresponding larger space is required. The foregoing applies to the above-described Embodiment 1, and the embodiments described hereinafter.

Part (b) of FIG. 21 shows a modified example 1 of the shutter 4 in which the misalignment prevention taper engaging portion 4*g* is divided into a plurality of parts, as is different from the shutter 4 of this embodiment. In the other respects, substantially the equivalent performance is provided.

Referring to, part (c) of FIG. 21 and part (d) of FIG. 21, the engaging relation between the shutter 4 and the developer receiving portion 11 will be described.

Part (c) of FIG. 21 shows the engaging relation between the misalignment prevention taper engaging portion 4*g* of the shutter 4 and the misalignment prevention tapered portion 11*c* of the developer receiving portion 11 in Embodiment 2.

As shown in part (c) of FIG. 21 and part (d) of FIG. 21, distances of the corner lines constituting the close-contact portion 4*h* and the misalignment prevention taper engaging portion 4*g* of the shutter 4 from a center R of the shutter opening 4*f* (part (a) of FIG. 21) are L1, L2, L3, L4.

Similarly, as shown in part (c) of FIG. 21, distances of corner lines constituting the misalignment prevention tapered portion 11*c* of the developer receiving portion 11 from the center R of the developer receiving port 11*a* (FIG. 19) are M1, M2, M3. The positions of the centers of the shutter opening 4*f* and the developer receiving port 11*a* are set to be aligned with each other. In this embodiment, the positions of the corner lines are selected to satisfy L1<L2<M1<L3<M2<L4<M3. As shown in part (c) FIG. 21, the corner lines at the distance M2 from the center R of the developer receiving port 11*a* of the developer receiving portion 11 abuts to the misalignment prevention taper engaging portion 4*g* of the shutter 4. Therefore, even if the positional relation between the shutter 4 and the developer receiving portion 11 is deviated more or less due to the vibration from the driving source of the main assembly of the apparatus and/or part accuracies, the misalignment prevention taper engaging portion 4*g* and the misalignment prevention are guided by the tapered surfaces to align with each other. Therefore, the deviation between the center shafts of and opening 4*f* and the developer receiving port 11*a* can be suppressed.

Similarly, part (d) of FIG. 21 shows a modified example of the engaging relation between the misalignment prevention taper engaging portion 4*g* of the shutter 4 and the misalignment prevention tapered portion 11*c* of the developer receiving portion 11, according to Embodiment 2.

As shown in part (d) of FIG. 21, the structure of this modified example is different from the structure shown in part (c) of FIG. 21 only in that the positional relation of the corner lines is L1<L2<M1<M2<L3<L4<M3. In this modified example, the corner lines at the position L4 away from the center R of the shutter opening 4*f* of the misalignment prevention taper engaging portion 4*g* abuts to the tapered surface of the tapered portion 11*c*. Also in this case, the deviation of the center shafts of the shutter and the developer receiving port 11*a* can be suppressed, similarly.

Figure 25:
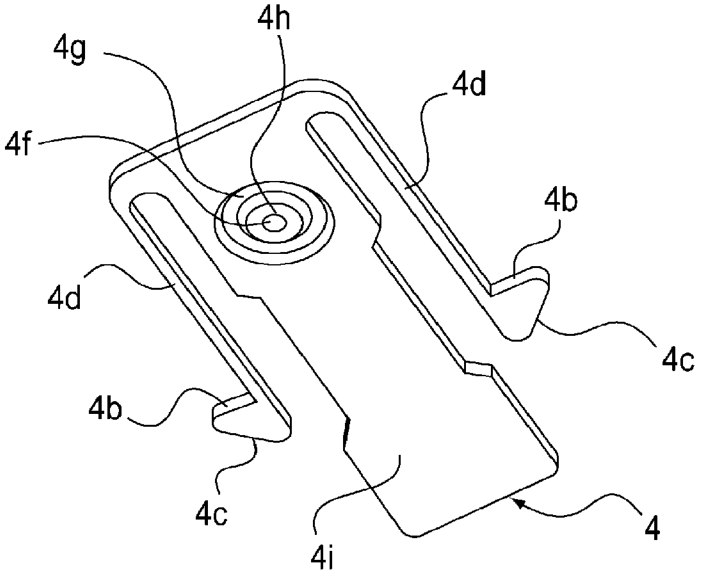
In FIG. 25, (a) is a perspective view of a shutter according to modified example 2, and (b) and (c) are schematic views of the shutter and the developer receiving portion.
Figure 25:
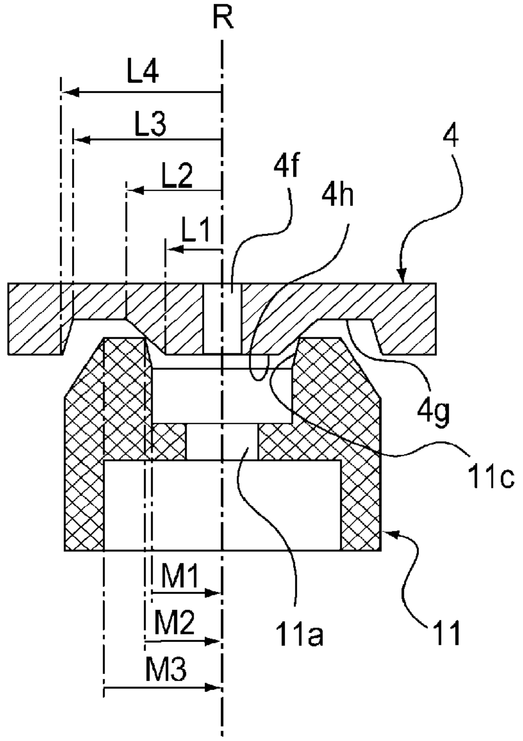
Figure 25:
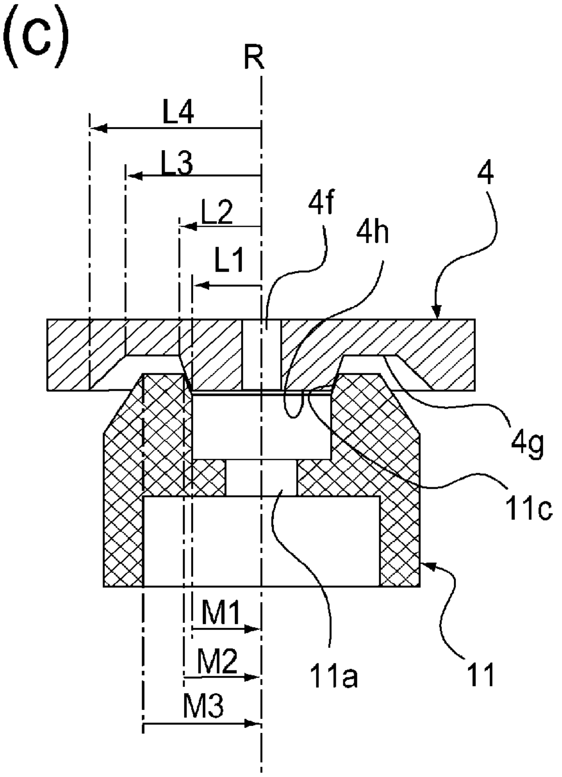

Referring to FIG. 25, a modified example 2 of the shutter 4 will be described. Part (a) of FIG. 25 shows modified example 2 of the shutter 4, and the part (b) of FIG. 25 and part (c) of FIG. 25 show the connection relation between the shutter 4 and the developer receiving portion 11 in the modified example 2.

As shown in part (a) of FIG. 25, the shutter 4 of modified example 2 is provided with the misalignment prevention taper engaging portion 4*g* in the close-contact portion 4*h*. The other configurations are the same as those of the shutter 4 (part (a) of FIG. 21) of this embodiment. The close-contact portion 4*h* is provided in order to control the amount of compression of the main assembly seal 13 (part (a) of FIG. 19).

In this modified example, as shown in part (b) of FIG. 25, distances of the corner lines constituting the close-contact portion 4*h* and the misalignment prevention taper engaging portion 4*g* of the shutter 4 from the center R of the shutter opening 4*f* (part (a) of FIG. 25). Similarly, distances of the corner lines constituting the misalignment prevention tapered portion 11*c* of the developer receiving portion 11 from the center R of the developer receiving port 11*a* (FIG. 19) are M1, M2, M3 (FIGS. 21, 25).

As shown in part (b) of FIG. 25, the positional relation of the corner lines satisfy L1<M1<M2<L2<M3<L3<L4. As shown in part (c) of FIG. 25, the positional relation of the corner lines may be M1<L1<L2<M2<M3<L3<L4. Similarly to the relation between the shutter 4 and the developer receiving portion 11 shown in part (a) of FIG. 21, by an aligning function by the misalignment prevention taper engaging portion 4*g* and the misalignment prevention tapered portion 11*c*, the misalignment between the center axes of the opening 4*f* and the developer receiving port 11*a* can be prevented. In this example, the misalignment prevention taper engaging portion 4*g* of the shutter 4 is monotonically linearly tapered, but the tapered surface portion may be curved, that is, may be an arcuate. Furthermore, it may be a contiguous taper, having a cut-away portion or portions. The same applies to the configuration of the misalignment prevention tapered portion 11*c* of the developer receiving portion 11 corresponding to the misalignment prevention taper engaging portion 4*g*.

With such structures, when the main assembly seal 13 (FIG. 19) and the close-contact portion 4*h* of the shutter 4 are connected with each other, the centers of the developer receiving port 11*a* and the shutter opening 4*f* are aligned, and therefore, the developer can be discharged smoothly from the developer supply container 1 into the sub-hopper 8*c*. If the center positions of them are deviated even by 1 mm when the shutter opening 4*f* and the developer receiving port 11*a* have small diameters, such as Φ2 mm and Φ3 mm, respectively, the effective opening area is only one half of the intended area, and therefore, the smooth discharge of the developer is not expected. Using the structures of this example, the deviation between the shutter opening 4*f* and the developer receiving port 11*a* can be suppressed to 0.2 mm or less (approx. The tolerances of the parts), and therefore, the effective through opening area can be assured. Therefore, the developer can be discharged smoothly.

(Mounting Operation of Developer Supply Container)

Figure 27:
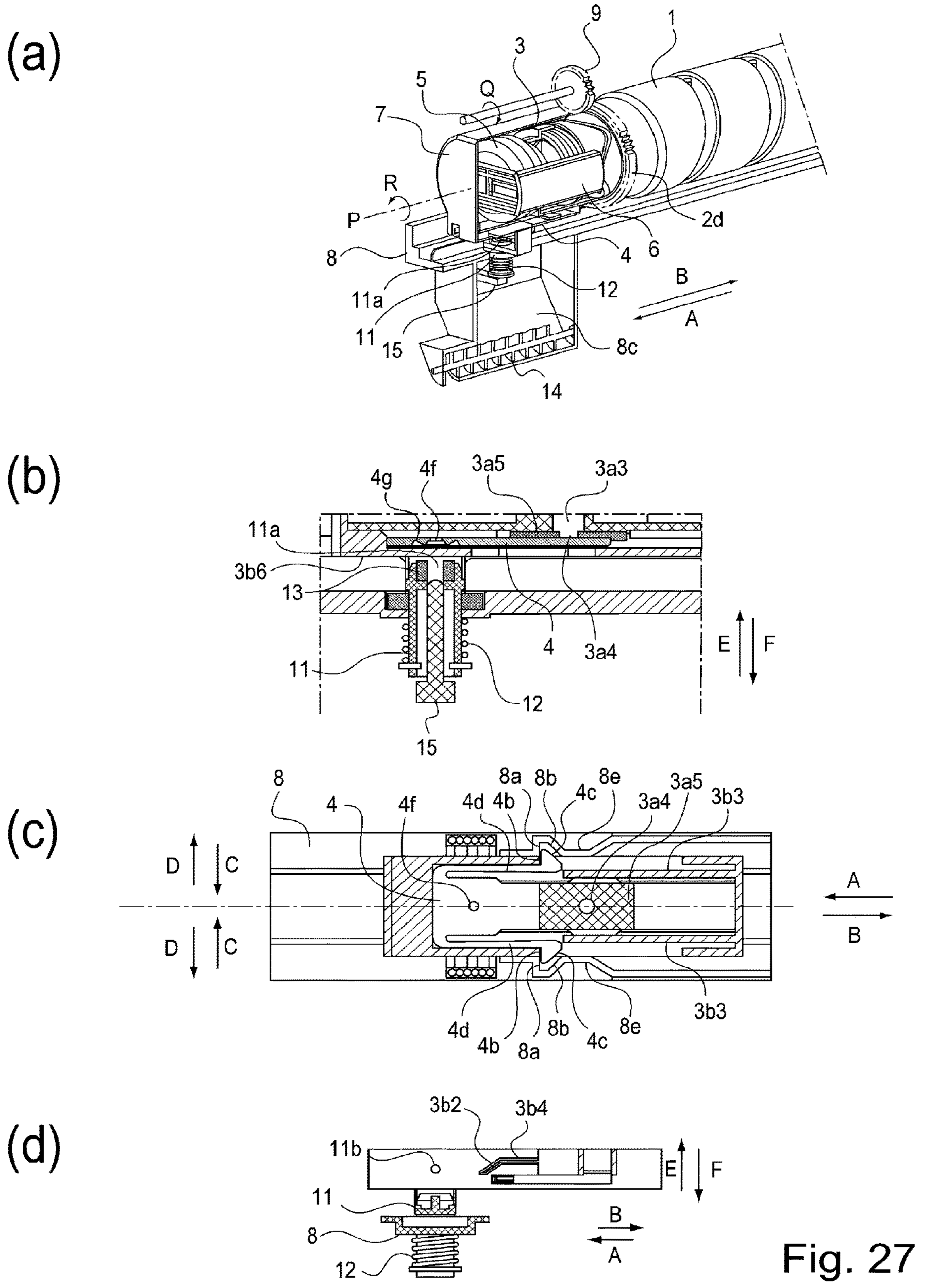
FIG. 27 is a perspective view (a) of a partial section, a front view (b) of the partial section, a top plan view (c), an interrelation relation view (d) of the lower flange portion with developer receiving portion, illustrating a mounting and demounting operation of the developer supply container in Embodiment 2.
Figure 28:
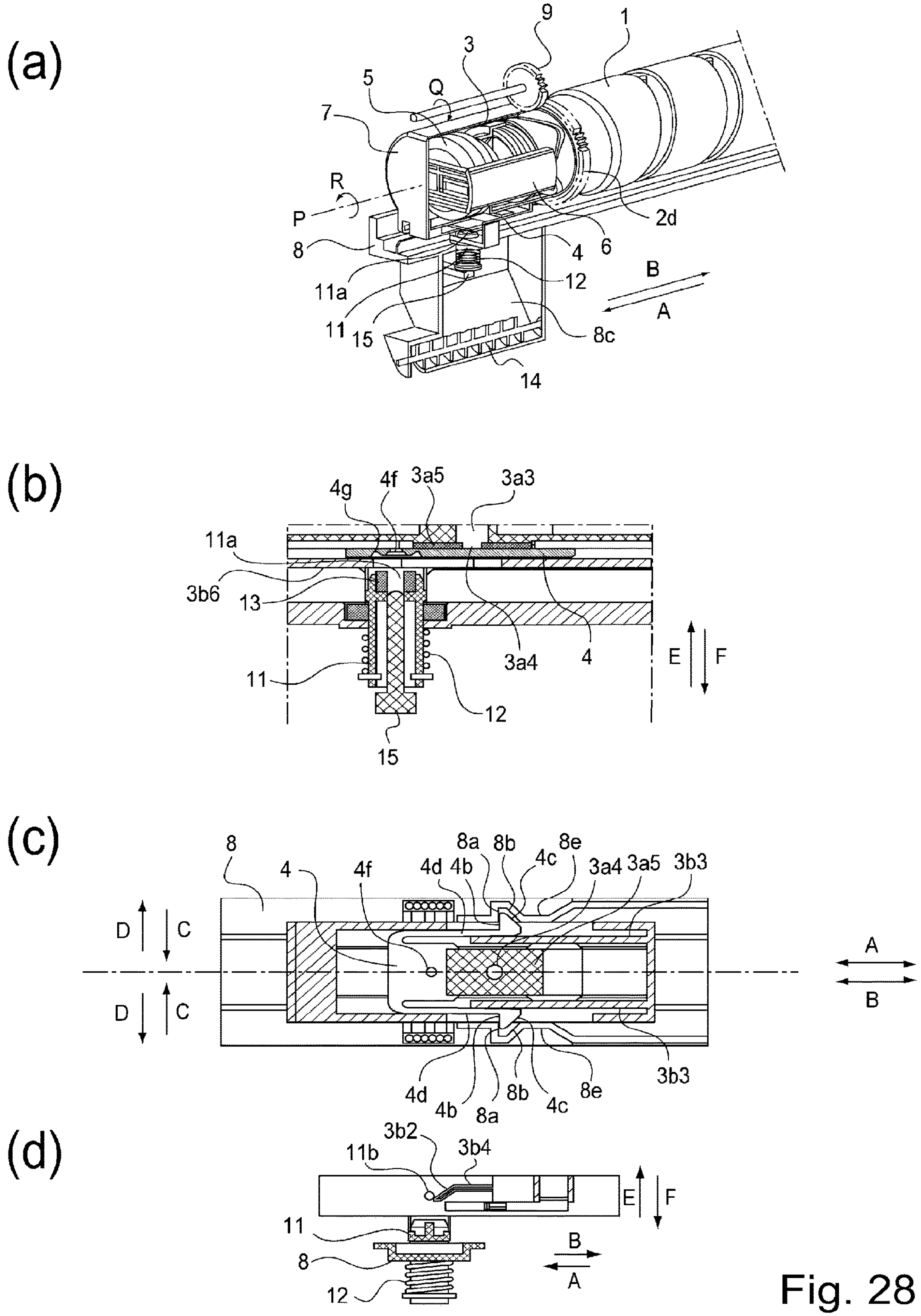
FIG. 28 is a perspective view (a) of a partial section, a front view (b) of the partial section, a top plan view (c), an interrelation relation view (d) of the lower flange portion with developer receiving portion, illustrating a mounting and demounting operation of the developer supply container in Embodiment 2.
Figure 29:
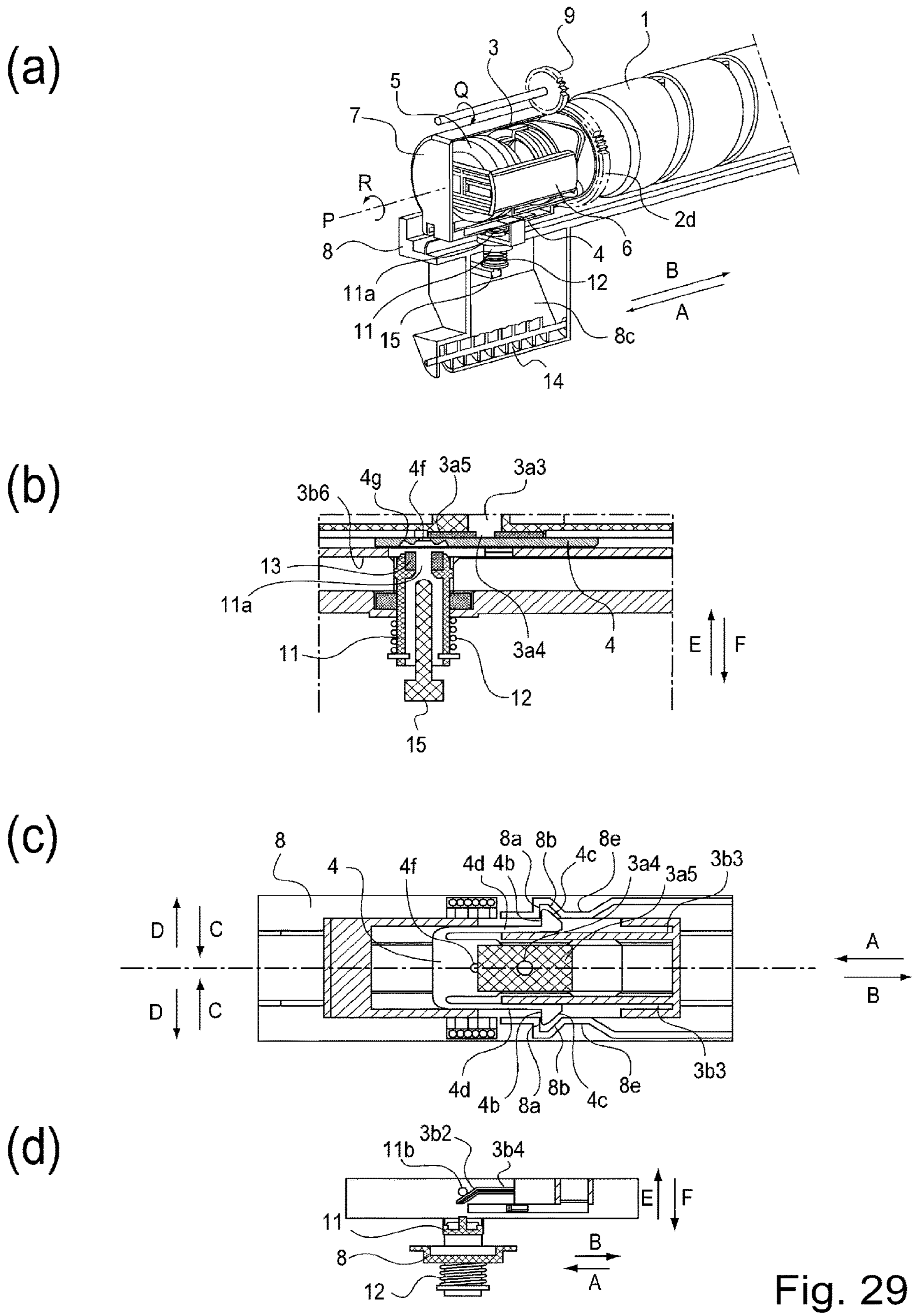
FIG. 29 is a perspective view (a) of a partial section, a front view (b) of the partial section, a top plan view (c), an interrelation relation view (d) of the lower flange portion with developer receiving portion, illustrating a mounting and demounting operation of the developer supply container in Embodiment 2.
Figure 30:
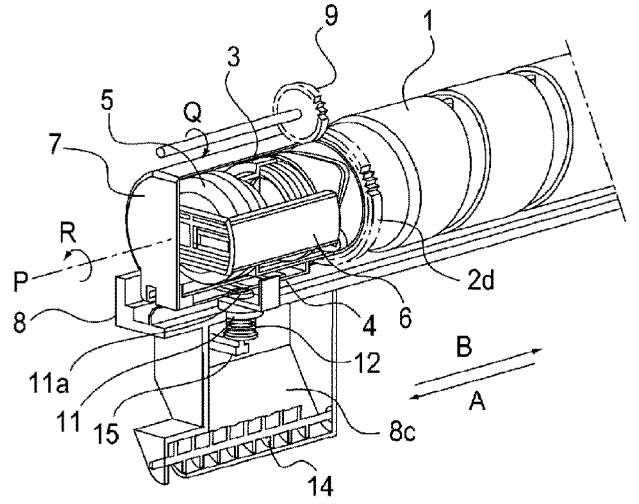
FIG. 30 is a perspective view (a) of a partial section, a front view (b) of the partial section, a top plan view (c), an interrelation relation view (d) of the lower flange portion with developer receiving portion, illustrating a mounting and demounting operation of the developer supply container in Embodiment 2.
Figure 30:
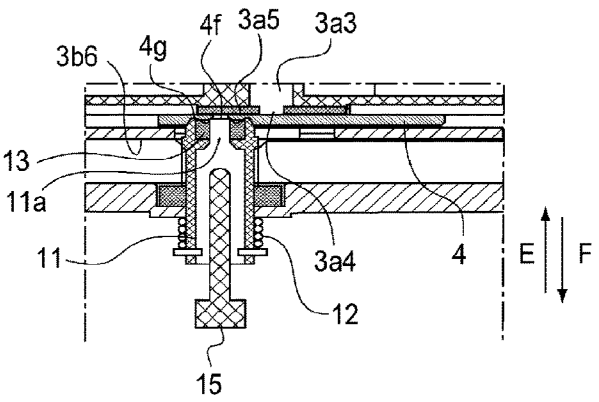
Figure 30:
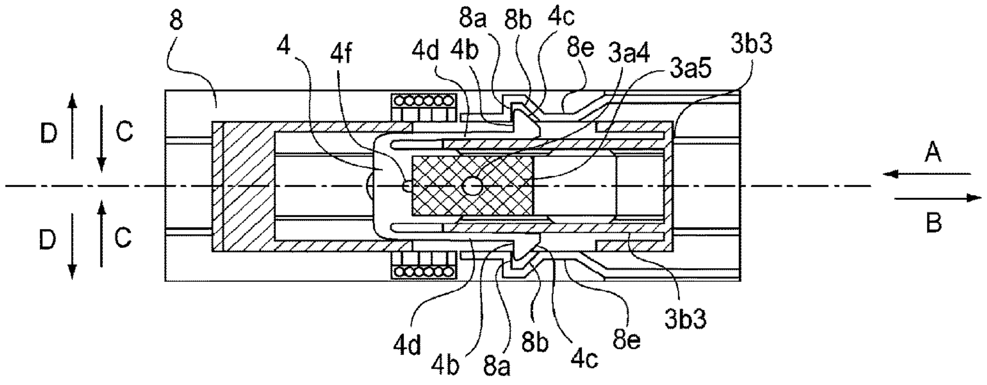
Figure 30:
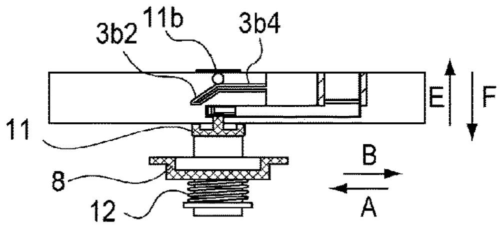
Figure 31:
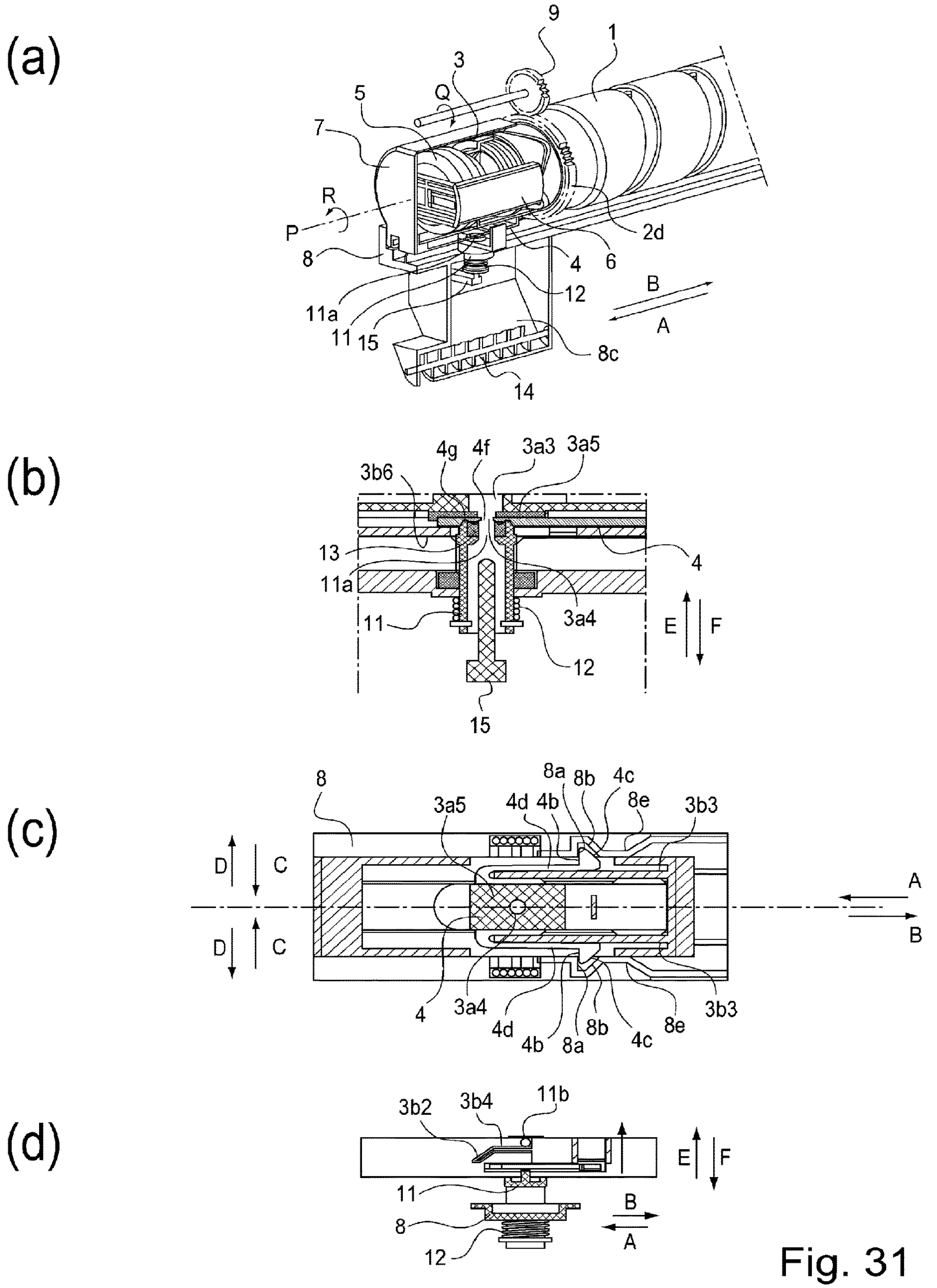
FIG. 31 is a perspective view (a) of a partial section, a front view (b) of the partial section, a top plan view (c), an interrelation relation view (d) of the lower flange portion with developer receiving portion, illustrating a mounting and demounting operation of the developer supply container in Embodiment 2.

Referring to FIG. 26-FIGS. 31 and 32, the mounting operation of the developer supply container 1 of this embodiment to the developer receiving apparatus 8 will be described. FIG. 26 shows the position when the developer supply container 1 is inserted into the developer receiving apparatus 8, and the shutter 4 has not yet been engaged with the developer receiving apparatus 8. FIG. 27 shows the position (corresponding to FIG. 13 of Embodiment 1) in which the shutter 4 of the developer supply container 1 is engaged with the developer receiving apparatus 8. FIG. 28 shows the position in which the shutter 4 of the developer supply container 1 is exposed from the shielding portion 3*b*6. FIG. 29 shows a position (corresponding to FIG. 14 of Embodiment 1) in the process of connection between the developer supply container 1 and the developer receiving portion 11. FIG. 30 shows the position (corresponding to FIG. 15 of Embodiment 1) in which the developer supply container 1 has been connected with the developer receiving portion 11. FIG. 31 shows the position in which the developer supply container 1 is completely mounted to the developer receiving apparatus 8, and the developer receiving port 11*a*, the shutter opening 4*f* and the discharge opening 3*a*4 are in fluid communication therethrough, thus enabling supply of the developer. FIG. 32 is a timing chart of operations of each elements relating to the mounting operation of the developer supply container 1 to the developer receiving apparatus 8 as shown in FIG. 27-FIG. 31.

As shown in part (a) of FIG. 26, in the mounting operation of the developer supply container 1, the developer supply container 1 is inserted in the direction of an arrow A in the FIGURE toward the developer receiving apparatus 8. At this time, as shown in part (b) of FIG. 26, the shutter opening 4*f* of the shutter 4 and the close-contact portion 4*h* is shielded by the shielding portion 3*b*6 of the lower flange. By this, the operator is protected from contacting to the shutter opening 4*f* and/or the close-contact portion 4*h* contaminated by the developer.

In addition, as shown in part (c) of FIG. 26, in the inserting operation, a first stopper portion 4*b* provided in the upstream side, with respect to the mounting direction, of the supporting portion 4*d* of the shutter 4 abuts to an insertion guide 8*e* of the developer receiving apparatus 8, so that the supporting portion 4*d* displaces in the direction of an arrow C in the FIGURE. In addition, as shown in part (d) FIG. 26, and first engaging portion 3*b*2 of the lower flange portion 3*b* and the engaging portion 11*b* of the developer receiving portion 11 are not engaged with each other. Therefore, as shown in part (b) of FIG. 26, the developer receiving portion 11 is held in the initial position by an urging force of an urging member 12 in the direction of an arrow F. In addition, the developer receiving port 11*a* is sealed by a main assembly shutter 15, so that entering of a foreign matter or the like through the developer receiving port 11*a* and scattering of the developer through the developer receiving port 11*a* from the sub-hopper 8*c* (FIG. 4) are prevented.

When the developer supply container 1 is inserted to the developer receiving apparatus 8 in the direction of an arrow A to the position shown in part (a) of FIG. 27, the shutter 4 is engaged with the developer receiving apparatus 8. That is, similarly to the developer supply container 1 of Embodiment 1 the supporting portion 4*d* of the shutter 4 is released from the insertion guide 8*e* and displaces in the direction of an arrow D in the FIGURE by an elastic restoring force, as shown in part (c) of FIG. 27. Therefore, the first stopper portion 4*b* of the shutter 4 and the first shutter stopper portion 8*a* of the developer receiving apparatus 8 are engaged with each other. Then, in the insertion process of the developer supply container 1, the shutter 4 is held immovably relative to the developer receiving apparatus 8 by the relation between the supporting portion 4*d* and the regulation rib 3*b*3 having been described with Embodiment 1. At this time, the positional relation between the shutter 4 and the lower flange portion 3*b* remains unchanged from the position shown in FIG. 26. Therefore, as shown in part (b) of FIG. 27, the shutter opening 4*f* of the shutter 4 keeps shielded by the shielding portion 3*b*6 of the lower flange portion 3*b*, and the discharge opening 3*a*4 keeps sealed by the shutter 4.

Also in this position, as shown in part (d) of FIG. 27, the engaging portion 11*b* of the developer receiving portion 11 is not engaged with the first engaging portion 3*b*2 of the lower flange portion 3*b*. In other words, as shown in part (b) of FIG. 27, the developer receiving portion 11 is kept in the initial position, and therefore, is spaced from the developer supply container 1. Therefore, the developer receiving port 11*a* is sealed by the main assembly shutter 15. The center axes of the shutter opening 4*f* and the developer receiving port 11*a* are substantially coaxial.

Then, the developer supply container 1 is further inserted into the developer receiving apparatus 8 in the direction of an arrow A to the position shown in part (a) of FIG. 28. At this time, since the position of the shutter 4 is retained relative to the developer receiving apparatus 8 the developer supply container 1 moves relative to the shutter 4, and therefore, the close-contact portion 4*h* (FIG. 25) and the shutter opening 4*f* of the shutter 4 are exposed through the shielding portion 3*b*6. Here, at this time, the shutter 4 still seals the discharge opening 3*a*4. In addition, as shown in part (d) of FIG. 28, the engaging portion 11*b* of the developer receiving portion 11 is in the neighborhood of bottom end portion of the first engaging portion 3*b*2 of the lower flange portion 3*b*. Therefore, the developer receiving portion 11 is held at the initial position as shown in part (b) of FIG.

28, and is spaced from the developer supply container 1, and therefore, the developer receiving port 11*a* is sealed by the main assembly shutter 15.

Then, the developer supply container 1 is further inserted into the developer receiving apparatus 8 in the direction of an arrow A to the position shown in part (a) of FIG. 29. At this time, similarly to the foregoing, the position of the shutter 4 is held relative to the developer receiving apparatus 8, and therefore, as shown in part (b) of FIG. 29, the developer supply container 1 moves relative the shutter 4 in the direction of an arrow A. As shown in part (b) of FIG. 29, at this time, the shutter 4 still seals the discharge opening 3*a*4. At this time, as shown in part (d) of FIG. 29, the engaging portion 11*b* of the developer receiving portion 11 is substantially in a middle part of the first engaging portion 3*b*2 of the lower flange portion 3*b*. Thus, as shown in part (b) of FIG. 29, the developer receiving portion 11 moves in the direction of an arrow E in the FIGURE toward the exposed shutter opening 4*f* and the close-contact portion 4*h* (FIG. 25) with the mounting operation by the engagement with the first engaging portion 3*b*2. Therefore, as shown in part (b) of FIG. 29, the developer receiving port 11*a* having been sealed by the main assembly shutter 15 starts opening gradually.

Then, the developer supply container 1 is further inserted into the developer receiving apparatus 8 in the direction of an arrow A to the position shown in part (a) of FIG. 30. Then, as shown in part (d) of FIG. 30, by the direct engagement between the engaging portion 11*b* of the developer receiving portion 11 and the first engaging portion 3*b*2, the developer supply container 1 displaces to the upper end of the first engaging portion 3*b*2 in the direction of the arrow E in the FIGURE, which is a direction crossing with the mounting direction. In other words, as shown in part (b) of FIG. 30, the developer receiving portion 11 displaces in the direction of the arrow E in the FIGURE, that is, in the direction crossing with the mounting direction of the developer supply container 1, so that the main assembly seal 13 connects with the shutter 4 in the state of being closely contacted with the close-contact portion 4*h* of the shutter 4 (FIG. 25). At this time, as described hereinbefore, the misalignment prevention tapered portion 11*c* of the developer receiving portion 11 and the misalignment prevention taper engaging portion 4*g* of the shutter 4 are engaged with each other (part (c) of FIG. 21), and therefore, the developer receiving port 11*a* and the shutter opening 4*f* are brought into fluid communication with each other. In addition, by the displacement of the developer receiving portion 11 in the direction of the arrow E, the main assembly shutter 15 is further spaced from the developer receiving port 11*a*, and therefore, the developer receiving port 11*a* is completely unsealed. Here, also at this time, the shutter 4 still seals the discharge opening 3*a*4.

In this embodiment, the start timing of the displacement of the developer receiving portion 11 is after the shutter opening 4*f* of the shutter 4 and the close-contact portion 4*h* are exposed assuredly, but this is not inevitable. For example, it may be before the completion of the exposure, if the shutter opening 4*f* and the close-contact portion 4*h* are completely uncovered by the shielding portion 3*b*6 by the time the developer receiving portion 11 reaches the neighborhood of the position of connecting to the shutter 4, that is, the engaging portion 11*b* of the developer receiving portion 11 comes to the neighborhood of the upper end of the first engaging portion 3*b*2. However, in order to connect the developer receiving portion 11 and the shutter 4 with each other assuredly, it is desired that the developer receiving portion 11 is displaced as described above after the shutter opening 4*f* and the close-contact portion 4*h* of the shutter 4 are uncovered by the shielding portion 3*b*6, as in this embodiment.

Subsequently, as shown in part (a) of FIG. 31, the developer supply container 1 is further inserted in the direction of the arrow A into the developer receiving apparatus 8. Then, as shown in part (c) of FIG. 31, similarly to the foregoing, the developer supply container 1 moves relative to the shutter 4 in the direction of the arrow A and reaches a supply position.

At this time, as shown in part (d) of FIG. 31, the engaging portion 11*b* of the developer receiving portion 11 displaces relative to the lower flange portion 3*b* to the downstream end of the second engaging portion 3*b*4 with respect to the mounting direction, and the position of the developer receiving portion 11 is kept at the position wherein it is connected with the shutter 4. Further, as shown in part (b) of FIG. 31, the shutter 4 unseals the discharge opening 3*a*4. In other words, the discharge opening 3*a*4, the shutter opening 4*f* and the developer receiving port 11*a* are in fluid communication with each other. In addition, as shown in part (a) of FIG. 31, a drive receiving portion 2*d* is engaged with a driving gear 9 so that the developer supply container 1 is capable of receiving a drive from the developer receiving apparatus 8. A detecting mechanism (unshown) provided in the developer receiving apparatus 8 detects that the developer supply container 1 is in the predetermined position (position) capable of supplying. When the driving gear 9 rotates in the direction of an arrow Q in the FIGURE, the container body 2 rotates in the direction of an arrow R, and the developer it supplied into the sub-hopper 8*c* by the operation of the above-described pump portion 5.

As described above, the main assembly seal 13 of the developer receiving portion 11 is connected with the close-contact portion 4*h* of the shutter 4 in the state that the position of the developer receiving portion 11 with respect to the mounting direction of the developer supply container 1. In addition, by the developer supply container 1 moves relative to the shutter 4 thereafter, the discharge opening 3*a*4, the shutter opening 4*f* and the developer receiving port 11*a* a brought into fluid communication with each other. Therefore, as compared with Embodiment 1, the positional relation, with respect to the mounting direction of the developer supply container 1 between the main assembly seal 13 forming the developer receiving port 11*a* and the shutter 4 is maintained, and therefore, the main assembly seal 13 does not slide on the shutter 4. In other words, in the mounting operation of the developer supply container 1 to the developer receiving apparatus 8, no direct sliding dragging action in the mounting direction occurs between the developer receiving portion 11 and the developer supply container 1 from the start of connection therebetween to the developer suppliable state. Therefore, in addition to the advantageous effects of the above-described embodiment, the contamination of the main assembly seal 13 of the developer receiving portion 11 with the developer which may be caused by the dragging of the developer supply container 1 can be prevented. In addition, wearing of main assembly seal 13 of the developer receiving portion 11 attributable to the dragging can be prevented. Therefore, a reduction of the durability, due to the wearing, of the main assembly seal 13 of the developer receiving portion 11 can be suppressed, and the reduction of the sealing property of the main assembly seal 13 due to the wearing can be suppressed.

(Dismounting Operation of Developer Supply Container)

Referring to FIG. 26 to FIG. 31 and FIG. 32, the operation of removing the developer supply container 1 from the developer receiving apparatus 8 will be described. FIG. 32 is a timing chart of operations of each elements relating to the dismounting operation of the developer supply container 1 from the developer receiving apparatus 8 as shown in FIG. 27-FIG. 31. Similarly to the Embodiment 1, the removing operation of developer supply container 1 (dismounting operation) is a reciprocal of the mounting operation.

As described hereinbefore, in the position of part (a) of FIG. 31, when the amount of the developer in the developer supply container 1 decreases, the operator dismounts the developer supply container 1 in the direction of an arrow B in the FIGURE. The position of the shutter 4 relative to the developer receiving apparatus 8 is maintained by the relation between the supporting portion 4*d* and the regulation rib 3*b*3, as described above. Therefore, the developer supply container 1 moves relative to the shutter 4. When the developer supply container 1 is moved to the position shown in part (a) of FIG. 30, the discharge opening 3*a*4 is sealed by the shutter 4, as shown in part (b) of FIG. 30. That is, in such a position, the developer is not supplied from the developer supply container 1. In addition, by the discharge opening 3*a*4 sealed, the developer does not scatter through the discharge opening 3*a*4 from the developer supply container 1 due to the vibration or the like resulting from the dismounting operation. The developer receiving portion 11 keeps connected with the shutter 4, and therefore, the developer receiving port 11*a* and the shutter are still in communication with each other.

Then, when the developer supply container 1 is moved to the position shown in part (a) of FIG. 28, the engaging portion 11*b* of the developer receiving portion 11 displaces in the direction of the arrow F along the first engaging portion 3*b*2 by the urging force in the direction of the arrow F of the urging member 12, as shown in part (d) of FIG. 28. By this, as shown in part (b) of FIG. 28, the shutter 4 and the developer receiving portion 11 are spaced from each other. Therefore, in the process of reaching this position, the developer receiving portion 11 displaces in the direction of the arrow F (downwardly). Therefore, even if the developer is in the state of being packed in the neighborhood of the developer receiving port 11*a*, the developer is accommodated in the sub-hopper 8*c* by the vibration or the like resulting from the dismounting operation. By this, the developer is prevented from scattering to the outside. Thereafter, as shown in part (b) of FIG. 28, the developer receiving port 11*a* is sealed by the main assembly shutter 15.

Then when the developer supply container 1 is removed to the position shown in part (a) of FIG. 27, the shutter opening 4*f* is shielded by the shielding portion 3*b*6 of the lower flange portion 3*b*. More particularly, the neighborhood of the shutter opening 4*f* and the close-contact portion 4*h* which is the only contaminated part is shielded by the shielding portion 3*b*6. Therefore, the neighborhood of the shutter opening 4*f* and the close-contact portion 4*h* are not seen by the operator handling the developer supply container 1. In addition, the operator is protected from touching inadvertently the neighborhood of the shutter opening 4*f* and the close-contact portion 4*h* contaminated with the developer. Furthermore, the close-contact portion 4*h* of the shutter 4 is stepped lower than the sliding surface 4*i*. Therefore, when the shutter opening 4*f* and the close-contact portion 4*h* are shielded by the shielding portion 3*b*6, a downstream side end surface X (part (b) of FIG. 20) of the shielding portion 3*b*6 with respect to the dismounting direction of the developer supply container 1 is not contaminated by the developer deposited on the shutter opening 4*f* and the close-contact portion 4*h*.

Moreover, with the dismounting operation of the above-described developer supply container 1, the space operation of the developer receiving portion 11 by the engaging portions 3*b*2, 3*b*4 is completed, and thereafter, the supporting portion 4*d* of the shutter 4 is disengaged from the regulation rib 3*b*3 so as to become elastically deformable. Therefore, the shutter 4 is released from the developer receiving apparatus 8, so that it becomes displaceable (movable) together with the developer supply container 1.

When the developer supply container 1 is moved to the position of part (a) of FIG. 26, supporting portion 4*d* of shutter 4 contacts to the insertion guide 8*e* of the developer receiving apparatus 8 by which it is displaced in the direction of the arrow C in the FIGURE, as shown in part (c) of FIG. 26. By this, the second stopper portion 4*c* of the shutter 4 is disengaged from the second shutter stopper portion 8*b* of the developer receiving apparatus 8, so that the lower flange portion 3*b* of the developer supply container 1 and the shutter 4 displace integrally in the direction of the arrow B. By further moving the developer supply container 1 away from the developer receiving apparatus 8 in the direction of the arrow B, by which the developer supply container 1 is completely taken out of the developer receiving apparatus 8. The shutter 4 of the developer supply container 1 thus taken out has returned to the initial position, and therefore, even if the developer receiving apparatus 8 is remounted, no problem arises. As described hereinbefore, the shutter opening 4*f* and the close-contact portion 4*h* of shutter 4 are shielded by the shielding portion 3*b*6, and therefore, the portion contaminated with the developer is not seen by the operator handling the developer supply container 1. Therefore, by the only portion of the developer supply container 1 that is contaminated with the developer is shielded, and therefore, the taken-out developer supply container 1 looks as if it is an unused developer supply container 1.

FIG. 32 shows flow of the mounting operation of the developer supply container 1 to the developer receiving apparatus 8 (FIGS. 26-31) and the flow of the dismounting operation of the developer supply container 1 from the developer receiving apparatus 8. When the developer supply container 1 is mounted to the developer receiving apparatus 8, the engaging portion 11*b* of the developer receiving portion 11 is engaged with the first engaging portion 3*b*2 of the developer supply container 1, by which the developer receiving port displaces toward the developer supply container. On the other hand, when the image material supply container 1 is dismounted from the developer receiving apparatus 8, the engaging portion 11*b* of the developer receiving portion 11 engages with the first engaging portion 3*b*2 of the developer supply container 1, by which the developer receiving port displaces away from the developer supply container.

As described in the foregoing, according to this embodiment of the developer supply container 1, the following advantageous effects can be provided in addition to the same advantageous effects of Embodiment 1.

The developer supply container 1 of this embodiment the developer receiving portion 11 and the developer supply container 1 are connected with each other through the shutter opening 4*f*. And, by the connection, the misalignment prevention of the developer receiving portion 11 and the misalignment prevention taper engaging portion 4*g* of the shutter 4 are engaged with each other. By the aligning function of such engagement, the discharge opening 3*a*4 is assuredly unsealed, and therefore, the discharge amount of the developer is stabilized.

In the case of Embodiment 1, the discharge opening 3*a*4 formed in the part of the opening seal 3*a*5 moves on the shutter 4 the become in fluid communication with the developer receiving port 11*a*. In this case, the developer might enter into a seam existing between the developer receiving portion 11 and the shutter 4 in the process to completely connect with the developer receiving port 11*a* after the discharge opening 3*a*4 is uncovered by the shutter 4 with the result that a small amount of the developer scatters to the developer receiving apparatus 8. However, according to this example, the shutter opening 4*f* and the discharge opening 3*a*4 are brought into communication with each other after completion of the connection (communication) between the developer receiving port 11*a* of the developer receiving portion 11 and the shutter opening 4*f* of the shutter 4. For this reason, there is no seam between the developer receiving portion 11 and the shutter 4. In addition, positional relation between the shutter and the developer receiving port 11*a* does not change. Therefore, the developer contamination by the developer entered into the gap between the developer receiving portion 11 and the shutter 4 and the developer contamination caused by the dragging of the main assembly seal 13 on the surface of the opening seal 3*a*5 can be avoided. Therefore, this example is preferable to Embodiment 1 from the standpoint of the reduction of the contamination with the developer. In addition, by the provision of the shielding portion 3*b*6, the shutter opening 4*f* and the close-contact portion 4*h* that are the only portion contaminated by the developer are shielded, the developer contamination dye portion is not exposed to the outside, similarly to the Embodiment 1 in which the developer contamination dye portion of the opening seal 3*a*5 is shielded by the shutter 4. Therefore, similarly to Embodiment 1, the portion contaminated with the developer is not seen from the outside by the operator.

Furthermore, as described in the foregoing, with respect to Embodiment 1, the connecting side (developer receiving portion 11) and the connected side (developer supply container 1) are directly engaged to establish the connection relation therebetween. More specifically, the timing of the connection between the developer receiving portion 11 and the developer supply container 1 can be controlled easily by the positional relation, with respect to mounting direction, among the engaging portion 11*b* of the developer receiving portion 11, the first engaging portion 3*b*2 and the second engaging portion 3*b*4 of the lower flange portion 3*b* of the developer supply container 1, and the shutter opening 4*f* of the shutter 4. In other words, the timing may deviate within the tolerances of the three elements, and therefore, very high accuracy control can be performed. Therefore, the connecting operation of the developer receiving portion 11 to the developer supply container 1 and the spacing operation from the developer supply container 1 can be carried out assuredly, with the mounting operation and the dismounting operation of the developer supply container 1.

Regarding the displacement amount of the developer receiving portion 11 in the direction crossing with the mounting direction of the developer supply container 1 can be controlled by the positions of the engaging portion 11*b* of the developer receiving portion 11 and the second engaging portion 3*b*4 of the lower flange portion 3*b*. Similarly to the foregoing, the deviation of the displacement amount may deviate within the tolerances of the two elements, and therefore, very high accuracy control can be performed. Therefore, for example, the close-contact state between the main assembly seal 13 and the shutter 4 can be controlled easily, so that the developer discharged from the opening 4*f* can be fed into the developer receiving port 11*a* assuredly.

Embodiment 3

Figure 33:
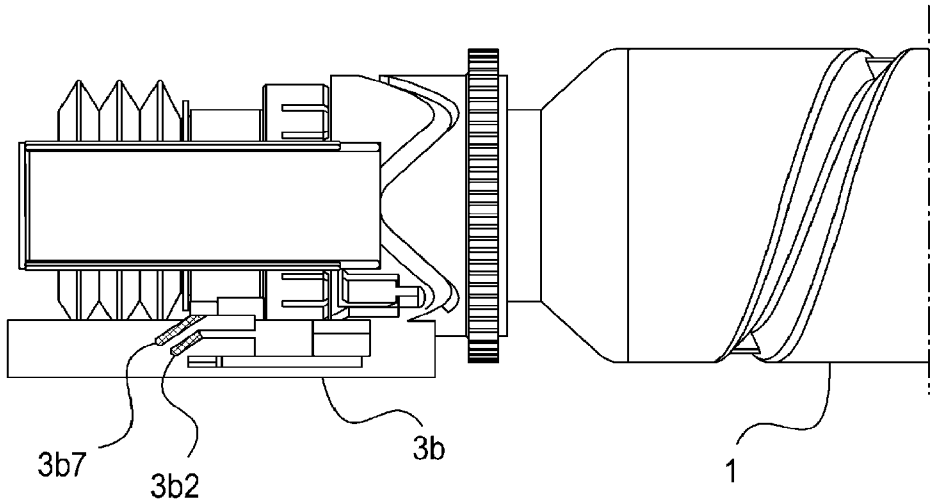
In FIG. 33, (a) is a partial enlarged view of a developer supply container according to Embodiment 3, (b) is a partial enlarged sectional view of the developer supply container and a developer receiving apparatus according to Embodiment 3.
Figure 33:
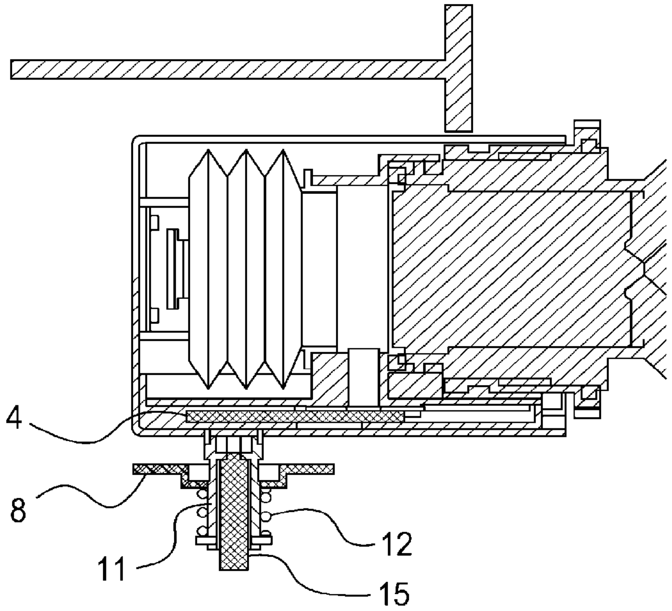
Figure 34:
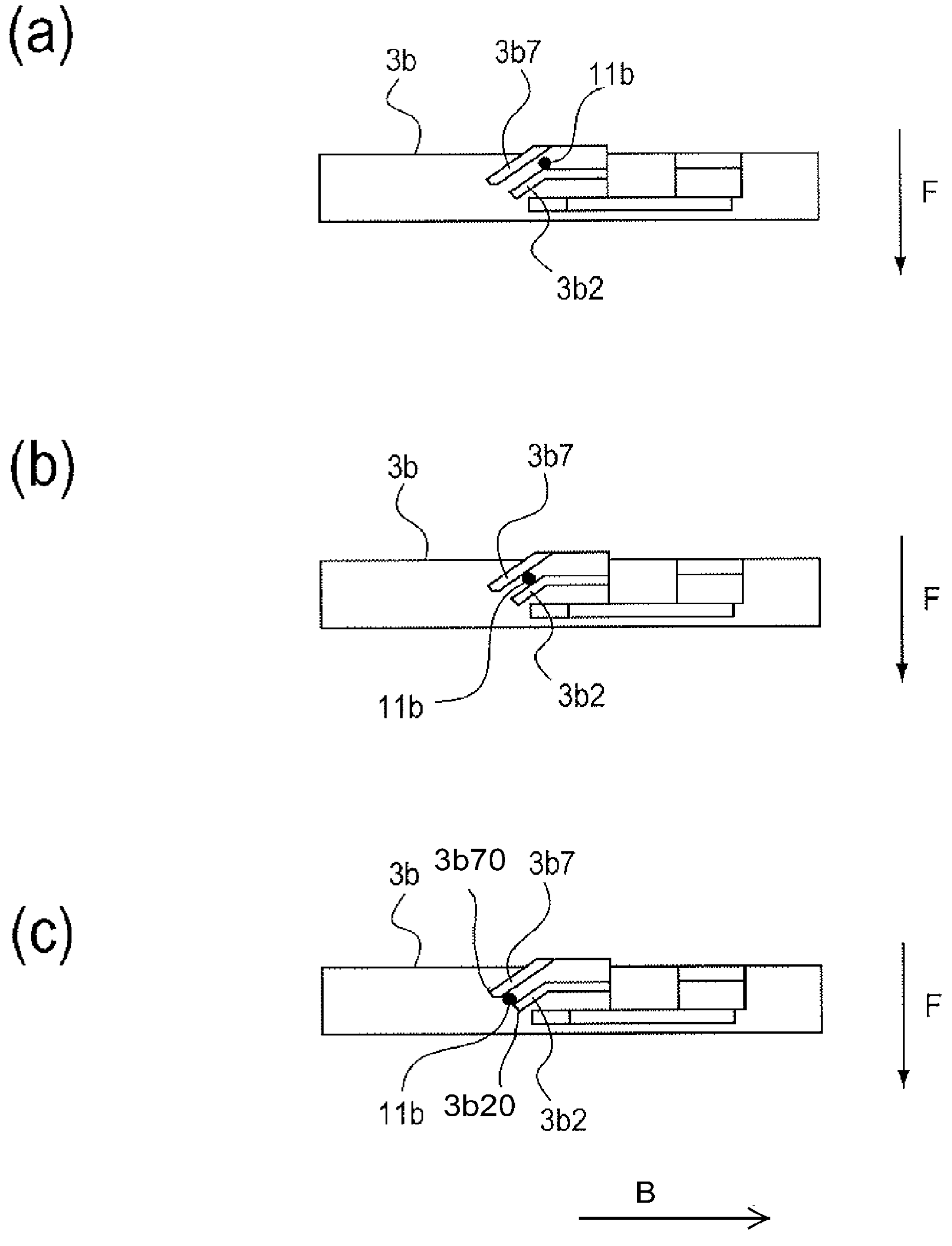
FIG. 34 is an operation view of the developer receiving portion relative to the lower flange portion in a dismounting operation of the developer supply container in Embodiment 3.

Referring to FIGS. 33, 34, a structure of the Embodiment 3 will be described Part (a) of FIG. 33 is a partial enlarged view around a first engaging portion 3*b*2 of a developer supply container 1, and part (b) of FIG. 33 is a partial enlarged view of a developer receiving apparatus 8. Part (a)-part (c) of FIG. 34 are schematic view illustrating the movement of a developer receiving portion 11 in a dismounting operation. The position of part (a) of FIG. 34 corresponding to the position of FIGS. 15, 30, the position of part (c) of FIG. 34 corresponds to the position of FIGS. 13 and 28, the position of part (b) of FIG. 34 is therebetween and corresponds to the position of FIGS. 14, 29.

As shown in part (a) of FIG. 33, in this example, the structure of the first engaging portion 3*b*2 is partly different from those of Embodiment 1 and Embodiment 2. The other structures are substantially similar to Embodiment 1 and/or Embodiment 2. In this example, the same reference numerals as in the foregoing Embodiment 1 are assigned to the elements having the corresponding functions in this embodiment, and the detailed description thereof is omitted.

As shown in part (a) of FIG. 33, above engaging portions 3*b*2, 3*b*4 for moving the developer receiving portion 11 upwardly, an engaging portion 3*b*7 for moving the developer receiving portion 11 downwardly is provided. Here, the engaging portion comprising the first engaging portion 3*b*2 and the second engaging portion 3*b*4 for moving the developer receiving portion 11 upwardly is called a lower engaging portion. On the other hand, the engaging portion 3*b*7 provided in this embodiment to move the developer receiving portion 11 downwardly is called an upper engaging portion.

The engaging relation between the developer receiving portion 11 and the lower engaging portion comprising the first engaging portion 3*b*2 and the second engaging portion 3*b*4 are similar to the above-described embodiments, and therefore, the description thereof is omitted. The engaging relation between the developer receiving portion 11 and the upper engaging portion comprising the engaging portion 3*b*7 will be described.

If, for example, the developer supply container 1 is extremely quickly dismounted (quick dismounting, not practical though), in the developer supply container 1 of Embodiment 1 or Embodiment 2, the developer receiving portion 11 might not be guided by the first engaging portion 3*b*2 and would be lowered at delayed timing, with the result of a slight contamination with the developer to a practically no problem extent on the lower surface of the developer supply container 1, the developer receiving portion 11 and/or the main assembly seal 13. This was confirmed.

In view of this, the developer supply container 1 of Embodiment 3 is improved in this respect by providing it with the upper engaging portion 3*b*7. When the developer supply container 1 is dismounted, the developer receiving portion 11 reaches a region contacting the first engaging portion. Even if the developer supply container 1 is taken out extremely quickly, an engaging portion 11*b* of the developer receiving portion 11 is engaged with the upper engaging portion 3*b*7 and is guided thereby, with the dismounting operation of the developer supply container 1, so that the developer receiving portion 11 is positively moved in the direction of an arrow F in the FIGURE. The upper engaging portion 3*b*7 extends to an upstream side beyond the first engaging portion 3*b*2 in the direction (arrow B) in which the developer supply container 1 is taken out. More particularly, a free end portion 3*b*70 of the upper engaging portion 3*b*7 is upstream of a free end portion 3*b*20 of the first engaging portion 3*b*2 with respect to the direction (arrow B) in which the developer supply container 1 is taken out.

The start timing of the downward movement of the developer receiving portion 11 in the dismounting of the developer supply container 1 is after the sealing of the discharge opening 3*a*4 by the shutter 4 similarly to Embodiment 2. The movement start timing is controlled by the position of the upper engaging portion 3*b*7 shown in part (a) of FIG. 33. If the developer receiving portion 11 is spaced from the developer supply container 1 before the discharge opening 3*a*4 is sealed by the shutter 4, the developer may scatter in the developer receiving apparatus 8 from the discharge opening 3*a*4 by vibration or the like during the dismounting. Therefore, it is preferable to space the developer receiving portion 11 after the discharge opening 3*a*4 is sealed assuredly by the shutter 4.

Using the developer supply container 1 of this embodiment, the developer receiving portion 11 can be spaced assuredly from the discharge opening 3*a*4 in the dismounting operation of the developer supply container 1. In addition, with the structure of this example, the developer receiving portion 11 can be moved assuredly by the upper engaging portion 3*b*7 without using the urging member 12 for moving the developer receiving portion 11 downwardly. Therefore, as described above, even in the case of the quick dismounting of the developer supply container 1, the upper engaging portion 3*b*7 assuredly guides the developer receiving portion 11 so that the downward movement can be effected at the predetermined timing. Therefore, the contamination of the developer supply container 1 with the developer can be prevented even in the quick dismounting.

With the structures of Embodiment 1 and Embodiment 2, the developer receiving portion 11 is moved against the urging force of the urging member 12 in the mounting of the developer supply container 1. Therefore, a manipulating force required to the operator in the mounting increases correspondingly, and on the contrary, in the dismounting, it can be dismounted smoothly with the aid of the urging force of the urging member 12. Using this example, as shown in part (b) of FIG. 3, it may be unnecessary to provide the developer receiving apparatus 8 with a member for urging the developer receiving portion 11 downwardly. In this case, the urging member 12 is not provided, and therefore, the required manipulating force is the same irrespective of whether the developer supply container 1 is mounted or dismounted relative to the developer receiving apparatus 8.

In addition, irrespective of the provision of the urging member 12, the developer receiving portion 11 of the developer receiving apparatus 8 can be connected and spaced in the direction crossing with the mounting and dismounting directions with the mounting and dismounting operation of the developer supply container 1. In other words, the contamination, with the developer, of the downstream side end surface Y (part (b) of FIG. 5) with respect to the mounting direction of the developer supply container 1, as compared with the case in which the developer supply container 1 is connected with and spaced from the developer receiving portion 11 in the direction of mounting and dismounting directions of the developer supply container 1. In addition, the developer contamination caused by the main assembly seal 13 dragging on the lower surface of the lower flange portion 3*b* can be prevented.

From the standpoint of suppression of the maximum value of the manipulating force in the mounting and dismounting of the developer supply container 1 of this example, the omission of the urging member 12 is desired. On the other hand, from the standpoint of reduction of the manipulating force in the dismounting or from the standpoint of assuring the initial position of the developer receiving portion 11, the developer receiving apparatus 8 is desirably provided with the urging member 12. A proper selection therebetween can be made depending on the specifications of the main assembly and/or the developer supply container.

Comparison Example

Figure 35:
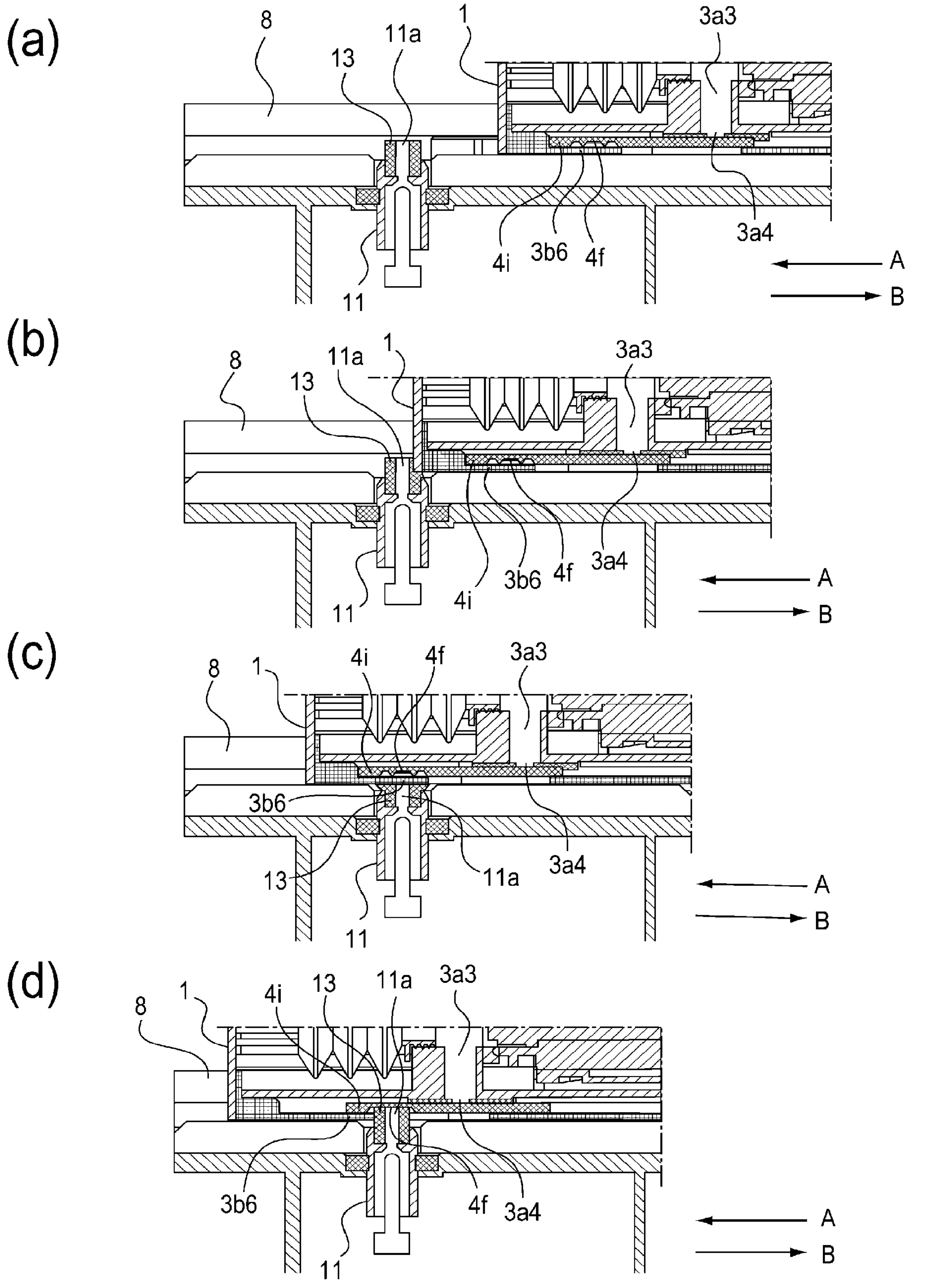
FIG. 35 illustrates a developer supply container of a comparison example.

Referring to FIG. 35, a comparison example will be described. Part (a) of FIG. 35 is a sectional view of a developer supply container 1 and a developer receiving apparatus 8 prior to the mounting, parts (b) and (c) of FIG. 35 are sectional views during the process of mounting the developer supply container 1 to the developer receiving apparatus 8, part (d) of FIG. 35 is a sectional view thereof after the developer supply container 1 is connected to the developer receiving apparatus 8. In the description of this comparison example, the same reference numerals as in the foregoing embodiments are assigned to the elements having the corresponding functions in this embodiment, and the detailed description thereof is omitted for simplicity.

In the comparison example, the developer receiving portion 11 is fixed to the developer receiving apparatus 8 and is immovable in the upward or downward direction, as contrasted to Embodiment 1 or Embodiment 2. In other words, the developer receiving portion 11 and the developer supply container 1 are connected and spaced relative to each other in the mounting and dismounting direction of the developer supply container 1. Therefore, in order to prevent an interference of the developer receiving portion 11 with the shielding portion 3*b*6 provided in the downstream side of the lower flange portion 3*b* with respect to the mounting direction in Embodiment 2, for example, an upper end of the developer receiving portion 11 is lower than the shielding portion 3*b*6 as shown in part (a) of FIG. 35. In addition, to provide a compression state equivalent to that of Embodiment 2 between the shutter 4 and the main assembly seal 13, the main assembly seal 13 of the comparison example is longer than that of the main assembly seal 13 of Embodiment 2 in the vertical direction. As described above, the main assembly seal 13 is made of an elastic member or foam member or the like, and therefore, even if the interference occurs between the developer supply container 1 and the developer supply container 1 in the mounting and dismounting operations, the interference does not prevent the mounting and dismounting operations of the developer supply container 1 because of the elastic deformation as shown in part (b) of FIG. 35 and part (c) of FIG. 35.

Experiments have been carried out about a discharge amount and an operationality as well as the developer contamination using the developer supply container 1 of the comparison example and the developer supply containers 1 of Embodiment 1-Embodiment 3. In the experiments, the developer supply container 1 is filled with a predetermined amount of a predetermined developer, and the developer supply container 1 is once mounted to the developer receiving apparatus 8. Thereafter, the developer supplying operation is carried out to the extent of one tenth of the filled amount, and the discharge amount during the supplying operation is measured. Then, the developer supply container 1 is taken out of the developer receiving apparatus 8, and the contamination of the developer supply container 1 and the developer receiving apparatus 8 with the developer is observed. Further, the operationality such as the manipulating force and the operation feeling during the mounting and dismounting operations of the developer supply container 1 are checked. In the experiments, the developer supply container 1 of Embodiment 3 was based on the developer supply container 1 of Embodiment 2. The experiments were carried out five times for each case for the purpose of reliability of the evaluations. Table 1 shows the results of the experiments and evaluations.

TABLE 1

| Structures | Developer contamination prevention: Developer supply device side | Developer contamination prevention: Developer supply container sice | Discharge performance | Operativity |
|---|---|---|---|---|
| Comp. example | N | N | F | G |
| Emb. 1 | F | G | F | G |
| Emb. 2 | G | G | G | G |
| Emb. 3 | E | E | G | G |

Developer contamination prevention:
E: Hardly any contamination even in extreme condition use;
G: Hardly any contamination in normal condition use;
F: Slight contamination (no problem practically) in normal use; and
N: Contaminated (problematic practically) in normal use.
Discharge performance:
G: Sufficient discharge amount per unit time;
F: 70% (based on G case) (no problem practically); and
N: Less than 50% (based on G case) (problematic pracctically).
Operactivity:
G: Required force is less than 20N with good operation feeling;
F: Required force is 20N or larger with good operation feeling; and
N: Required force is 20N or larger with no good operation feeling.

As to the level of the developer contamination of the developer supply container 1 or the developer receiving apparatus 8 taken out of the developer receiving apparatus 8 after the supplying operation, the developer deposited on the main assembly seal 13 is transferred onto the lower surface of the lower flange portion 3*b* and/or the sliding surface 4*i* (FIG. 35) of the shutter 4, in the developer supply container 1 of the comparison example. In addition, the developer is deposited on the end surface Y (part (b) of FIG. 5) of the developer supply container 1. Therefore, in this state, if the operator touches inadvertently the developer deposited portion, the operator's finger will be contaminated with the developer. In addition, a large amount of the developer is scattered on the developer receiving apparatus 8. With the structure of the comparison example, when the developer supply container 1 is mounted in the mounting direction (arrow A) in the FIGURE) from the position shown in part (a) of FIG. 35, the upper surface of the main assembly seal 13 of the developer receiving portion 11 first contacts the end surface Y the part (b) of FIG. 5) in the downstream side, with respect to the mounting direction, of the developer supply container 1. Thereafter, as shown in part (c) of FIG. 35, the developer supply container 1 displaces in the direction of an arrow A, in the state that the upper surface of the main assembly seal 13 of the developer receiving portion 11 is in contact with the lower surface of the lower flange portion 3*b* and the sliding surface 4*i* of the shutter 4. Therefore, the developer contamination by the dragging remains on the contact portions, and the developer contamination is exposed in the outside of the developer supply container 1 and scatters with the result of contamination of the developer receiving apparatus 8.

It has been confirmed that the levels of the developer contamination in the developer supply containers 1 of Embodiment 1-Embodiment 3 are much improved over that in the comparison example. In Embodiment 1, by the mounting operation of the developer supply container 1, the connecting portion 3*a*6 of the opening seal 3*a*5 having been shielded by the shutter 4 is exposed, and the main assembly seal 13 of the developer receiving portion 11 is connected to the exposed portion in the direction crossing with the mounting direction. With the structure of Embodiment 2 and Embodiment 3, the shutter opening 4*f* and the close-contact portion 4*h* are uncovered by the shielding portion 3*b*6, and by the time immediately before the alignment between the discharge opening 3*a*4 and the shutter opening 4*f*, the developer receiving portion 11 displaces in the (upwardly in the embodiments) direction crossing with the mounting direction to connect with the shutter 4. Therefore, the developer contamination of the downstream end surface Y (part (b) of FIG. 5) with respect to the mounting direction of the developer supply container 1 can be prevented. In addition, in the developer supply container 1 of Embodiment 1, the connecting portion 3*a*6 formed on the opening seal 3*a*5 which is contaminated by the developer to be connected by the main assembly seal 13 of the developer receiving portion 11 is shielded in the shutter 4, with the dismounting operation of the developer supply container 1. Therefore, the connecting portion 3*a*6 of the opening seal 3*a*5 of the taken-out developer supply container 1 is not seen from the outside. In addition, the scattering of the developer deposited on the connecting portion 3*a*6 of the opening seal 3*a*5 of the taken-out developer supply container 1 can prevented. Similarly, in the developer supply container 1 of Embodiment 2 or Embodiment 3, the close-contact portion 4*h* of the shutter 4 and the shutter opening 4*f* contaminated with the developer in the connection of the developer receiving portion 11 is shielded in the shielding portion 3*b*6 with the dismounting operation of the developer supply container 1. Therefore, close-contact portion 4*h* of the shutter 4 and the shutter opening 4*f* contaminated with the developer is not seen from the outside. In addition, the scattering of the developer deposited on the close-contact portion 4*h* and the shutter of the shutter 4 can be prevented.

The levels of the contaminations with the developer are checked in the case of the quick dismounting of the developer supply container 1. With the structures of Embodiment 1 and Embodiment 2, a slight level of developer contamination is seen, and with the structure of Embodiment 3, no developer contamination is seen on the developer supply container 1 or the developer receiving portion 11. This is because even if the quick dismounting of the developer supply container 1 of Embodiment 3 is carried out, the developer receiving portion 11 is assuredly guiding downwardly at the predetermined timing by the upper engaging portion 3*b*7, and therefore, no deviation of the timing of the movement of the developer receiving portion 11 occurs. It has been confirmed that the structure of Embodiment 3 is better than the structures of Embodiment 1 and Embodiment 2 with respect to the developer contamination level in the quick dismounting.

Discharging performance during the supplying operation of the developer supply containers 1 is checked. For this checking, the discharge amount of the developer discharged from the developer supply container 1 per unit time is measured, and the repeatability is checked. The results show that in Embodiment 2 and Embodiment 3, the discharge amount from the developer supply container 1 per unit time is sufficient the and the repeatability is excellent. With Embodiment 1 and the comparison example, the discharge amount from the developer supply container 1 per unit time are sufficient is an occasion and is 70% in another occasion. When the developer supply container 1 is observed during the supplying operation, the developer supply containers 1 sometimes slightly offset in the dismounting direction from the mounting position by the vibration during the operation. The developer supply container 1 of Embodiment 1 is mounted and demounted relative to the developer receiving apparatus 8*a* plurality of times, and the connection state is checked each time, and in one case out of five, the positions of the discharge opening 3*a*4 of the developer supply container 1 and the developer receiving port 11*a* are offset with the result that the opening communication area is relatively small. It is considered that the discharge amount from the developer supply container 1 per unit time is relatively small.

From the phenomenon—and the structure, it is understood that in the developer supply containers 1 of Embodiment 2 and Embodiment 3, by the aligning function of the engaging effect between the misalignment prevention tapered portion 11*c* and the misalignment prevention taper engaging portion 4*g* the shutter opening 4*f* and the developer receiving port 11*a* communicate with each other without the misalignment, even if the position of the developer receiving apparatus 8 is slightly offset. Therefore, it is considered that the discharging performance (discharge amount per unit time) is stabilized.

The operationalities are checked. A mounting force for the developer supply container 1 to the developer receiving apparatus 8 is slightly higher in Embodiment 1, Embodiment 2 and Embodiment 3 than the comparison example. This is because, as described above, the developer receiving portion 11 is displaced upwardly against the urging force of the urging member 12 urging the developer receiving portion 11 downwardly. The manipulating force in Embodiment 1 to Embodiment 3 is approx. 8N-15N, which is not a problem. With the structure of Embodiment 3, the mounting force was checked with the structure not having the urging member 12. At this time, the manipulating force in the mounting operation is substantially the same as that of the comparison example and was approx. 5N-10N. The demounting force in the dismounting operation of the developer supply container 1 was measured. The results show that the demounting force is smaller than the mounting force in the case of the developer supply containers 1 of Embodiment 1, Embodiment 2 and Embodiment 3 and is approx. 5N-9N. As described above, this is because the developer receiving portion 11 moves downwardly by the assisting of the urging force of the urging member 12. Similarly to the foregoing, when the urging member 12 is not provided in Embodiment 3, there is no significant difference between the mounting force and the demounting force and is approx. 6N-10N.

In any of the developer supply containers 1, the operation feeling has no problem.

By the checking described in the foregoing, it has been confirmed that the developer supply container 1 of this embodiment is overwhelmingly better than the developer supply container 1 of the comparison example from the standpoint of prevention of the developer contamination.

In addition, the developer supply container 1 of these embodiments have solved to various problems with conventional developer supply container.

In the developer supply container of this embodiment, the mechanism for displacing the developer receiving portion 11 and connecting it with the developer supply container 1 can be simplified, as compared with the conventional art. More particularly, a driving source or a drive transmission mechanism for moving the entirety of the developing device upwardly is not required, and therefore, the structure of the image forming apparatus side is not complicated, and increase in cost due to the increase of the number of parts can be avoided. In the conventional art, in order to avoid the interference with the developing device when the entirety of the developing device moves up and down, a large space is required, but such upsizing of the image forming apparatus can be prevented in the present invention.

The connection between the developer supply container 1 and the developer receiving apparatus 8 can be properly established using the mounting operation of the developer supply container 1 with the minimum contamination with the developer. Similarly, utilizing the dismounting operation of the developer supply container 1, the spacing and resealing between the developer supply container 1 and the developer receiving apparatus 8 can be carried out with minimum contamination with the developer.

In addition, with the developer supply container 1 of this embodiment, the timing of displacing the developer receiving portion 11 in the direction crossing with the mounting and demounting direction by the developer supply container 1 in the mounting and dismounting operation of the developer supply container 1 can be controlled assuredly by the engaging portion comprising the first engaging portion 3*b*2 and the second engaging portion 3*b*4. In other words, the developer supply container 1 and the developer receiving portion 11 can be connected and spaced relative to each other without relying on the operation of the operator.

Embodiment 4

Referring to the drawings, Embodiment 4 will be described. In Embodiment 4, the structure of the developer receiving apparatus and the developer supply container are partly different from those of Embodiment 1 and Embodiment 2. The other structures are substantially the same as with Embodiment 1 or Embodiment 2. In the description of this embodiment, the same reference numerals as in Embodiments 1 and 2 are assigned to the elements having the corresponding functions in this embodiment, and the detailed description thereof is omitted for simplicity.

(Image Forming Apparatus)

Figure 36:
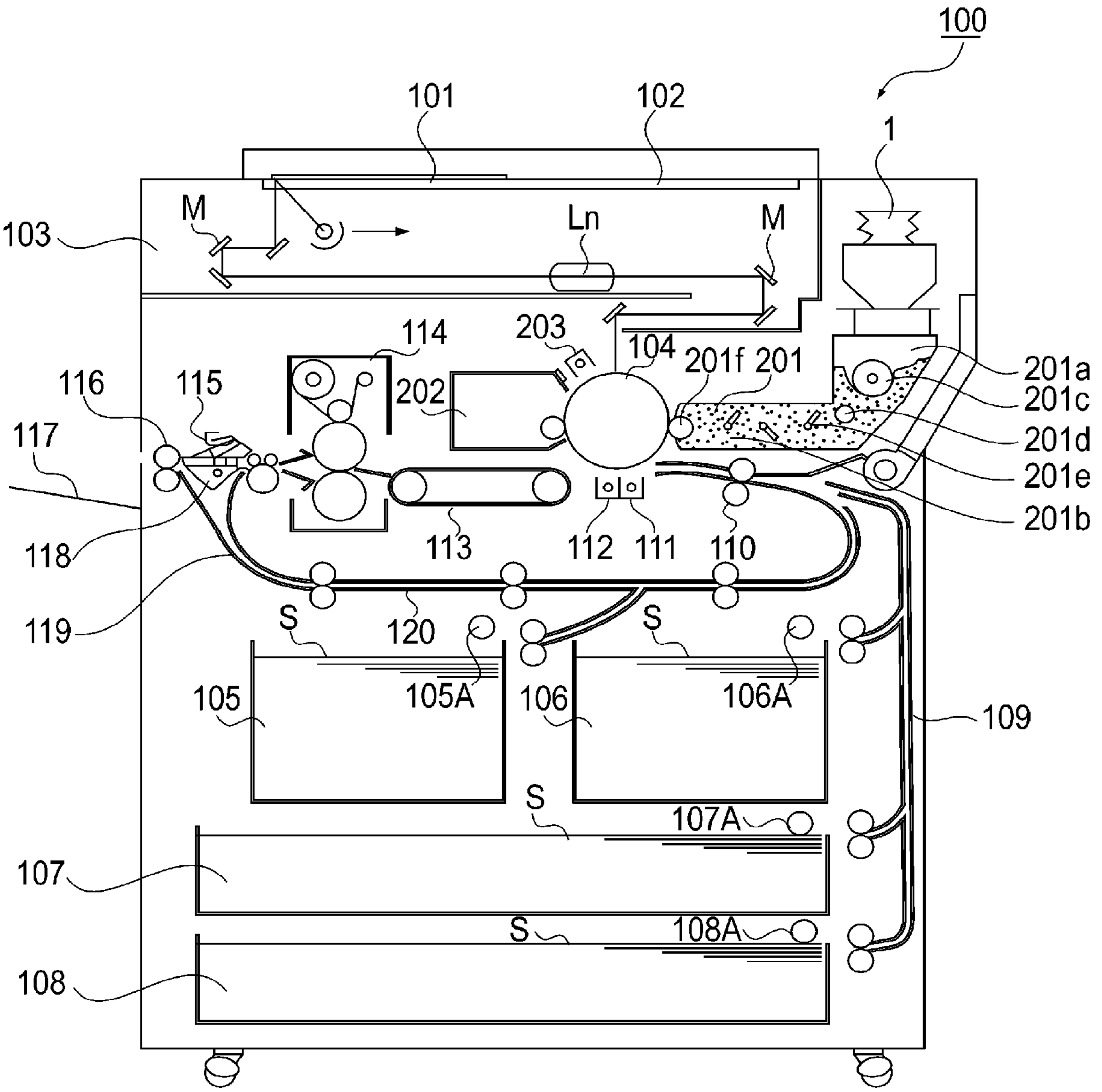
FIG. 36 is a sectional view of an example of an image forming apparatus.
Figure 37:
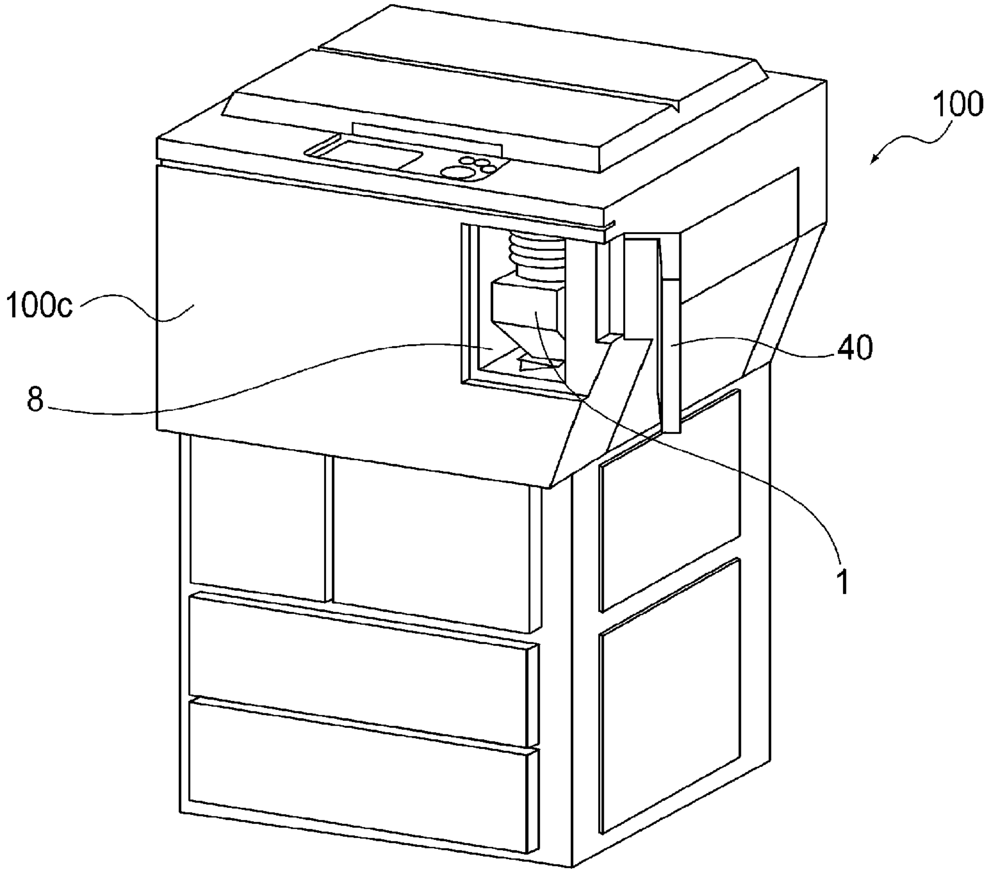
FIG. 37 is a perspective view of the image forming apparatus of FIG. 36.

FIGS. 36 and 37 illustrate an example of the image forming apparatus comprising a developer receiving apparatus to which a developer supply container (so-called toner cartridge) is detachably mounted. The structure of the image forming apparatus is substantially the same as with Embodiment 1 or Embodiment 2 except for a structure of a part of the developer supply container and a part of the developer receiving apparatus, and therefore, the detailed description of the common parts is omitted for simplicity.

(Developer Receiving Apparatus)

Figure 38:
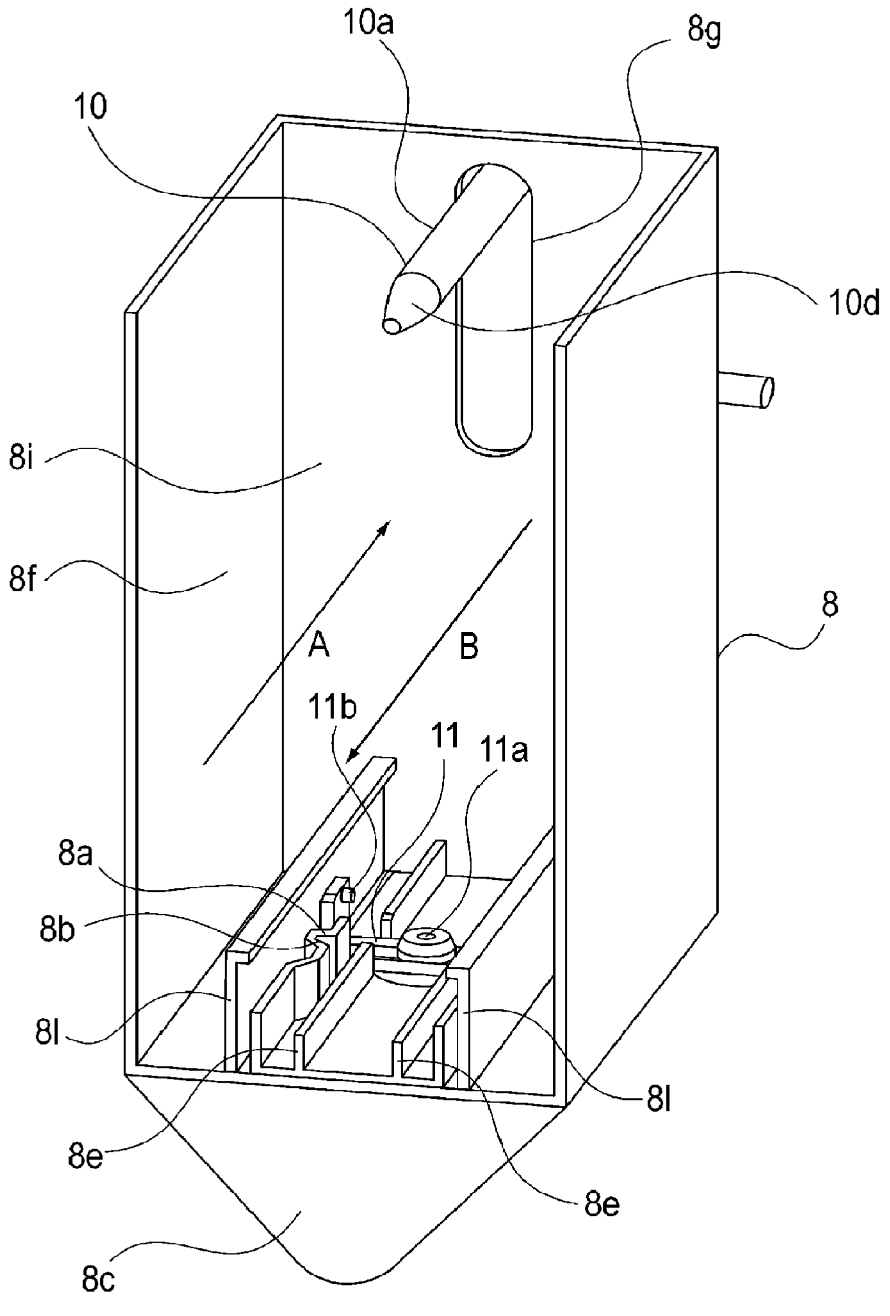
FIG. 38 is a perspective view illustrating a developer receiving apparatus according to an embodiment.
Figure 39:
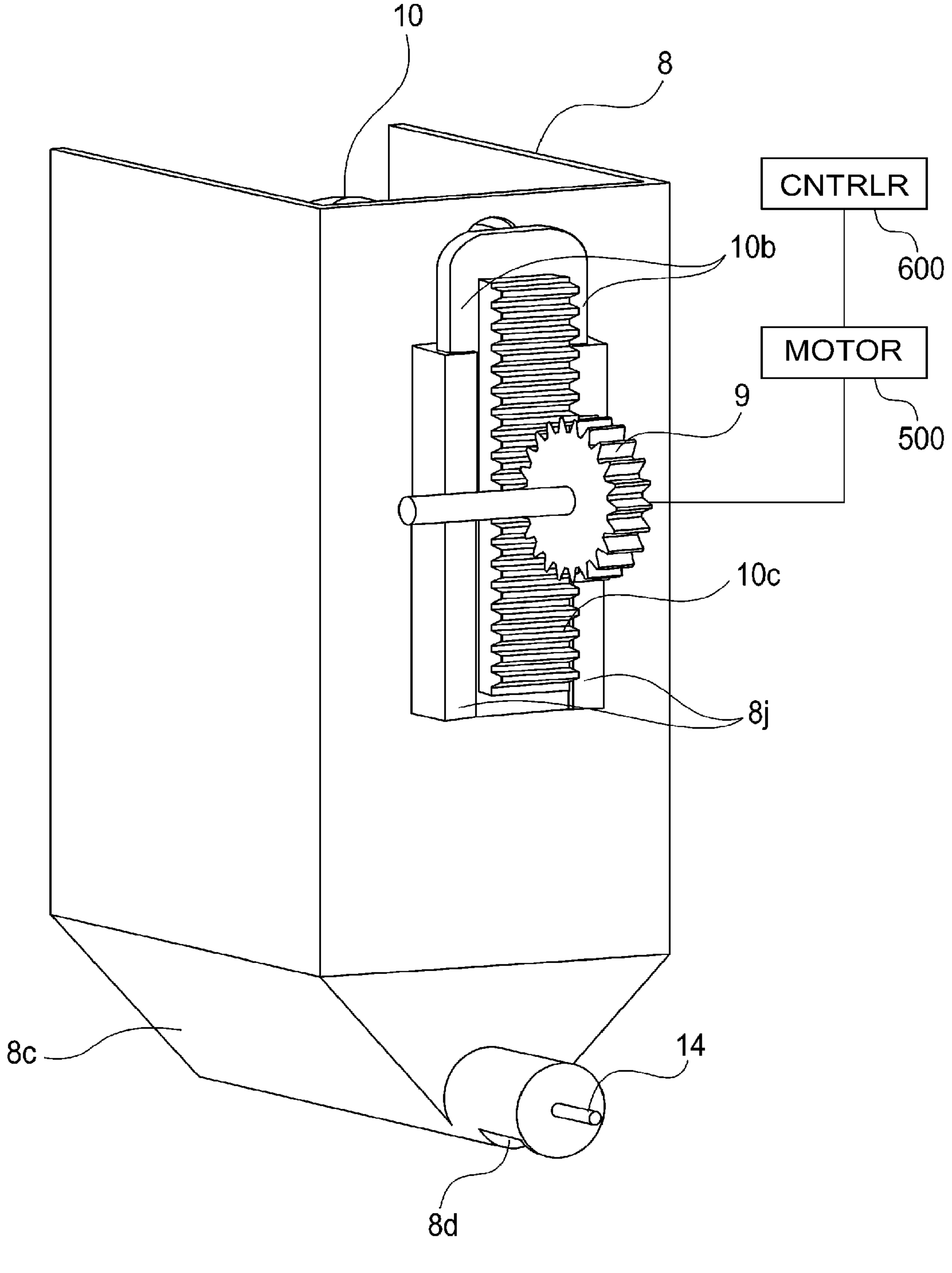
FIG. 39 is a perspective view of the developer receiving apparatus of FIG. 38 as seen in a different direction.
Figure 40:
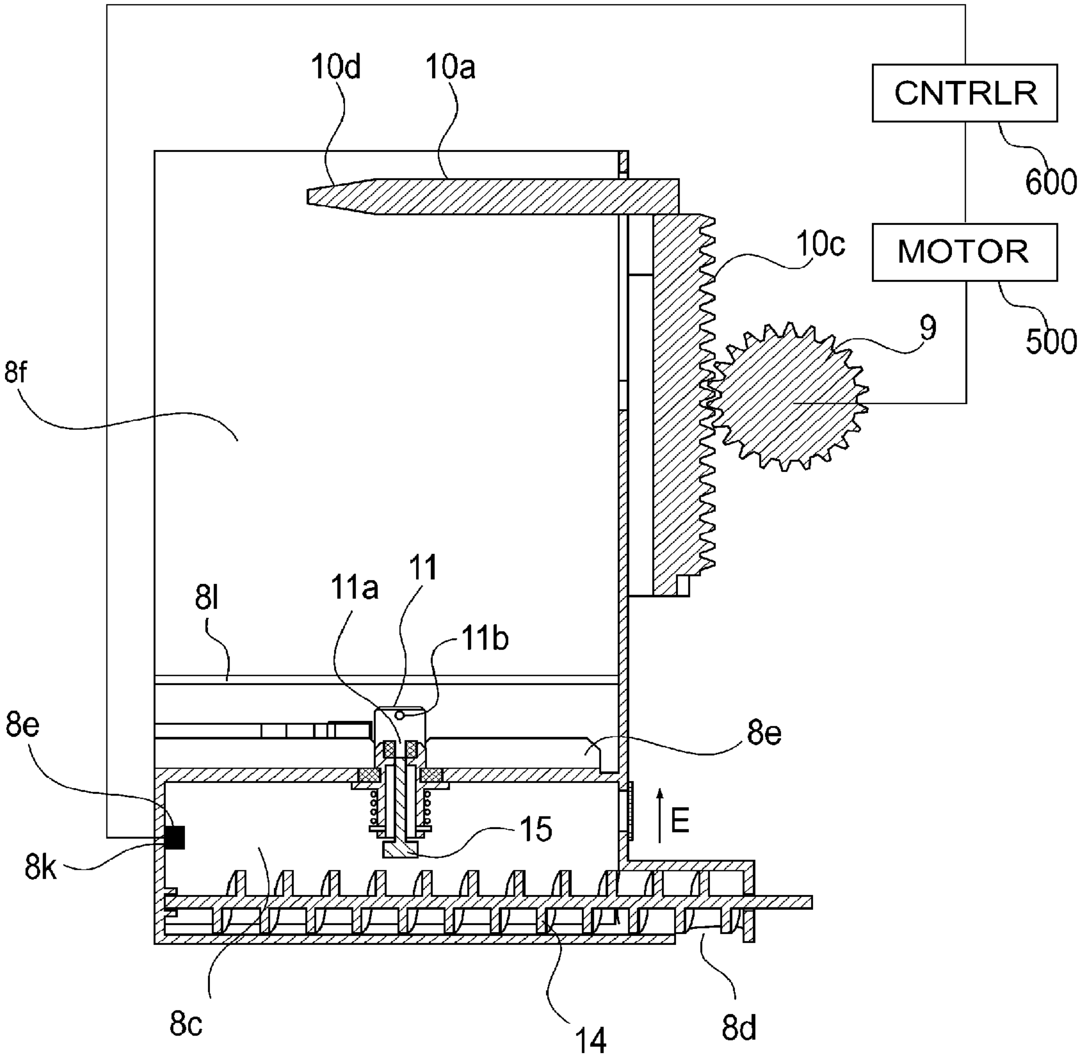
FIG. 40 is a sectional view of the developer receiving apparatus of FIG. 38.

Referring to FIGS. 38, 39 and 40, the developer receiving apparatus 8 will be described. FIG. 3 is a schematic perspective view of the developer receiving apparatus 8. FIG. 39 is a schematic perspective view of the developer receiving apparatus 8 as seen from a back side of FIG. 38. FIG. 40 is a schematic sectional view of the developer receiving apparatus 8.

Figure 43:
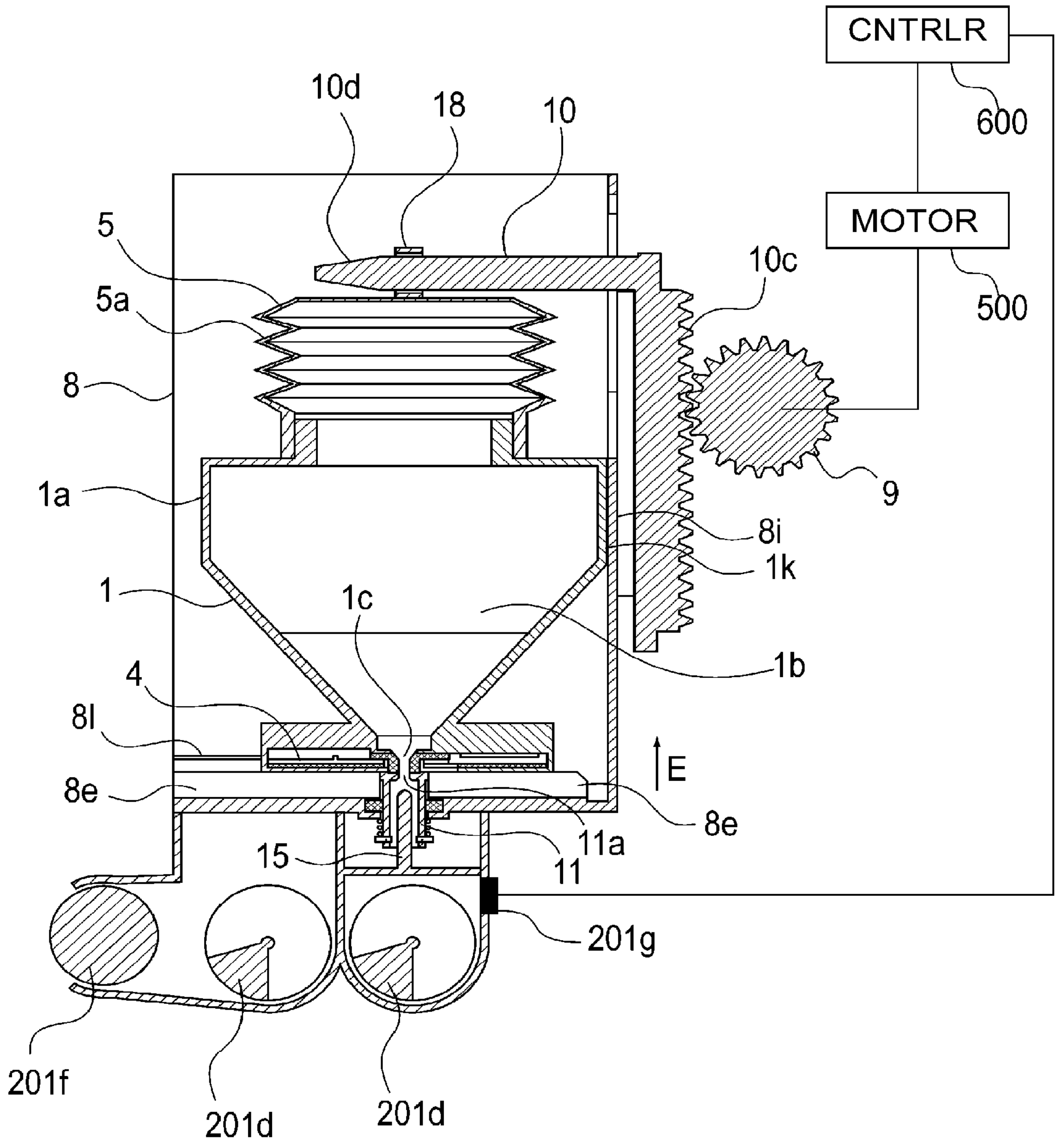
FIG. 43 is a sectional view illustrating a developer receiving apparatus without a hopper and a mounting state of the developer supply container.

The developer receiving apparatus 8 is provided with a mounting portion (mounting space) 8*f* to which the developer supply container 1 is detachably mounted. Further, there is provided an developer receiving portion 11 for receiving a developer discharged from the developer supply container 1 through a discharge opening (opening) 1*c* (FIG. 43). The developer receiving portion 11 is mounted so as to be movable (displaceable) relative to the developer receiving apparatus 8 in the vertical direction. As shown in FIG. 40, the upper end surface of the developer receiving portion 11 is provided with a main assembly seal 13 having a developer receiving port 11*a* at the central portion. The main assembly seal 13 comprises an elastic member, a foam member or the like, and the main assembly seal 13 is closely-contacted with an opening seal (unshown) provided with a discharge opening 1*c* for the developer supply container 1 which will be described hereinafter to prevent leakage of the developer from the discharge opening 1*c* and/or the developer receiving port 11*a*.

In order to prevent the contamination in the mounting portion 8*f* by the developer as much as possible, a diameter of the developer receiving port 11*a* is desirably substantially the same as or slightly larger than a diameter of the discharge opening 3*a*4 of the developer supply container 1. This is because if the diameter of the developer receiving port 11*a* is smaller than the diameter of the discharge opening 1*c*, the developer discharged from the developer supply container 1 is deposited on the upper surface of developer receiving port 11*a*, and the deposited developer is transferred onto the lower surface of the developer supply container 1 during the dismounting operation of the developer supply container 1, with the result of contamination with the developer. In addition, the developer transferred onto the developer supply container 1 may be scattered to the mounting portion 8*f* with the result of contamination of the mounting portion 8*f* with the developer. On the contrary, if the diameter of the developer receiving port 11*a* is quite larger than the diameter of the discharge opening 1*c*, an area in which the developer scattered from the developer receiving port 11*a* is deposited on the neighborhood of the discharge opening 1*c* is large. That is, the contaminated area of the developer supply container 1 by the developer is large, which is not preferable. Under the circumstances, the difference between the diameter of the developer receiving port 11*a* and the diameter of the discharge opening 1*c* is preferably substantially 0 to approx. 2 mm.

In this example, the diameter of the discharge opening 1*c* of the developer supply container 1 is approx. Φ2 mm (pin hole), and therefore, the diameter of the developer receiving port 11*a* is approx. φ3 mm.

As shown in FIG. 40, the developer receiving portion 11 is urged downwardly by an urging member 12. When the developer receiving portion 11 moves upwardly, it has to move against an urging force of the urging member 12.

Below the developer receiving apparatus 8, there is provided a sub-hopper 8*c* for temporarily storing the developer. As shown in FIG. 40, in the sub-hopper 8*c*, there are provided a feeding screw 14 for feeding the developer into the developer hopper portion 201*a* (FIG. 36) which is a part of the developing device 201, and an opening 8*d* which is in fluid communication with the developer hopper portion 201*a*.

The developer receiving port 11*a* is closed so as to prevent foreign matter and/or dust entering the sub-hopper 8*c* in a state that the developer supply container 1 is not mounted. More specifically, the developer receiving port 11*a* is closed by a main assembly shutter 15 in the state that the developer receiving portion 11 is away to the upside. The developer receiving portion 11 moves upwardly (arrow E) from the position shown in FIG. 43 toward the developer supply container 1 with the mounting operation of the developer supply container 1. By this, the developer receiving port 11*a* and the main assembly shutter 15 are spaced from each other to unseal the developer receiving port 11*a*. With this open state, the developer is discharged from the developer supply container 1 through the discharge opening 1*c*, so that the developer received by the developer receiving port 11*a* is movable to the sub-hopper 8*c*.

A side surface of the developer receiving portion 11 is provided with an engaging portion 11*b* (FIGS. 4, 19). The engaging portion 11*b* is directly engaged with an engaging portion 3*b*2, 3*b*4 (FIGS. 8 and 20) provided on the developer supply container 1 which will be described hereinafter, and is guided thereby so that the developer receiving portion 11 is raised toward the developer supply container 1.

As shown in FIG. 38, mounting portion 8*f* of the developer receiving apparatus 8 is provided with a positioning guide (holding member) 81 having a L-like shape to fix the position of the developer supply container 1. The mounting portion 8*f* of the developer receiving apparatus 8 is provided with an insertion guide 8*e* for guiding the developer supply container 1 in the mounting and demounting direction. By the positioning guide 81 and the insertion guide 8*e*, the mounting direction of the developer supply container 1 is determined as being the direction of an arrow A. The dismounting direction of the developer supply container 1 is the opposite (arrow B) to the direction of the arrow A.

The developer receiving apparatus 8 is provided with a driving gear 9 (FIG. 39) functioning as a driving mechanism for driving the developer supply container 1 and is provided with a locking member 10 (FIG. 38).

Figure 44:
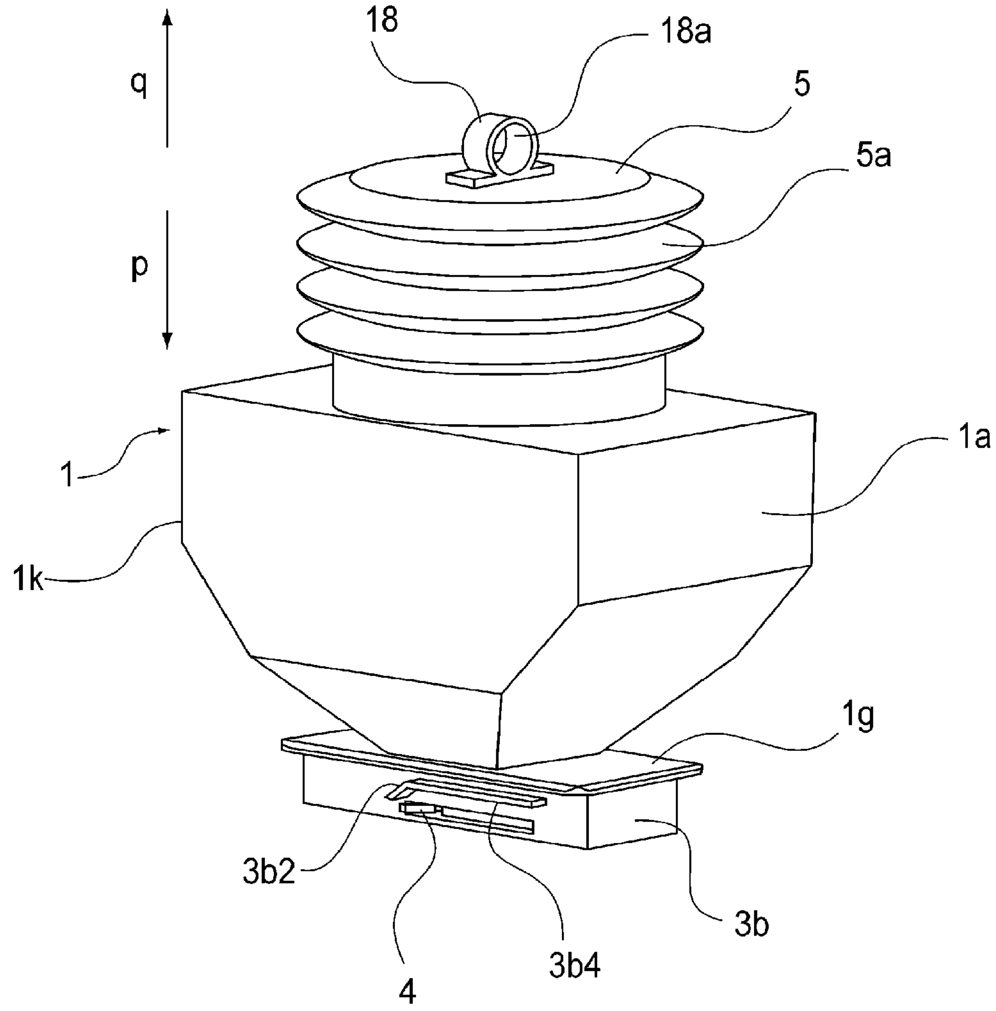
FIG. 44 is a perspective view illustrating an embodiment of the developer supply container.

The locking member 10 is locked with a locking portion 18 (FIG. 44 the functioning as a drive inputting portion of the developer supply container 1 when the developer supply container 1 is mounted to the mounting portion 8 fed of the developer receiving apparatus 8.

As shown in FIG. 38, the locking member 10 is loose fitted in an elongate hole portion 8*g* formed in the mounting portion 8*f* of the developer receiving apparatus 8, and is movable relative to the mounting portion 8*f* in the up and down directions in the FIGURE. The locking member 10 is in the form of a round bar configuration and is provided at the free end with a tapered portion 10*d* in consideration of easy insertion into a locking portion 18 (FIG. 44) of the developer supply container 1 which will be described hereinafter.

The locking portion 10*a* (engaging portion engageable with locking portion 18) of the locking member 10 is connected with a rail portion 10*b* shown in FIG. 39. The sides of the rail portion 10*b* are held by a guide portion 8*j* of the developer receiving apparatus 8 and is movable in the up and down direction in the FIGURE.

The rail portion 10*b* is provided with a gear portion 10*c* which is engaged with a driving gear 9. The driving gear 9 is connected with a driving motor 500. By a control device 600 effecting such a control that the rotational moving direction of a driving motor 500 provided in the image forming apparatus 100 is periodically reversed, the locking member 10 reciprocates in the up and down directions in the FIGURE along the elongated hole 8*g*.

(Developer Supply Control of Developer Receiving Apparatus)

Figure 41:
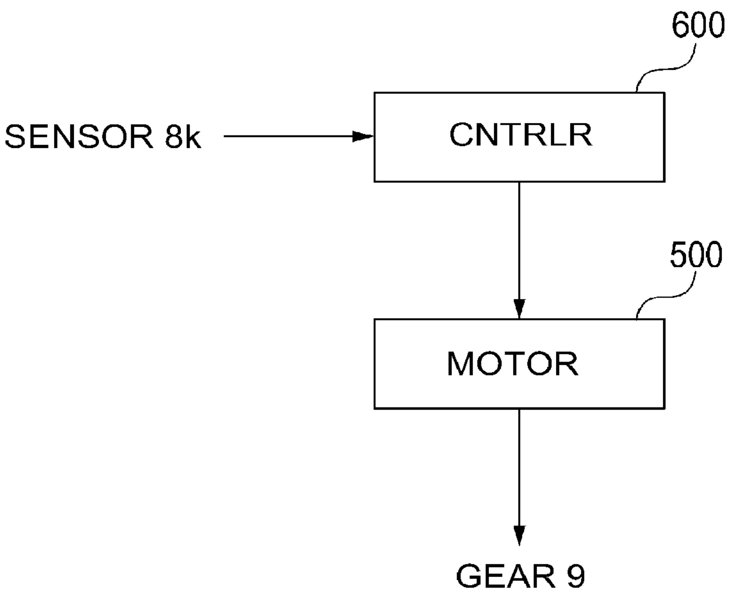
FIG. 41 is a block diagram illustrating a function and a structure of a control device.
Figure 42:
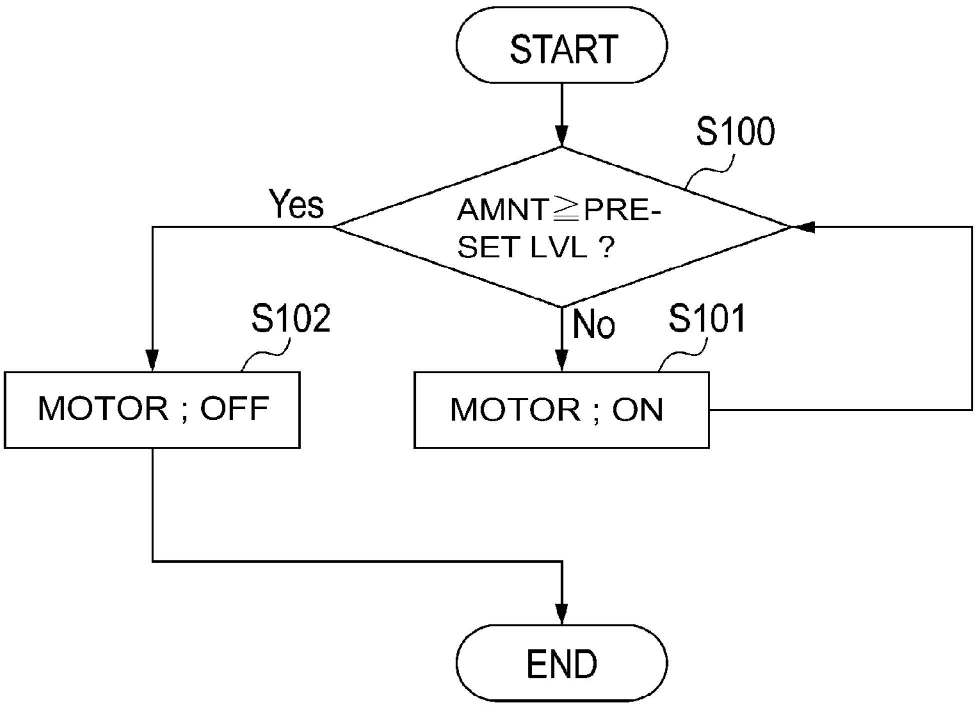
FIG. 42 is a flow chart illustrating a flow of a supplying operation.

Referring to FIGS. 41 and 42, a developer supply control by the developer receiving apparatus 8 will be described. FIG. 41 is a block diagram illustrating the function and the structure of the control device 600, and FIG. 42 is a flow chart illustrating a flow of the supplying operation.

In this example, an amount of the developer temporarily accumulated in the hopper 8*c* (height of the developer level) is limited so that the developer does not flow reversely into the developer supply container 1 from the developer receiving apparatus 8 by the sucking operation of the developer supply container 1 which will be described hereinafter. For this purpose, in this example, a developer sensor 8*k* (FIG. 40) is provided to detect the amount of the developer accommodated in the hopper 8*g*. As shown in FIG. 41, the control device 600 controls the operation/non-operation of the driving motor 500 in accordance with an output of the developer sensor 8*k* by which the developer is not accommodated in the hopper 8*c* beyond a predetermined amount.

The control flow will be described. First, as shown in FIG. 42, the developer sensor 8*k* checks the accommodated developer amount in the hopper 8*c*. When the accommodated developer amount detected by the developer sensor 8*k* is discriminated as being less than a predetermined amount, that is, when no developer is detected by the developer sensor 8*k*, the driving motor 500 is actuated to execute a developer supplying operation for a predetermined time period (S101).

When the accommodated developer amount detected with developer sensor 8*k* is discriminated as having reached the predetermined amount, that is, when the developer is detected by the developer sensor 8*k*, as a result of the developer supplying operation, the driving motor 500 is deactuated to stop the developer supplying operation (S102). By the stop of the supplying operation, a series of developer supplying steps is completed.

Such developer supplying steps are carried out repeatedly whenever the accommodated developer amount in the hopper 8*c* becomes less than a predetermined amount as a result of consumption of the developer by the image forming operations.

In this example, the developer discharged from the developer supply container 1 is stored temporarily in the hopper 8*c*, and then is supplied into the developing device, but the following structure of the developer receiving apparatus can be employed.

Particularly in the case of a low speed image forming apparatus 100, the main assembly is required to be compact and low in cost. In such a case, it is desirable that the developer is supplied directly to the developing device 201, as shown in FIG. 43. More particularly, the above-described hopper 8*c* is omitted, and the developer is supplied directly into the developing device 201*a* from the developer supply container 1. FIG. 43 shows an example using a two-component type developing device 201 as the developer receiving apparatus. The developing device 201 comprises a stirring chamber into which the developer is supplied, and a developer chamber for supplying the developer to the developing roller 201*f*, wherein the stirring chamber and the developer chamber are provided with screws 201*d* rotatable in such directions that the developer is fed in the opposite directions from each other. The stirring chamber and the developer chamber are communicated with each other in the opposite longitudinal end portions, and the two component developer are circulated the two chambers. The stirring chamber is provided with a magnetometric sensor 201*g* for detecting a toner content of the developer, and on the basis of the detection result of the magnetometric sensor 201*g*, the control device 600 controls the operation of the driving motor 500. In such a case, the developer supplied from the developer supply container is non-magnetic toner or non-magnetic toner plus magnetic carrier.

The developer receiving portion is not illustrated in FIG. 43, but in the case where the hopper 8*c* is omitted, and the developer is supplied directly to the developing device 201 from the developer supply container 1, the developer receiving portion 11 is provided in the developing device 201. The arrangement of the developer receiving portion 11 in the developing device 201 may be properly determined.

In this example, as will be described hereinafter, the developer in the developer supply container 1 is hardly discharged through the discharge opening 1*c* only by the gravitation, but the developer is by a discharging operation by a pump portion 2, and therefore, variation in the discharge amount can be suppressed. Therefore, the developer supply container 1 which will be described hereinafter is usable for the example of FIG. 8 lacking the hopper 8*c*.

(Developer Supply Container)

Figure 45:
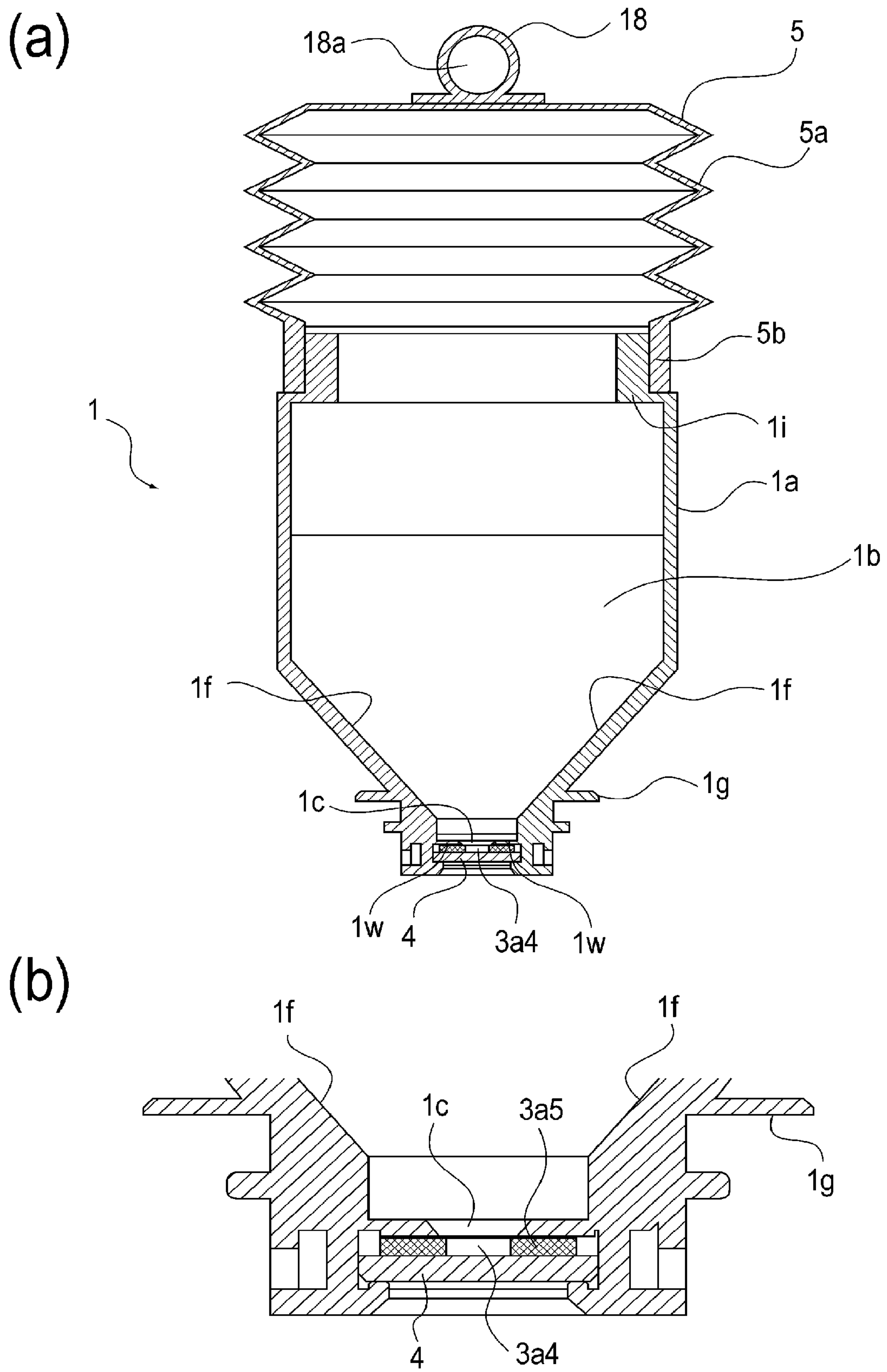
FIG. 45 is a sectional view illustrating an embodiment of the developer supply container.

Referring to FIGS. 44 and 45, the developer supply container 1 according to this embodiment will be described. FIG. 44 is a schematic perspective view of the developer supply container1. FIG. 45 is a schematic sectional view of the developer supply container 1.

As shown in FIG. 44, the developer supply container 1 has a container body 1*a* (developer discharging chamber) functioning as a developer accommodating portion for accommodating the developer. Designated by 1*b* in FIG. 45 is a developer accommodating space in which the developer is accommodated in the container body 1*a*. In the example, the developer accommodating space 1*b* functioning as the developer accommodating portion is the space in the container body 1*a* plus an inside space in the pump portion 5. In this example, the developer accommodating space 1*b* accommodates toner which is dry powder having a volume average particle size of 5 μm-6 μm.

In this example, the pump portion is a displacement type pump portion 5 in which the volume changes. More particularly, the pump portion 5 has a bellow-like expansion-and-contraction portion 5*a* (bellow portion, expansion-and-contraction member) which can be contracted and expanded by a driving force received from the developer receiving apparatus 8.

As shown in FIGS. 44 and 45, the bellow-like pump portion 5 of this example is folded to provide crests and bottoms which are provided alternately and periodically, and is contractable and expandable. When the bellow-like pump portion 2 as in this example, a variation in the volume change amount relative to the amount of expansion and contraction can be reduced, and therefore, a stable volume change can be accomplished.

In this embodiment, the entire volume of the developer accommodating space 1*b* is 480 cm^3, of which the volume of the pump portion 2 is 160 cm^3 (in the free state of the expansion-and-contraction portion 5*a*), and in this example, the pumping operation is effected in the pump portion (2) expansion direction from the length in the free state.

The volume change amount by the expansion and contraction of the expansion-and-contraction portion 5*a* of the pump portion 5 is 15 cm^3, and the total volume at the time of maximum expansion of the pump portion 5 is 495 cm^3.

The developer supply container 1 filled with 240 g of developer. The driving motor 500 for driving the locking member 10 shown in FIG. 43 is controlled by the control device 600 to provide a volume change speed of 90 cm^3/s. The volume change amount and the volume change speed may be properly selected in consideration of a required discharge amount of the developer receiving apparatus 8.

The pump portion 5 in this example is a bellow-like pump, but another pump is usable if the air amount (pressure) in the developer accommodating space 1*b* can be changed. For example, the pump portion 5 may be a single-shaft eccentric screw pump. In this case, an opening for suction and discharging of the single-shaft eccentric screw pump is required, and such an opening requires a additional filter or the like in addition to the above-described filter, in order to prevent the leakage of the developer therethrough. In addition, a single-shaft eccentric screw pump requires a very high torque to operate, and therefore, the load to the main assembly 100 of the image forming apparatus increases. Therefore, the bellow-like pump is preferable since it is free of such problems.

The developer accommodating space 1*b* may be only the inside space of the pump portion 5. In such a case, the pump portion 5 functions simultaneously as the developer accommodating space 1*b*.

A connecting portion 5*b* of the pump portion 5 and the connected portion 1*i* of the container body 1*a* are unified by welding to prevent leakage of the developer, that is, to keep the hermetical property of the developer accommodating space 1*b*.

The developer supply container 1 is provided with a locking portion 18 as a drive inputting portion (driving force receiving portion, drive connecting portion, engaging portion) which is engageable with the driving mechanism of the developer receiving apparatus 8 and which receives a driving force for driving the pump portion 5 from the driving mechanism.

More particularly, the locking portion 18 engageable with the locking member 10 of the developer receiving apparatus 8 is mounted to an upper end of the pump portion 5. The locking portion 18 is provided with a locking hole 18*a* in the center portion as shown in FIG. 44. When the developer supply container 1 is mounted to the mounting portion 8*f* (FIG. 38), the locking member 10 is inserted into a locking hole 18*a*, so that they are unified (slight play is provided for easy insertion). As shown in FIG. 44, the relative position between the locking portion 18 and the locking member 10 in arrow p direction and arrow q direction which are expansion and contracting directions of the expansion-and-contraction portion 5*a*. It is preferable that the pump portion 5 and the locking portion 18 are molded integrally using an injection molding method or a blow molding method.

The locking portion 18 unified substantially with the locking member 10 in this manner receives a driving force for expanding and contracting the expansion-and-contraction portion 5*a* of the pump portion 2 from the locking member 10. As a result, with the vertical movement of the locking member 10, the expansion-and-contraction portion 5*a* of the pump portion 5 is expanded and contracted.

The pump portion 5 functions as an air flow generating mechanism for producing alternately and repeatedly the air flow into the developer supply container and the air flow to the outside of the developer supply container through the discharge opening 1*c* by the driving force received by the locking portion 18 functioning as the drive inputting portion.

In this embodiment, the use is made with the round bar locking member 10 and the round hole locking portion 18 to substantially unify them, but another structure is usable if the relative position therebetween can be fixed with respect to the expansion and contracting direction (arrow p direction and arrow q direction) of the expansion-and-contraction portion 5*a*. For example, the locking portion 18 is a rod-like member, and the locking member 10 is a locking hole; the cross-sectional configurations of the locking portion 18 and the locking member 10 may be triangular, rectangular or another polygonal, or may be ellipse, star shape or another shape. Or, another known locking structure is usable.

The bottom end portion of the container body 1*a* is provided with an upper flange portion 1*g* constituting a flange held by the developer receiving apparatus 8 so as to be non-rotatable. The upper flange portion 1*g* is provided with a discharge opening 1*c* for permitting discharging of the developer to the outer of the developer supply container 1 from the developer accommodating space 1*b*. The discharge opening 1*c* will be described in detail hereinafter.

As shown in FIG. 45, an inclined surface 1*f* is formed toward the discharge opening 1*c* in a lower portion of the container body 1*a*, the developer accommodated in the developer accommodating space 1*b* slides down on the inclined surface 1*f* by the gravity toward a neighborhood of the discharge opening 1*c*. In this embodiment, the inclination angle of the inclined surface 1*f* (angle relative to a horizontal surface in the state that the developer supply container 1 is set in the developer receiving apparatus 8) is larger than an angle of rest of the toner (developer).

Figure 46:
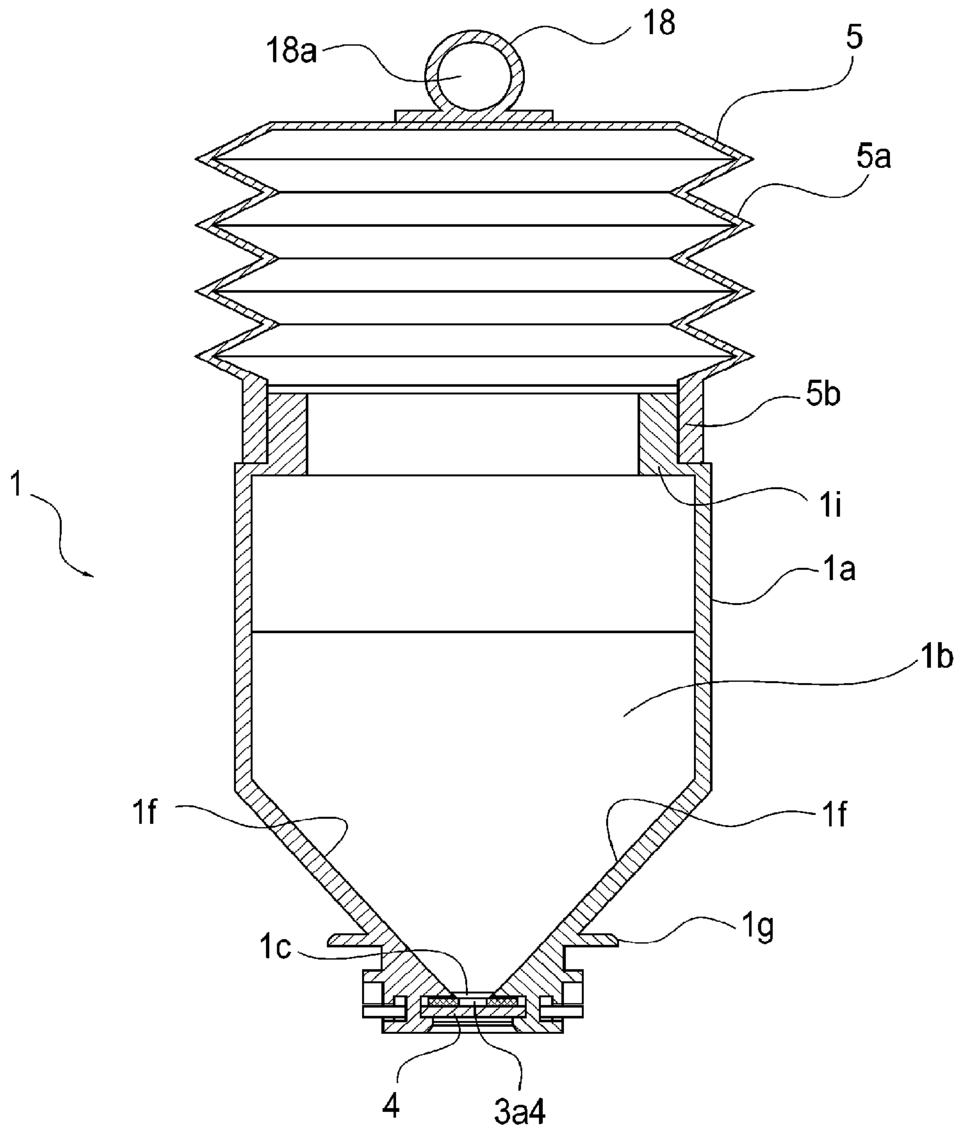
FIG. 46 is a sectional view of the developer supply container in which a discharge opening and an inclined surface are connected.
Figure 46:
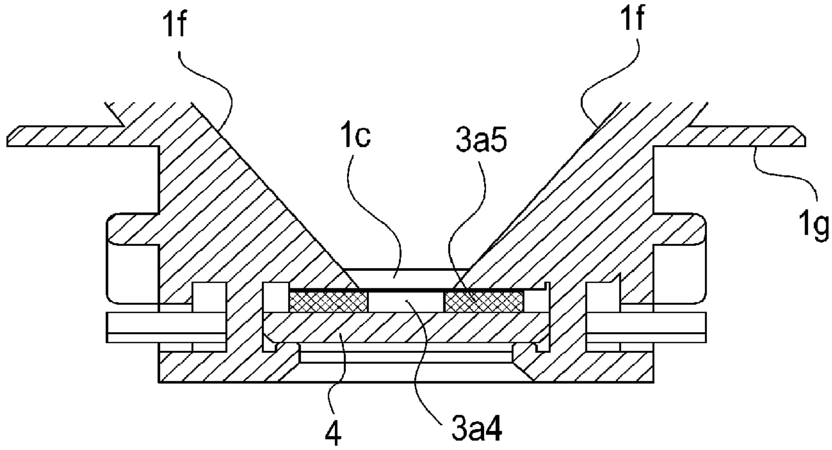

As for the configuration of the peripheral portion of the discharge opening 1*c*, as shown in FIG. 46, the configuration of the connecting portion between the discharge opening 1*c* and the inside of the container body 1*a* may be flat (1 W in FIG. 45), or as shown in FIG. 46, the discharge opening 1*c* may be connected with the inclined surface 1*f*.

The flat configuration shown in FIG. 45 provides high space efficiency in the direction of the height of the developer supply container 1, and the configuration connecting with the inclined surface if shown in FIG. 46 provides the reduction of the remaining developer because the developer remaining on the inclined surface if falls to the discharge opening 1*c*. As described above, the configuration of the peripheral portion of the discharge opening 1*c* may be selected properly depending on the situation.

In this embodiment, the flat configuration shown in FIG. 45 is used.

The developer supply container 1 is in fluid communication with the outside of the developer supply container 1 only through the discharge opening 1*c*, and is sealed substantially except for the discharge opening 1*c*.

Referring to FIGS. 38 and 45, a shutter mechanism for opening and closing the discharge opening 1*c* will be described.

An opening seal (sealing member) 3*a*5 of a elastic material is fixed by bonding to a lower surface of the upper flange portion 1*g* so as to surround the circumference of the discharge opening 1*c* to prevent developer leakage. The opening seal 3*a*5 is provided with a circular discharge opening (opening) 3*a*4 for discharging the developer into the developer receiving apparatus 8 similarly to the above-described embodiments. There is provided a shutter 4 for sealing the discharge opening 3*a*4 (discharge opening 1*c*) so that the opening seal 3*a*5 is compressed between the lower surface of the upper flange portion 1*g*. In this manner, the opening seal 3*a*5 is stuck on the lower surface of the upper flange portion 1*g*, and is nipped by the upper flange portion 1*g* and the shutter 4 which will be described hereinafter.

In this example, the discharge opening 3*a*4 is provided on the opening seal 3*a*5 is unintegral with the upper flange portion 1*g*, but the discharge opening 3*a*4 may be provided directly on the upper flange portion 1*g* (discharge opening 1*c*). Also in this case, in order to prevent the leakage of the developer, it is desired to nip the opening seal 3*a*5 by the upper flange portion 1*g* and the shutter 4.

Below the upper flange portion 1*g*, a lower flange portion 3*b* constituting a flange through the shutter 4 is mounted. The lower flange portion 3*b* includes engaging portions 3*b*2, 3*b*4 engageable with the developer receiving portion 11 (FIG. 4) similarly to the lower flange shown in FIG. 8 or FIG. 20. The structure of the lower flange portion 3*b* having the engaging portions 3*b*2 and 3*b*4 is similar to the above-described embodiments, and the description thereof is omitted.

The shutter 4 is provided with a stopper portion (holding portion) held by a shutter stopper portion of the developer receiving apparatus 8 so that the developer supply container 1 is movable relative to the shutter 4, similarly to the shutter shown in FIG. 9 or FIG. 21. The structure of the shutter 4 having the stopper portion (holding portion) is similar to that of the above-described embodiments, and the description thereof is omitted.

The shutter 4 is fixed to the developer receiving apparatus 8 by the stopper portion engaging with the shutter stopper portion formed on the developer receiving apparatus 8, with the operation of mounting the developer supply container 1. Then, the developer supply container 1 starts the relative movement relative to the fixed shutter 4.

At this time, similarly to the above-described embodiments, the engaging portion 3*b*2 of the developer supply container 1 is first engaged directly with the engaging portion 11*b* of the developer receiving portion 11 to move the developer receiving portion 11 upwardly. By this, the developer receiving portion 11 is close-contacted to the developer supply container 1 (or the shutter opening 4*f* of the shutter 4), and the developer receiving port 11*a* of the developer receiving portion 11 is unsealed.

Figure 52:
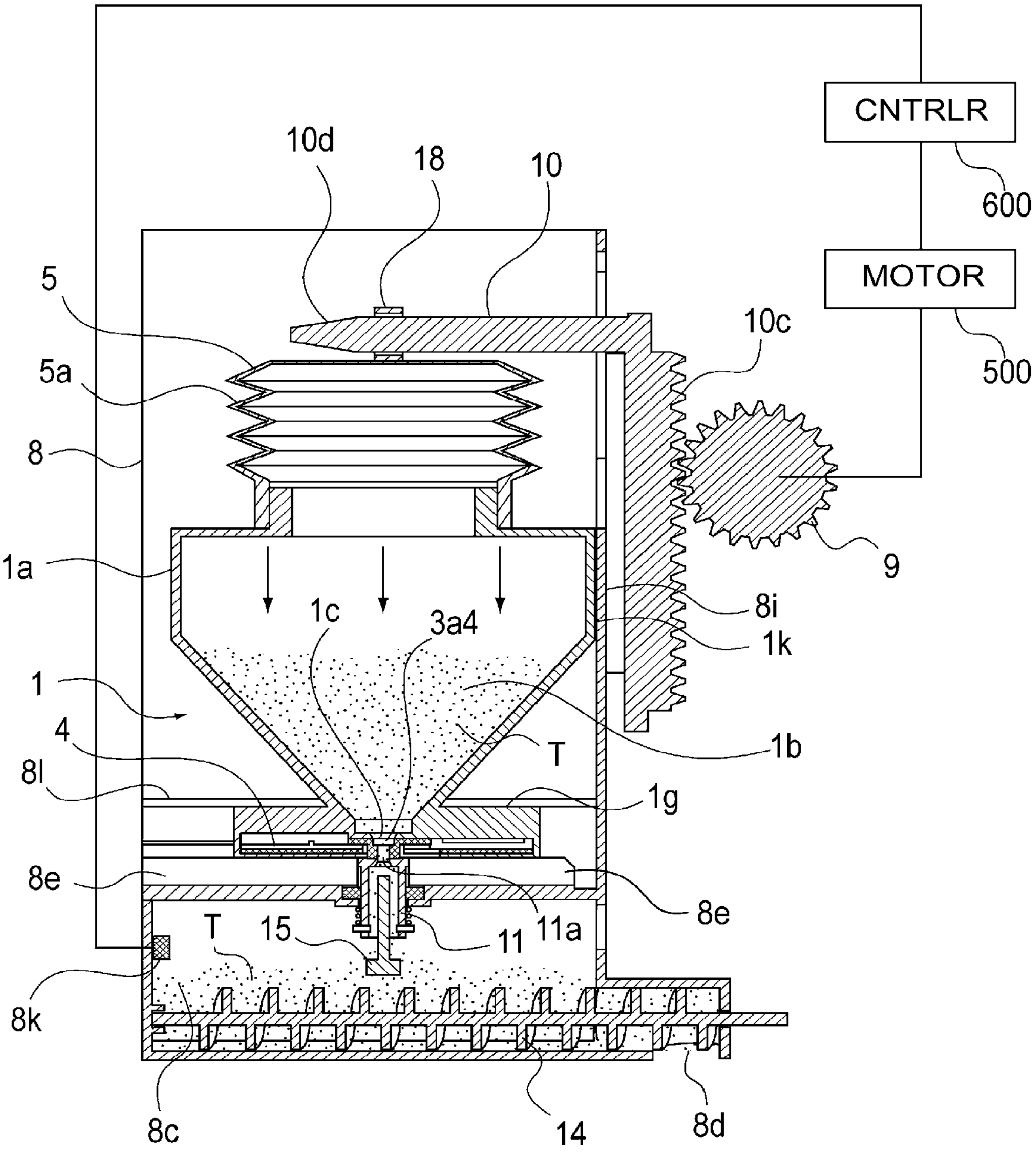
FIG. 52 is a sectional view of the developer supply container and the developer receiving apparatus.

Thereafter, the engaging portion 3*b*4 of the developer supply container 1 is engaged directly with the engaging portion 11*b* of the developer receiving portion 11, and the developer supply container 1 moves relative to the shutter 4 while maintaining the above-described close-contact state, with the mounting operation. By this, the shutter 4 is unsealed, and the discharge opening 1*c* of the developer supply container 1 and the developer receiving port 11*a* of the developer receiving portion 11 are aligned with each other. At this time, the upper flange portion 1*g* of the developer supply container 1 is guided by the positioning guide 81 of the developer receiving apparatus 8 so that a side surface 1*k* (FIG. 44) of the developer supply container 1 abuts to the stopper portion 8*i* of the developer receiving apparatus 8. As a result, the position of the developer supply container 1 relative to the developer receiving apparatus 8 in the mounting direction (A direction) is determined (FIG. 52).

In this manner, the upper flange portion 1*g* of the developer supply container 1 is guided by the positioning guide 81, and at the time when the inserting operation of the developer supply container 1 is completed, the discharge opening 1*c* of the developer supply container 1 and the developer receiving port 11*a* of the developer receiving portion 11 are aligned with each other.

At the time when the inserting operation of the developer supply container 1 is completed, the opening seal 3*a*5 (FIG. 52) seals between the discharge opening 1*c* and the developer receiving port 11*a* to prevent leakage of the developer to the outside.

With the inserting operation of the developer supply container 1, the locking member 109 is inserted into the locking hole 18*a* of the locking portion 18 of the developer supply container 1 so that they are unified.

At this time, the position thereof is determined by the L shape portion of the positioning guide 81 in the direction (up and down direction in FIG. 38) perpendicular to the mounting direction (A direction), relative to the developer receiving apparatus 8, of the developer supply container 1. The flange portion 1*g* as the positioning portion also functions to prevent movement of the developer supply container 1 in the up and down direction (reciprocating direction of the pump portion 5).

The operations up to here are the series of mounting steps for the developer supply container 1. By the operator closing the front cover 40, the mounting step is finished.

The steps for dismounting the developer supply container 1 from the developer receiving apparatus 8 are opposite from those in the mounting step. The steps for dismounting the developer supply container 1 from the developer receiving apparatus 8 are opposite from those in the mounting step.

More specifically, the steps described as the mounting operation and the dismounting operation of the developer supply container 1 in the above-described embodiments apply. More specifically, the steps described in conjunction with FIG. 13-17 by Embodiment 1, or the steps described in conjunction with FIGS. 26-29 by Embodiment 2 apply here.

In this example, the state (decompressed state, negative pressure state) in which the internal pressure of the container body 1*a* (developer accommodating space 1*b*) is lower than the ambient pressure (external air pressure) and the state (compressed state, positive pressure state) in which the internal pressure is higher than the ambient pressure are alternately repeated at a predetermined cyclic period. Here, the ambient pressure (external air pressure) is the pressure under the ambient condition in which the developer supply container 1 is placed. Thus, the developer is discharged through the discharge opening 1*c* by changing a pressure (internal pressure) of the container body 1*a*. In this example, it is changed (reciprocated) between 480-495 cm^3 at a cyclic period of 0.3 sec.

The material of the container body 1*a* is preferably such that it provides an enough rigidity to avoid collision or extreme expansion.

In view of this, this example employs polystyrene resin material as the materials of the developer container body 1*a* and employs polypropylene resin material as the material of the pump portion 2.

As for the material for the container body 1*a*, other resin materials such as ABS (acrylonitrile, butadiene, styrene copolymer resin material), polyester, polyethylene, polypropylene, for example are usable if they have enough durability against the pressure. Alternatively, they may be metal.

As for the material of the pump portion 2, any material is usable if it is expansible and contractable enough to change the internal pressure of the space in the developer accommodating space 1*b* by the volume change. The examples includes thin formed ABS (acrylonitrile, butadiene, styrene copolymer resin material), polystyrene, polyester, polyethylene materials. Alternatively, other expandable-and-contractable materials such as rubber are usable.

They may be integrally molded of the same material through an injection molding method, a blow molding method or the like if the thicknesses are properly adjusted for the pump portion 5*b* and the container body 1*a*.

In this example, the developer supply container 1 is in fluid communication with the outside only through the discharge opening 1*c*, and therefore, it is substantially sealed from the outside except for the discharge opening 1*c*. That is, the developer is discharged through discharge opening 1*c* by compressing and decompressing the inside of the developer supply container 1 by the pump portion 5, and therefore, the hermetical property is desired to maintain the stabilized discharging performance.

On the other hand, there is a liability that during transportation (air transportation) of the developer supply container 1 and/or in long term unused period, the internal pressure of the container may abruptly changes due to abrupt variation of the ambient conditions. For an example, when the apparatus is used in a region having a high altitude, or when the developer supply container 1 kept in a low ambient temperature place is transferred to a high ambient temperature room, the inside of the developer supply container 1 may be pressurized as compared with the ambient air pressure. In such a case, the container may deform, and/or the developer may splash when the container is unsealed.

In view of this, the developer supply container 1 is provided with an opening of a diameter φ3 mm, and the opening is provided with a filter, in this example. The filter is TEMISH (registered Trademark) available from Nitto Denko Kabushiki Kaisha, Japan, which is provided with a property preventing developer leakage to the outside but permitting air passage between inside and outside of the container. Here, in this example, despite the fact that such a counter measurement is taken, the influence thereof to the sucking operation and the discharging operation through the discharge opening 1*c* by the pump portion 5 can be ignored, and therefore, the hermetical property of the developer supply container 1 is kept in effect.

(Discharge Opening of Developer Supply Container)

In this example, the size of the discharge opening 1*c* of the developer supply container 1 is so selected that in the orientation of the developer supply container 1 for supplying the developer into the developer receiving apparatus 8, the developer is not discharged to a sufficient extent, only by the gravitation. The opening size of the discharge opening 1*c* is so small that the discharging of the developer from the developer supply container is insufficient only by the gravitation, and therefore, the opening is called pin hole hereinafter. In other words, the size of the opening is determined such that the discharge opening 1*c* is substantially clogged. This is expectedly advantageous in the following points:

1) the developer does not easily leak through the discharge opening 1*c;*
2) excessive discharging of the developer at time of opening of the discharge opening 1*c* can be suppressed; and
3) the discharging of the developer can rely dominantly on the discharging operation by the pump portion.

The inventors have investigated as to the size of the discharge opening 1*c* not enough to discharge the toner to a sufficient extent only by the gravitation. The verification experiment (measuring method) and criteria will be described.

A rectangular parallelepiped container of a predetermined volume in which a discharge opening (circular) is formed at the center portion of the bottom portion is prepared, and is filled with 200 g of developer; then, the filling port is sealed, and the discharge opening is plugged; in this state, the container is shaken enough to loosen the developer. The rectangular parallelepiped container has a volume of 1000 cm^3, 90 mm in length, 92 mm width and 120 mm in height.

Thereafter, as soon as possible the discharge opening is unsealed in the state that the discharge opening is directed downwardly, and the amount of the developer discharged through the discharge opening is measured. At this time, the rectangular parallelepiped container is sealed completely except for the discharge opening. In addition, the verification experiments were carried out under the conditions of the temperature of 24 degree C. and the relative humidity of 55%.

Using these processes, the discharge amounts are measured while changing the kind of the developer and the size of the discharge opening. In this example, when the amount of the discharged developer is not more than 2 g, the amount is negligible, and therefore, the size of the discharge opening at that time is deemed as being not enough to discharge the developer sufficiently only by the gravitation.

The developers used in the verification experiment are shown in Table 1. The kinds of the developer are one component magnetic toner, non-magnetic toner for two component developer developing device and a mixture of the non-magnetic toner and the magnetic carrier.

As for property values indicative of the property of the developer, the measurements are made as to angles of rest indicating flowabilities, and fluidity energy indicating easiness of loosing of the developer layer, which is measured by a powder flowability analyzing device (Powder Rheometer FT4 available from Freeman Technology).

TABLE 2

| Developers | Volume average particle size of toner (μm) | Developer component | Angle of rest (deg.) | Fluidity energy (Bulk density of 0.5 g/cm$^3$) |
|---|---|---|---|---|
| A | 7 | Two-component non-magnetic | 18 | $2.09 \times 10^{-3}$ J |
| B | 6.5 | Two-component non-magnetic toner + carrier | 22 | $6.80 \times 10^{-4}$ J |
| C | 7 | One-component magnetic toner | 35 | $4.30 \times 10^{-4}$ J |
| D | 5.5 | Two-component non-magnetic toner + carrier | 40 | $3.51 \times 10^{-3}$ J |
| E | 5 | Two-component non-magnetic toner + carrier | 27 | $4.14 \times 10^{-3}$ J |

Figure 47:
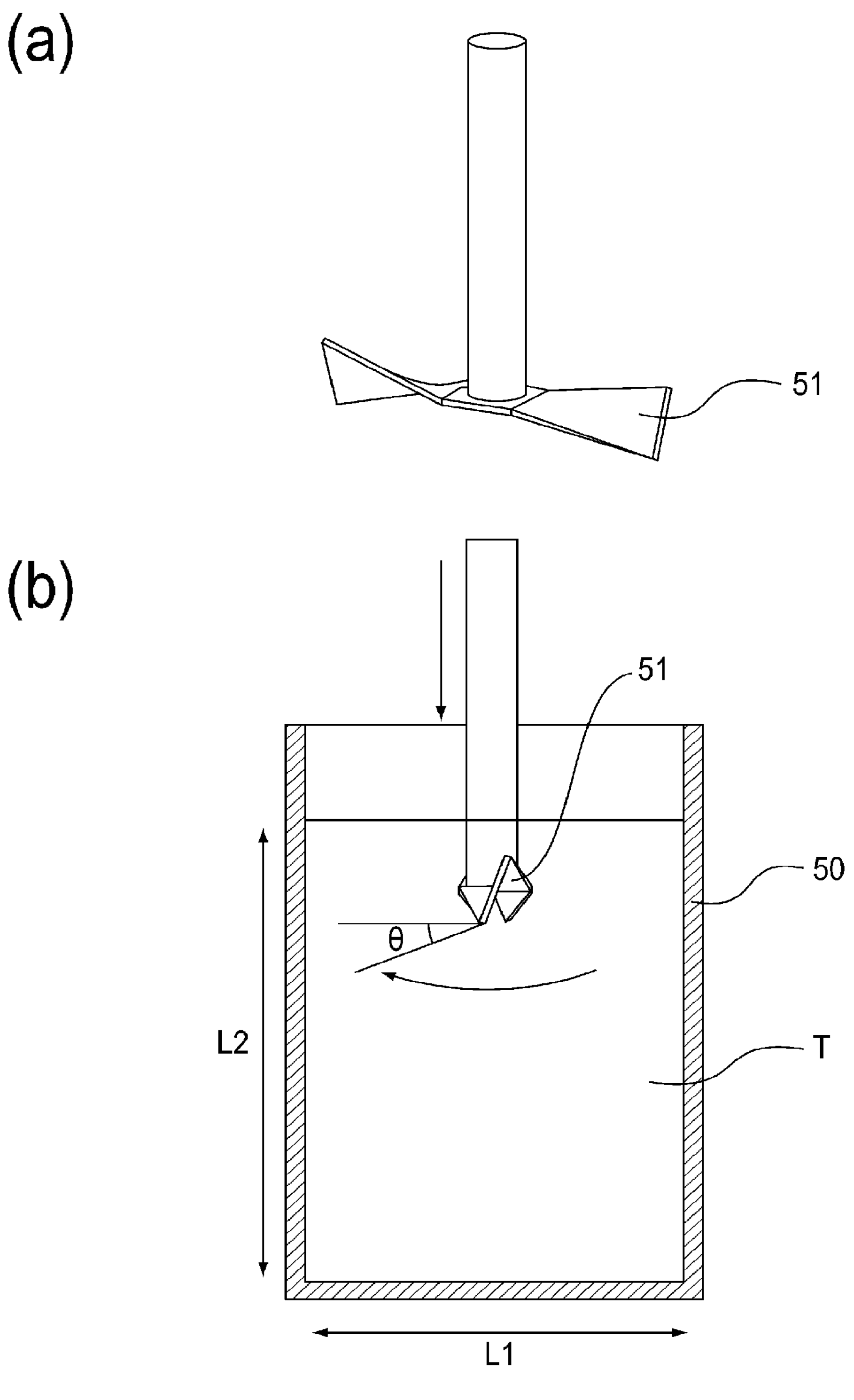
In FIG. 47, (a) is a perspective view of a blade used in a device for measuring a flowability energy, and (b) is a schematic view of the measuring device.

Referring to FIG. 47, a measuring method for the fluidity energy will be described. Here, FIG. 47 is a schematic view of a device for measuring the fluidity energy.

The principle of the powder flowability analyzing device is that a blade is moved in a powder sample, and the energy required for the blade to move in the powder, that is, the fluidity energy, is measured. The blade is of a propeller type, and when it rotates, it moves in the rotational axis direction simultaneously, and therefore, a free end of the blade moves helically.

The propeller type blade 51 is made of SUS (type=C210) and has a diameter of 48 mm, and is twisted smoothly in the counterclockwise direction. More specifically, from a center of the blade of 48 mm×10 mm, a rotation shaft extends in a normal line direction relative to a rotation plane of the blade, a twist angle of the blade at the opposite outermost edge portions (the positions of 24 mm from the rotation shaft) is 70°, and a twist angle at the positions of 12 mm from the rotation shaft is 35°.

The fluidity energy is total energy provided by integrating with time a total sum of a rotational torque and a vertical load when the helical rotating blade 51 enters the powder layer and advances in the powder layer. The value thus obtained indicates easiness of loosening of the developer powder layer, and large fluidity energy means less easiness and small fluidity energy means greater easiness.

In this measurement, as shown in FIG. 12, the developer T is filled up to a powder surface level of 70 mm (L2 in FIG. 47) into the cylindrical container 53 having a diameter φ of 50 mm (volume=200 cc, L1 (FIG. 47)=50 mm) which is the standard part of the device. The filling amount is adjusted in accordance with a bulk density of the developer to measure. The blade 54 of φ48 mm which is the standard part is advanced into the powder layer, and the energy required to advance from depth 10 mm to depth 30 mm is displayed.

The set conditions at the time of measurement are, The set conditions at the time of measurement are, The rotational speed of the blade 51 (tip speed=peripheral speed of the outermost edge portion of the blade) is 60 mm/s: The blade advancing speed in the vertical direction into the powder layer is such a speed that an angle θ (helix angle) formed between a track of the outermost edge portion of the blade 51 during advancement and the surface of the powder layer is 10°: The advancing speed into the powder layer in the perpendicular direction is 11 mm/s (blade advancement speed in the powder layer in the vertical direction=(rotational speed of blade)×tan (helix angle×π/180)): and The measurement is carried out under the condition of temperature of 24 degree C. and relative humidity of 55%

The bulk density of the developer when the fluidity energy of the developer is measured is close to that when the experiments for verifying the relation between the discharge amount of the developer and the size of the discharge opening, is less changing and is stable, and more particularly is adjusted to be 0.5 g/cm^3.

Figure 48:
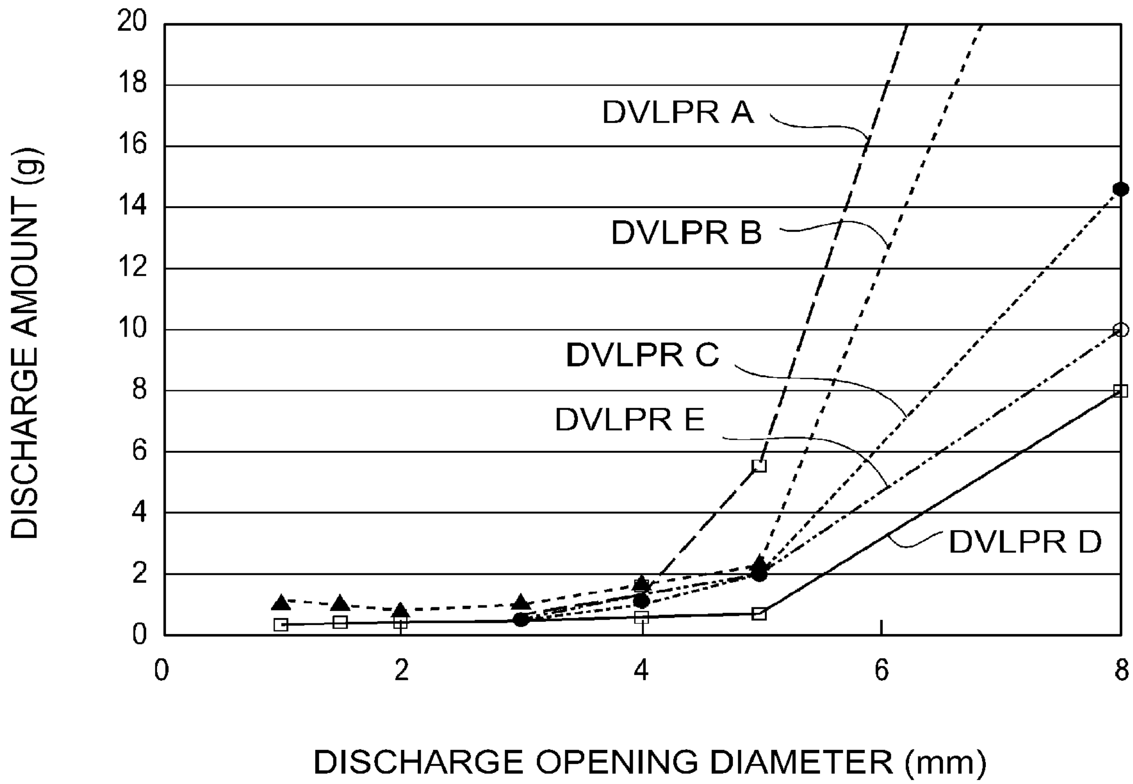
FIG. 48 is a graph showing a relation between a diameter of the discharge opening and a discharge amount.

The verification experiments were carried out for the developers (Table 2) with the measurements of the fluidity energy in such a manner. FIG. 48 is a graph showing relations between the diameters of the discharge openings and the discharge amounts with respect to the respective developers From the verification results shown in FIG. 48, it has been confirmed that the discharge amount through the discharge opening is not more than 2 g for each of the developers A-E, if the diameter φ of the discharge opening is not more than 4 mm (12.6 mm^2 in the opening area (circle ratio=3.14)). When the diameter φ discharge opening exceeds 4 mm, the discharge amount increases sharply.

The diameter φ of the discharge opening is preferably not more than 4 mm (12.6 mm^2 of the opening area) when the fluidity energy of the developer (0.5 g/cm^3 of the bulk density) is not less than 4.3×10−4 kg-m^2/s^2 (J) and not more than 4.14×10^−3 kg-m^2/s^2 (J).

As for the bulk density of the developer, the developer has been loosened and fluidized sufficiently in the verification experiments, and therefore, the bulk density is lower than that expected in the normal use condition (left state), that is, the measurements are carried out in the condition in which the developer is more easily discharged than in the normal use condition.

Figure 49:
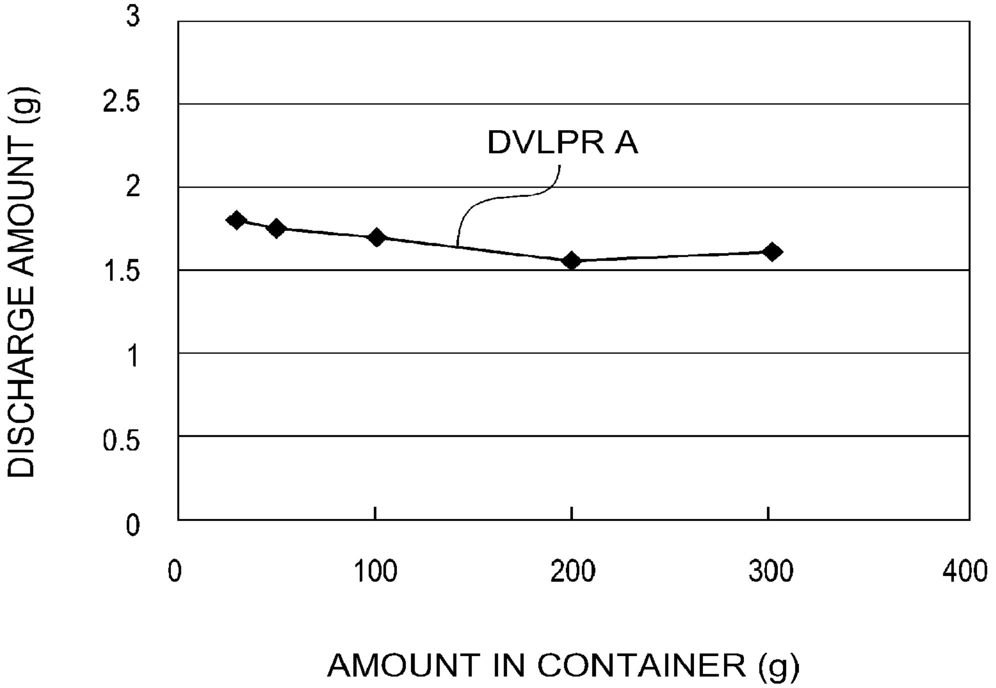
FIG. 49 is a graph showing a relation between a filling amount in the container and the discharge amount.

The verification experiments were carries out as to the developer A with which the discharge amount is the largest in the results of FIG. 48, wherein the filling amount in the container were changed in the range of 30-300 g while the diameter ϕ of the discharge opening is constant at 4 mm. The verification results are shown in part (b) of FIG. 49. From the results of FIG. 49, it has been confirmed that the discharge amount through the discharge opening hardly changes even if the filling amount of the developer changes.

From the foregoing, it has been confirmed that by making the diameter φ of the discharge opening not more than 4 mm (12.6 mm^2 in the area), the developer is not discharged sufficiently only by the gravitation through the discharge opening in the state that the discharge opening is directed downwardly (supposed supplying attitude into the developer receiving apparatus 201 irrespective of the kind of the developer or the bulk density state.

On the other hand, the lower limit value of the size of the discharge opening 1*c* is preferably such that the developer to be supplied from the developer supply container 1 (one component magnetic toner, one component non-magnetic toner, two component non-magnetic toner or two component magnetic carrier) can at least pass therethrough. More particularly, the discharge opening is preferably larger than a particle size of the developer (volume average particle size in the case of toner, number average particle size in the case of carrier) contained in the developer supply container 1. For example, in the case that the supply developer comprises two component non-magnetic toner and two component magnetic carrier, it is preferable that the discharge opening is larger than a larger particle size, that is, the number average particle size of the two component magnetic carrier.

Specifically, in the case that the supply developer comprises two component non-magnetic toner having a volume average particle size of 5.5 μm and a two component magnetic carrier having a number average particle size of 40 μm, the diameter of the discharge opening 1*c* is preferably not less than 0.05 mm (0.002 mm^2 in the opening area).

If, however, the size of the discharge opening 1*c* is too close to the particle size of the developer, the energy required for discharging a desired amount from the developer supply container 1, that is, the energy required for operating the pump portion 5 is large. It may be the case that a restriction is imparted to the manufacturing of the developer supply container 1. When the discharge opening 1*c* is formed in a resin material part using an injection molding method, a durable of a metal mold part forming the portion of the discharge opening 1*c* has to be high. From the foregoing, the diameter φ of the discharge opening 1*c* is preferably not less than 0.5 mm.

In this example, the configuration of the discharge opening 1*c* is circular, but this is not inevitable. A square, a rectangular, an ellipse or a combination of lines and curves or the like are usable if the opening area is not more than 12.6 mm^2 which is the opening area corresponding to the diameter of 4 mm.

However, a circular discharge opening has a minimum circumferential edge length among the configurations having the same opening area, the edge being contaminated by the deposition of the developer. Therefore, the amount of the developer dispersing with the opening and closing operation of the shutter 5 is small, and therefore, the contamination is decreased. In addition, with the circular discharge opening, a resistance during discharging is also small, and a discharging property is high. Therefore, the configuration of the discharge opening 1*c* is preferably circular which is excellent in the balance between the discharge amount and the contamination prevention.

From the foregoing, the size of the discharge opening 1*c* is preferably such that the developer is not discharged sufficiently only by the gravitation in the state that the discharge opening 1*c* is directed downwardly (supposed supplying attitude into the developer receiving apparatus 8). More particularly, a diameter φ of the discharge opening 1*c* is not less than 0.05 mm (0.002 mm^2 in the opening area) and not more than 4 mm (12.6 mm^2 in the opening area). Furthermore, the diameter φ of the discharge opening 1*c* is preferably not less than 0.5 mm (0.2 mm^2 in the opening area and not more than 4 mm (12.6 mm^2 in the opening area). In this example, on the basis of the foregoing investigation, the discharge opening 1*c* is circular, and the diameter φ of the opening is 2 mm.

In this example, the number of discharge openings 1*c* is one, but this is not inevitable, and a plurality of discharge openings 1*c* a total opening area of the opening areas satisfies the above-described range. For example, in place of one developer receiving port 8*a* having a diameter φ of 2 mm, two discharge openings 3*a* each having a diameter φ of 0.7 mm are employed. However, in this case, the discharge amount of the developer per unit time tends to decrease, and therefore, one discharge opening 1*c* having a diameter φ of 2 mm is preferable.

(Developer Supplying Step)

Figure 50:
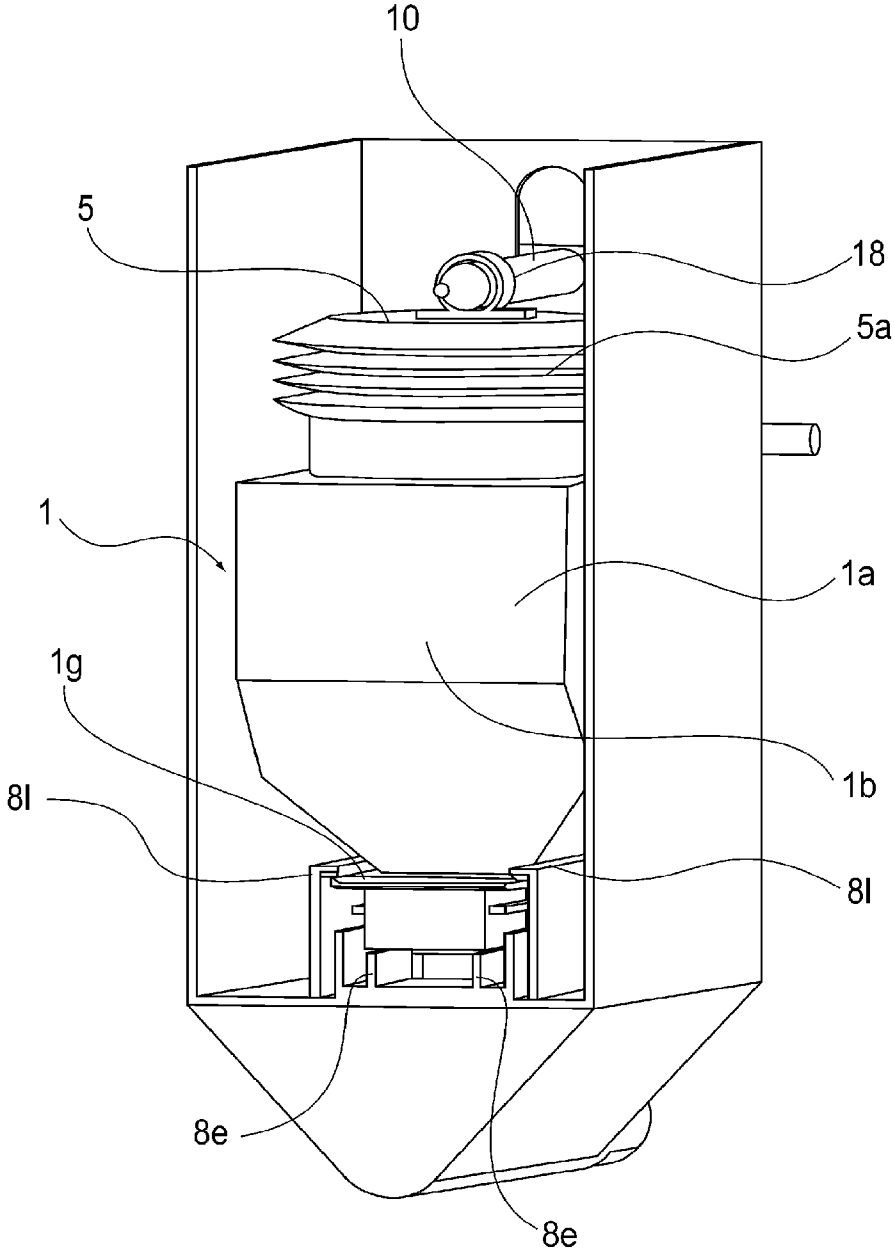
FIG. 50 is a perspective view illustrating parts of operation states of the developer supply container and the developer receiving apparatus.
Figure 51:
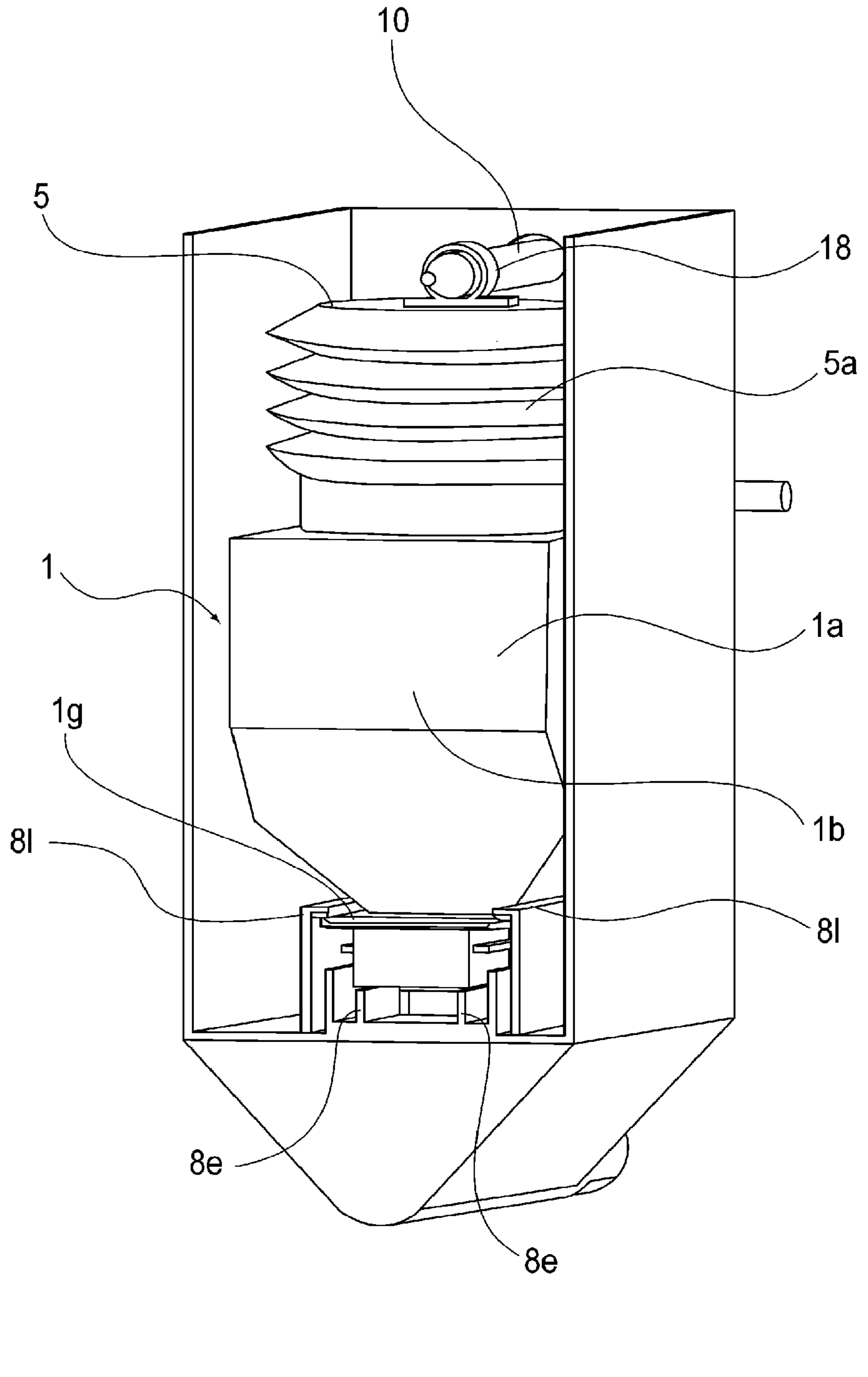
FIG. 51 is a perspective view of the developer supply container and the developer receiving apparatus.
Figure 53:
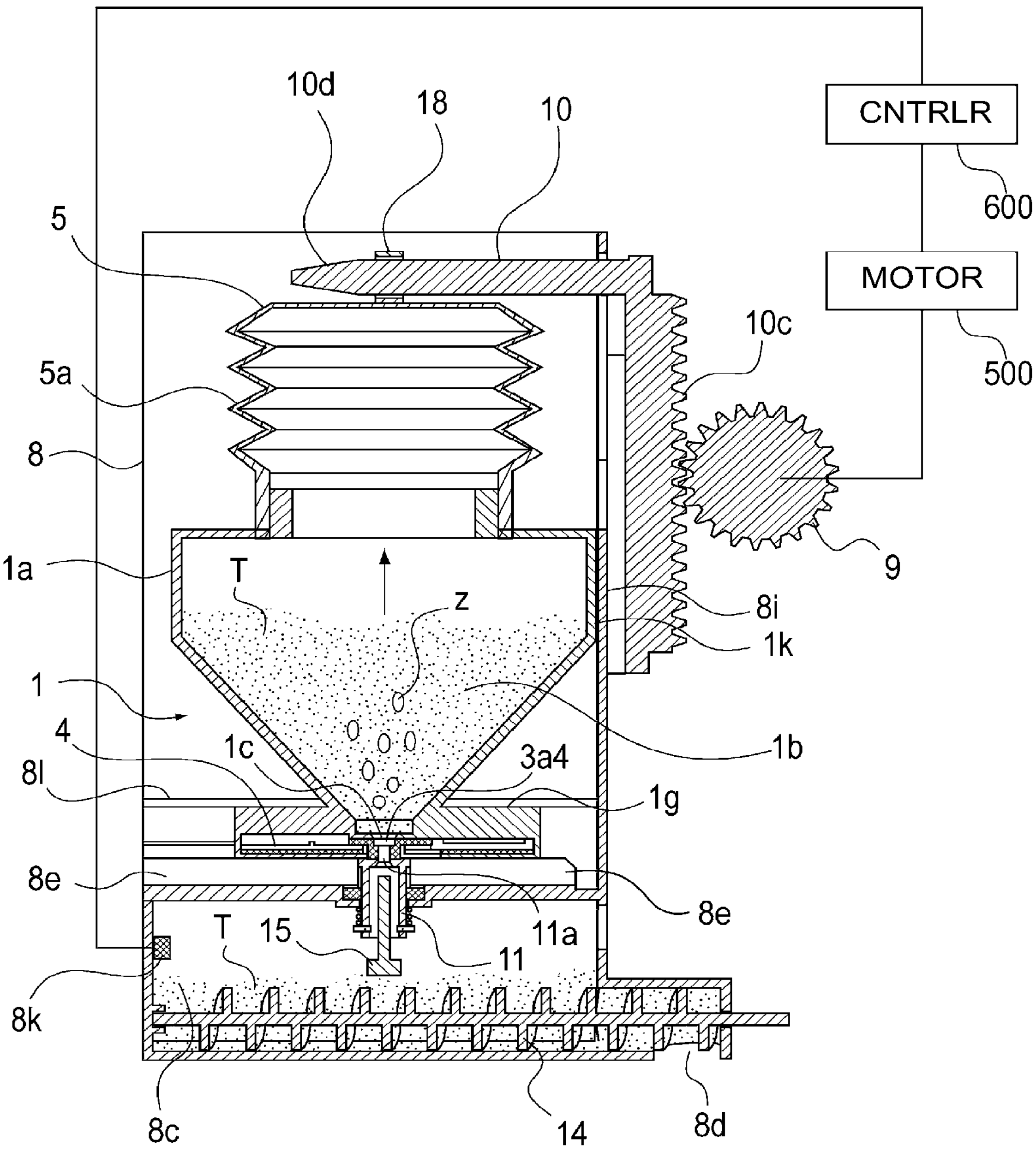
FIG. 53 is a sectional view of the developer supply container and the developer receiving apparatus.

Referring to FIGS. 50-53, a developer supplying step by the pump portion will be described. FIG. 50 is a schematic perspective view in which the expansion-and-contraction portion 5*a* of the pump portion 5 is contracted. FIG. 51 is a schematic perspective view in which the expansion-and-contraction portion 5*a* of the pump portion 5 is expanded. FIG. 52 is a schematic sectional view in which the expansion-and-contraction portion 5*a* of the pump portion 5 is contracted. FIG. 53 is a schematic sectional view in which the expansion-and-contraction portion 5*a* of the pump portion 5 is expanded.

In this example, as will be described hereinafter, the drive conversion of the rotational force is carries out by the drive converting mechanism so that the suction step (sucking operation through discharge opening 3*a*) and the discharging step (discharging operation through the discharge opening 3*a*) are repeated alternately. The suction step and the discharging step will be described.

The description will be made as to a developer discharging principle using a pump.

The operation principle of the expansion-and-contraction portion 5*a* of the pump portion 5 is as has been in the foregoing. Stating briefly, as shown in FIG. 45, the lower end of the expansion-and-contraction portion 5*a* is connected to the container body 1*a*. The container body 1*a* is prevented in the movement in the arrow p direction and in the arrow q direction (FIG. 44) by the positioning guide 81 of the developer supplying apparatus 8 through the upper flange portion 1*g* at the lower end. Therefore, the vertical position of the lower end of the expansion-and-contraction portion 5*a* connected with the container body 1*a* is fixed relative to the developer receiving apparatus 8.

On the other hand, the upper end of the expansion-and-contraction portion 5*a* is engaged with the locking member 10 through the locking portion 18, and is reciprocated in the arrow p direction and in the arrow q direction by the vertical movement of the locking member 10.

Since the lower end of the expansion-and-contraction portion 5*a* of the pump portion 5 is fixed, the portion thereabove expands and contracts.

The description will be made as to expanding-and-contracting operation (discharging operation and sucking operation) of the expansion-and-contraction portion 5*a* of the pump portion 5 and the developer discharging.

(Discharging Operation)

First, the discharging operation through the discharge opening 1*c* will be described.

With the downward movement of the locking member 10, the upper end of the expansion-and-contraction portion 5*a* displaces in the p direction (contraction of the expansion-and-contraction portion), by which discharging operation is effected. More particularly, with the discharging operation, the volume of the developer accommodating space 1*b* decreases. At this time, the inside of the container body 1*a* is sealed except for the discharge opening 1*c*, and therefore, until the developer is discharged, the discharge opening 1*c* is substantially clogged or closed by the developer, so that the volume in the developer accommodating space 1*b* decreases to increase the internal pressure of the developer accommodating space 1*b*. Therefore, the volume of the developer accommodating space 1*b* decreases, so that the internal pressure of the developer accommodating space 1*b* increases.

Then, the internal pressure of the developer accommodating space 1*b* becomes higher than the pressure in the hopper 8*c* (substantially equivalent to the ambient pressure). Therefore, as shown in FIG. 52, the developer T is pushed out by the air pressure due to the pressure difference (difference pressure relative to the ambient pressure). Thus, the developer T is discharged from the developer accommodating space 1*b* into the hopper 8*c*. An arrow in FIG. 52 indicates a direction of a force applied to the developer T in the developer accommodating space 1*b*.

Thereafter, the air in the developer accommodating space 1*b* is also discharged together with the developer, and therefore, the internal pressure of the developer accommodating space 1*b* decreases.

(Sucking Operation)

The sucking operation through the discharge opening 1*c* will be described.

With upward movement of the locking member 10, the upper end of the expansion-and-contraction portion 5*a* of the pump portion 5 displaces in the p direction (the expansion-and-contraction portion expands) so that the sucking operation is effected. More particularly, the volume of the developer accommodating space 1*b* increases with the sucking operation. At this time, the inside of the container body 1*a* is sealed except of the discharge opening 1*c*, and the discharge opening 1*c* is clogged by the developer and is substantially closed. Therefore, with the increase of the volume in the developer accommodating space 1*b*, the internal pressure of the developer accommodating space 1*b* decreases.

The internal pressure of the developer accommodating space 1*b* at this time becomes lower than the internal pressure in the hopper 8*c* (substantially equivalent to the ambient pressure). Therefore, as shown in FIG. 53, the air in the upper portion in the hopper 8*c* enters the developer accommodating space 1*b* through the discharge opening 1*c* by the pressure difference between the developer accommodating space 1*b* and the hopper 8*gc*. An arrow in FIG. 53 indicates a direction of a force applied to the developer T in the developer accommodating space 1*b*. Ovals Z in FIG. 53 schematically show the air taken in from the hopper 8*c*.

At this time, the air is taken-in from the outside of the developer receiving device 8 side, and therefore, the developer in the neighborhood of the discharge opening 1*c* can be loosened. More particularly, the air impregnated into the developer powder existing in the neighborhood of the discharge opening 1*c*, reduces the bulk density of the developer powder and fluidizing.

In this manner, by the fluidization of the developer T, the developer T does not pack or clog in the discharge opening 3*a*, so that the developer can be smoothly discharged through the discharge opening 3*a* in the discharging operation which will be described hereinafter. Therefore, the amount of the developer T (per unit time) discharged through the discharge opening 1*c* can be maintained substantially at a constant level for a long term.

(Change of Internal Pressure of Developer Accommodating Portion)

Verification experiments were carried out as to a change of the internal pressure of the developer supply container 1 The verification experiments will be described The developer is filled such that the developer accommodating space 1*b* in the developer supply container 1 is filled with the developer; and the change of the internal pressure of the developer supply container 1 is measured when the pump portion 5 is expanded and contracted in the range of 15 cm^3 of volume change. The internal pressure of the developer supply container 1 is measured using a pressure gauge (AP-C40 available from Kabushiki Kaisha KEYENCE) connected with the developer supply container 1.

Figure 54:
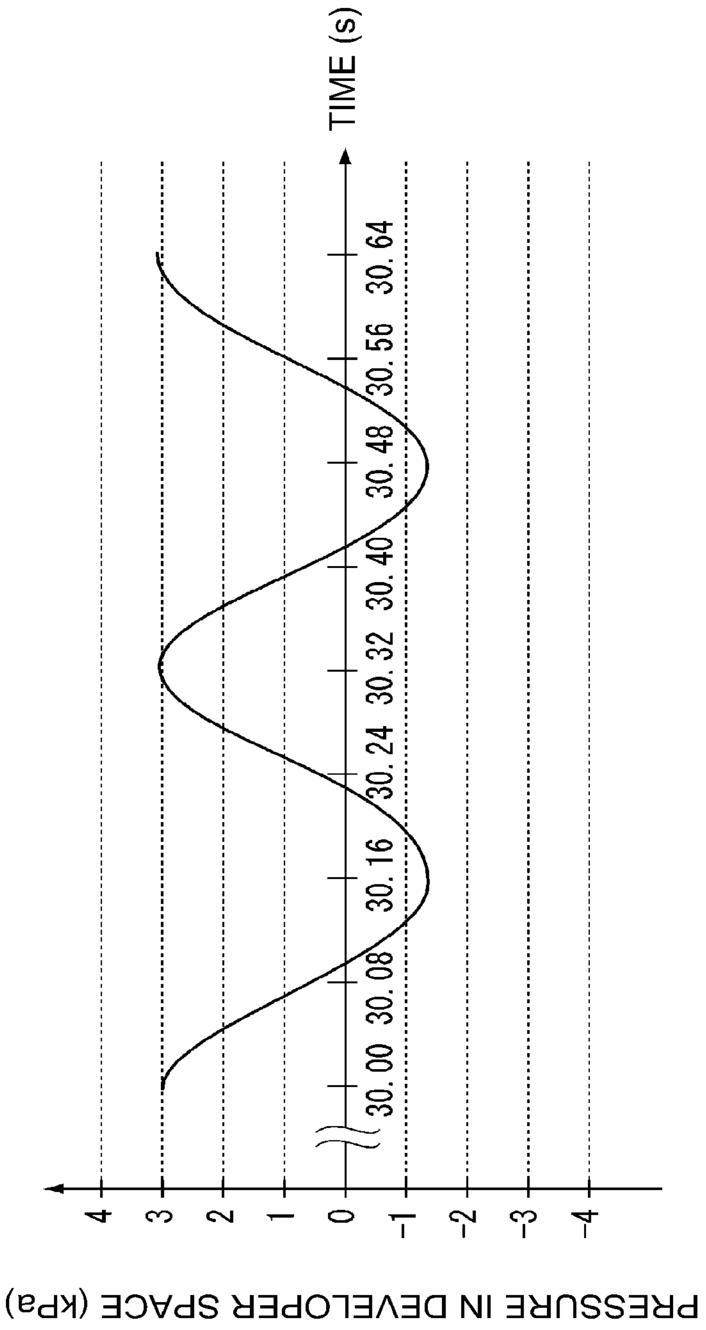
FIG. 54 illustrates a change of an internal pressure of the developer accommodating portion in the apparatus and the system according to Embodiment 4 of the present invention.

FIG. 54 shows a pressure change when the pump portion 5 is expanded and contracted in the state that the shutter 4 of the developer supply container 1 filled with the developer is open, and therefore, in the communicatable state with the outside air.

In FIG. 54, the abscissa represents the time, and the ordinate represents a relative pressure in the developer supply container 1 relative to the ambient pressure (reference (0)) (+ is a positive pressure side, and − is a negative pressure side).

When the internal pressure of the developer supply container 1 becomes negative relative to the outside ambient pressure by the increase of the volume of the developer supply container 1, the air is taken in through the discharge opening 1*c* by the pressure difference. When the internal pressure of the developer supply container 1 becomes positive relative to the outside ambient pressure by the decrease of the volume of the developer supply container 1, a pressure is imparted to the inside developer by the pressure difference. At this time, the inside pressure eases corresponding to the discharged developer and air.

By the verification experiments, it has been confirmed that by the increase of the volume of the developer supply container 1, the internal pressure of the developer supply container 1 becomes negative relative to the outside ambient pressure, and the air is taken in by the pressure difference. In addition, it has been confirmed that by the decrease of the volume of the developer supply container 1, the internal pressure of the developer supply container 1 becomes positive relative to the outside ambient pressure, and the pressure is imparted to the inside developer so that the developer is discharged. In the verification experiments, an absolute value of the negative pressure is 1.3 kPa, and an absolute value of the positive pressure is 3.0 kPa.

As described in the foregoing, with the structure of the developer supply container 1 of this example, the internal pressure of the developer supply container 1 switches between the negative pressure and the positive pressure alternately by the sucking operation and the discharging operation of the pump portion 5, and the discharging of the developer is carried out properly.

As described in the foregoing, in this example, a simple and easy pump capable of effecting the sucking operation and the discharging operation of the developer supply container 1 is provided, by which the discharging of the developer by the air can be carries out stably while providing the developer loosening effect by the air.

In other words, with the structure of the example, even when the size of the discharge opening 1*c* is extremely small, a high discharging performance can be assured without imparting great stress to the developer since the developer can be passed through the discharge opening 1*c* in the state that the bulk density is small because of the fluidization.

In addition, in this example, the inside of the displacement type pump portion 5 is utilized as a developer accommodating space, and therefore, when the internal pressure is reduced by increasing the volume of the pump portion 5, an additional developer accommodating space can be formed. Therefore, even when the inside of the pump portion 5 is filled with the developer, the bulk density can be decreased (the developer can be fluidized) by impregnating the air in the developer powder. Therefore, the developer can be filled in the developer supply container 1 with a higher density than in the conventional art.

In the foregoing, the inside space in the pump portion 5 is used as a developer accommodating space 1*b*, but in an alternative, a filter which permits passage of the air but prevents passage of the toner may be provided to partition between the pump portion and the developer accommodating space 1*b*. However, the embodiment described in the form of is preferable in that when the volume of the pump 5 increases, an additional developer accommodating space can be provided (Developer Loosening Effect in Suction Step)

Verification has been carried out as to the developer loosening effect by the sucking operation through the discharge opening 1*c* in the suction step. When the developer loosening effect by the sucking operation through the discharge opening 1*c* is significant, a low discharge pressure (small volume change of the pump) is enough, in the subsequent discharging step, to start immediately the discharging of the developer from the developer supply container 1. This verification is to demonstrate remarkable enhancement of the developer loosening effect in the structure of this example. This will be described in detail.

Figure 55:
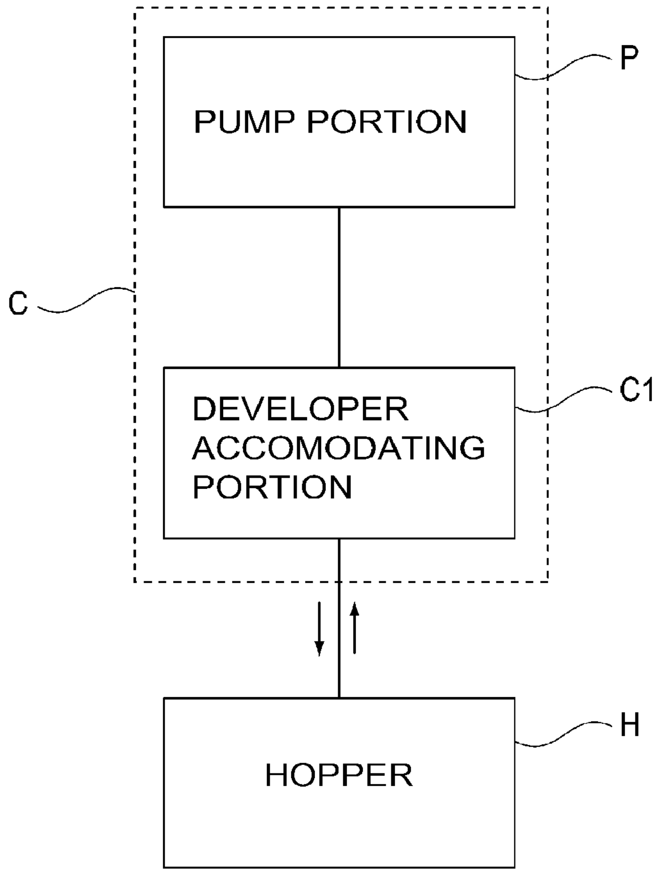
In FIG. 55, (a) is a block diagram of a developer supplying system (Embodiment 4) used in a verification experiment, and (b) is a schematic view illustrating a phenomenon—in the developer supply container.
Figure 55:
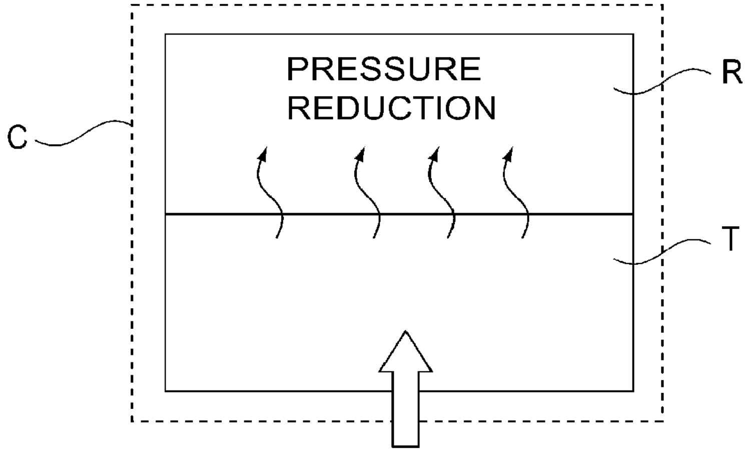
Figure 56:
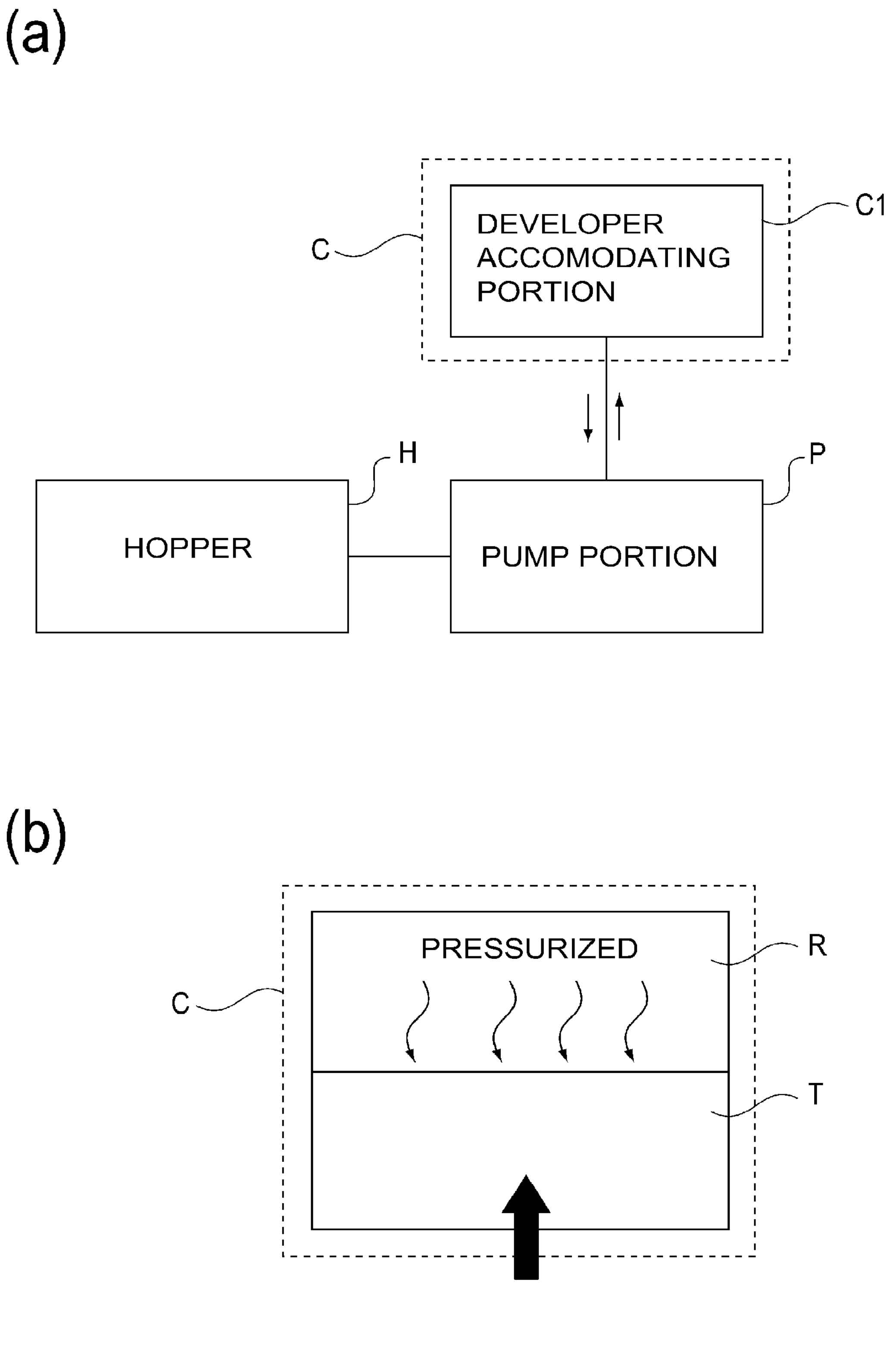
In FIG. 56, (a) is a block diagram of a developer supplying system (comparison example) used in the verification experiment, and (b) is a schematic FIGURE of a phenomenon—in the developer supply container.

Part (a) of FIG. 55 and part (a) of FIG. 56 are block diagrams schematically showing a structure of the developer supplying system used in the verification experiment. Part (b) of FIG. 55 and part (b) of FIG. 56 are schematic views showing a phenomenon-occurring in the developer supply container. The system of FIG. 55 is analogous to this example, and a developer supply container C is provided with a developer accommodating portion C1 and a pump portion P. By the expanding-and-contracting operation of the pump portion P, the sucking operation and the discharging operation through a discharge opening (the discharge opening 1*c* of this example (unshown)) of the developer supply container C are carried out alternately to discharge the developer into a hopper H. On the other hand, the system of FIG. 56 is a comparison example wherein a pump portion P is provided in the developer receiving apparatus side, and by the expanding-and-contracting operation of the pump portion P, an air-supply operation into the developer accommodating portion C1 and the sucking operation from the developer accommodating portion C1 are carried out alternately to discharge the developer into a hopper H. In FIGS. 55 and 56, the developer accommodating portions C1 have the same internal volumes, the hoppers H have the same internal volumes, and the pump portions P have the same internal volumes (volume change amounts).

First, 200 g of the developer is filled into the developer supply container C.

Then, the developer supply container C is shaken for 15 minutes in view of the state after transportation, and thereafter, it is connected to the hopper H.

The pump portion P is operated, and a peak value of the internal pressure in the sucking operation is measured as a condition of the suction step required for starting the developer discharging immediately in the discharging step. In the case of FIG. 55, the start position of the operation of the pump portion P corresponds to 480 cm^3 of the volume of the developer accommodating portion C1, and in the case of FIG. 56, the start position of the operation of the pump portion P corresponds to 480 cm^3 of the volume of the hopper H.

In the experiments of the structure of FIG. 56, the hopper H is filled with 200 g of the developer beforehand to make the conditions of the air volume the same as with the structure of FIG. 55. The internal pressures of the developer accommodating portion C1 and the hopper H are measured by the pressure gauge (AP-C40 available from Kabushiki Kaisha KEYENCE) connected to the developer accommodating portion C1.

As a result of the verification, according to the system analogous to this example shown in FIG. 55, if the absolute value of the peak value (negative pressure) of the internal pressure at the time of the sucking operation is at least 1.0 kPa, the developer discharging can be immediately started in the subsequent discharging step. In the comparison example system shown in FIG. 56, on the other hand, unless the absolute value of the peak value (positive pressure) of the internal pressure at the time of the sucking operation is at least 1.7 kPa, the developer discharging cannot be immediately started in the subsequent discharging step.

It has been confirmed that using the system of FIG. 55 similar to the example, the suction is carries out with the volume increase of the pump portion P, and therefore, the internal pressure of the developer supply container C can be lower (negative pressure side) than the ambient pressure (pressure outside the container), so that the developer solution effect is remarkably high. This is because as shown in part (b) of FIG. 55, the volume increase of the developer accommodating portion C1 with the expansion of the pump portion P provides pressure reduction state (relative to the ambient pressure) of the upper portion air layer of the developer layer T. For this reason, the forces are applied in the directions to increase the volume of the developer layer T due to the decompression (wave line arrows), and therefore, the developer layer can be loosened efficiently. Furthermore, in the system of FIG. 55, the air is taken in from the outside into the developer supply container C1 by the decompression (white arrow), and the developer layer T is solved also when the air reaches the air layer R, and therefore, it is a very good system. As a proof of the loosening of the developer in the developer supply container C in the, experiments, it has been confirmed that in the sucking operation, the apparent volume of the whole developer increases (the level of the developer rises).

In the case of the system of the comparison example shown in FIG. 56, the internal pressure of the developer supply container C is raised by the air-supply operation to the developer supply container C up to a positive pressure (higher than the ambient pressure), and therefore, the developer is agglomerated, and the developer solution effect is not obtained. This is because as shown in part (b) of FIG. 56, the air is fed forcedly from the outside of the developer supply container C, and therefore, the air layer R above the developer layer T becomes positive relative to the ambient pressure. For this reason, the forces are applied in the directions to decrease the volume of the developer layer T due to the pressure (wave line arrows), and therefore, the developer layer T is packed. Actually, a phenomenon—has been confirmed that the apparent volume of the whole developer in the developer supply container C increases upon the sucking operation in this comparison example. Accordingly, with the system of FIG. 56, there is a liability that the packing of the developer layer T disables subsequent proper developer discharging step.

In order to prevent the packing of the developer layer T by the pressure of the air layer R, it would be considered that an air vent with a filter or the like is provided at a position corresponding to the air layer R thereby reducing the pressure rise. However, in such a case, the flow resistance of the filter or the like leads to a pressure rise of the air layer R. However, in such a case, the flow resistance of the filter or the like leads to a pressure rise of the air layer R. Even if the pressure rise were eliminated, the loosening effect by the pressure reduction state of the air layer R described above cannot be provided.

From the foregoing, the significance of the function of the sucking operation a discharge opening with the volume increase of the pump portion by employing the system of this example has been confirmed.

As described above, by the repeated alternate sucking operation and the discharging operation of the pump portion 2, the developer can be discharged through the discharge opening 1*c* of the developer supply container 1. That is, in this example, the discharging operation and the sucking operation are not in parallel or simultaneous, but are alternately repeated, and therefore, the energy required for the discharging of the developer can be minimized.

On the other hand, in the case that the developer receiving apparatus includes the air-supply pump and the suction pump, separately, it is necessary to control the operations of the two pumps, and in addition it is not easy to rapidly switch the air-supply and the suction alternately.

In this example, one pump is effective to efficiently discharge the developer, and therefore, the structure of the developer discharging mechanism can be simplified.

In the foregoing, the discharging operation and the sucking operation of the pump are repeated alternately to efficiently discharge the developer, but in an alternative structure, the discharging operation or the sucking operation is temporarily stopped and then resumed.

For example, the discharging operation of the pump is not effected monotonically, but the compressing operation may be once stopped partway and then resumed to discharge. The same applies to the sucking operation. Each operation may be made in a multi-stage form as long as the discharge amount and the discharging speed are enough. It is still necessary that after the multi-stage discharging operation, the sucking operation is effected, and they are repeated.

In this example, the internal pressure of the developer accommodating space 1*b* is reduced to take the air through the discharge opening 1*c* to loosen the developer. On the other hand, in the above-described conventional example, the developer is loosened by feeding the air into the developer accommodating space 1*b* from the outside of the developer supply container 1, but at this time, the internal pressure of the developer accommodating space 1*b* is in a compressed state with the result of agglomeration of the developer. This example is preferable since the developer is loosened in the pressure reduced state in which is the developer is not easily agglomerated.

Furthermore, also according to this example, the mechanism for connecting and separating the developer receiving portion 11 relative to the developer supply container 1 by displacing the developer receiving portion 11 can be simplified, similarly to Embodiments 1 and 2. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

In a conventional structure, a large space is required to avoid an interference with the developing device in the upward and downward movement, but according to this example, such a large space is unnecessary so that the upsizing of the image forming apparatus can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 5

Figure 57:
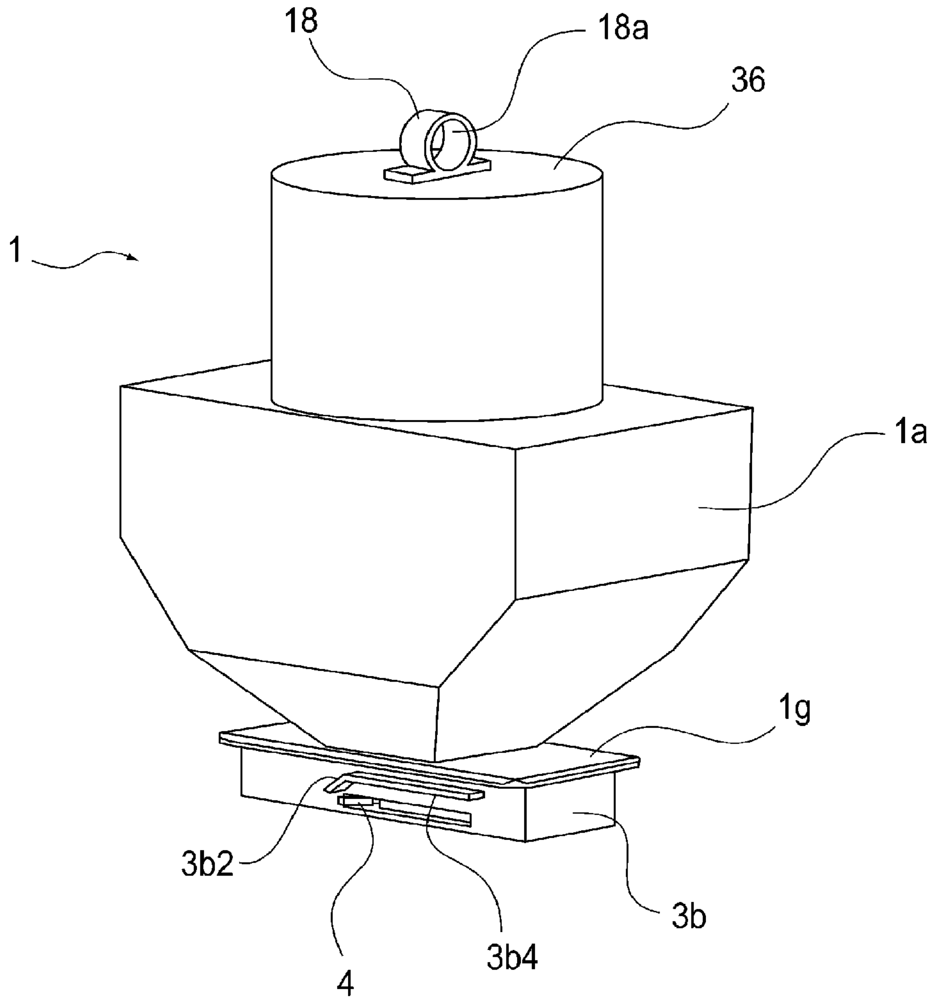
FIG. 57 is a perspective view of a developer supply container according to Embodiment 5.
Figure 58:
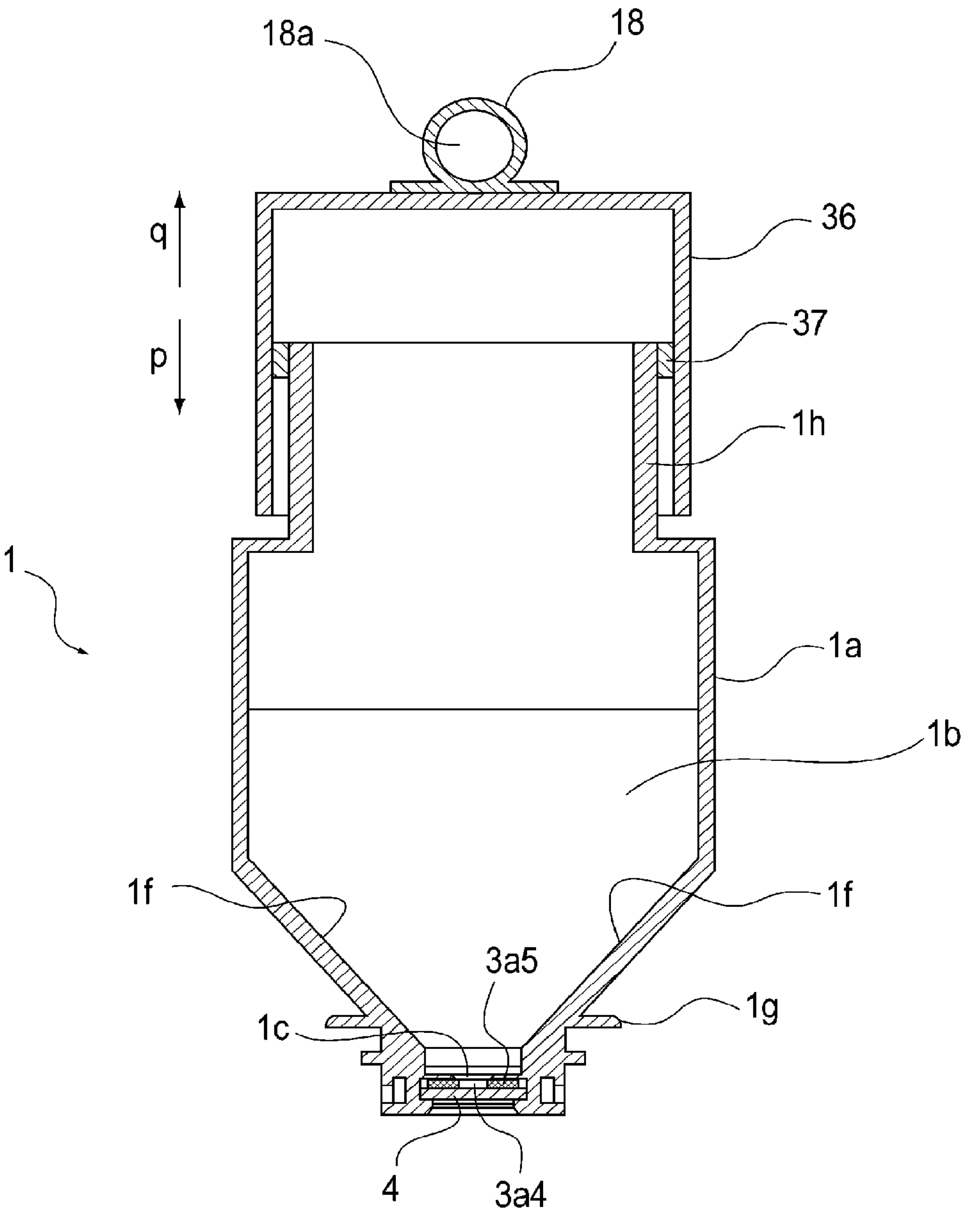
FIG. 58 is a sectional view of the developer supply container of FIG. 57.

Referring to FIGS. 57, 58, a structure of the Embodiment 5 will be described. FIG. 57 is a schematic perspective view of a developer supply container 1, and FIG. 58 is a schematic sectional view of the developer supply container 1. In this example, the structure of the pump is different from that of Embodiment 4, and the other structures are substantially the same as with Embodiment 4. In the description of this embodiment, the same reference numerals as in Embodiment 4 are assigned to the elements having the corresponding functions in this embodiment, and the detailed description thereof is omitted.

In this example, as shown in FIGS. 57, 58, a plunger type pump is used in place of the bellow-like displacement type pump as in Embodiment 4. More specifically, the plunger type pump of this example includes an inner cylindrical portion 1*h* and an outer cylindrical portion 6 extending outside the outer surface of the inner cylindrical portion 1*h* and movable relative to the inner cylindrical portion 1*h*. The upper surface of the outer cylindrical portion 36 is provided with a locking portion 18, fixed by bonding similarly to Embodiment 4. More particularly, the locking portion 18 fixed to the upper surface of the outer cylindrical portion 36 receives a locking member 10 of the developer receiving apparatus 8, by which they a substantially unified, the outer cylindrical portion 36 can move in the up and down directions (reciprocation) together with the locking member 10.

The inner cylindrical portion 1*h* is connected with the container body 1*a*, and the inside space thereof functions as a developer accommodating space 1*b*.

In order to prevent leakage of the air through a gap between the inner cylindrical portion 1*h* and the outer cylindrical portion 36 (to prevent leakage of the developer by keeping the hermetical property), a sealing member (elastic seal 7) is fixed by bonding on the outer surface of the inner cylindrical portion 1*h*. The elastic seal 37 is compressed between the inner cylindrical portion 1*h* and the outer cylindrical portion 35.

Therefore, by reciprocating the outer cylindrical portion 36 in the arrow p direction and the arrow q direction relative to the container body 1*a* (inner cylindrical portion 1*h*) fixed non-movably to the developer receiving apparatus 8, the volume in the developer accommodating space 1*b* can be changed (increased and decreased). That is, the internal pressure of the developer accommodating space 1*b* can be repeated alternately between the negative pressure state and the positive pressure state.

Thus, also in this example, one pump is enough to effect the sucking operation and the discharging operation, and therefore, the structure of the developer discharging mechanism can be simplified. In addition, by the sucking operation through the discharge opening, a decompressed state (negative pressure state) can be provided in the developer accommodation supply container, and therefore, the developer can be efficiently loosened.

In this example, the configuration of the outer cylindrical portion 36 is cylindrical, but may be of another form, such as a rectangular section. In such a case, it is preferable that the configuration of the inner cylindrical portion 1*h* meets the configuration of the outer cylindrical portion 36. The pump is not limited to the plunger type pump, but may be a piston pump.

When the pump of this example is used, the seal structure is required to prevent developer leakage through the gap between the inner cylinder and the outer cylinder, resulting in a complicated structure and necessity for a large driving force for driving the pump portion, and therefore, Embodiment 4 is preferable.

In addition, in this example, the developer supply container 1 is provided with the engaging portion similar to Embodiment 4, and therefore, similarly to the above-described embodiments, the mechanism for connecting and separating the developer receiving portion 11 relative to the developer supply container 1 by displacing the developer receiving portion 11 of the developer receiving apparatus 8 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 6

Figure 59:
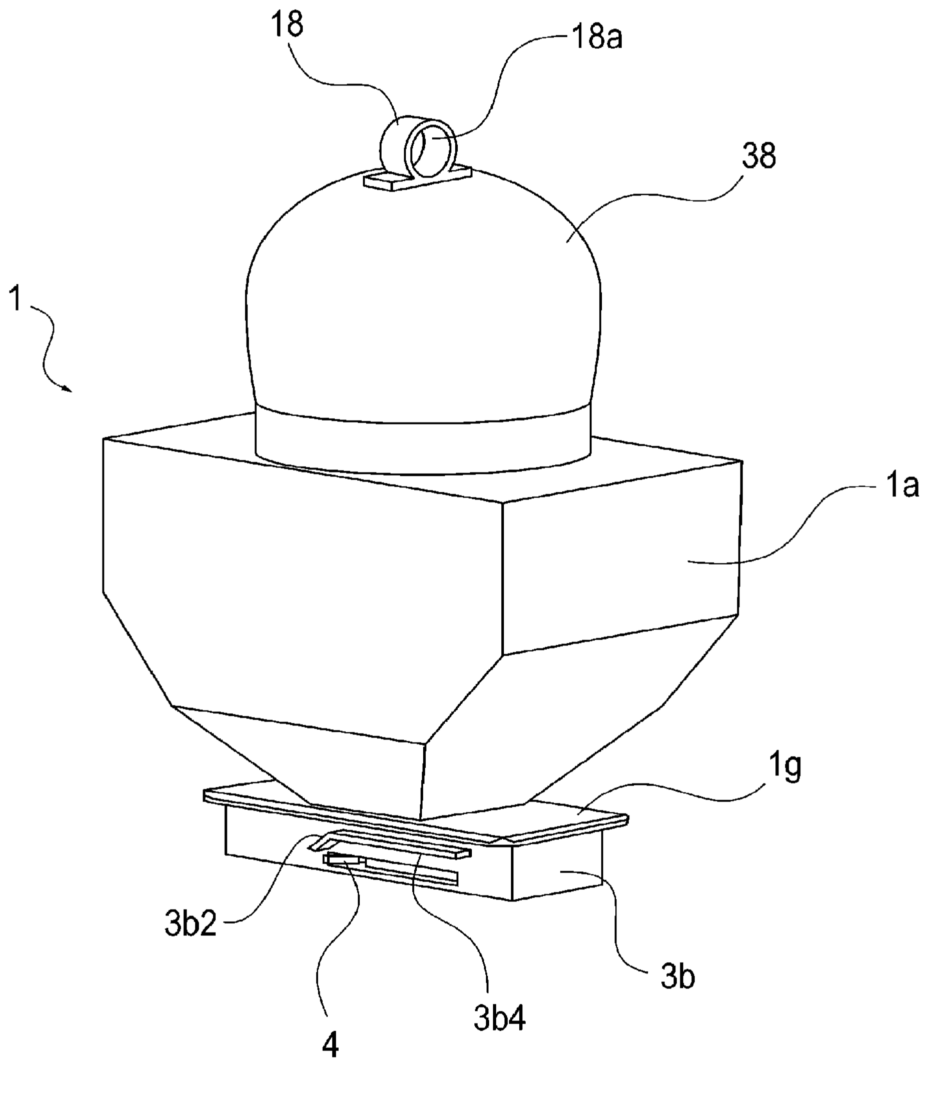
FIG. 59 is a perspective view of a developer supply container according to Embodiment 6.
Figure 60:
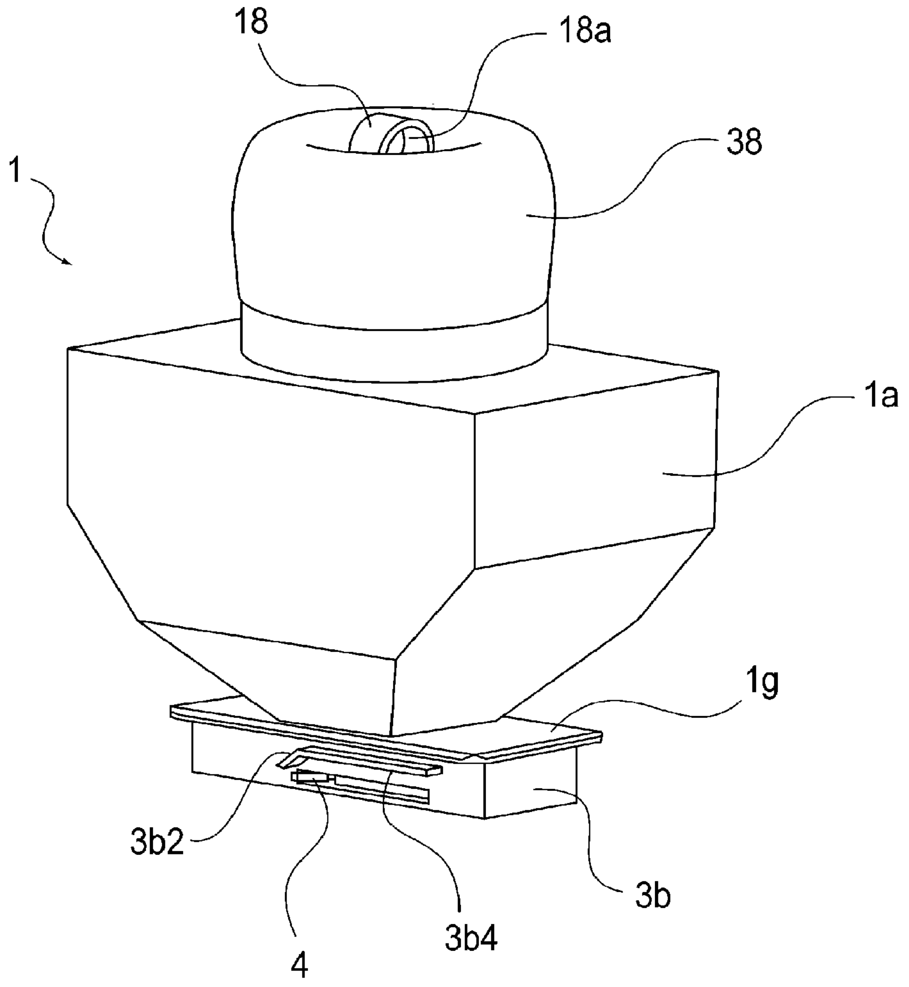
FIG. 60 is a perspective view of a developer supply container according to Embodiment 6.

Referring to FIGS. 59, 60, a structure of the Embodiment 6 will be described. FIG. 59 is a perspective view of an outer appearance in which a pump portion 38 of a developer supply container 1 according to this embodiment is in an expanded state, and FIG. 60 is a perspective view of an outer appearance in which the pump portion 38 of the developer supply container 1 is in a contracted state. In this example, the structure of the pump is different from that of Embodiment 4, and the other structures are substantially the same as with Embodiment 4. In the description of this embodiment, the same reference numerals as in Embodiment 4 are assigned to the elements having the corresponding functions in this embodiment, and the detailed description thereof is omitted.

In this example, as shown in FIGS. 59, 60, in place of a bellow-like pump having folded portions of Embodiment 4, a film-like pump portion 38 capable of expansion and contraction not having a folded portion is used. The film-like portion of the pump portion 38 is made of rubber. The material of the film-like portion of the pump portion 12 may be a flexible material such as resin film rather than the rubber.

The film-like pump portion 38 is connected with the container body 1*a*, and the inside space thereof functions as a developer accommodating space 1*b*. The upper portion of the film-like pump portion 38 is provided with a locking portion 18 fixed thereto by bonding, similarly to the foregoing embodiments. Therefore, the pump portion 38 can alternately repeat the expansion and the contraction by the vertical movement of the locking member 10 (FIG. 38).

In this manner, also in this example, one pump is enough to effect both of the sucking operation and the discharging operation, and therefore, the structure of the developer discharging mechanism can be simplified. In addition, by the sucking operation through the discharge opening, a pressure reduction state (negative pressure state) can be provided in the developer supply container, and therefore, the developer can be efficiently loosened.

Figure 61:
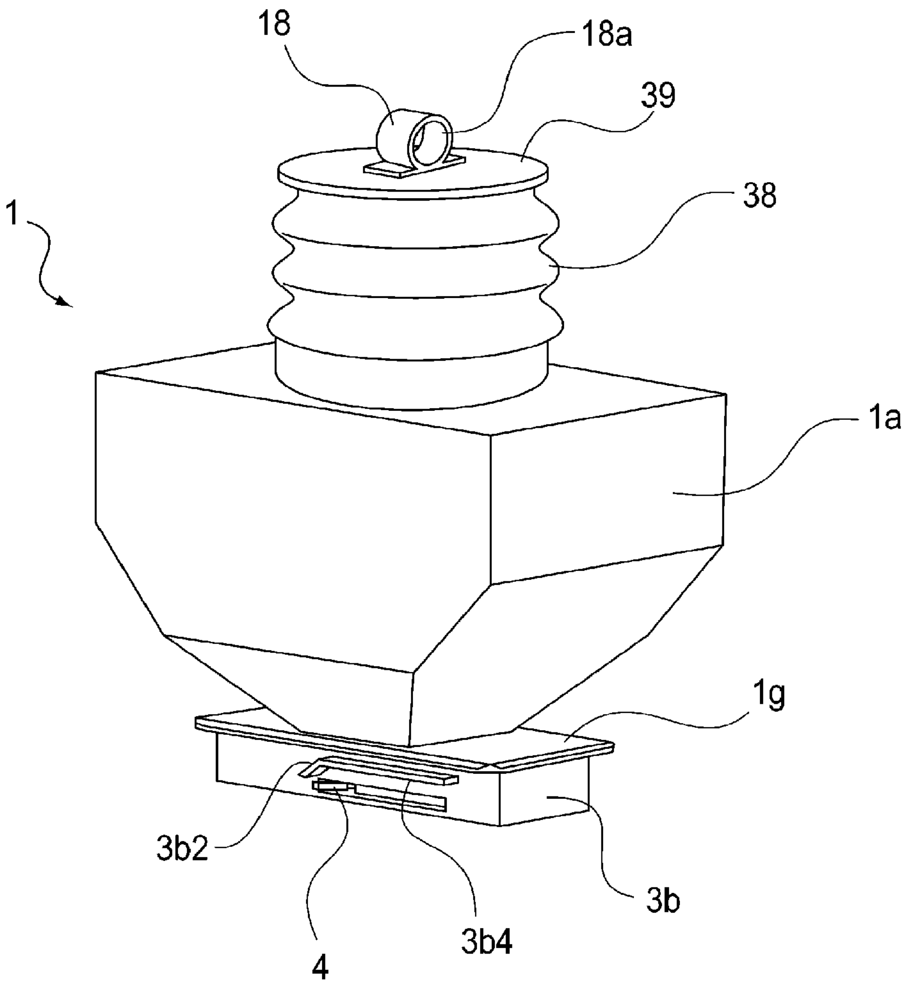
FIG. 61 is a perspective view of a developer supply container according to Embodiment 6.

In the case of this example, as shown in FIG. 61, it is preferable that a plate-like member 39 having a higher rigid than the film-like portion is mounted to the upper surface of the film-like portion of the pump portion 38, and the locking member 18 is provided on the plate-like member 39. With such a structure, it can be suppressed that the amount of the volume change of the pump portion 38 decreases due to deformation of only the neighborhood of the locking portion 18 of the pump portion 38. That is, the followability of the pump portion 38 to the vertical movement of the locking member 10 can be improved, and therefore, the expansion and the contraction of the pump portion 38 can be effected efficiently. Thus, the discharging property of the developer can be improved.

In addition, in this example, the developer supply container 1 is provided with the engaging portion similar to Embodiment 4, and therefore, similarly to the above-described embodiments, the mechanism for connecting and separating the developer receiving portion 11 relative to the developer supply container 1 by displacing the developer receiving portion 11 of the developer receiving apparatus 8 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 7

Figure 62:
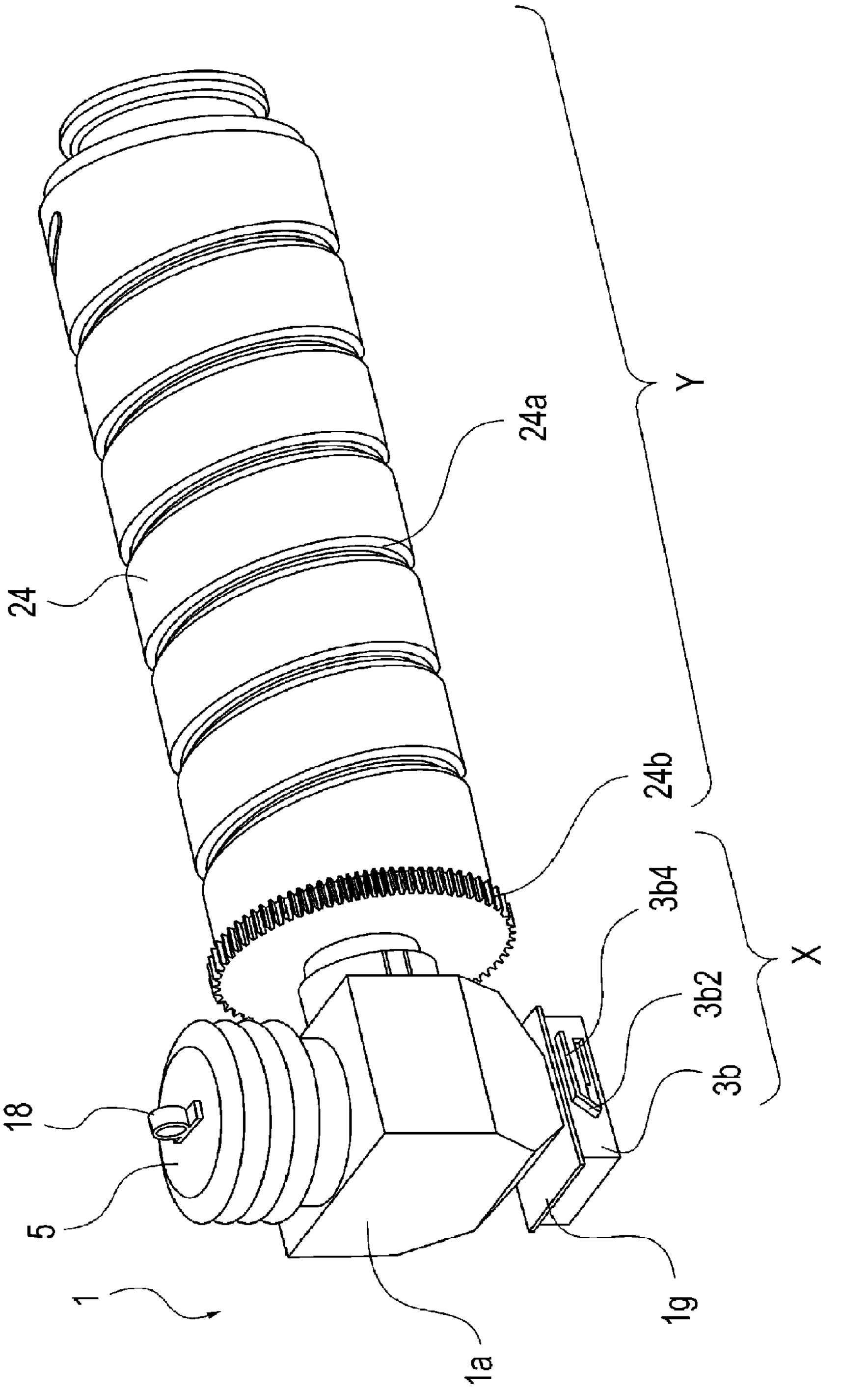
FIG. 62 is a perspective view of a developer supply container according to Embodiment 7.
Figure 63:
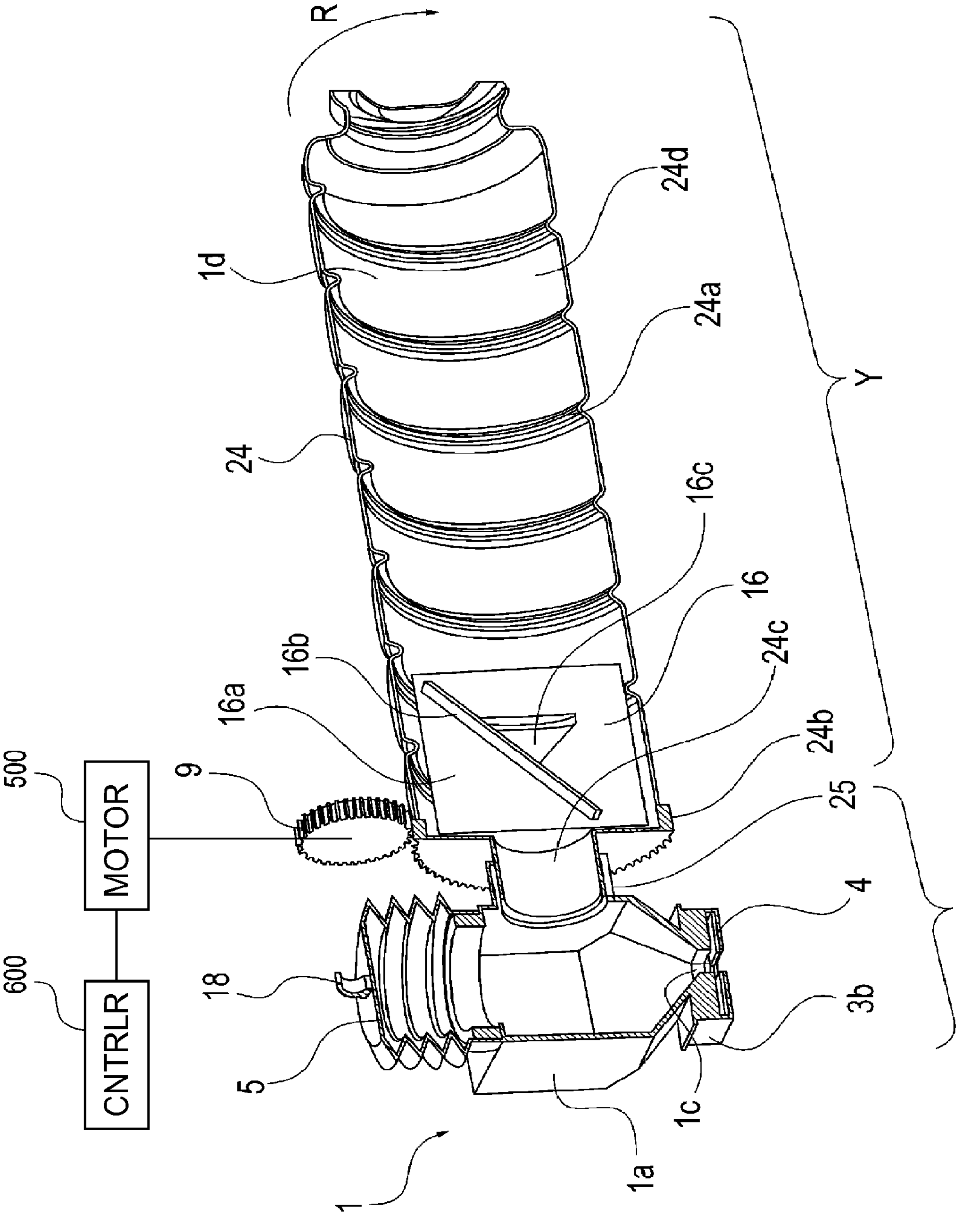
FIG. 63 is a sectional perspective view of a developer supply container according to Embodiment 74.
Figure 64:
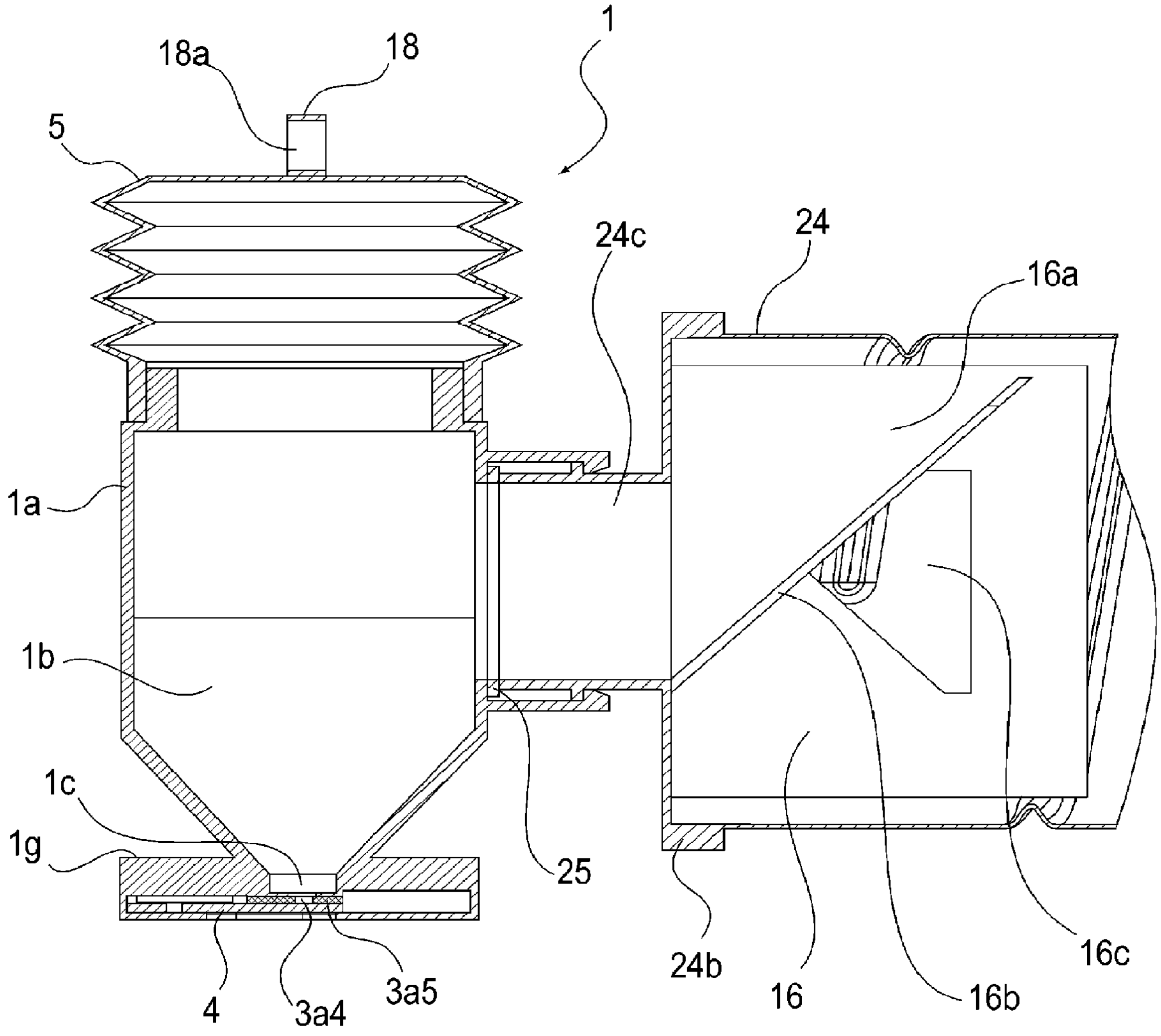
FIG. 64 is a partially sectional view of a developer supply container according to Embodiment 7.

Referring to FIGS. 62-64, a structure of the Embodiment 7 will be described. FIG. 62 is a perspective view of an outer appearance of a developer supply container 1, FIG. 63 is a sectional perspective view of the developer supply container 1, and FIG. 64 is a partially sectional view of the developer supply container 1. In this example, the structure is different from that of Embodiment 4 only in the structure of a developer accommodating space, and the other structure is substantially the same. In the description of this embodiment, the same reference numerals as in Embodiment 4 are assigned to the elements having the corresponding functions in this embodiment, and the detailed description thereof is omitted.

As shown in FIGS. 62, 63, the developer supply container 1 of this example comprises two components, namely, a portion X including a container body 1*a* and a pump portion 5 and a portion Y including a cylindrical portion 24. The structure of the portion X of the developer supply container 1 is substantially the same as that of Embodiment 4, and therefore, detailed description thereof is omitted.

(Structure of Developer Supply Container)

In the developer supply container 1 of this example, as contrasted to Embodiment 4, the cylindrical portion 24 is connected by a connecting portion 14*c* to a side of the portion X (a discharging portion in which a discharge opening 1*c* is formed), as shown in FIG. 63.

The cylindrical portion (developer accommodation rotatable portion) 24 has a closed end at one longitudinal end thereof and an open end at the other end which is connected with an opening of the portion X, and the space therebetween is a developer accommodating space 1*b*. In this example, an inside space of the container body 1*a*, an inside space of the pump portion 5 and the inside space of the cylindrical portion 24 are all developer accommodating space 1*b*, and therefore, a large amount of the developer can be accommodated. In this example, the cylindrical portion 24 as the developer accommodation rotatable portion has a circular cross-sectional configuration, but the circular shape is not restrictive to the present invention. For example, the cross-sectional configuration of the developer accommodation rotatable portion may be of non-circular configuration such as a polygonal configuration as long as the rotational motion is not obstructed during the developer feeding operation.

A inside of the cylindrical portion (developer feeding chamber) 24 is provided with a helical feeding projection (feeding portion) 24*a*, which has a function of feeding the inside developer accommodated therein toward the portion X (discharge opening 1*c*) when the cylindrical portion 24 rotates in a direction indicated by an arrow R.

In addition, the inside of the cylindrical portion 24 is provided with a receiving-and-feeding member (feeding portion) 16 for receiving the developer fed by the feeding projection 24*a* and supplying it to the portion X side by rotation of the cylindrical portion 24 in the direction of arrow R (the rotational axis is substantially extends in the horizontal direction), the moving member upstanding from the inside of the cylindrical portion 24. The receiving-and-feeding member 16 is provided with a plate-like portion 16*a* for scooping the developer up, and inclined projections 16*b* for feeding (guiding) the developer scooped up by the plate-like portion 16*a* toward the portion X, the inclined projections 16*b* being provided on respective sides of the plate-like portion 16*a*. The plate-like portion 16*a* is provided with a through-hole 16*c* for permitting passage of the developer in both directions to improve the stirring property for the developer.

In addition, a gear portion 24*b* as a drive inputting mechanism is fixed by bonding on an outer surface at the other longitudinal end (with respect to the feeding direction of the developer) of the cylindrical portion 24. When the developer supply container 1 is mounted to the developer receiving apparatus 8, the gear portion 24*b* engages with the driving gear (driving portion) 9 functioning as a driving mechanism provided in the developer receiving apparatus 8. When the rotational force is inputted to the gear portion 14*b* as the driving force receiving portion from the driving gear 9, the cylindrical portion 24 rotates in the direction or arrow R (FIG. 63). The gear portion 24*b* is not restrictive to the present invention, but another drive inputting mechanism such as a belt or friction wheel is usable as long as it can rotate the cylindrical portion 24.

As shown in FIG. 64, one longitudinal end of the cylindrical portion 24 (downstream end with respect to the developer feeding direction) is provided with a connecting portion 24*c* as a connecting tube for connection with portion X. The above-described inclined projection 16*b* extends to a neighborhood of the connecting portion 24*c*. Therefore, the developer fed by the inclined projection 16*b* is prevented as much as possible from falling toward the bottom side of the cylindrical portion 24 again, so that the developer is properly supplied to the connecting portion 24*c*.

The cylindrical portion 24 rotates as described above, but on the contrary, the container body 1*a* and the pump portion 5 are connected to the cylindrical portion 24 through a flange portion 1*g* so that the container body 1*a* and the pump portion 5 are non-rotatable relative to the developer receiving apparatus 8 (non-rotatable in the rotational axis direction of the cylindrical portion 24 and non-movable in the rotational moving direction), similarly to Embodiment 4. Therefore, the cylindrical portion 24 is rotatable relative to the container body 1*a*.

A ring-like elastic seal 25 is provided between the cylindrical portion 24 and the container body 1*a* and is compressed by a predetermined amount between the cylindrical portion 24 and the container body 1*a*. By this, the developer leakage there is prevented during the rotation of the cylindrical portion 24. In addition, the structure, the hermetical property can be maintained, and therefore, the loosening and discharging effects by the pump portion 5 are applied to the developer without loss. The developer supply container 1 does not have an opening for substantial fluid communication between the inside and the outside except for the discharge opening 1*c*.

(Developer Supplying Step)

A developer supplying step will be described.

When the operator inserts the developer supply container 1 into the developer receiving apparatus 8, similarly to Embodiment 4, the locking portion 18 of the developer supply container 1 is locked with the locking member 10 of the developer receiving apparatus 8, and the gear portion 24*b* of the developer supply container 1 is engaged with the driving gear 9 of the developer receiving apparatus 8.

Thereafter, the driving gear 9 is rotated by another driving motor (not shown) for rotation, and the locking member 10 is driven in the vertical direction by the above-described driving motor 500. Then, the cylindrical portion 24 rotates in the direction of the arrow R, by which the developer therein is fed to the receiving-and-feeding member 16 by the feeding projection 24*a*. In addition, by the rotation of the cylindrical portion 24 in the direction R, the receiving-and-feeding member 16 scoops the developer, and feeds it to the connecting portion 24*c*. The developer fed into the container body 1*a* from the connecting portion 24*c* is discharged from the discharge opening 1*c* by the expanding-and-contracting operation of the pump portion 5, similarly to Embodiment 4.

These are a series of the developer supply container 1 mounting steps and developer supplying steps. Here, the developer supply container 1 is exchanged, the operator takes the developer supply container 1 out of the developer receiving apparatus 8, and a new developer supply container 1 is inserted and mounted.

In the case of a vertical container having a developer accommodating space 1*b* which is long in the vertical direction as in Embodiment 4-Embodiment 6, if the volume of the developer supply container 1 is increased to increase the filling amount, the developer results in concentrating to the neighborhood of the discharge opening 1*c* by the weight of the developer. As a result, the developer adjacent the discharge opening 1*c* tends to be compacted, leading to difficulty in suction and discharge through the discharge opening 1*c*. In such a case, in order to loosen the developer compacted by the suction through the discharge opening 1*c* or to discharge the developer by the discharging, the internal pressure (negative pressure/positive pressure) of the developer accommodating space 1*b* has to be enhanced by increasing the amount of the change of the pump portion 5 volume. Then, the driving forces or drive the pump portion 5 has to be increased, and the load to the main assembly of the image forming apparatus 100 may be excessive.

According to this embodiment, however, container body 1*a* and the portion X of the pump portion 5 and the portion Y of the cylindrical portion 24 are arranged in the horizontal direction, and therefore, the thickness of the developer layer above the discharge opening 1*c* in the container body 1*a* can be thinner than in the structure of FIG. 44. By doing so, the developer is not easily compacted by the gravity, and therefore, the developer can be stably discharged without load to the main assembly of the image forming apparatus 100.

As described, with the structure of this example, the provision of the cylindrical portion 24 is effective to accomplish a large capacity developer supply container 1 without load to the main assembly of the image forming apparatus.

In this manner, also in this example, one pump is enough to effect both of the sucking operation and the discharging operation, and therefore, the structure of the developer discharging mechanism can be simplified.

The developer feeding mechanism in the cylindrical portion 24 is not restrictive to the present invention, and the developer supply container 1 may be vibrated or swung, or may be another mechanism. Specifically, the structure of FIG. 65 is usable.

Figure 65:
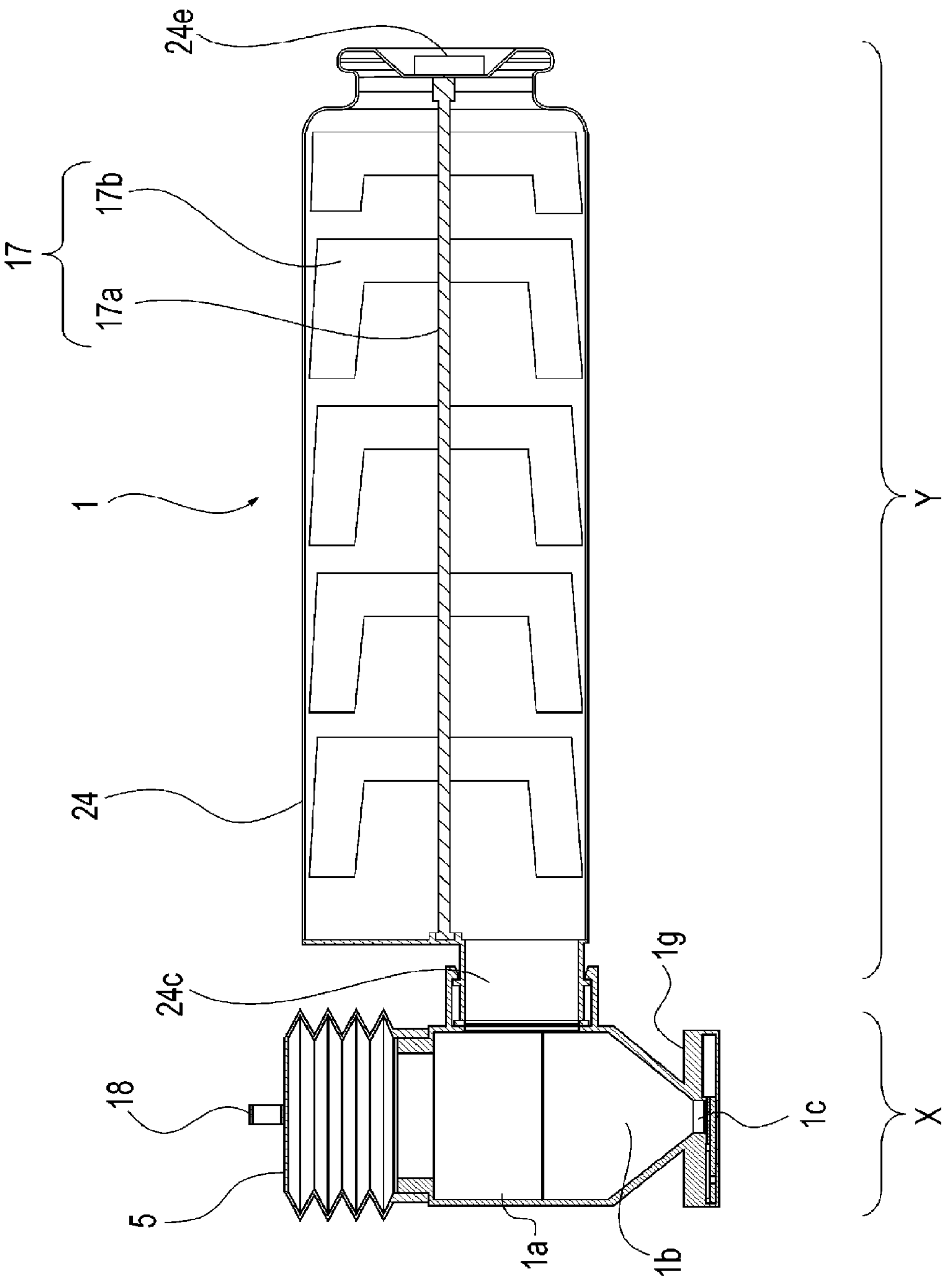
FIG. 65 is a sectional view of another example according to Embodiment 7.

As shown in FIG. 65, the cylindrical portion 24 per se is not movable substantially relative to the developer receiving apparatus 8 (with slight play), and a feeding member 17 is provided in the cylindrical portion in place of the feeding projection 24*a*, the feeding member 17 being effective to feed the developer by rotation relative to the cylindrical portion 24.

The feeding member 17 includes a shaft portion 17*a* and flexible feeding blades 17*b* fixed to the shaft portion 17*a*. The feeding blade 17*b* is provided at a free end portion with an inclined portion S inclined relative to an axial direction of the shaft portion 17*a*. Therefore, it can feed the developer toward the portion X while stirring the developer in the cylindrical portion 24.

One longitudinal end surface of the cylindrical portion 24 is provided with a coupling portion 24*e* as the rotational driving force receiving portion, and the coupling portion 24*e* is operatively connected with a coupling member (not shown) of the developer receiving apparatus 8, by which the rotational force can be transmitted. The coupling portion 24*e* is coaxially connected with the shaft portion 17*a* of the feeding member 17 to transmit the rotational force to the shaft portion 17*a*.

By the rotational force applied from the coupling member (not shown) of the developer receiving apparatus 8, the feeding blade 17*b* fixed to the shaft portion 17*a* is rotated, so that the developer in the cylindrical portion 24 is fed toward the portion X while being stirred.

However, with the modified example shown in FIG. 65, the stress applied to the developer in the developer feeding step tends to be large, and the driving torque is also large, and for this reason, the structure of the embodiment is preferable.

Thus, also in this example, one pump is enough to effect the sucking operation and the discharging operation, and therefore, the structure of the developer discharging mechanism can be simplified. In addition, by the sucking operation through the discharge opening, a pressure reduction state (negative pressure state) can be provided in the developer supply container, and therefore, the developer can be efficiently loosened.

In addition, in this example, the developer supply container 1 is provided with the engaging portion similar to Embodiment 4, and therefore, similarly to the above-described embodiments, the mechanism for connecting and separating the developer receiving portion 11 relative to the developer supply container 1 by displacing the developer receiving portion 11 of the developer receiving apparatus 8 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 8

Figure 66:
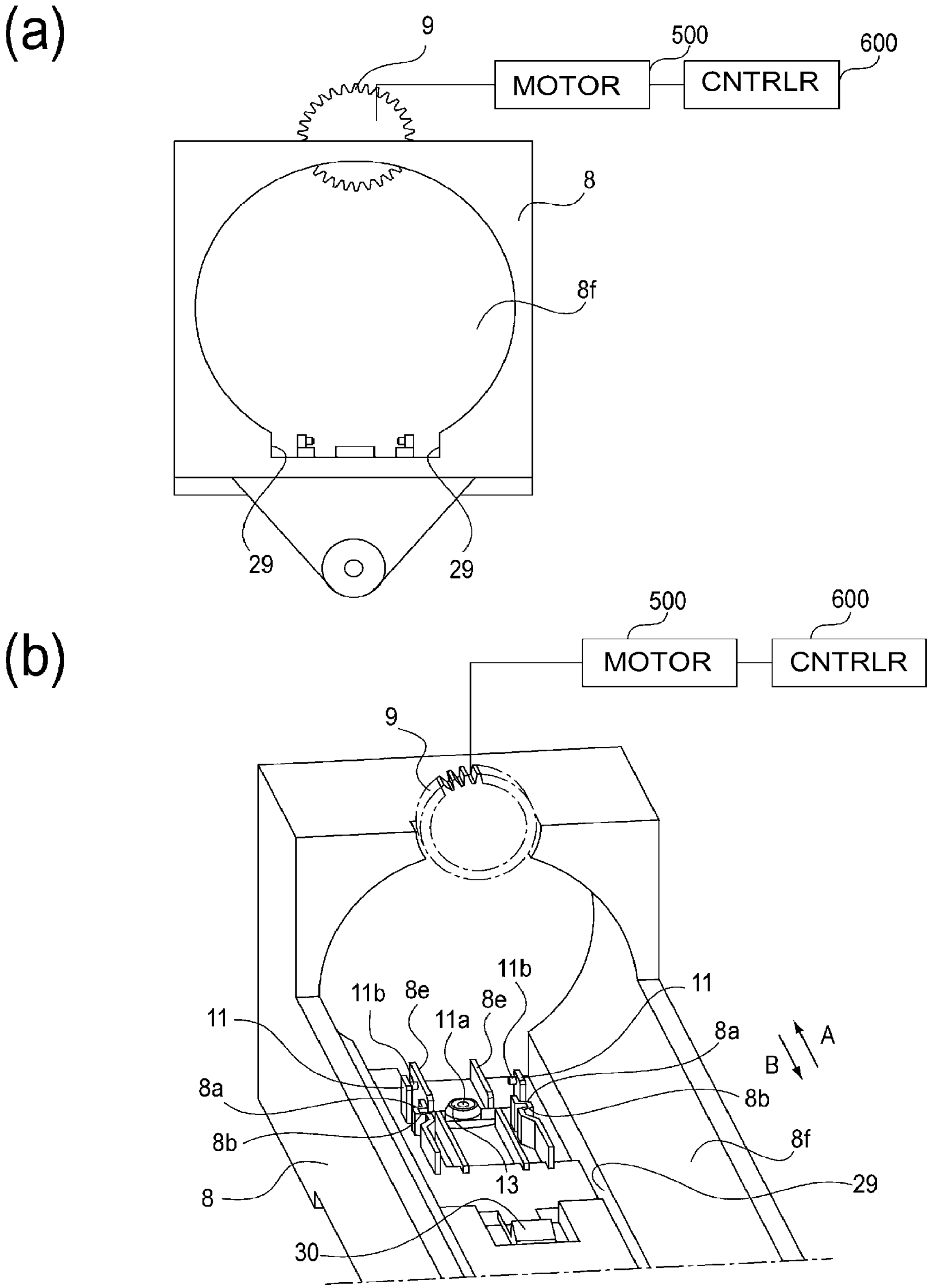
In FIG. 66, (a) is a front view of a mounting portion, and (b) is a partial enlarged perspective view of an inside of the mounting portion.
Figure 67:
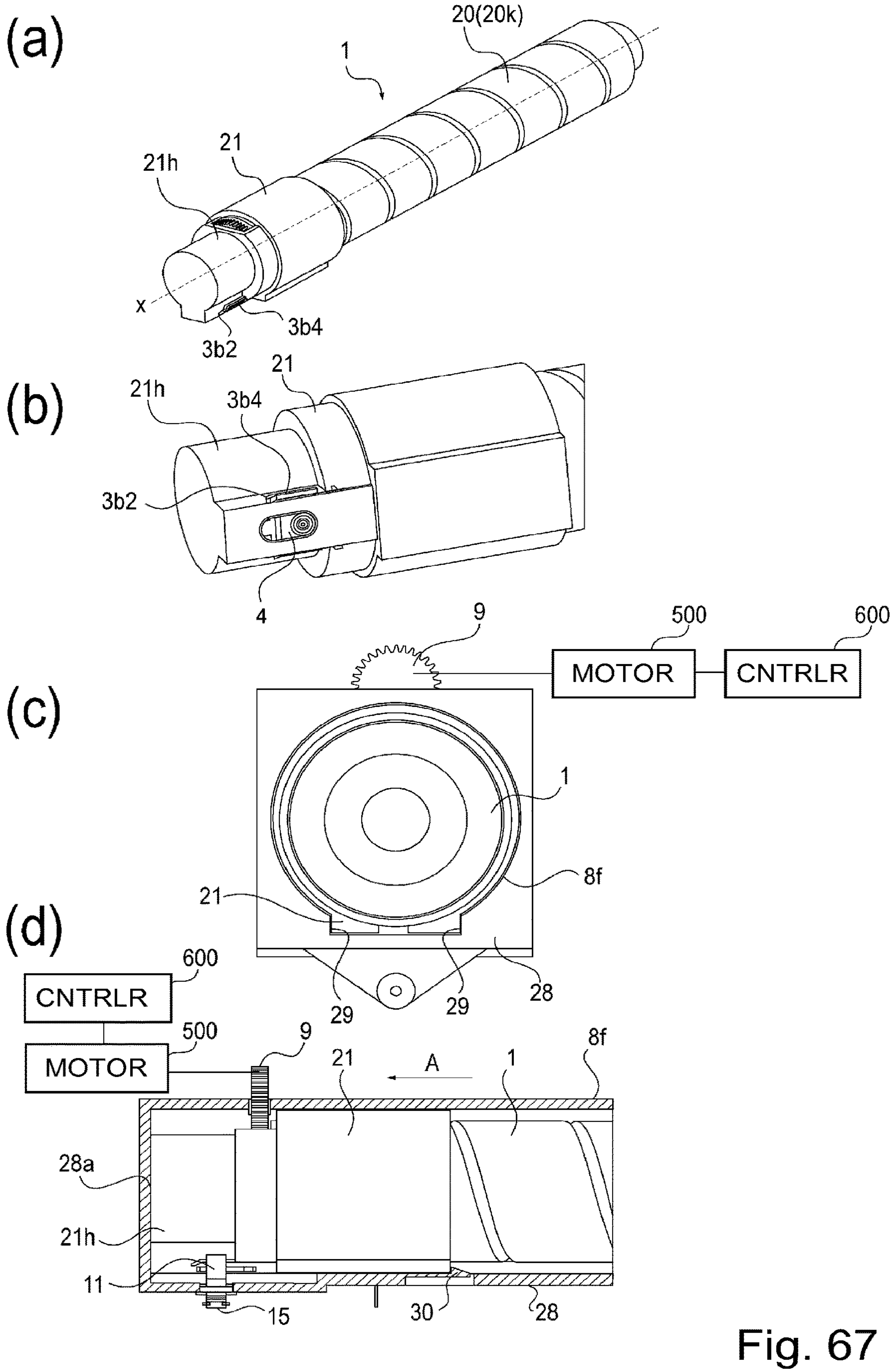
In FIG. 67, (a) is a perspective view of a developer supply container according to Embodiment 8, (b) is a perspective view around a discharge opening, and (c) and (d) are a front view and a sectional view illustrating a state in which the developer supply container is mounted to a mounting portion of the developer receiving apparatus.
Figure 68:
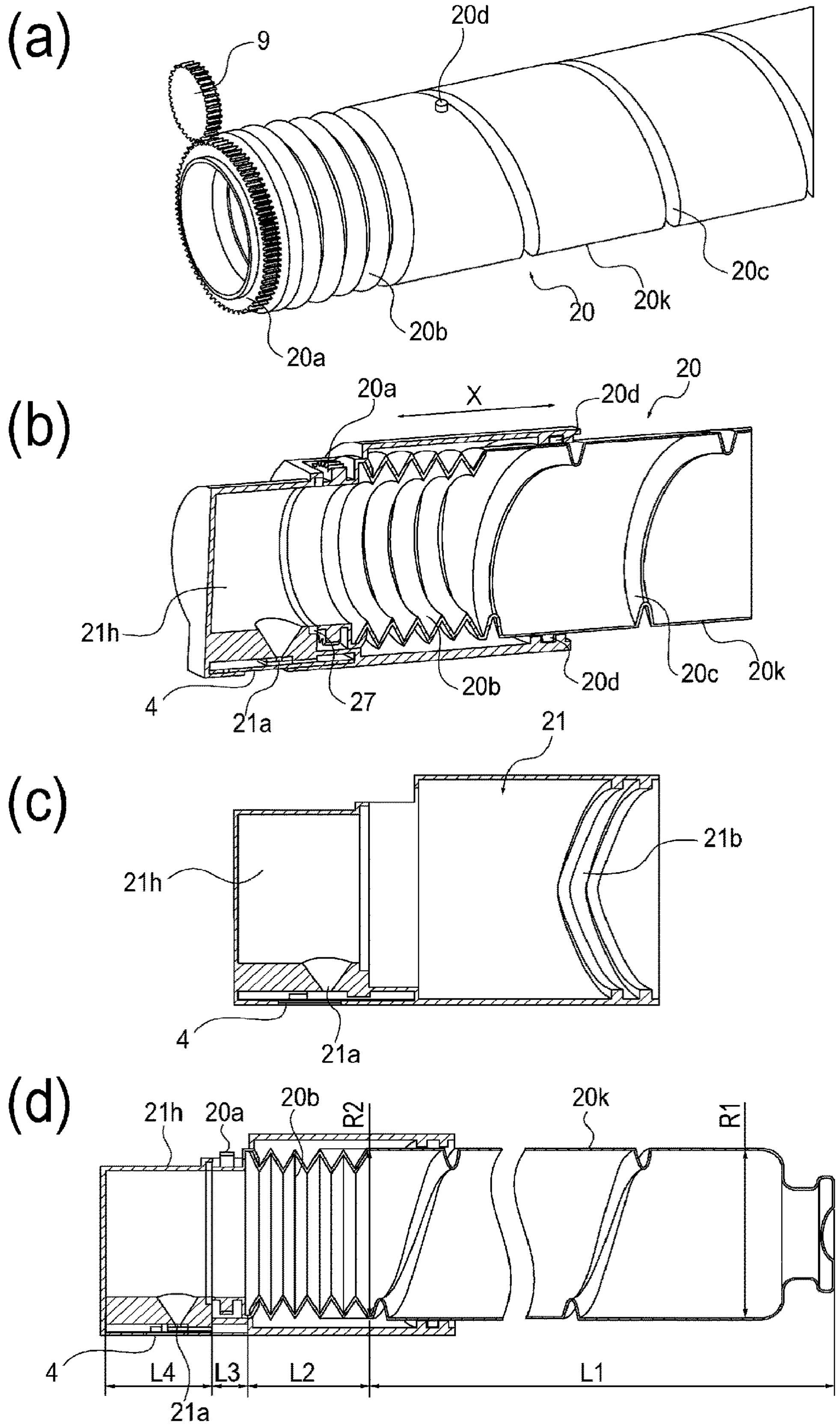
In FIG. 68, (a) is a perspective view of a portion of the developer accommodating portion of Embodiment 8, (b) is a perspective view of a section of the developer supply container, (c) is a sectional view of an inner surface of a flange portion, (d) is a sectional view of the developer supply container.

Referring to FIGS. 66-68, the description will be made as to structures of Embodiment 8. Part (a) of FIG. 66 is a front view of a developer receiving apparatus 8, as seen in a mounting direction of a developer supply container 1, and (b) is a perspective view of an inside of the developer receiving apparatus 8. Part (a) of FIG. 67 is a perspective view of the entire developer supply container 1, (b) is a partial enlarged view of a neighborhood of a discharge opening 21*a* of the developer supply container 1, and (c)-(d) are a front view and a sectional view illustrating a state that the developer supply container 1 is mounted to a mounting portion 8*f*. Part (a) of FIG. 68 is a perspective view of the developer accommodating portion 20, (b) is a partially sectional view illustrating an inside of the developer supply container 1, (c) is a sectional view of a flange portion 21, and (d) is a sectional view illustrating the developer supply container 1.

In the above-described Embodiment 4-7, the pump is expanded and contracted by moving the locking member 10 (FIG. 38) of the developer receiving apparatus 8 vertically. In this example, the developer supply container 1 receives only a rotational force from the developer receiving apparatus 8, similarly to the Embodiment 1-Embodiment 3. In the other respects, the structure is similar to the foregoing embodiments, and therefore, the same reference numerals as in the foregoing embodiments are assigned to the elements having the corresponding functions in this embodiment, and the detailed description thereof is omitted for simplicity.

Specifically, in this example, the rotational force inputted from the developer receiving apparatus 8 is converted to the force in the direction of reciprocation of the pump, and the converted force is transmitted to the pump portion 5.

In the following, the structure of the developer receiving apparatus 8 and the developer supply container 1 will be described in detail.

(Developer Receiving Apparatus)

Referring to FIG. 66, the developer receiving apparatus 8 will be described.

The developer receiving apparatus 8 is provided with a mounting portion (mounting space) 8*f* to which the developer supply container 1 is detachably mounted. As shown in part (b) of FIG. 66, the developer supply container 1 is mountable in a direction indicated by an arrow A to the mounting portion 8*f*. Thus, a longitudinal direction (rotational axis direction) of the developer supply container 1 is substantially the same as the direction of an arrow A. The direction of the arrow A is substantially parallel with a direction indicated by X of part (b) of FIG. 68 which will be described hereinafter. In addition, a dismounting direction of the developer supply container 1 from the mounting portion 8*f* is opposite (the direction of arrow B) the direction of the arrow A.

As shown in part (a) of FIG. 66, the mounting portion 8*f* of the developer receiving apparatus 8 is provided with a rotation regulating portion (holding mechanism) 29 for limiting movement of the flange portion 21 in the rotational moving direction by abutting to a flange portion 21 (FIG. 67) of the developer supply container 1 when the developer supply container 1 is mounted. Furthermore, as shown in part (b) of FIG. 66, the mounting portion 8*f* is provided with a regulating portion (holding mechanism) 30 for regulating the movement of the flange portion 21 in the rotational axis direction by locking with the flange portion 21 of the developer supply container 1 when the developer supply container 1 is mounted. The rotational axis direction regulating portion 30 elastic deforms with the interference with the flange portion 21, and thereafter, upon release of the interference with the flange portion 21 (part (b) of FIG. 67), it elastically restores to lock the flange portion 21 (resin material snap locking mechanism).

The mounting portion 8*f* of the developer receiving apparatus 8 is provided with a developer receiving portion 11 for receiving the developer discharged through the discharge opening (opening) 21*a* (part (b) of FIG. 68) of the developer supply container 1 which will be described hereinafter. Similarly to the above-described Embodiment 1 or Embodiment 2, the developer receiving portion 11 is movable (displaceable) in the vertical direction relative to the developer receiving apparatus 8. An upper end surface of the developer receiving portion 11 is provided with a main assembly seal 13 having a developer receiving port 11*a* in the central portion thereof. The main assembly seal 13 is made of an elastic member, a foam member or the like, and is close-contacted with an opening seal 3*a*5 (part (b) of FIG. 7) having a discharge opening 3*a*4 of the developer supply container 1, by which the developer discharged through the discharge opening 3*a*4 is prevented from leaking out of a developer feeding path including developer receiving port 11*a*. Or, it is close-contacted with the shutter 4 (part (a) of FIG. 25) having a shutter opening 4*f* to prevent leakage of the developer through the discharge opening 21*a*, the shutter opening 4*f* and the developer receiving port 11*a*.

In order to prevent the contamination in the mounting portion 8*f* by the developer as much as possible, a diameter of the developer receiving port 11*a* is desirably substantially the same as or slightly larger than a diameter of the discharge opening 21*a* of the developer supply container 1. This is because if the diameter of the developer receiving port 11*a* is smaller than the diameter of the discharge opening 21*a*, the developer discharged from the developer supply container 1 is deposited on the upper surface of developer receiving port 11*a*, and the deposited developer is transferred onto the lower surface of the developer supply container 1 during the dismounting operation of the developer supply container 1, with the result of contamination with the developer. In addition, the developer transferred onto the developer supply container 1 may be scattered to the mounting portion 8*f* with the result of contamination of the mounting portion 8*f* with the developer. On the contrary, if the diameter of the developer receiving port 11*a* is quite larger than the diameter of the discharge opening 21*a*, an area in which the developer scattered from the developer receiving port 11*a* is deposited on the neighborhood of the discharge opening 21*a* is large. That is, the contaminated area of the developer supply container 1 by the developer is large, which is not preferable. Under the circumstances, the difference between the diameter of the developer receiving port 11*a* and the diameter of the discharge opening 21*a* is preferably substantially 0 to approx. 2 mm.

In this example, the diameter of the discharge opening 21*a* of the developer supply container 1 is approx. Φ2 mm (pin hole), and therefore, the diameter of the developer receiving port 11*a* is approx. φ3 mm.

Further, the developer receiving portion 11 is urged downwardly by an urging member 12 (FIGS. 3 and 4). When the developer receiving portion 11 moves upwardly, it has to move against an urging force of the urging member 12.

As shown in FIGS. 3 and 4, below the developer receiving apparatus 8, there is provided a sub-hopper 8*c* for temporarily storing the developer. In the sub-hopper 8*c*, there are provided a feeding screw 14 for feeding the developer into the developer hopper portion 201*a* which is a part of the developing device 201, and an opening 8*d* which is in fluid communication with the developer hopper portion 201*a*.

The developer receiving port 11*a* is closed so as to prevent foreign matter and/or dust entering the sub-hopper 8*c* in a state that the developer supply container 1 is not mounted. More specifically, the developer receiving port 11*a* is closed by a main assembly shutter 15 in the state that the developer receiving portion 11 is away to the upside. The developer receiving portion 11 moves upwardly (arrow E) from the position spaced from the developer supply container 1 toward the developer supply container 1. By this, the developer receiving port 11*a* and the main assembly shutter 15 are spaced from each other so that the developer receiving port 11*a* is open. With this open state, the developer discharged from the developer supply container 1 through the discharge opening 21*a* or the shutter and received by the developer receiving port 11*a* becomes movable to the sub-hopper 8*c*.

A side surface of the developer receiving portion 11 is provided with an engaging portion 11*b* (FIGS. 3 and 4). The engaging portion 11*b* is directly engaged with an engaging portion 3*b*2, 3*b*4 (FIG. 8 or 20) provided on the developer supply container 1 which will be described hereinafter, and is guided thereby so that the developer receiving portion 11 is raised toward the developer supply container 1.

The mounting portion 8*f* of the developer receiving apparatus 8 is provided with an insertion guide 8*e* for guiding the developer supply container 1 in the mounting and demounting direction, and by the insertion guide 8*e* (FIGS. 3 and 4), the mounting direction of the developer supply container 1 is made along the arrow A. The dismounting direction of the developer supply container 1 is the opposite (arrow B) to the direction of the arrow A.

As shown in part (a) of FIG. 66, the developer receiving apparatus 8 is provided with a driving gear 9 functioning as a driving mechanism for driving the developer supply container 1. The driving gear 9 receives a rotational force from a driving motor 500 through a driving gear train, and functions to apply a rotational force to the developer supply container 1 which is set in the mounting portion 8*f*.

As shown in FIG. 66, the driving motor 500 is controlled by a control device (CPU) 600.

In this example, the driving gear 9 is rotatable unidirectionally to simplify the control for the driving motor 500. The control device 600 controls only ON (operation) and OFF (non-operation) of the driving motor 500. This simplifies the driving mechanism for the developer replenishing apparatus 8 as compared with a structure in which forward and backward driving forces are provided by periodically rotating the driving motor 500 (driving gear 9) in the forward direction and backward direction.

(Developer Supply Container)

Referring to FIGS. 67 and 68, the structure of the developer supply container 1 which is a constituent-element of the developer supplying system will be described.

As shown in part (a) of FIG. 67, the developer supply container 1 includes a developer accommodating portion 20 (container body) having a hollow cylindrical inside space for accommodating the developer. In this example, a cylindrical portion 20*k* and the pump portion 20*b* functions as the developer accommodating portion 20. Furthermore, the developer supply container 1 is provided with a flange portion 21 (non-rotatable portion) at one end of the developer accommodating portion 20 with respect to the longitudinal direction (developer feeding direction). The developer accommodating portion 20 is rotatable relative to the flange portion 21.

In this example, as shown in part (d) of FIG. 68, a total length L1 of the cylindrical portion 20*k* functioning as the developer accommodating portion is approx. 300 mm, and an outer diameter R1 is approx. 70 mm. A total length L2 of the pump portion 20*b* (in the state that it is most expanded in the expansible range in use) is approx. 50 mm, and a length L3 of a region in which a gear portion 20*a* of the flange portion 21 is provided is approx. 20 mm. A length L4 of a region of a discharging portion 21*h* functioning as a developer discharging portion is approx. 25 mm. A maximum outer diameter R2 (in the state that it is most expanded in the expansible range in use in the diametrical direction) of the pump portion 20*b* is approx. 65 mm, and a total volume capacity accommodating the developer in the developer supply container 1 is the 1250 cm^3. In this example, the developer can be accommodated in the cylindrical portion 20*k* and the pump portion 20*b* and in addition the discharging portion 21*h*, that is, they function as a developer accommodating portion.

As shown in FIGS. 67 and 68, in this example, in the state that the developer supply container 1 is mounted to the developer receiving apparatus 8, the cylindrical portion 20*k* and the discharging portion 21*h* are substantially on line along a horizontal direction. That is, the cylindrical portion 20*k* has a sufficiently long length in the horizontal direction as compared with the length in the vertical direction, and one end part with respect to the horizontal direction is connected with the discharging portion 21*h*. For this reason, the suction and discharging operations can be carried out smoothly as compared with the case in which the cylindrical portion 20*k* is above the discharging portion 21*h* in the state that the developer supply container 1 is mounted to the developer receiving apparatus 8. This is because the amount of the toner existing above the discharge opening 21*a* is small, and therefore, the developer in the neighborhood of the discharge opening 21*a* is less compressed.

As shown in part (b) of FIG. 67, the flange portion 21 is provided with a hollow discharging portion (developer discharging chamber) 21*h* for temporarily storing the developer having been fed from the inside of the developer accommodating portion (inside of the developer accommodating chamber) 20 (see parts (b) and (c) of FIG. 33 if necessary). A bottom portion of the discharging portion 21*h* is provided with the small discharge opening 21*a* for permitting discharge of the developer to the outside of the developer supply container 1, that is, for supplying the developer into the developer receiving apparatus 8. The size of the discharge opening 21*a* is as has been described hereinbefore.

An inner shape of the bottom portion of the inner of the discharging portion 21*h* (inside of the developer discharging chamber) is like a funnel converging toward the discharge opening 21*a* in order to reduce as much as possible the amount of the developer remaining therein (parts (b) and (c) of FIG. 68, if necessary).

In addition, as shown in FIG. 67, the flange portion 21 is provided with engaging portions 3*b*2, 3*b*4 engageable with the developer receiving portion 11 displaceably provided in the developer receiving apparatus 8, similarly to the above-described Embodiment 1 or Embodiment 2. The structures of the engaging portions 3*b*2, 3*b*4 are similar to those of above-described Embodiment 1 or Embodiment 2, and therefore, the description is omitted.

Further, the flange portion 21 is provided therein with the shutter 4 for opening and closing discharge opening 21*a*, similarly to the above-described Embodiment 1 or Embodiment 2. The structure of the shutter 4 and the movement of the developer supply container 1 in the mounting and demounting operation are similar to the above-described Embodiment 1 or Embodiment 2, and therefore, the description thereof is omitted.

The flange portion 21 is constructed such that when the developer supply container 1 is mounted to the mounting portion 8*f* of the developer receiving apparatus 8, it is stationary substantially.

More particularly, as shown in part (c) of FIG. 67, the flange portion 21 is regulated (prevented) from rotating in the rotational direction about the rotational axis of the developer accommodating portion 20 by a rotational moving direction regulating portion 29 provided in the mounting portion 8*f*. In other words, the flange portion 21 is retained such that it is substantially non-rotatable by the developer receiving apparatus 8 (although the rotation within the play is possible).

Furthermore, the flange portion 21 is locked by the rotational axis direction regulating portion 30 provided in the mounting portion 8*f* with the mounting operation of the developer supply container1. More specifically, the flange portion 21 contacts to the rotational axis direction regulating portion 30 in the process of the mounting operation of the developer supply container 1 to elastically deform the rotational axis direction regulating portion 30. Thereafter, the flange portion 21 abuts to an inner wall portion 28*a* (part (d) of FIG. 67) which is a stopper provided in the mounting portion 8*f*, by which the mounting step of the developer supply container 1 is completed. At this time, substantially simultaneously with and completion of the mounting, the interference by the flange portion 21 is released, so that the elastic deformation of the regulating portion 30 is released.

As a result, as shown in part (d) of FIG. 67, the rotational axis direction regulating portion 30 is locked with the edge portion (functioning as a locking portion) of the flange portion 21 so that the movement in the rotational axis direction (rotational axis direction of the developer accommodating portion 20) is substantially prevented (regulated). At this time, a slight negligible movement within the play is possible.

As described in the foregoing, in this example, the flange portion 21 is retained by the rotational axis direction regulating portion 30 of the developer receiving apparatus 8 so that it does not move in the rotational axis direction of the developer accommodating portion 20. Furthermore, the flange portion 21 is retained by the rotational moving direction regulating portion 29 of the developer receiving apparatus 8 such that it does not rotate in the rotational moving direction of the developer accommodating portion 20.

When the operator takes the developer supply container 1 out of the mounting portion 8*f*, the rotational axis direction regulating portion 30 elastically deforms by the flange portion 21 so as to be released from the flange portion 21. The rotational axis direction of the developer accommodating portion is substantially coaxial with the rotational axis direction of the gear portion 20*a* (FIG. 68).

Therefore, in the state that the developer supply container 1 is mounted to the developer receiving apparatus 8, the discharging portion 21*h* provided in the flange portion 21 is prevented substantially in the movement of the developer accommodating portion 20 in the axial direction and in the rotational moving direction (movement within the play is permitted).

On the other hand, the developer accommodating portion 20 is not limited in the rotational moving direction by the developer receiving apparatus 8, and therefore, is rotatable in the developer supplying step. However, the movement of the developer accommodating portion 20 in the rotational axis direction is substantially prevented by the flange portion 21 (the movement within the play is permitted).

(Pump Portion)

Referring to FIGS. 68 and 69, the description will be made as to the pump portion (reciprocable pump) 20*b* in which the volume thereof changes with reciprocation. Part (a) of FIG. 69 is a sectional view of the developer supply container 1 in which the pump portion 20*b* is expanded to the maximum extent in operation of the developer supplying step, and part (b) of FIG. 69 is a sectional view of the developer supply container 1 in which the pump portion 20*b* is compressed to the maximum extent in operation of the developer supplying step.

The pump portion 20*b* of this example functions as a suction and discharging mechanism for repeating the sucking operation and the discharging operation alternately through the discharge opening 21*a*.

As shown in part (b) of FIG. 68, the pump portion 20*b* is provided between the discharging portion 21*h* and the cylindrical portion 20*k*, and is fixedly connected to the cylindrical portion 20*k*. Thus, the pump portion 20*b* is rotatable integrally with the cylindrical portion 20*k*.

In the pump portion 20*b* of this example, the developer can be accommodated therein. The developer accommodating space in the pump portion 20*b* has a significant function of fluidizing the developer in the sucking operation, as will be described hereinafter.

In this example, the pump portion 20*b* is a displacement type pump (bellow-like pump) of resin material in which the volume thereof changes with the reciprocation. More particularly, as shown in (a)-(b) of FIG. 68, the bellow-like pump includes crests and bottoms periodically and alternately. The pump portion 20*b* repeats the compression and the expansion alternately by the driving force received from the developer receiving apparatus 8. In this example, the volume change of the pump portion 20*b* by the expansion and contraction is 15 cm^3 (cc). As shown in part (d) of FIG. 68, a total length L2 (most expanded state within the expansion and contraction range in operation) of the pump portion 20*b* is approx. 50 mm, and a maximum outer diameter (largest state within the expansion and contraction range in operation) R2 of the pump portion 20*b* is approx. 65 mm.

With use of such a pump portion 20*b*, the internal pressure of the developer supply container 1 (developer accommodating portion 20 and discharging portion 21*h*) higher than the ambient pressure and the internal pressure lower than the ambient pressure are produced alternately and repeatedly at a predetermined cyclic period (approx. 0.9 sec in this example). The ambient pressure is the pressure of the ambient condition in which the developer supply container 1 is placed. As a result, the developer in the discharging portion 21*h* can be discharged efficiently through the small diameter discharge opening 21*a* (diameter of approx. 2 mm).

As shown in part (b) of FIG. 68, the pump portion 20*b* is connected to the discharging portion 21*h* rotatably relative thereto in the state that a discharging portion 21*h* side end is compressed against a ring-like sealing member 27 provided on an inner surface of the flange portion 21.

By this, the pump portion 20*b* rotates sliding on the sealing member 27, and therefore, the developer does not leak from the pump portion 20*b*, and the hermetical property is maintained, during rotation. Thus, in and out of the air through the discharge opening 21*a* are carries out properly, and the internal pressure of the developer supply container 1 (pump portion 20*b*, developer accommodating portion 20 and discharging portion 21*h*) are changed properly, during supply operation.

(Drive Transmission Mechanism)

The description will be made as to a drive receiving mechanism (drive inputting portion, driving force receiving portion) of the developer supply container 1 for receiving the rotational force for rotating the feeding portion 20*c* from the developer receiving apparatus 8.

As shown in part (a) of FIG. 68, the developer supply container 1 is provided with a gear portion 20*a* which functions as a drive receiving mechanism (drive inputting portion, driving force receiving portion) engageable (driving connection) with a driving gear 9 (functioning as driving portion, driving mechanism) of the developer receiving apparatus 8. The gear portion 20*a* is fixed to one longitudinal end portion of the pump portion 20*b*. Thus, the gear portion 20*a*, the pump portion 20*b*, and the cylindrical portion 20*k* are integrally rotatable.

Therefore, the rotational force inputted to the gear portion 20*a* from the driving gear 9 is transmitted to the cylindrical portion 20*k* (feeding portion 20*c*) a pump portion 20*b*.

In other words, in this example, the pump portion 20*b* functions as a drive transmission mechanism for transmitting the rotational force inputted to the gear portion 20*a* to the feeding portion 20*c* of the developer accommodating portion 20.

For this reason, the bellow-like pump portion 20*b* of this example is made of a resin material having a high property against torsion or twisting about the axis within a limit of not adversely affecting the expanding-and-contracting operation.

In this example, the gear portion 20*a* is provided at one longitudinal end (developer feeding direction) of the developer accommodating portion 20, that is, at the discharging portion 21*h* side end, but this is not inevitable, and for example, it may be provided in the other longitudinal end portion of the developer accommodating portion 20, that is, most rear part. In such a case, the driving gear 9 is provided at a corresponding position.

In this example, a gear mechanism is employed as the driving connection mechanism between the drive inputting portion of the developer supply container 1 and the driver of the developer receiving apparatus 8, but this is not inevitable, and a known coupling mechanism, for example is usable. More particularly, in such a case, the structure may be such that a non-circular recess is provided in a bottom surface of one longitudinal end portion (righthand side end surface of (d) of FIG. 68) as a drive inputting portion, and correspondingly, a projection having a configuration corresponding to the recess as a driver for the developer receiving apparatus 8, so that they are in driving connection with each other.

(Drive Converting Mechanism)

A drive converting mechanism (drive converting portion) for the developer supply container 1 will be described.

The developer supply container 1 is provided with the cam mechanism for converting the rotational force for rotating the feeding portion 20*c* received by the gear portion 20*a* to a force in the reciprocating directions of the pump portion 20*b*. That is, in the example, the description will be made as to an example using a cam mechanism as the drive converting mechanism, but the present invention is not limited to this example, and other structures such as with Embodiments 9 et seqq. Are usable.

In this example, one drive inputting portion (gear portion 20*a*) receives the driving force for driving the feeding portion 20*c* and the pump portion 20*b*, and the rotational force received by the gear portion 20*a* is converted to a reciprocation force in the developer supply container 1 side.

Because of this structure, the structure of the drive inputting mechanism for the developer supply container 1 is simplified as compared with the case of providing the developer supply container 1 with two separate drive inputting portions. In addition, the drive is received by a single driving gear of developer receiving apparatus 8, and therefore, the driving mechanism of the developer receiving apparatus 8 is also simplified.

In the case that the reciprocation force is received from the developer receiving apparatus 8, there is a liability that the driving connection between the developer receiving apparatus 8 and the developer supply container 1 is not proper, and therefore, the pump portion 20*b* is not driven. More particularly, when the developer supply container 1 is taken out of the image forming apparatus 100 and then is mounted again, the pump portion 20*b* may not be properly reciprocated.

For example, when the drive input to the pump portion 20*b* stops in a state that the pump portion 20*b* is compressed from the normal length, the pump portion 20*b* restores spontaneously to the normal length when the developer supply container is taken out. In this case, the position of the drive inputting portion for the pump portion 20*b* changes when the developer supply container 1 is taken out, despite the fact that a stop position of the drive outputting portion of the image forming apparatus 100 side remains unchanged.

As a result, the driving connection is not properly established between the drive outputting portion of the image forming apparatus 100 sides and pump portion 20*b* drive inputting portion of the developer supply container 1 side, and therefore, the pump portion 20*b* cannot be reciprocated. Then, the developer supply is not carries out, and sooner or later, the image formation becomes impossible.

Such a problem may similarly arise when the expansion and contraction state of the pump portion 20*b* is changed by the user while the developer supply container 1 is outside the apparatus. Such a problem similarly arises when developer supply container 1 is exchanged with a new one.

The structure of this example is substantially free of such a problem. This will be described in detail.

As shown in FIGS. 68 and 69, the outer surface of the cylindrical portion 20*k* of the developer accommodating portion 20 is provided with a plurality of cam projections 20*d* functioning as a rotatable portion substantially at regular intervals in the circumferential direction. More particularly, two cam projections 20*d* are disposed on the outer surface of the cylindrical portion 20*k* at diametrically opposite positions, that is, approx. 180° opposing positions.

The number of the cam projections 20*d* may be at least one. However, there is a liability that a moment is produced in the drive converting mechanism and so on by a drag at the time of expansion or contraction of the pump portion 20*b*, and therefore, smooth reciprocation is disturbed, and therefore, it is preferable that a plurality of them are provided so that the relation with the configuration of the cam groove 21*b* which will be described hereinafter is maintained.

Figure 70:
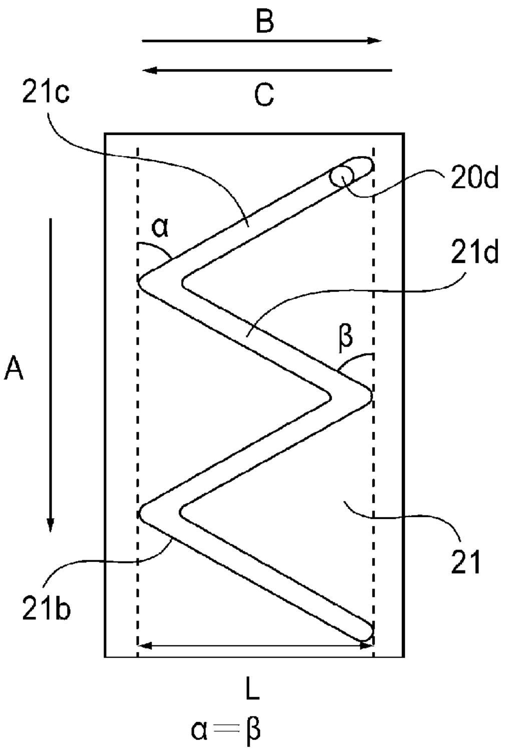
FIG. 70 is an extended elevation of a cam groove configuration of the developer supply container.

On the other hand, a cam groove 21*b* engaged with the cam projections 20*d* is formed in an inner surface of the flange portion 21 over an entire circumference, and it functions as a follower portion. Referring to FIG. 70, the cam groove 21*b* will be described. In FIG. 70, an arrow An indicates a rotational moving direction of the cylindrical portion 20*k* (moving direction of cam projection 20*d*), an arrow B indicates a direction of expansion of the pump portion 20*b*, and an arrow C indicates a direction of compression of the pump portion 20*b*. In FIG. 40, an arrow An indicates a rotational moving direction of the cylindrical portion 20*k* (moving direction of cam projection 20*d*), an arrow B indicates a direction of expansion of the pump portion 20*b*, and an arrow C indicates a direction of compression of the pump portion 20*b*. Here, an angle α is formed between a cam groove 21*c* and a rotational moving direction An of the cylindrical portion 20*k*, and an angle β is formed between a cam groove 21*d* and the rotational moving direction A. In addition, an amplitude (=length of expansion and contraction of pump portion 20*b*) in the expansion and contracting directions B, C of the pump portion 20*b* of the cam groove is L.

As shown in FIG. 70 illustrating the cam groove 21*b* in a developed view, a groove portion 21*c* inclining from the cylindrical portion 20*k* side toward the discharging portion 21*h* side and a groove portion 21*d* inclining from the discharging portion 21*h* side toward the cylindrical portion 20*k* side are connected alternately. In this example, the relation between the angles of the cam grooves 21*c*, 21*d* is α=β.

Therefore, in this example, the cam projection 20*d* and the cam groove 21*b* function as a drive transmission mechanism to the pump portion 20*b*. More particularly, the cam projection 20*d* and the cam groove 21*b* function as a mechanism for converting the rotational force received by the gear portion 20*a* from the driving gear 300 to the force (force in the rotational axis direction of the cylindrical portion 20*k*) in the directions of reciprocal movement of the pump portion 20*b* and for transmitting the force to the pump portion 20*b*.

More particularly, the cylindrical portion 20*k* is rotated with the pump portion 20*b* by the rotational force inputted to the gear portion 20*a* from the driving gear 9, and the cam projections 20*d* are rotated by the rotation of the cylindrical portion 20*k*. Therefore, by the cam groove 21*b* engaged with the cam projection 20*d*, the pump portion 20*b* reciprocates in the rotational axis direction (X direction of FIG. 68) together with the cylindrical portion 20*k*. The arrow X direction is substantially parallel with the arrow M direction of FIGS. 66 and 67.

In other words, the cam projection 20*d* and the cam groove 21*b* convert the rotational force inputted from the driving gear 9 so that the state in which the pump portion 20*b* is expanded (part (a) of FIG. 69) and the state in which the pump portion 20*b* is contracted (part (b) of FIG. 69) are repeated alternately.

Thus, in this example, the pump portion 20*b* rotates with the cylindrical portion 20*k*, and therefore, when the developer in the cylindrical portion 20*k* moves in the pump portion 20*b*, the developer can be stirred (loosened) by the rotation of the pump portion 20*b*. In this example, the pump portion 20*b* is provided between the cylindrical portion 20*k* and the discharging portion 21*h*, and therefore, stirring action can be imparted on the developer fed to the discharging portion 21*h*, which is further advantageous.

Furthermore, as described above, in this example, the cylindrical portion 20*k* reciprocates together with the pump portion 20*b*, and therefore, the reciprocation of the cylindrical portion 20*k* can stir (loosen) the developer inside cylindrical portion 20*k*.

(Set Conditions of Drive Converting Mechanism)

In this example, the drive converting mechanism effects the drive conversion such that an amount (per unit time) of developer feeding to the discharging portion 21*h* by the rotation of the cylindrical portion 20*k* is larger than a discharging amount (per unit time) to the developer receiving apparatus 8 from the discharging portion 21*h* by the pump function.

This is because if the developer discharging power of the pump portion 20*b* is higher than the developer feeding power of the feeding portion 20*c* to the discharging portion 21*h*, the amount of the developer existing in the discharging portion 21*h* gradually decreases. In other words, it is avoided that the time period required for supplying the developer from the developer supply container 1 to the developer receiving apparatus 8 is prolonged.

In the drive converting mechanism of this example, the feeding amount of the developer by the feeding portion 20*c* to the discharging portion 21*h* is 2.0 g/s, and the discharge amount of the developer by pump portion 20*b* is 1.2 g/s.

In addition, in the drive converting mechanism of this example, the drive conversion is such that the pump portion 20*b* reciprocates a plurality of times per one full rotation of the cylindrical portion 20*k*. This is for the following reasons.

In the case of the structure in which the cylindrical portion 20*k* is rotated inner the developer receiving apparatus 8, it is preferable that the driving motor 500 is set at an output required to rotate the cylindrical portion 20*k* stably at all times. However, from the standpoint of reducing the energy consumption in the image forming apparatus 100 as much as possible, it is preferable to minimize the output of the driving motor 500. The output required by the driving motor 500 is calculated from the rotational torque and the rotational frequency of the cylindrical portion 20*k*, and therefore, in order to reduce the output of the driving motor 500, the rotational frequency of the cylindrical portion 20*k* is minimized.

However, in the case of this example, if the rotational frequency of the cylindrical portion 20*k* is reduced, a number of operations of the pump portion 20*b* per unit time decreases, and therefore, the amount of the developer (per unit time) discharged from the developer supply container 1 decreases. In other words, there is a possibility that the developer amount discharged from the developer supply container 1 is insufficient to quickly meet the developer supply amount required by the main assembly of the image forming apparatus 100.

If the amount of the volume change of the pump portion 20*b* is increased, the developer discharging amount per unit cyclic period of the pump portion 20*b* can be increased, and therefore, the requirement of the main assembly of the image forming apparatus 100 can be met, but doing so gives rise to the following problem.

If the amount of the volume change of the pump portion 20*b* is increased, a peak value of the internal pressure (positive pressure) of the developer supply container 1 in the discharging step increases, and therefore, the load required for the reciprocation of the pump portion 20*b* increases.

For this reason, in this example, the pump portion 20*b* operates a plurality of cyclic periods per one full rotation of the cylindrical portion 20*k*. By this, the developer discharge amount per unit time can be increased as compared with the case in which the pump portion 20*b* operates one cyclic period per one full rotation of the cylindrical portion 20*k*, without increasing the volume change amount of the pump portion 20*b*. Corresponding to the increase of the discharge amount of the developer, the rotational frequency of the cylindrical portion 20*k* can be reduced.

Verification experiments were carried out as to the effects of the plural cyclic operations per one full rotation of the cylindrical portion 20*k*. In the experiments, the developer is filled into the developer supply container 1, and a developer discharge amount and a rotational torque of the cylindrical portion 20*k* are measured. Then, the output (=rotational torque×rotational frequency) of the driving motor 500 required for rotation a cylindrical portion 20*k* is calculated from the rotational torque of the cylindrical portion 20*k* and the preset rotational frequency of the cylindrical portion 20*k*. The experimental conditions are that the number of operations of the pump portion 20*b* per one full rotation of the cylindrical portion 20*k* is two, the rotational frequency of the cylindrical portion 20*k* is rpm, and the volume change of the pump portion 20*b* is 15 cm^3.

As a result of the verification experiment, the developer discharging amount from the developer supply container 1 is approx. 1.2 g/s. The rotational torque of the cylindrical portion 20*k* (average torque in the normal state) is 0.64N m, and the output of the driving motor 500 is approx. 2 W (motor load (W)=0.1047×rotational torque (N·m)×rotational frequency (rpm), wherein 0.1047 is the unit conversion coefficient) as a result of the calculation.

Comparative experiments were carried out in which the number of operations of the pump portion 20*b* per one full rotation of the cylindrical portion 20*k* was one, the rotational frequency of the cylindrical portion 20*k* was 60 rpm, and the other conditions were the same as the above-described experiments. In other words, the developer discharge amount was made the same as with the above-described experiments, i.e. approx. 1.2 g/s.

As a result of the comparative experiments, the rotational torque of the cylindrical portion 20*k* (average torque in the normal state) is 0.66N·m, and the output of the driving motor 500 is approx. 4 W by the calculation.

From these experiments, it has been confirmed that the pump portion 20*b* carries out preferably the cyclic operation a plurality of times per one full rotation of the cylindrical portion 20*k*. In other words, it has been confirmed that by doing so, the discharging performance of the developer supply container 1 can be maintained with a low rotational frequency of the cylindrical portion 20*k*. With the structure of this example, the required output of the driving motor 500 may be low, and therefore, the energy consumption of the main assembly of the image forming apparatus 100 can be reduced.

(Position of Drive Converting Mechanism)

As shown in FIGS. 68 and 69, in this example, the drive converting mechanism (cam mechanism constituted by the cam projection 20*d* and the cam groove 21*b*) is provided outside of developer accommodating portion 20. More particularly, the drive converting mechanism is disposed at a position separated from the inside spaces of the cylindrical portion 20*k*, the pump portion 20*b* and the flange portion 21, so that the drive converting mechanism does not contact the developer accommodated inside the cylindrical portion 20*k*, the pump portion 20*b* and the flange portion 21.

By this, a problem which may arise when the drive converting mechanism is provided in the inside space of the developer accommodating portion 20 can be avoided. More particularly, the problem is that by the developer entering portions of the drive converting mechanism where sliding motions occur, the particles of the developer are subjected to heat and pressure to soften and therefore, they agglomerate into masses (coarse particle), or they enter into a converting mechanism with the result of torque increase. The problem can be avoided.

(Developer Discharging Principle by Pump Portion).

Referring to FIG. 69, a developer supplying step by the pump portion will be described.

In this example, as will be described hereinafter, the drive conversion of the rotational force is carries out by the drive converting mechanism so that the suction step (sucking operation through discharge opening 21*a*) and the discharging step (discharging operation through the discharge opening 21*a*) are repeated alternately. The suction step and the discharging step will be described.

(Suction Step)

First, the suction step (sucking operation through discharge opening 21*a*) will be described.

As shown in part (a) of FIG. 69, the sucking operation is effected by the pump portion 20*b* being expanded in a direction indicated by an arrow ω by the above-described drive converting mechanism (cam mechanism). More particularly, by the sucking operation, a volume of a portion of the developer supply container 1 (pump portion 20*b*, cylindrical portion 20*k* and flange portion 21) which can accommodate the developer increases.

At this time, the developer supply container 1 is substantially hermetically sealed except for the discharge opening 21*a*, and the discharge opening 21*a* is plugged substantially by the developer T. Therefore, the internal pressure of the developer supply container 1 decreases with the increase of the volume of the portion of the developer supply container 1 capable of containing the developer T.

At this time, the internal pressure of the developer supply container 1 is lower than the ambient pressure (external air pressure). For this reason, the air outside the developer supply container 1 enters the developer supply container 1 through the discharge opening 21$a$ by a pressure difference between the inside and the outside of the developer supply container 1.

At this time, the air is taken-in from the outside of the developer supply container 1, and therefore, the developer T in the neighborhood of the discharge opening 21$a$ can be loosened (fluidized). More particularly, by the air impregnated into the developer powder existing in the neighborhood of the discharge opening 21$a$, the bulk density of the developer powder T is reduced and the developer is and fluidized.

Since the air is taken into the developer supply container 1 through the discharge opening 21$a$ as a result, the internal pressure of the developer supply container 1 changes in the neighborhood of the ambient pressure (external air pressure) despite the increase of the volume of the developer supply container 1.

In this manner, by the fluidization of the developer T, the developer T does not pack or clog in the discharge opening 21$a$, so that the developer can be smoothly discharged through the discharge opening 21$a$ in the discharging operation which will be described hereinafter. Therefore, the amount of the developer T (per unit time) discharged through the discharge opening 3$a$ can be maintained substantially at a constant level for a long term.

(Discharging Step)

As shown in part (b) of FIG. 69, the discharging operation is effected by the pump portion 20$b$ being compressed in a direction indicated by an arrow $\gamma$ by the above-described drive converting mechanism (cam mechanism). More particularly, by the discharging operation, a volume of a portion of the developer supply container 1 (pump portion 20$b$, cylindrical portion 20$k$ and flange portion 21) which can accommodate the developer decreases. At this time, the developer supply container 1 is substantially hermetically sealed except for the discharge opening 21$a$, and the discharge opening 21$a$ is plugged substantially by the developer T until the developer is discharged. Therefore, the internal pressure of the developer supply container 1 rises with the decrease of the volume of the portion of the developer supply container 1 capable of containing the developer T.

Since the internal pressure of the developer supply container 1 is higher than the ambient pressure (the external air pressure), the developer T is pushed out by the pressure difference between the inside and the outside of the developer supply container 1, as shown in part (b) of FIG. 69. That is, the developer T is discharged from the developer supply container 1 into the developer receiving apparatus 8.

Thereafter, the air in the developer supply container 1 is also discharged with the developer T, and therefore, the internal pressure of the developer supply container 1 decreases.

As described in the foregoing, according to this example, the discharging of the developer can be effected efficiently using one reciprocation type pump, and therefore, the mechanism for the developer discharging can be simplified.

(Set Condition of Cam Groove)

Referring to FIGS. 71-76, modified examples of the set condition of the cam groove 21$b$ will be described. FIGS. 71-76 are developed views of cam grooves 3$b$. Referring to the developed views of FIGS. 71-76, the description will be made as to the influence to the operational condition of the pump portion 20$b$ when the configuration of the cam groove 21$b$ is changed.

Here, in each of FIGS. 71-76-41, an arrow A indicates a rotational moving direction of the developer accommodating portion 20 (moving direction of the cam projection 20$d$); an arrow B indicates the expansion direction of the pump portion 20$b$; and an arrow C indicates a compression direction of the pump portion 20$b$. In addition, a groove portion of the cam groove 21$b$ for compressing the pump portion 20$b$ is indicated as a cam groove 21$c$, and a groove portion for expanding the pump portion 20$b$ is indicated as a cam groove 21$d$. Furthermore, an angle formed between the cam groove 21$c$ and the rotational moving direction An of the developer accommodating portion 20 is $\alpha$; an angle formed between the cam groove 21$d$ and the rotational moving direction An is $\beta$; and an amplitude (expansion and contraction length of the pump portion 20$b$), in the expansion and contracting directions B, C of the pump portion 20$b$, of the cam groove is L.

First, the description will be made as to the expansion and contraction length L of the pump portion 20$b$.

When the expansion and contraction length L is shortened, for example, the volume change amount of the pump portion 20$b$ decreases, and therefore, the pressure difference from the external air pressure is reduced. Then, the pressure imparted to the developer in the developer supply container 1 decreases, with the result that the amount of the developer discharged from the developer supply container 1 per one cyclic period (one reciprocation, that is, one expansion and contracting operation of the pump portion 20$b$) decreases.

Figure 71:
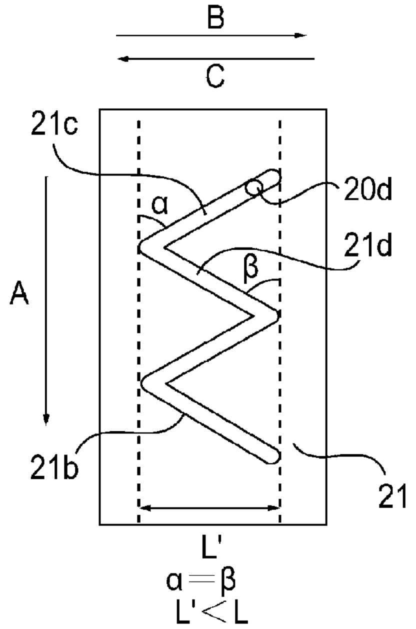
FIG. 71 is an extended elevation of an example of the cam groove configuration of the developer supply container.

From this consideration, as shown in FIG. 71, the amount of the developer discharged when the pump portion 20$b$ is reciprocated once, can be decreased as compared with the structure of FIG. 70, if an amplitude L' is selected so as to satisfy $L'<L$ under the condition that the angles $\alpha$ and $\beta$ are constant. On the contrary, if $L'>L$, the developer discharge amount can be increased.

As regards the angles $\alpha$ and $\beta$ of the cam groove, when the angles are increased, for example, the movement distance of the cam projection 20$d$ when the developer accommodating portion 20 rotates for a constant time increases if the rotational speed of the developer accommodating portion 20 is constant, and therefore, as a result, the expansion-and-contraction speed of the pump portion 20$b$ increases.

On the other hand, when the cam projection 20$d$ moves in the cam groove 21$b$, the resistance received from the cam groove 21$b$ is large, and therefore, a torque required for rotating the developer accommodating portion 20 increases as a result.

Figure 72:
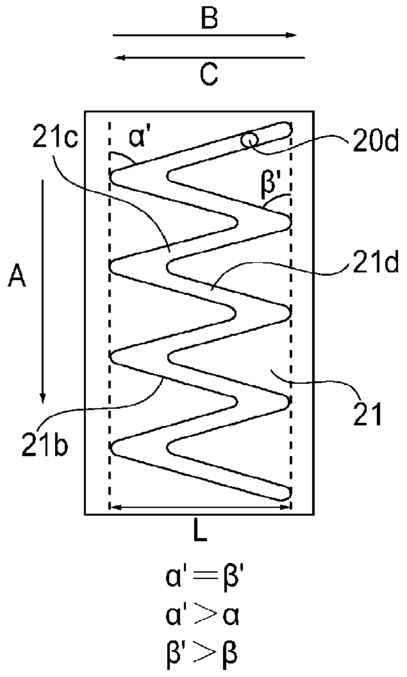
FIG. 72 is an extended elevation of an example of the cam groove configuration of the developer supply container.

For this reason, as shown in FIG. 72, if the angle $\beta'$ of the cam groove 21$d$ of the cam groove 21$d$ is selected so as to satisfy $\alpha'>\alpha$ and $\beta'>\beta$ without changing the expansion and contraction length L, the expansion-and-contraction speed of the pump portion 20$b$ can be increased as compared with the structure of the FIG. 70. As a result, the number of expansion and contracting operations of the pump portion 20$b$ per one rotation of the developer accommodating portion 20 can be increased. Furthermore, since a flow speed of the air entering the developer supply container 1 through the discharge opening 21$a$ increases, the loosening effect to the developer existing in the neighborhood of the discharge opening 21$a$ is enhanced.

On the contrary, if the selection satisfies $\alpha'<\alpha$ and $\beta'<\beta$, the rotational torque of the developer accommodating portion 20 can be decreased. When a developer having a high flowability is used, for example, the expansion of the pump portion 20$b$ tends to cause the air entered through the discharge opening 21$a$ to blow out the developer existing in the neighborhood of the discharge opening 21$a$. As a result, there is a possibility that the developer cannot be accumulated sufficiently in the discharging portion 21$h$, and therefore, the developer discharge amount decreases. In this case, by decreasing the expanding speed of the pump portion 20*b* in accordance with this selection, the blowing-out of the developer can be suppressed, and therefore, the discharging power can be improved.

Figure 73:
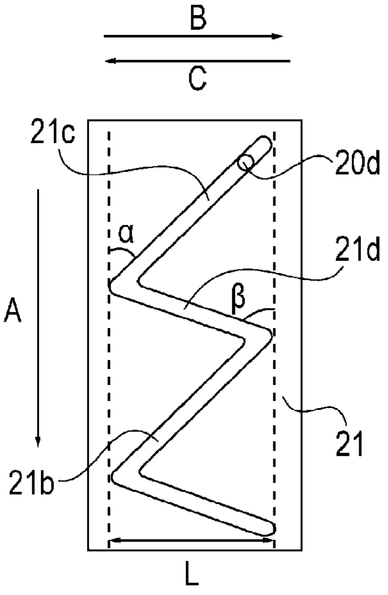
FIG. 73 is an extended elevation of an example of the cam groove configuration of the developer supply container.

If, as shown in FIG. 73, the angle of the cam groove 21*b* is selected so as to satisfy α<β, the expanding speed of the pump portion 20*b* can be increased as compared with a compressing speed. On the contrary, as shown in FIG. 70, if the angle α>the angle β, the expanding speed of the pump portion 20*b* can be reduced as compared with the compressing speed.

When the developer is in a highly packed state, for example, the operation force of the pump portion 20*b* is larger in a compression stroke of the pump portion 20*b* than in an expansion stroke thereof. As a result, the rotational torque for the developer accommodating portion 20 tends to be higher in the compression stroke of the pump portion 20*b*. However, in this case, if the cam groove 21*b* is constructed as shown in FIG. 73, the developer loosening effect in the expansion stroke of the pump portion 20*b* can be enhanced as compared with the structure of FIG. 70. In addition, the resistance received by the cam projection 20*d* from the cam groove 21*b* in the compression stroke is small, and therefore, the increase of the rotational torque in the compression of the pump portion 20*b* can be suppressed.

Figure 74:
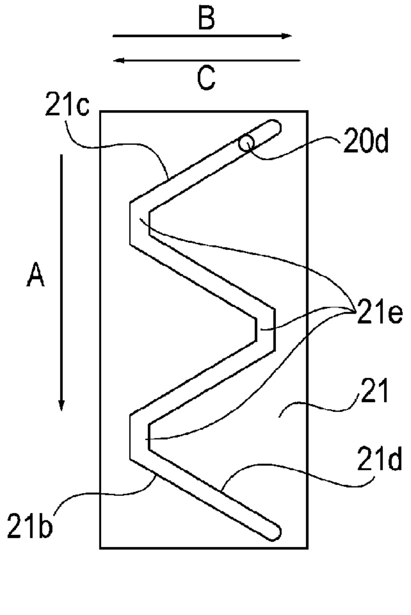
FIG. 74 is an extended elevation of an example of the cam groove configuration of the developer supply container.

As shown in FIG. 74, a cam groove 21*e* substantially parallel with the rotational moving direction (arrow A in the FIGURE) of the developer accommodating portion 20 may be provided between the cam grooves 21*c*, 21*d*. In this case, the cam does not function while the cam projection 20*d* is moving in the cam groove 21*e*, and therefore, a step in which the pump portion 20*b* does not carry out the expanding-and-contracting operation can be provided.

By doing so, if a process in which the pump portion 20*b* is at rest in the expanded state is provided, the developer loosening effect is improved, since then in an initial stage of the discharging in which the developer is present always in the neighborhood of the discharge opening 21*a*, the pressure reduction state in the developer supply container 1 is maintained during the rest period.

On the other hand, in a last part of the discharging, the developer is not stored sufficiently in the discharging portion 21*h*, because the amount of the developer inside the developer supply container 1 is small and because the developer existing in the neighborhood of the discharge opening 21*a* is blown out by the air entered through the discharge opening 21*a*.

In other words, the developer discharge amount tends to gradually decrease, but even in such a case, by continuing to feed the developer by rotating is developer accommodating portion 20 during the rest period with the expanded state, the discharging portion 21*h* can be filled sufficiently with the developer. Therefore, a stabilization developer discharge amount can be maintained until the developer supply container 1 becomes empty.

In addition, in the structure of FIG. 70, by making the expansion and contraction length L of the cam groove longer, the developer discharging amount per one cyclic period of the pump portion 20*b* can be increased. However, in this case, the amount of the volume change of the pump portion 20*b* increases, and therefore, the pressure difference from the external air pressure also increases. For this reason, the driving force required for driving the pump portion 20*b* also increases, and therefore, there is a liability that a drive load required by the developer receiving apparatus 8 is excessively large.

Figure 75:
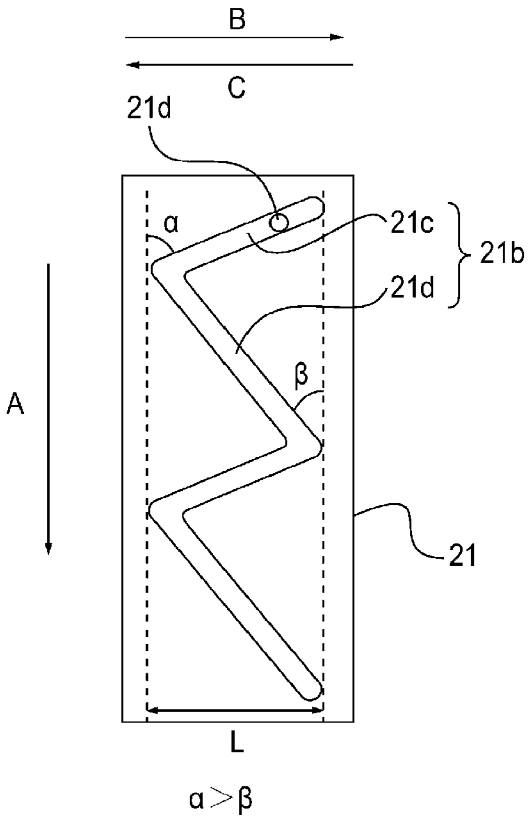
FIG. 75 is an extended elevation of an example of the cam groove configuration of the developer supply container.

Under the circumstances, in order to increase the developer discharge amount per one cyclic period of the pump portion 20*b* without giving rise to such a problem, the angle of the cam groove 21*b* is selected so as to satisfy α>β, by which the compressing speed of a pump portion 20*b* can be increased as compared with the expanding speed, as shown in FIG. 75.

Verification experiments were carried out as to the structure of FIG. 75.

In the experiments, the developer is filled in the developer supply container 1 having the cam groove 21*b* shown in FIG. 75; the volume change of the pump portion 20*b* is carried out in the order of the compressing operation and then the expanding operation to discharge the developer; and the discharge amounts are measured. The experimental conditions are that the amount of the volume change of the pump portion 20*b* is 50 cm^3, the compressing speed of the pump portion 20*b* the 180 cm^3/s, and the expanding speed of the pump portion 20*b* is 60 cm^3/s. The cyclic period of the operation of the pump portion 20*b* is approx. 1.1 seconds.

The developer discharge amounts are measured in the case of the structure of FIG. 70. However, the compressing speed and the expanding speed of the pump portion 20*b* are 90 cm^3/s, and the amount of the volume change of the pump portion 20*b* and one cyclic period of the pump portion 20*b* is the same as in the example of FIG. 75.

Figure 77:
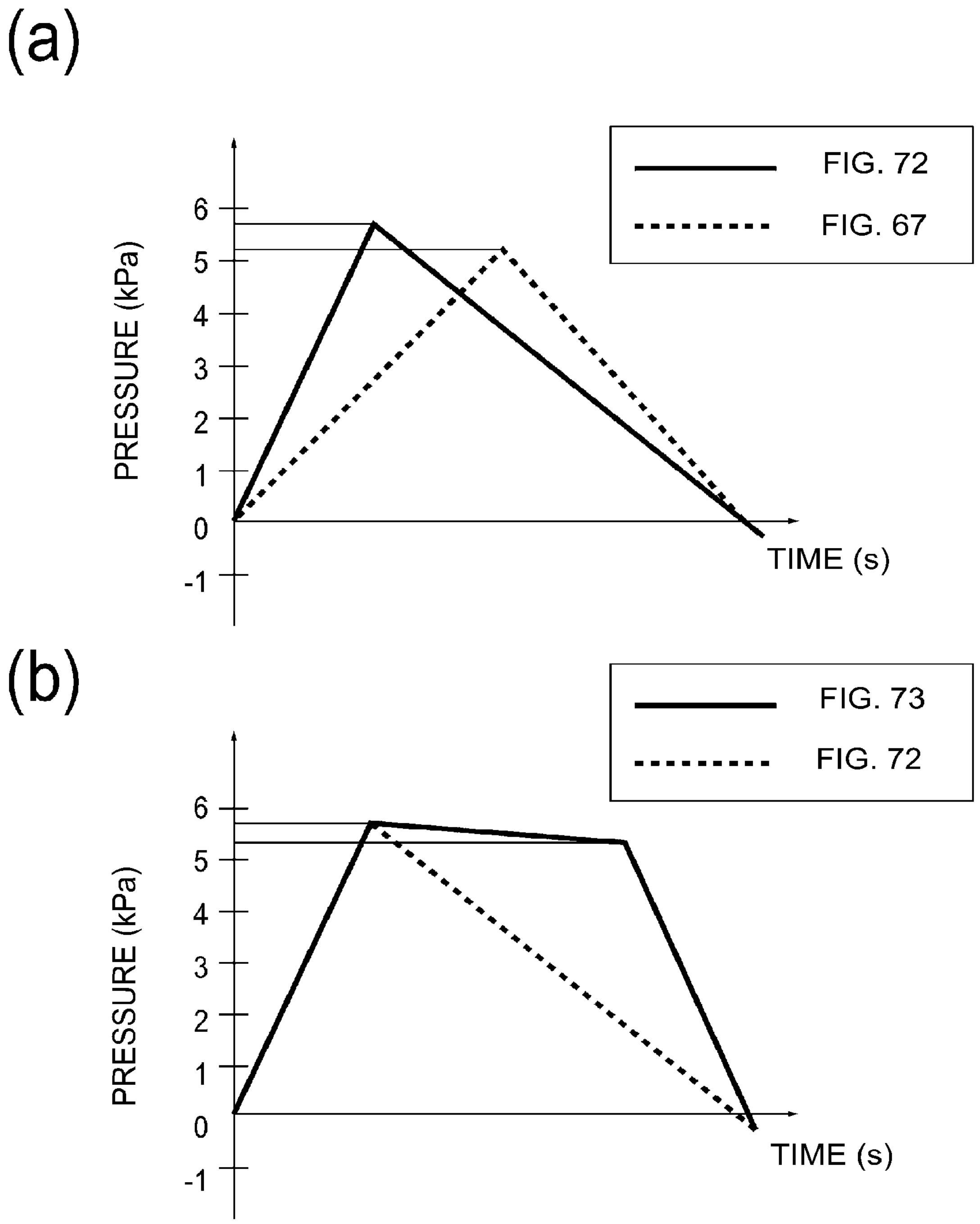
FIG. 77 is graphs showing changes of an internal pressure of the developer supply container.

The results of the verification experiments will be described. Part (a) of FIG. 77 shows the change of the internal pressure of the developer supply container 1 in the volume change of the pump portion 50*b*. In part (a) of FIG. 77, the abscissa represents the time, and the ordinate represents a relative pressure in the developer supply container 1 (+ is positive pressure side, is negative pressure side) relative to the ambient pressure (reference (0)). Solid lines and broken lines are for the developer supply container 1 having the cam groove 21*b* of FIG. 75, and that of FIG. 70, respectively.

In the compressing operation of the pump portion 20*b*, the internal pressures rise with elapse of time and reach the peaks upon completion of the compressing operation, in both examples. At this time, the pressure in the developer supply container 1 changes within a positive range relative to the ambient pressure (external air pressure), and therefore, the inside developer is pressurized, and the developer is discharged through the discharge opening 21*a*.

Subsequently, in the expanding operation of the pump portion 20*b*, the volume of the pump portion 20*b* increases for the internal pressures of the developer supply container 1 decrease, in both examples. At this time, the pressure in the developer supply container 1 changes from the positive pressure to the negative pressure relative to the ambient pressure (external air pressure), and the pressure continues to apply to the inside developer until the air is taken in through the discharge opening 21*a*, and therefore, the developer is discharged through the discharge opening 21*a*.

That is, in the volume change of the pump portion 20*b*, when the developer supply container 1 is in the positive pressure state, that is, when the inside developer is pressurized, the developer is discharged, and therefore, the developer discharge amount in the volume change of the pump portion 20*b* increases with a time-integration amount of the pressure.

As shown in part (a) of FIG. 77, the peak pressure at the time of completion of the compressing operation of the pump portion 2*b* is 5.7 kPa with the structure of FIG. 75 and is 5.4 kPa with the structure of the FIG. 70, and it is higher in the structure of FIG. 75 despite the fact that the volume change amounts of the pump portion 20*b* are the same. This is because by increasing the compressing speed of the pump portion 20*b*, the inside of the developer supply container 1 is pressurized abruptly, and the developer is concentrated to the discharge opening 21*a* at once, with the result that a discharge resistance in the discharging of the developer through the discharge opening 21*a* becomes large. Since the discharge openings 21*a* have small diameters in both examples, the tendency is remarkable. Since the time required for one cyclic period of the pump portion is the same in both examples as shown in (a) of FIG. 77, the time integration amount of the pressure is larger in the example of the FIG. 75.

Following Table 3 shows measured data of the developer discharge amount per one cyclic period operation of the pump portion 20*b*.

TABLE 3

| | Amount of developer discharge (g) |
|---|---|
| FIG. 67 | 3.4 |
| FIG. 72 | 3.7 |
| FIG. 73 | 4.5 |

As shown in Table 3, the developer discharge amount is 3.7 g in the structure of FIG. 75, and is 3.4 g in the structure of FIG. 70, that is, it is larger in the case of FIG. 75 structure. From these results and, the results of part (a) of the FIG. 77, it has been confirmed that the developer discharge amount per one cyclic period of the pump portion 20*b* increases with the time integration amount of the pressure.

From the foregoing, the developer discharging amount per one cyclic period of the pump portion 20*b* can be increased by making the compressing speed of the pump portion 20*b* higher as compared with the expansion speed and making the peak pressure in the compressing operation of the pump portion 20*b* higher as shown in FIG. 75.

The description will be made as to another method for increasing the developer discharging amount per one cyclic period of the pump portion 20*b*.

Figure 76:
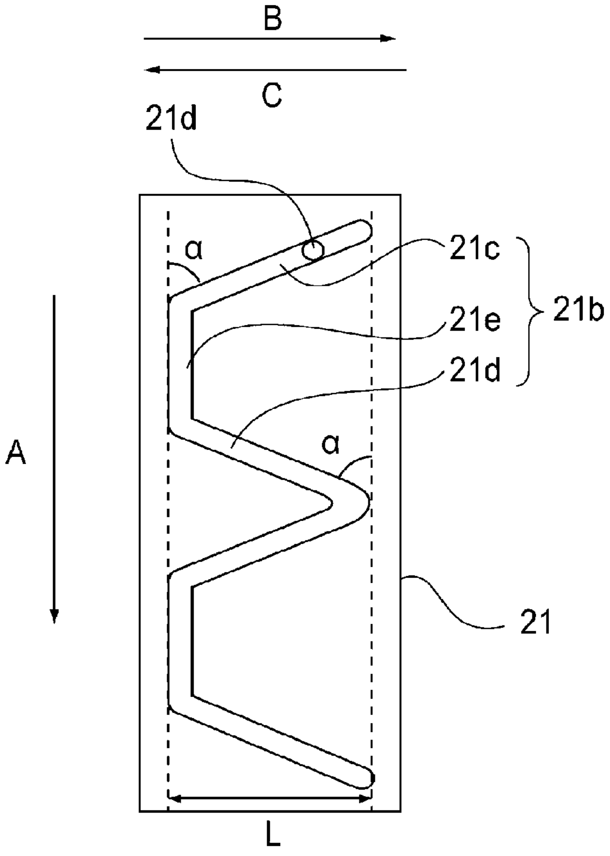
FIG. 76 is an extended elevation of an example of the cam groove configuration of the developer supply container.

With the cam groove 21*b* shown in FIG. 76, similarly to the case of FIG. 74, a cam groove 21*e* substantially parallel with the rotational moving direction of the developer accommodating portion 20 is provided between the cam groove 21*c* and the cam groove 21*d*. However, in the case of the cam groove 21*b* shown in FIG. 76, the cam groove 21*e* is provided at such a position that in a cyclic period of the pump portion 20*b*, the operation of the pump portion 20*b* stops in the state that the pump portion 20*b* is compressed, after the compressing operation of the pump portion 20*b*.

With the structure of the FIG. 76, the developer discharge amount was measured similarly. In the verification experiments for this, the compressing speed and the expanding speed of the pump portion 20*b* is 180 cm^3/s, and the other conditions are the same as with FIG. 75 example.

The results of the verification experiments will be described. Part (b) of the FIG. 77 shows changes of the internal pressure of the developer supply container 1 in the expanding-and-contracting operation of the pump portion 2*b*. Solid lines and broken lines are for the developer supply container 1 having the cam groove 21*b* of FIG. 76, and that of FIG. 75, respectively.

Also in the case of FIG. 76, the internal pressure rises with elapse of time during the compressing operation of the pump portion 20*b*, and reaches the peak upon completion of the compressing operation. At this time, similarly to FIG. 75, the pressure in the developer supply container 1 changes within the positive range, and therefore, the inside developer are discharged. The compressing speed of the pump portion 20*b* in the example of the FIG. 41 is the same as with FIG. 75 example, and therefore, the peak pressure upon completion of the compressing operation of the pump portion 2*b* is 5.7 kPa which is equivalent to the FIG. 76 example.

Subsequently, when the pump portion 20*b* stops in the compression state, the internal pressure of the developer supply container 1 gradually decreases. This is because the pressure produced by the compressing operation of the pump portion 2*b* remains after the operation stop of the pump portion 2*b*, and the inside developer and the air are discharged by the pressure. However, the internal pressure can be maintained at a level higher than in the case that the expanding operation is started immediately after completion of the compressing operation, and therefore, a larger amount of the developer is discharged during it.

When the expanding operation starts thereafter, similarly to the example of the FIG. 40, the internal pressure of the developer supply container 1 decreases, and the developer is discharged until the pressure in the developer supply container 1 becomes negative, since the inside developer is pressed continuously.

As time integration values of the pressure are compared as shown is part (b) of FIG. 77, it is larger in the case of FIG. 76, because the high internal pressure is maintained during the rest period of the pump portion 20*b* under the condition that the time durations in unit cyclic periods of the pump portion 20*b* in these examples are the same.

As shown in Table 3, the measured developer discharge amounts per one cyclic period of the pump portion 20*b* is 4.5 g in the case of FIG. 76, and is larger than in the case of FIG. 75 (3.7*g*). From the results of the Table 3 and the results shown in part (b) of FIG. 77, it has been confirmed that the developer discharge amount per one cyclic period of the pump portion 20*b* increases with time integration amount of the pressure.

Thus, in the example of FIG. 76, the operation of the pump portion 20*b* is stopped in the compressed state, after the compressing operation. For this reason, the peak pressure in the developer supply container 1 in the compressing operation of the pump portion 2*b* is high, and the pressure is maintained at a level as high as possible, by which the developer discharging amount per one cyclic period of the pump portion 20*b* can be further increased.

As described in the foregoing, by changing the configuration of the cam groove 21*b*, the discharging power of the developer supply container 1 can be adjusted, and therefore, the apparatus of this embodiment can respond to a developer amount required by the developer receiving apparatus 8 and to a property or the like of the developer to use.

In FIGS. 70-76, the discharging operation and the sucking operation of the pump portion 20*b* are alternately carried out, but the discharging operation and/or the sucking operation may be temporarily stopped partway, and a predetermined time after the discharging operation and/or the sucking operation may be resumed.

For example, it is a possible alternative that the discharging operation of the pump portion 20*b* is not carried out monotonically, but the compressing operation of the pump portion is temporarily stopped partway, and then, the compressing operation is compressed to effect discharge. The same applies to the sucking operation. Furthermore, the discharging operation and/or the sucking operation may be multi-step type, as long as the developer discharge amount and the discharging speed are satisfied. Thus, even when the discharging operation and/or the sucking operation are divided into multi-steps, the situation is still that the discharging operation and the sucking operation are alternately repeated.

As described in the foregoing, also in this embodiment, one pump is enough to effect the sucking operation and the discharging operation, and therefore, the structure of the developer discharging mechanism can be simplified. In addition, by the sucking operation through the discharge opening, a pressure reduction state (negative pressure state) can be provided in the developer supply container, and therefore, the developer can be efficiently loosened.

In addition, in this example, the driving force for rotating the feeding portion (helical projection 20*c*) and the driving force for reciprocating the pump portion (bellow-like pump portion 20*b*) are received by a single drive inputting portion (gear portion 20*a*). Therefore, the structure of the drive inputting mechanism of the developer supply container can be simplified. In addition, by the single driving mechanism (driving gear 300) provided in the developer receiving apparatus, the driving force is applied to the developer supply container, and therefore, the driving mechanism for the developer receiving apparatus can be simplified. Furthermore, a simple and easy mechanism can be employed positioning the developer supply container relative to the developer receiving apparatus.

With the structure of the example, the rotational force for rotating the feeding portion received from the developer receiving apparatus is converted by the drive converting mechanism of the developer supply container, by which the pump portion can be reciprocated properly. In other words, in a system in which the developer supply container receives the reciprocating force from the developer receiving apparatus, the appropriate drive of the pump portion is assured.

In addition, in this example, the flange portion 21 of the developer supply container 1 is provided with the engaging portions 3*b*2, 3*b*4 similar to Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 9

Figure 78:
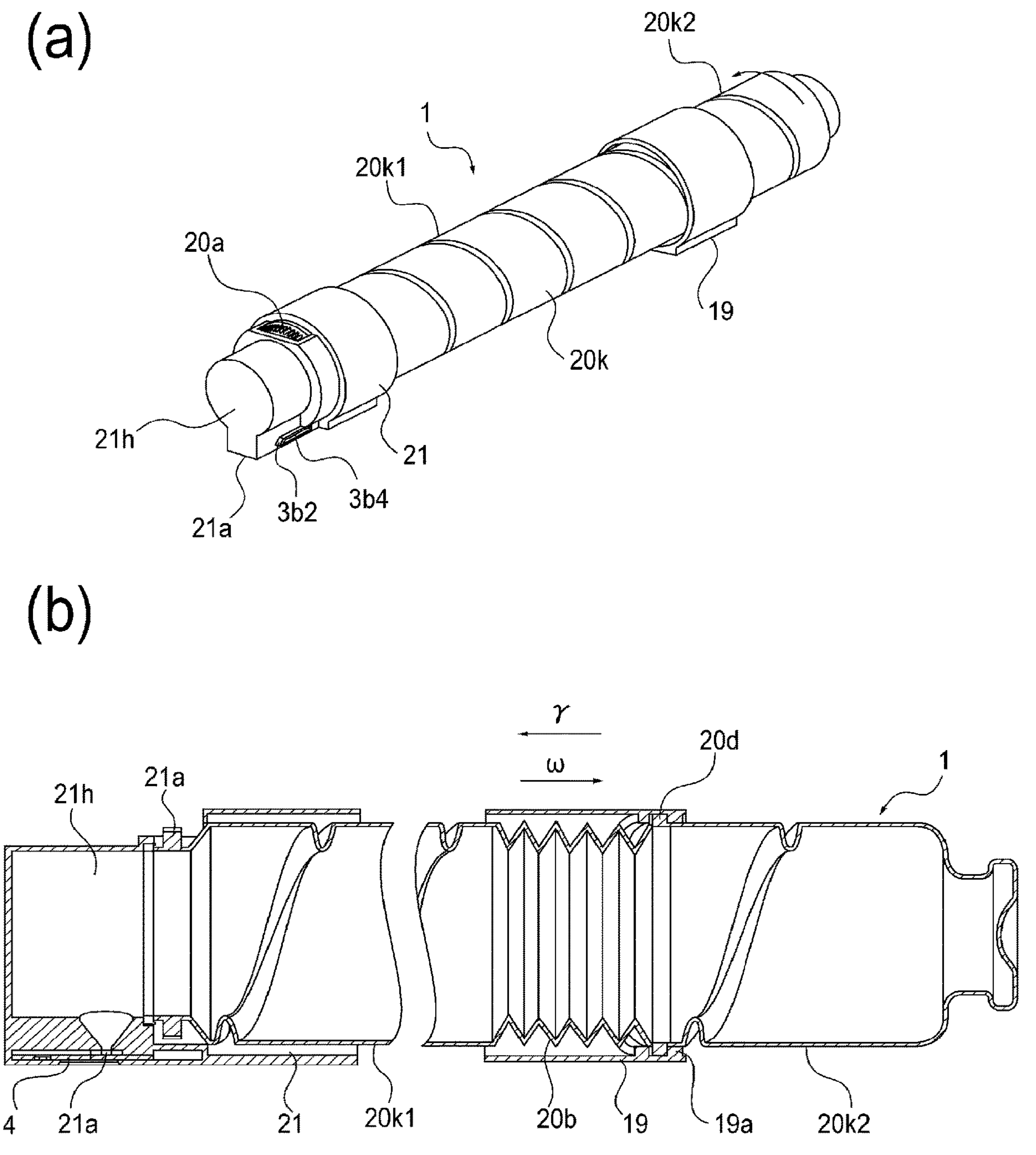
In FIG. 78, (a) is a perspective view of a structure of a developer supply container according to Embodiment 9, and (b) is a sectional view of a structure of the developer supply container.

Referring to FIG. 78 (parts (a) and (b)), structures of the Embodiment 9 will be described. Part (a) of the FIG. 78 is a schematic perspective view of the developer supply container 1, part (b) of the FIG. 78 is a schematic sectional view illustrating a state in which a pump portion 20*b* expands, and (c) is a schematic perspective view around the regulating member 56. In this example, the same reference numerals as in the foregoing embodiments are assigned to the elements having the corresponding functions in this embodiment, and the detailed description thereof is omitted.

In this example, a drive converting mechanism (cam mechanism) is provided together with a pump portion 20*b* in a position dividing a cylindrical portion 20*k* with respect to a rotational axis direction of the developer supply container 1, as is significantly different from Embodiment 8. The other structures are substantially similar to the structures of Embodiment 8.

As shown in part (a) of FIG. 78, in this example, the cylindrical portion 20*k* which feeds the developer toward a discharging portion 21*h* with rotation comprises a cylindrical portion 20*k*1 and a cylindrical portion 20*k*2. The pump portion 20*b* is provided between the cylindrical portion 20*k*1 and the cylindrical portion 20*k*2.

A cam flange portion 19 functioning as a drive converting mechanism is provided at a position corresponding to the pump portion 20*b*. An inner surface of the cam flange portion 19 is provided with a cam groove 19*a* extending over the entire circumference as in Embodiment 8. On the other hand, an outer surface of the cylindrical portion 20*k*2 is provided a cam projection 20*d* functioning as a drive converting mechanism and is locked with the cam groove 19*a*.

In addition, the developer receiving apparatus 8 is provided with a portion similar to the rotational moving direction regulating portion 29 (FIG. 66), which functions as a holding portion for the cam flange portion 19 so as to prevent the rotation. Furthermore, the developer receiving apparatus 8 is provided with a portion similar to the rotational moving direction regulating portion 30 (FIG. 66), which functions as a holding portion for the cam flange portion 19 so as to prevent the rotation.

Therefore, when a rotational force is inputted to a gear portion 20*a*, the pump portion 20*b* reciprocates together with the cylindrical portion 20*k*2 in the directions ω and γ.

As described in the foregoing, also in this embodiment, one pump is enough to effect the sucking operation and the discharging operation, and therefore, the structure of the developer discharging mechanism can be simplified. In addition, by the sucking operation through the discharge opening, a pressure reduction state (negative pressure state) can be provided in the developer supply container, and therefore, the developer can be efficiently loosened.

In addition, also in the case that the pump portion 20*b* is disposed at a position dividing the cylindrical portion, the pump portion 20*b* can be reciprocated by the rotational driving force received from the developer receiving apparatus 8, as in Embodiment 8.

Here, the structure of Embodiment 8 in which the pump portion 20*b* is directly connected with the discharging portion 21*h* is preferable from the standpoint that the pumping action of the pump portion 20*b* can be efficiently applied to the developer stored in the discharging portion 21*h*.

In addition, this embodiment requires an additional cam flange portion (drive converting mechanism) 19 which has to be held substantially stationary by the developer receiving apparatus 8. Furthermore, this embodiment requires an additional mechanism, in the developer receiving apparatus 8, for limiting movement of the cam flange portion 19 in the rotational axis direction of the cylindrical portion 20*k*. Therefore, in view of such a complication, the structure of Embodiment 8 using the flange portion 21 is preferable.

This is because in Embodiment 8, the flange portion 21 is held by the developer receiving apparatus 8 in order to make substantially immovable the portion where the developer receiving apparatus side and the developer supply container side are directly connected (the portion corresponding to the developer receiving port 11*a* and the shutter opening 4*f* in Embodiment 2), and one of cam mechanisms constituting the drive converting mechanism is provided on the flange portion 21. That is, the drive converting mechanism is simplified in this manner.

In addition, in this example, similarly to the foregoing embodiments, the flange portion 21 of the developer supply container 1 is provided with the engaging portions 3*b*2, 3*b*4 similar to those of Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 10

Figure 79:
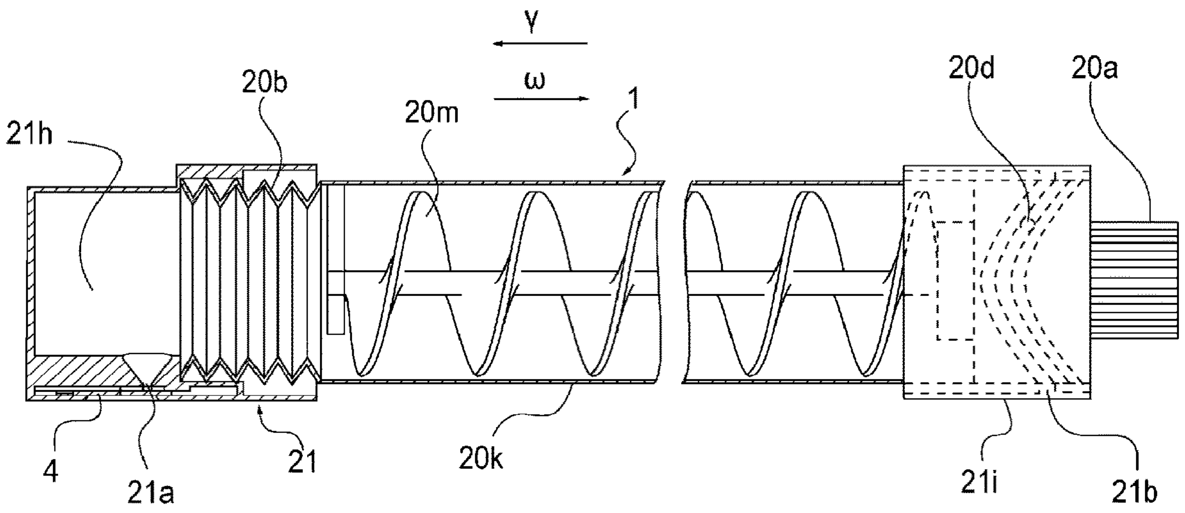
FIG. 79 is a sectional view illustrating a structure of a developer supply container according to Embodiment 10.

Referring to FIG. 79, a structure of the Embodiment 10 will be described. In this example, the same reference numerals as in the foregoing embodiments are assigned to the elements having the corresponding functions in this embodiment, and the detailed description thereof is omitted.

This example is significantly different from Embodiment 5 in that a drive converting mechanism (cam mechanism) is provided at an upstream end of the developer supply container 1 with respect to the feeding direction for the developer and in that the developer in the cylindrical portion 20*k* is fed using a stirring member 20*m*. The other structures are substantially similar to the structures of Embodiment 8.

As shown in FIG. 79, in this example, the stirring member 20*m* is provided in the cylindrical portion 2*kt* as the feeding portion and rotates relative to the cylindrical portion 20*k*. The stirring member 20*m* rotates by the rotational force received by the gear portion 20*a*, relative to the cylindrical portion 20*k* fixed to the developer receiving apparatus 8 non-rotatably, by which the developer is fed in a rotational axis direction toward the discharging portion 21*h* while being stirred. More particularly, the stirring member 20*m* is provided with a shaft portion and a feeding blade portion fixed to the shaft portion.

In this example, the gear portion 20*a* as the drive inputting portion is provided at one longitudinal end portion of the developer supply container 1 (right-hand side in FIG. 79), and the gear portion 20*a* is connected co-axially with the stirring member 20*m*.

In addition, a hollow cam flange portion 21*i* which is integral with the gear portion 20*a* is provided at one longitudinal end portion of the developer supply container (right-hand side in FIG. 79) so as to rotate co-axially with the gear portion 20*a*. The cam flange portion 21*i* is provided with a cam groove 21*b* which extends in an inner surface over the entire inner circumference, and the cam groove 21*b* is engaged with two cam projections 20*d* provided on an outer surface of the cylindrical portion 20*k* at substantially diametrically opposite positions, respectively.

One end portion (discharging portion 21*h* side) of the cylindrical portion 20*k* is fixed to the pump portion 20*b*, and the pump portion 20*b* is fixed to a flange portion 21 at one end portion (discharging portion 21*h* side) thereof. They are fixed by welding method. Therefore, in the state that it is mounted to the developer receiving apparatus 8, the pump portion 20*b* and the cylindrical portion 20*k* are substantially non-rotatable relative to the flange portion 21.

Also in this example, similarly to the Embodiment 8, when the developer supply container 1 is mounted to the developer receiving apparatus 8, the flange portion 21 (discharging portion 21*h*) is prevented from the movements in the rotational moving direction and the rotational axis direction by the developer receiving apparatus 8.

Therefore, when the rotational force is inputted from the developer receiving apparatus 8 to the gear portion 20*a*, the cam flange portion 21*i* rotates together with the stirring member 20*m*. As a result, the cam projection 20*d* is driven by the cam groove 21*b* of the cam flange portion 21*i* so that the cylindrical portion 20*k* reciprocates in the rotational axis direction to expand and contract the pump portion 20*b*.

In this manner, by the rotation of the stirring member 20*m*, the developer is fed to the discharging portion 21*h*, and the developer in the discharging portion 21*h* is finally discharged through a discharge opening 21*a* by the suction and discharging operation of the pump portion 20*b*.

As described in the foregoing, also in this embodiment, one pump is enough to effect the sucking operation and the discharging operation, and therefore, the structure of the developer discharging mechanism can be simplified. In addition, by the sucking operation through the discharge opening, a pressure reduction state (negative pressure state) can be provided in the developer supply container, and therefore, the developer can be efficiently loosened.

In addition, in the structure of this example, similarly to the Embodiments 8-9, both of the rotating operation of the stirring member 20*m* provided in the cylindrical portion 20*k* and the reciprocation of the pump portion 20*b* can be performed by the rotational force received by the gear portion 20*a* from the developer receiving apparatus 8.

In the case of this example, the stress applied to the developer in the developer feeding step at the cylindrical portion 20*t* tends to be relatively large, and the driving torque is relatively large, and from this standpoint, the structures of Embodiment 8 and Embodiment 6 are preferable.

In addition, in this example, similarly to the foregoing embodiments, the flange portion 21 of the developer supply container 1 is provided with the engaging portions 3*b*2, 3*b*4 similar to those of Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 11

Figure 80:
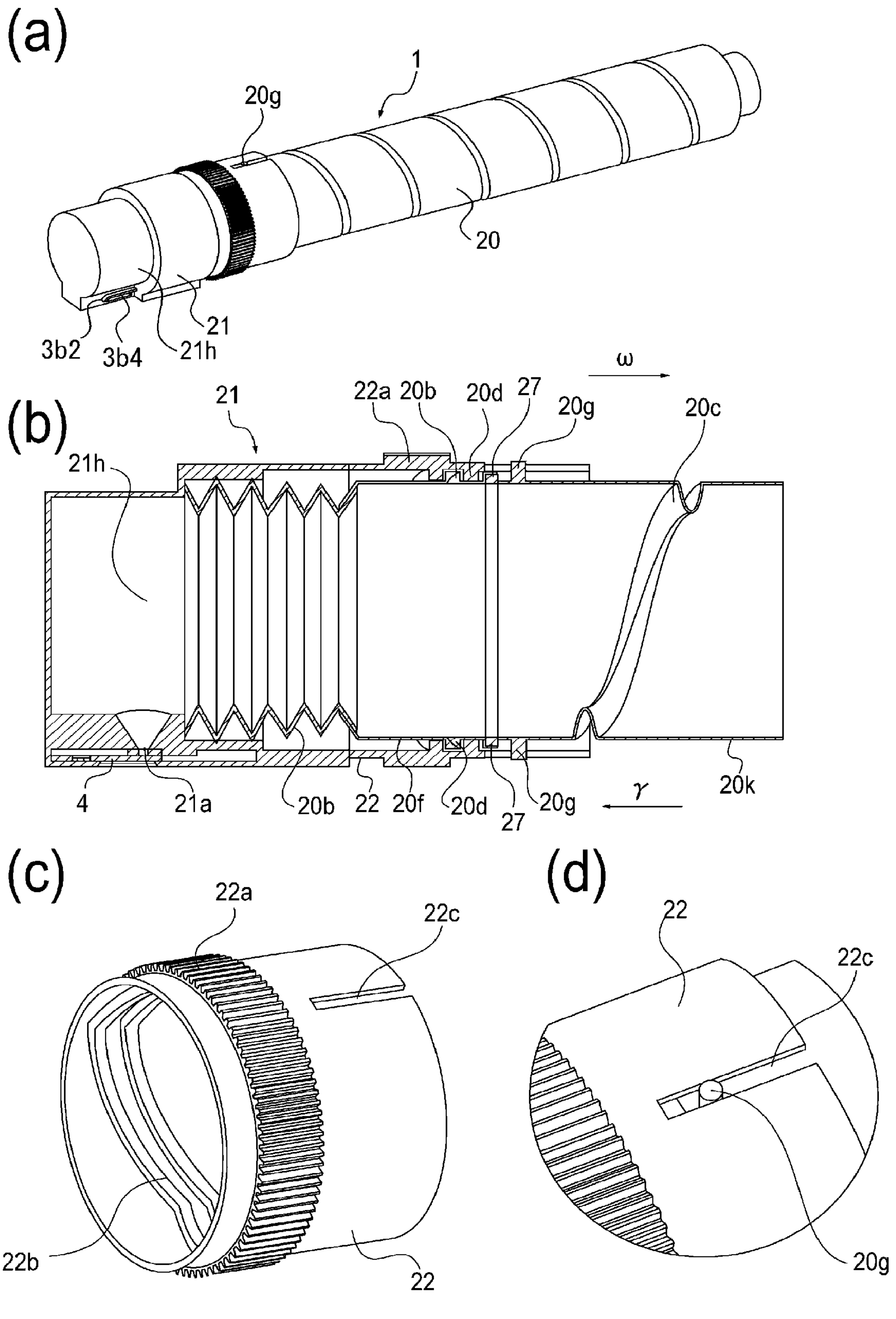
In FIG. 80, (a) is a perspective view of a developer supply container according to Embodiment 11, (b) is a sectional view of the developer supply container, (c) is a perspective view of a cam gear, and (d) is a partial enlarged view of a rotational engaging portion of a cam gear.

Referring to FIG. 80 (parts (a)-(d)), structures of the Embodiment 11 will be described. Part (a) of FIG. 80 is a schematic perspective view of a developer supply container 1, (b) is an enlarged sectional view of the developer supply container 1, and (c)-(d) are enlarged perspective views of the cam portions. In this example, the same reference numerals as in the foregoing embodiments are assigned to the elements having the corresponding functions in this embodiment, and the detailed description thereof is omitted.

This example is substantially the same as Embodiment 8 except that the pump portion **20*b* is made non-rotatable by a developer receiving apparatus 8**.

In this example, as shown in parts (a) and (b) of FIG. 80, relaying portion **20*f* is provided between a pump portion 20*b* and a cylindrical portion 20*k* of a developer accommodating portion 20. The relaying portion 20*f* is provided with two cam projections 20*d* on the outer surface thereof at the positions substantially diametrically opposed to each other, and one end thereof (discharging portion 21*h* side) is connected to and fixed to the pump portion 20*b*** (welding method).

Another end (discharging portion **21*h* side) of the pump portion 20*b* is fixed to a flange portion 21 (welding method), and in the state that it is mounted to the developer receiving apparatus 8**, it is substantially non-rotatable.

A sealing member 27 is compressed between the cylindrical portion **20*k* and the relaying portion 20*f*, and the cylindrical portion 20*k* is unified so as to be rotatable relative to the relaying portion 20*f*. The outer peripheral portion of the cylindrical portion 20*k* is provided with a rotation receiving portion (projection) 20*g* for receiving a rotational force from a cam gear portion 7**, as will be described hereinafter.

On the other hand, the cam gear portion 7 which is cylindrical is provided so as to cover the outer surface of the relaying portion **20*f*. The cam gear portion 22 is engaged with the flange portion 21 so as to be substantially stationary (movement within the limit of play is permitted), and is rotatable relative to the flange portion 21**.

As shown in part (c) of FIG. 80, the cam gear portion 22 is provided with a gear portion **22*a* as a drive inputting portion for receiving the rotational force from the developer receiving apparatus 8, and a cam groove 22*b* engaged with the cam projection 20*d*. In addition, as shown in part (d) of FIG. 80, the cam gear portion 22 is provided with a rotational engaging portion (recess) 7*c* engaged with the rotation receiving portion 20*g* to rotate together with the cylindrical portion 20*k*. Thus, by the above-described engaging relation, the rotational engaging portion (recess) 7*c* is permitted to move relative to the rotation receiving portion 20*g*** in the rotational axis direction, but it can rotate integrally in the rotational moving direction.

The description will be made as to a developer supplying step of the developer supply container 1 in this example.

When the gear portion **22*a* receives a rotational force from the driving gear 9 of the developer receiving apparatus 8, and the cam gear portion 22 rotates, the cam gear portion 22 rotates together with the cylindrical portion 20*k* because of the engaging relation with the rotation receiving portion 20*g* by the rotational engaging portion 7*c*. That is, the rotational engaging portion 7*c* and the rotation receiving portion 20*g* function to transmit the rotational force which is received by the gear portion 22*a* from the developer receiving apparatus 8, to the cylindrical portion 20*k* (feeding portion 20*c***).

On the other hand, similarly to Embodiments 8-10, when the developer supply container 1 is mounted to the developer receiving apparatus 8, the flange portion 21 is non-rotatably supported by the developer receiving apparatus 8, and therefore, the pump portion **20*b* and the relaying portion 20*f* fixed to the flange portion 21 is also non-rotatable. In addition, the movement of the flange portion 21 in the rotational axis direction is prevented by the developer receiving apparatus 8**.

Therefore, when the cam gear portion 22 rotates, a cam function occurs between the cam groove **22*b* of the cam gear portion 22 and the cam projection 20*d* of the relaying portion 20*f*. Thus, the rotational force inputted to the gear portion 22*a* from the developer receiving apparatus 8 is converted to the force reciprocating the relaying portion 20*f* and the cylindrical portion 20*k* in the rotational axis direction of the developer accommodating portion 20. As a result, the pump portion 20*b* which is fixed to the flange portion 21 at one end position (left side in part (b) of the FIG. 80) with respect to the reciprocating direction expands and contracts in interrelation with the reciprocation of the relaying portion 20*f* and the cylindrical portion 20*k***, thus effecting a pump operation.

In this manner, with the rotation of the cylindrical portion **20*k*, the developer is fed to the discharging portion 21*h* by the feeding portion 20*c*, and the developer in the discharging portion 21*h* is finally discharged through a discharge opening 21*a* by the suction and discharging operation of the pump portion 20*b***.

As described in the foregoing, also in this embodiment, one pump is enough to effect the sucking operation and the discharging operation, and therefore, the structure of the developer discharging mechanism can be simplified. In addition, by the sucking operation through the discharge opening, a pressure reduction state (negative pressure state) can be provided in the developer supply container, and therefore, the developer can be efficiently loosened.

In addition, in this example, the rotational force received from the developer receiving apparatus 8 is transmitted and converted simultaneously to the force rotating the cylindrical portion **20*k* and to the force reciprocating (expanding-and-contracting operation) the pump portion 20*b*** in the rotational axis direction.

Therefore, also in this example, similarly to Embodiments 8-10, by the rotational force received from the developer receiving apparatus 8, both of the rotating operation of the cylindrical portion **20*k* (feeding portion 20*c*) and the reciprocation of the pump portion 20*b*** can be effected.

In addition, in this example, similarly to the foregoing embodiments, the flange portion 21 of the developer supply container 1 is provided with the engaging portions **3*b*2, 3*b*4 similar to those of Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11** can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 12

Figure 81:
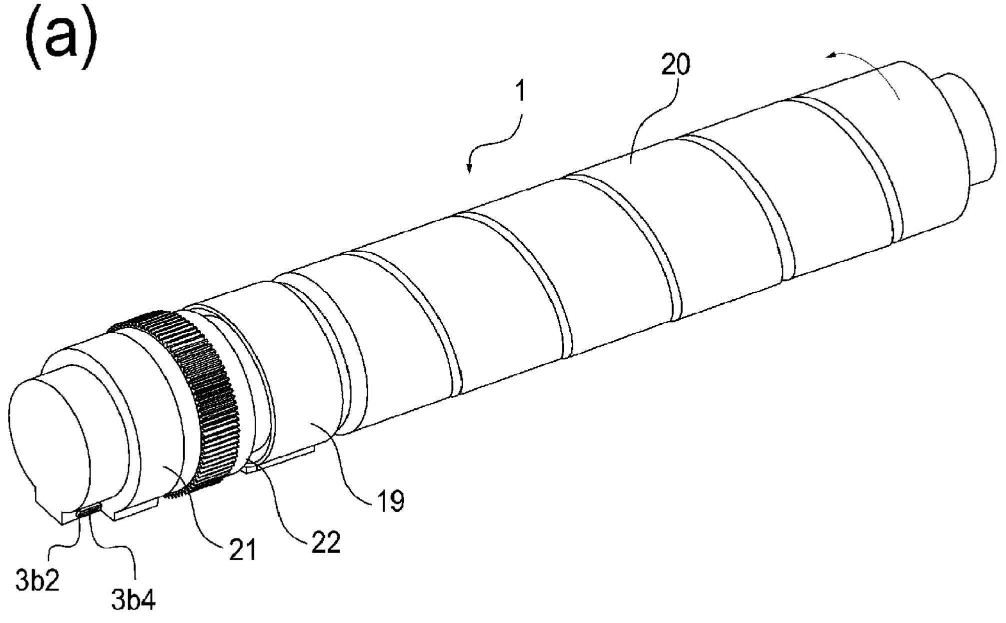
In FIG. 81, (a) is a perspective view of a structure of a developer supply container according to Embodiment 12, and (b) is a sectional view of a structure of the developer supply container.
Figure 81:
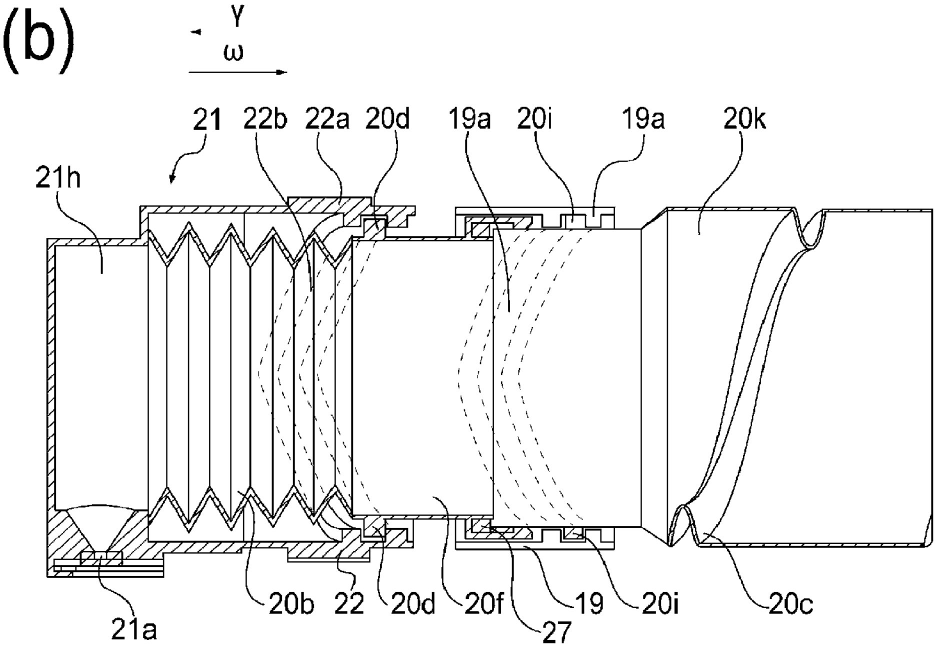

Referring to parts (a) and (b) of the FIG. 81, Embodiment 12 will be described. Part (a) of the FIG. 81 is a schematic perspective view of a developer supply container 1, part (b) is an enlarged sectional view of the developer supply container. In this example, the same reference numerals as in the foregoing embodiments are assigned to the elements having the corresponding functions in this embodiment, and the detailed description thereof is omitted.

This example is significantly different from Embodiment 8 in that a rotational force received from a driving gear 9 of a developer receiving apparatus 8 is converted to a reciprocating force for reciprocating a pump portion 20*b*, and then the reciprocating force is converted to a rotational force, by which a cylindrical portion 20*k* is rotated.

In this example, as shown in part (b) of the FIG. 81, a relaying portion 20*f* is provided between the pump portion 20*b* and the cylindrical portion 20*k*. The relaying portion 20*f* includes two cam projections 20*d* at substantially diametrically opposite positions, respectively, and one end sides thereof (discharging portion 21*h* side) are connected and fixed to the pump portion 20*b* by welding method.

Another end (discharging portion 21*h* side) of the pump portion 20*b* is fixed to a flange portion 21 (welding method), and in the state that it is mounted to the developer receiving apparatus 8, it is substantially non-rotatable.

Between the one end portion of the cylindrical portion 20*k* and the relaying portion 20*f*, a sealing member 27 is compressed, and the cylindrical portion 20*k* is unified such that it is rotatable relative to the relaying portion 20*f*. An outer periphery portion of the cylindrical portion 20*k* is provided with two cam projections 20*i* at substantially diametrically opposite positions, respectively.

On the other hand, a cylindrical cam gear portion 22 is provided so as to cover the outer surfaces of the pump portion 20*b* and the relaying portion 20*f*. The cam gear portion 22 is engaged so that it is non-movable relative to the flange portion 21 in a rotational axis direction of the cylindrical portion 20*k* but it is rotatable relative thereto. The cam gear portion 22 is provided with a gear portion 22*a* as a drive inputting portion for receiving the rotational force from the developer replenishing apparatus 8, and a cam groove 22*a* engaged with the cam projection 20*d*.

Furthermore, there is provided a cam flange portion 19 covering the outer surfaces of the relaying portion 20*f* and the cylindrical portion 20*k*. When the developer supply container 1 is mounted to a mounting portion 8*f* of the developer receiving apparatus 8, cam flange portion 19 is substantially non-movable. The cam flange portion 19 is provided with a cam projection 20*i* and a cam groove 19*a*.

A developer supplying step in this example will be described.

The gear portion 22*a* receives a rotational force from a driving gear 300 of the developer receiving apparatus 8 by which the cam gear portion 22 rotates. Then, since the pump portion 20*b* and the relaying portion 20*f* are held non-rotatably by the flange portion 21, a cam function occurs between the cam groove 22*b* of the cam gear portion 22 and the cam projection 20*d* of the relaying portion 20*f*.

More particularly, the rotational force inputted to the gear portion 7*a* from the developer receiving apparatus 8 is converted to a reciprocation force the relaying portion 20*f* in the rotational axis direction of the cylindrical portion 20*k*. As a result, the pump portion 20*b* which is fixed to the flange portion 21 at one end with respect to the reciprocating direction the left side of the part (b) of the FIG. 81) expands and contracts in interrelation with the reciprocation of the relaying portion 20*f*, thus effecting the pump operation.

When the relaying portion 20*f* reciprocates, a cam function works between the cam groove 19*a* of the cam flange portion 19 and the cam projection 20*i* by which the force in the rotational axis direction is converted to a force in the rotational moving direction, and the force is transmitted to the cylindrical portion 20*k*. As a result, the cylindrical portion 20*k* (feeding portion 20*c*) rotates. In this manner, with the rotation of the cylindrical portion 20*k*, the developer is fed to the discharging portion 21*h* by the feeding portion 20*c*, and the developer in the discharging portion 21*h* is finally discharged through a discharge opening 21*a* by the suction and discharging operation of the pump portion 20*b*.

As described in the foregoing, also in this embodiment, one pump is enough to effect the sucking operation and the discharging operation, and therefore, the structure of the developer discharging mechanism can be simplified. In addition, by the sucking operation through the discharge opening, a pressure reduction state (negative pressure state) can be provided in the developer supply container, and therefore, the developer can be efficiently loosened.

In addition, in this example, the rotational force received from the developer receiving apparatus 8 is converted to the force reciprocating the pump portion 20*b* in the rotational axis direction (expanding-and-contracting operation), and then the force is converted to a force rotation the cylindrical portion 20*k* and is transmitted.

Therefore, also in this example, similarly to Embodiment 11, by the rotational force received from the developer receiving apparatus 8, both of the rotating operation of the cylindrical portion 20*k* (feeding portion 20*c*) and the reciprocation of the pump portion 20*b* can be effected.

However, in this example, the rotational force inputted from the developer receiving apparatus 8 is converted to the reciprocating force and then is converted to the force in the rotational moving direction with the result of complicated structure of the drive converting mechanism, and therefore, Embodiments 8-11 in which the re-conversion is unnecessary are preferable.

In addition, in this example, similarly to the foregoing embodiments, the flange portion 21 of the developer supply container 1 is provided with the engaging portions 3*b*2, 3*b*4 similar to those of Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 13

Figure 82:
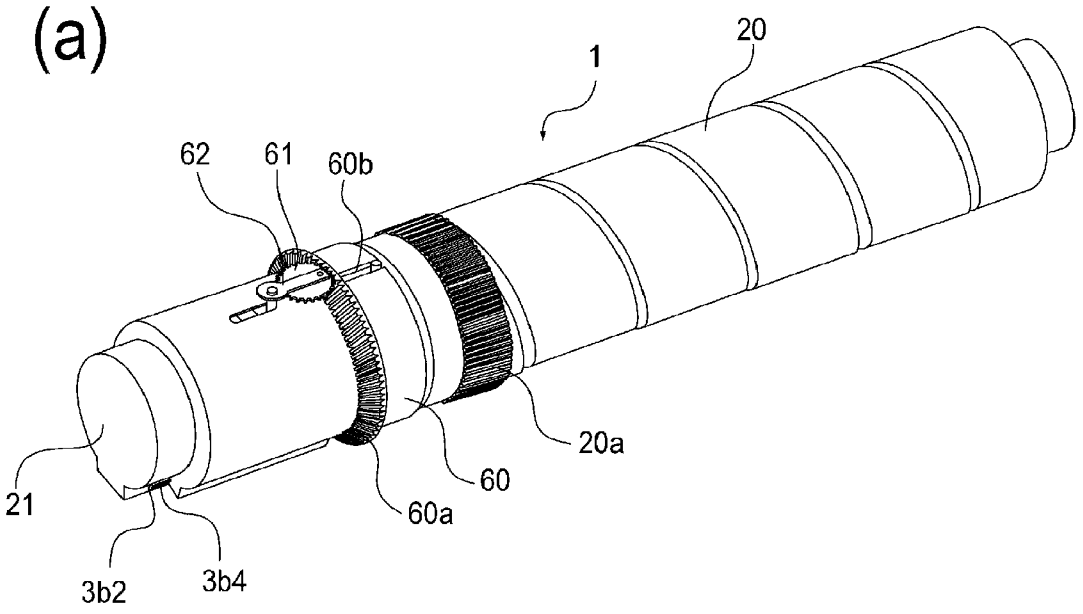
In FIG. 82, (a) is a perspective view of a structure of a developer supply container according to Embodiment 13, and (b) is a sectional view of a structure of the developer supply container.
Figure 82:
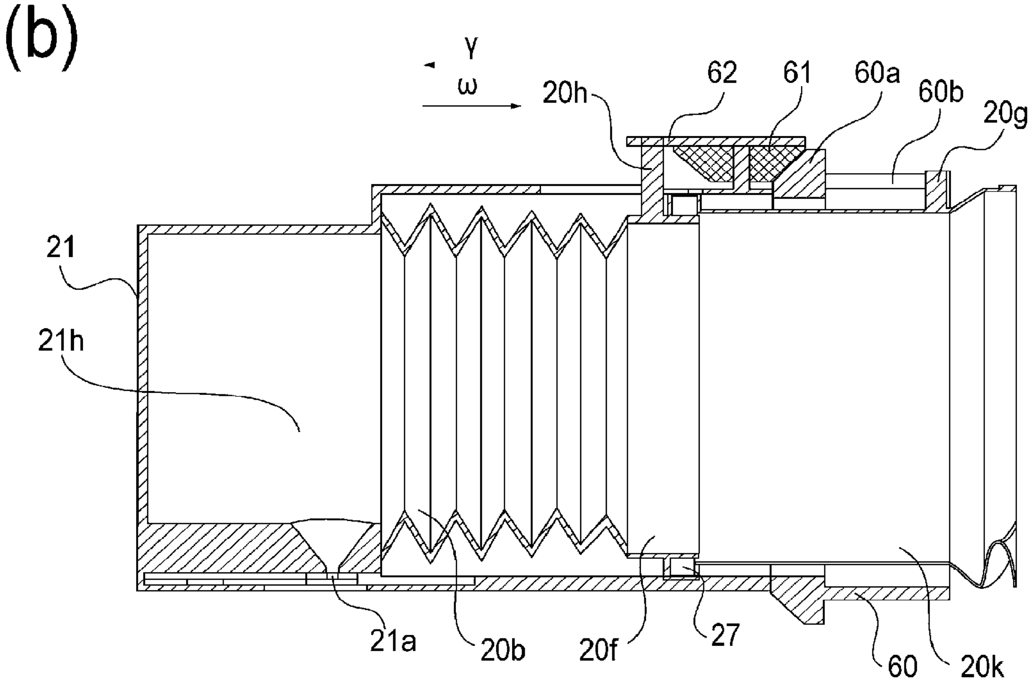
Figure 83:
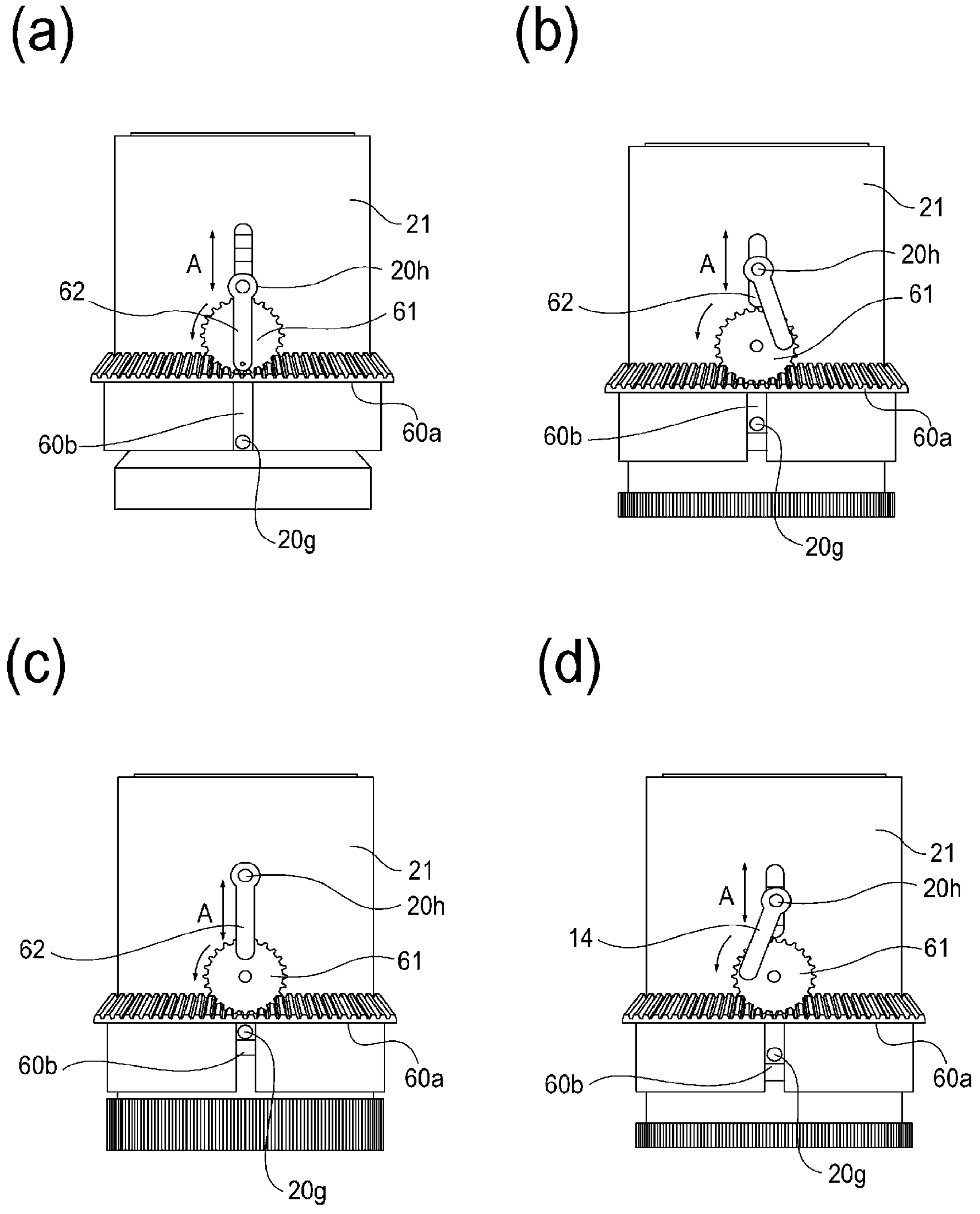
In FIG. 83, (a)-(d) illustrate an operation of a drive converting mechanism.

Referring to parts (a)-(b) of FIG. 82 and parts (a)-(d) of FIG. 83, Embodiment 13 will be described. Part (a) of FIG. 82 is a schematic perspective view of a developer supply container, part (b) is an enlarged sectional view of the developer supply container 1, and parts (a)-(d) of FIG. 83 are enlarged views of a drive converting mechanism. In parts (a)-(d) of FIG. 83, a gear ring 60 and a rotational engaging portion 8*b* are shown as always taking top positions for better illustration of the operations thereof. In this example, the same reference numerals as in the foregoing embodiments are assigned to the elements having the corresponding functions in this embodiment, and the detailed description thereof is omitted.

In this example, the drive converting mechanism employs a bevel gear, as is contrasted to the foregoing examples.

As shown in part (b) of FIG. 82, a relaying portion 20*f* is provided between a pump portion 20*b* and a cylindrical portion 20*k*. The relaying portion 20*f* is provided with an engaging projection 20*h* engaged with a connecting portion 62 which will be described hereinafter.

Another end (discharging portion 21*h* side) of the pump portion 20*b* is fixed to a flange portion 21 (welding method), and in the state that it is mounted to the developer receiving apparatus 8, it is substantially non-rotatable.

A sealing member 27 is compressed between the discharging portion 21*h* side end of the cylindrical portion 20*k* and the relaying portion 20*f*, and the cylindrical portion 20*k* is unified so as to be rotatable relative to the relaying portion 20*f*. An outer periphery portion of the cylindrical portion 20*k* is provided with a rotation receiving portion (projection) 20*g* for receiving a rotational force from the gear ring 60 which will be described hereinafter.

On the other hand, a cylindrical gear ring 60 is provided so as to cover the outer surface of the cylindrical portion 20*k*. The gear ring 60 is rotatable relative to the flange portion 21.

As shown in parts (a) and (b) of FIG. 82, the gear ring 60 includes a gear portion 60*a* for transmitting the rotational force to the bevel gear 61 which will be described hereinafter and a rotational engaging portion (recess) 60*b* for engaging with the rotation receiving portion 20*g* to rotate together with the cylindrical portion 20*k*. Thus, by the above-described engaging relation, the rotational engaging portion (recess) 60*b* is permitted to move relative to the rotation receiving portion 20*g* in the rotational axis direction, but it can rotate integrally in the rotational moving direction.

On the outer surface of the flange portion 21, the bevel 61 is provided so as to be rotatable relative to the flange portion 21. Furthermore, the bevel 61 and the engaging projection 20*h* are connected by a connecting portion 62.

A developer supplying step of the developer supply container 1 will be described.

When the cylindrical portion 20*k* rotates by the gear portion 20*a* of the developer accommodating portion 20 receiving the rotational force from the driving gear 9 of the developer receiving apparatus 8, gear ring 60 rotates with the cylindrical portion 20*k* since the cylindrical portion 20*k* is in engagement with the gear ring 60 by the receiving portion 20*g*. That is, the rotation receiving portion 20*g* and the rotational engaging portion 60*b* function to transmit the rotational force inputted from the developer receiving apparatus 8 to the gear portion 20*a* to the gear ring 60.

On the other hand, when the gear ring 60 rotates, the rotational force is transmitted to the bevel gear 61 from the gear portion 60*a* so that the bevel gear 61 rotates. The rotation of the bevel gear 61 is converted to reciprocating motion of the engaging projection 20*h* through the connecting portion 62, as shown in parts (a)-(d) of the FIG. 83. By this, the relaying portion 20*f* having the engaging projection 20*h* is reciprocated. As a result, the pump portion 20*b* expands and contracts in interrelation with the reciprocation of the relaying portion 20*f* to effect a pump operation.

In this manner, with the rotation of the cylindrical portion 20*k*, the developer is fed to the discharging portion 21*h* by the feeding portion 20*c*, and the developer in the discharging portion 21*h* is finally discharged through a discharge opening 21*a* by the suction and discharging operation of the pump portion 20*b*.

As described in the foregoing, also in this embodiment, one pump is enough to effect the sucking operation and the discharging operation, and therefore, the structure of the developer discharging mechanism can be simplified. In addition, by the sucking operation through the discharge opening, a pressure reduction state (negative pressure state) can be provided in the developer supply container, and therefore, the developer can be efficiently loosened.

In addition, also in this example, similarly to the Embodiment 8-Embodiment 12, both of the reciprocation of the pump portion 20*b* and the rotating operation of the cylindrical portion 20*k* (feeding portion 20*c*) are effected by the rotational force received from the developer receiving apparatus 8.

However, in the case of using the bevel gear, the number of parts is large, and Embodiment 8-Embodiment 12 are preferable from this standpoint.

In addition, in this example, similarly to the foregoing embodiments, the flange portion 21 of the developer supply container 1 is provided with the engaging portions 3*b*2, 3*b*4 similar to those of Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 14

Figure 84:
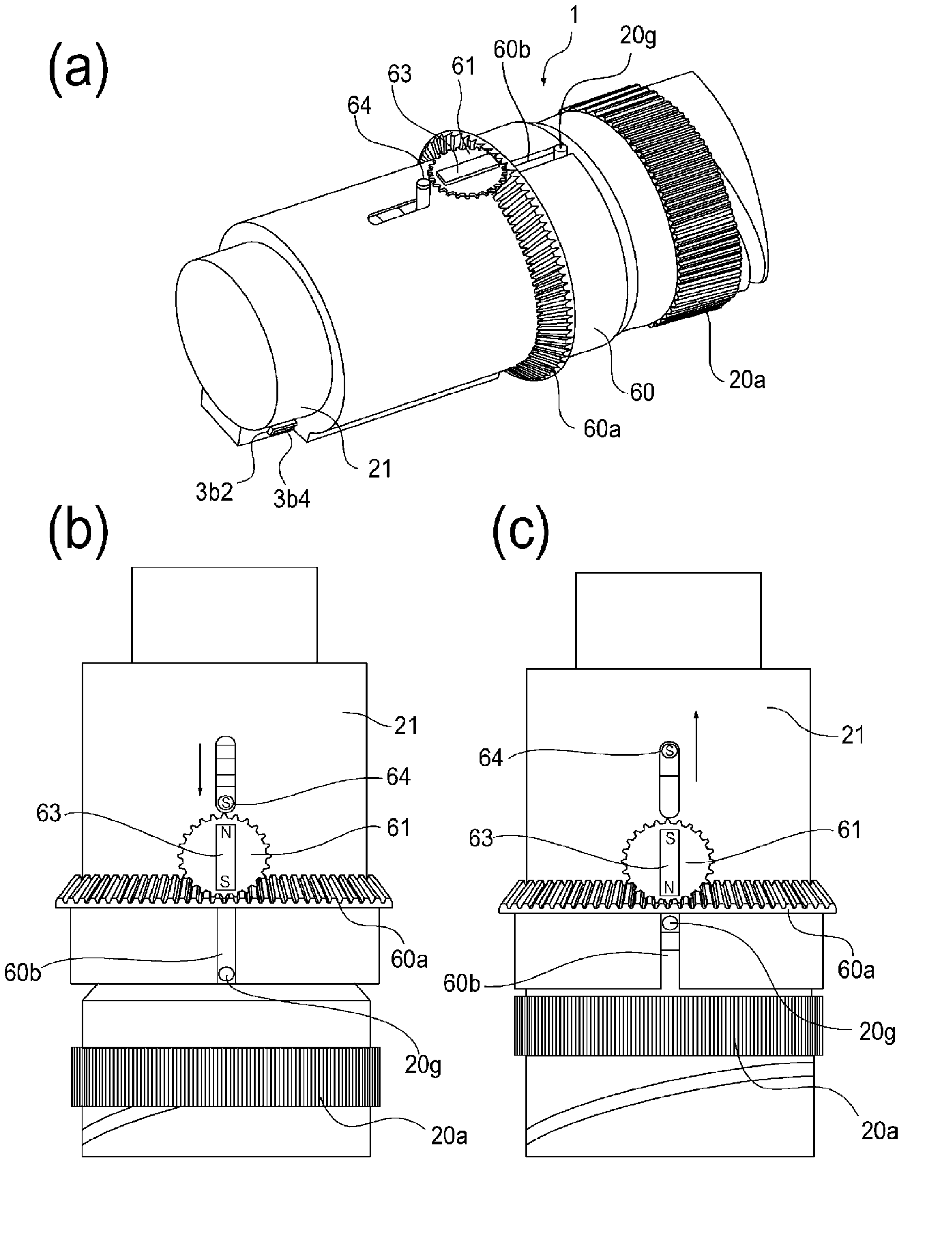
In FIG. 84, (a) is a perspective view of a structure of a developer supply container according to Embodiment 14, and (b) and (c) illustrate an operation of a drive converting mechanism.

Referring to FIG. 84 (parts (a) and (b)), structures of the Embodiment 14 will be described. Part (a) of FIG. 84 is an enlarged perspective view of a drive converting mechanism, (b)-(c) are enlarged views thereof as seen from the top. In this example, the same reference numerals as in the foregoing embodiments are assigned to the elements having the corresponding functions in this embodiment, and the detailed description thereof is omitted. In parts (b) and (c) of FIG. 84, a gear ring 60 and a rotational engaging portion 60*b* are schematically shown as being at the top for the convenience of illustration of the operation.

In this embodiment, the drive converting mechanism includes a magnet (magnetic field generating means) as is significantly different from Embodiments.

As shown in FIG. 84 (FIG. 83, if necessary), the bevel gear 61 is provided with a rectangular parallelepiped shape magnet 63, and an engaging projection 20*h* of a relaying portion 20*f* is provided with a bar-like magnet 64 having a magnetic pole directed to the magnet 63. The rectangular parallelepiped shape magnet 63 has a N pole at one longitudinal end thereof and a S pole as the other end, and the orientation thereof changes with the rotation of the bevel gear 61. The bar-like magnet 64 has a S pole at one longitudinal end adjacent an outside of the container and a N pole at the other end, and it is movable in the rotational axis direction. The magnet 64 is non-rotatable by an elongated guide groove formed in the outer peripheral surface of the flange portion 21.

With such a structure, when the magnet 63 is rotated by the rotation of the bevel gear 61, the magnetic pole facing the magnet and exchanges, and therefore, attraction and repelling between the magnet 63 and the magnet 64 are repeated alternately. As a result, a pump portion 20*b* fixed to the relaying portion 20*f* is reciprocated in the rotational axis direction.

As described in the foregoing, also in this embodiment, one pump is enough to effect the sucking operation and the discharging operation, and therefore, the structure of the developer discharging mechanism can be simplified. In addition, by the sucking operation through the discharge opening, a pressure reduction state (negative pressure state) can be provided in the developer supply container, and therefore, the developer can be efficiently loosened.

In addition, also in the structure of this example, similarly to the Embodiment 8-Embodiment 13, both of the reciprocation of the pump portion 20*b* and the rotating operation of the feeding portion 20*c* (cylindrical portion 20*k*) can be effected by the rotational force received from the developer receiving apparatus 8.

In this example, the bevel gear 61 is provided with the magnet, but this is not inevitable, and another way of use of magnetic force (magnetic field) is applicable.

From the standpoint of certainty of the drive conversion, Embodiments 8-13 are preferable. In the case that the developer accommodated in the developer supply container 1 is a magnetic developer (one component magnetic toner, two component magnetic carrier), there is a liability that the developer is trapped in an inner wall portion of the container adjacent to the magnet. Then, an amount of the developer remaining in the developer supply container 1 may be large, and from this standpoint, the structures of Embodiments 5-10 are preferable.

In addition, in this example, similarly to the foregoing embodiments, the flange portion 21 of the developer supply container 1 is provided with the engaging portions 3*b*2, 3*b*4 similar to those of Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 15

Referring to parts (a)-(c) of FIG. 85 and parts (a)-(b) of FIG. 86, Embodiment 15 will be described. Part (a) of the FIG. 85 is a schematic view illustrating an inside of a developer supply container 1, (b) is a sectional view in a state that the pump portion 20*b* is expanded to the maximum in the developer supplying step, showing (c) is a sectional view of the developer supply container 1 in a state that the pump portion 20*b* is compressed to the maximum in the developer supplying step. Part (a) of FIG. 86 is a schematic view illustrating an inside of the developer supply container 1, (b) is a perspective view of a rear end portion of the cylindrical portion 20*k*, and (c) is a schematic perspective view around a regulating member 56. In this example, the same reference numerals as in the foregoing embodiments are assigned to the elements having the corresponding functions in this embodiment, and the detailed description thereof is omitted.

This embodiment is significantly different from the structures of the above-described embodiments in that the pump portion 20*b* is provided at a leading end portion of the developer supply container 1 and in that the pump portion 20*b* does not have the functions of transmitting the rotational force received from the driving gear 9 to the cylindrical portion 20*k*. More particularly, the pump portion 20*b* is provided outside a drive conversion path of the drive converting mechanism, that is, outside a drive transmission path extending from the coupling portion 20*s* (part (b) of FIG. 86) received the rotational force from the driving gear 9 (FIG. 66) to the cam groove 20*n*.

This structure is employed in consideration of the fact that with the structure of Embodiment 8, after the rotational force inputted from the driving gear 9 is transmitted to the cylindrical portion 20*k* through the pump portion 20*b*, it is converted to the reciprocation force, and therefore, the pump portion 20*b* receives the rotational moving direction always in the developer supplying step operation. Therefore, there is a liability that in the developer supplying step the pump portion 20*b* is twisted in the rotational moving direction with the results of deterioration of the pump function. This will be described in detail.

As shown in part (a) of FIG. 85, an opening portion of one end portion (discharging portion 21*h* side) of the pump portion 20*b* is fixed to a flange portion 21 (welding method), and when the container is mounted to the developer receiving apparatus 8, the pump portion 20*b* is substantially non-rotatable with the flange portion 21.

On the other hand, a cam flange portion 19 is provided covering the outer surface of the flange portion 21 and/or the cylindrical portion 20*k*, and the cam flange portion 15 functions as a drive converting mechanism. As shown in FIG. 85, the inner surface of the cam flange portion 19 is provided with two cam projections 19*a* at diametrically opposite positions, respectively. In addition, the cam flange portion 19 is fixed to the closed side (opposite the discharging portion 21*h* side) of the pump portion 20*b*.

On the other hand, the outer surface of the cylindrical portion 20*k* is provided with a cam groove 20*n* functioning as the drive converting mechanism, the cam groove 20*n* extending over the entire circumference, and the cam projection 19*a* is engaged with the cam groove 20*n*.

Furthermore, in this embodiment, as is different from Embodiment 8, as shown in part (b) of the FIG. 86, one end surface of the cylindrical portion 20*k* (upstream side with respect to the feeding direction of the developer) is provided with a non-circular (rectangular in this example) male coupling portion 20*s* functioning as the drive inputting portion. On the other hand, the developer receiving apparatus 8 includes non-circular (rectangular) female coupling portion) for driving connection with the male coupling portion 20*s* to apply a rotational force. The female coupling portion, similarly to Embodiment 8, is driven by a driving motor 500.

In addition, the flange portion 21 is prevented, similarly to Embodiment 5, from moving in the rotational axis direction and in the rotational moving direction by the developer receiving apparatus 8. On the other hand, the cylindrical portion 20*k* is connected with the flange portion 21 through a sealing member 27, and the cylindrical portion 20*k* is rotatable relative to the flange portion 21. The sealing member 27 is a sliding type seal which prevents incoming and outgoing leakage of air (developer) between the cylindrical portion 20*k* and the flange portion 21 within a range not influential to the developer supply using the pump portion 20*b* and which permits rotation of the cylindrical portion 20*k*.

A developer supplying step of the developer supply container 1 will be described.

The developer supply container 1 is mounted to the developer receiving apparatus 8, and then the cylindrical portion 20*k* receptions the rotational force from the female coupling portion of the developer receiving apparatus 8, by which the cam groove 20*n* rotates.

Therefore, the cam flange portion 19 reciprocates in the rotational axis direction relative to the flange portion 21 and the cylindrical portion 20*k* by the cam projection 19*a* engaged with the cam groove 20*n*, while the cylindrical portion 20*k* and the flange portion 21 are prevented from movement in the rotational axis direction by the developer receiving apparatus 8.

Since the cam flange portion 19 and the pump portion 20*b* are fixed with each other, the pump portion 20*b* reciprocates with the cam flange portion 19 (arrow ω direction and arrow γ direction). As a result, as shown in parts (b) and (c) of FIG. 85, the pump portion 20*b* expands and contracts in interrelation with the reciprocation of the cam flange portion 19, thus effecting a pumping operation.

As described in the foregoing, also in this embodiment, one pump is enough to effect the sucking operation and the discharging operation, and therefore, the structure of the developer discharging mechanism can be simplified. In addition, by the sucking operation through the discharge opening 21*a*, a pressure reduction state (negative pressure state) can be provided in the developer supply container, and therefore, the developer can be efficiently loosened.

In addition, also in this example, similar to the above-described Embodiments 8-14, the rotational force received from the developer receiving apparatus 8 is converted a force operating the pump portion 20*b*, in the developer supply container 1, so that the pump portion 20*b* can be operated properly.

In addition, the rotational force received from the developer receiving apparatus 8 is converted to the reciprocation force without using the pump portion 20*b*, by which the pump portion 20*b* is prevented from being damaged due to the torsion in the rotational moving direction. Therefore, it is unnecessary to increase the strength of the pump portion 20*b*, and the thickness of the pump portion 20*b* may be small, and the material thereof may be an inexpensive one.

Further with the structure of this example, the pump portion 20*b* is not provided between the discharging portion 21*h* and the cylindrical portion 20*k* as in Embodiment 8-Embodiment 14, but is provided at a position away from the cylindrical portion 20*k* of the discharging portion 21*h*, and therefore, the developer amount remaining in the developer supply container 1 can be reduced.

As shown in (a) of FIG. 86, it is an usable alternative that the internal space of the pump portion 20*b* is not uses as a developer accommodating space, and the filter 65 partitions between the pump portion 20*b* and the discharging portion 21*h*. Here, the filter has such a property that the air is easily passed, but the toner is not passed substantially. With such a structure, when the pump portion 20*b* is compressed, the developer in the recessed portion of the bellow portion is not stressed. However, the structure of parts (a)-(c) of FIG. 85 is preferable from the standpoint that in the expanding stroke of the pump portion 20*b*, an additional developer accommodating space can be formed, that is, an additional space through which the developer can move is provided, so that the developer is easily loosened.

In addition, in this example, similarly to the foregoing embodiments, the flange portion 21 of the developer supply container 1 is provided with the engaging portions 3*b*2, 3*b*4 similar to those of Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 16

Referring to FIG. 87 (parts (a) and (b)), structures of the Embodiment 16 will be described. Parts (a)-(c) of FIG. 87 are enlarged sectional views of a developer supply container 1. In parts (a)-(c) of FIG. 87, the structures except for the pump are substantially the same as structures shown in FIGS. 85 and 86, and therefore, the detailed description there of is omitted.

In this example, the pump does not have the alternating peak folding portions and bottom folding portions, but it has a film-like pump portion 38 capable of expansion and contraction substantially without a folding portion, as shown in FIG. 87.

In this embodiment, the film-like pump portion 38 is made of rubber, but this is not inevitable, and flexible material such as resin film is usable.

With such a structure, when the cam flange portion 19 reciprocates in the rotational axis direction, the film-like pump portion 38 reciprocates together with the cam flange portion 19. As a result, as shown in parts (b) and (c) of FIG. 87, the film-like pump portion 38 expands and contracts interrelated with the reciprocation of the cam flange portion 19 in the directions of arrow ω and arrow γ, thus effecting a pumping operation.

As described in the foregoing, also in this embodiment, one pump 38 is enough to effect the sucking operation and the discharging operation, and therefore, the structure of the developer discharging mechanism can be simplified. In addition, by the sucking operation through the discharge opening 21*a*, a pressure reduction state (negative pressure state) can be provided in the developer supply container, and therefore, the developer can be efficiently loosened.

In addition, also in this example, similar to the above-described Embodiments 8-15, the rotational force received from the developer receiving apparatus 8 is converted a force operating the pump portion 38, in the developer supply container 1, so that the pump portion 38 can be operated properly.

In addition, in this example, similarly to the foregoing embodiments, the flange portion 21 of the developer supply container 1 is provided with the engaging portions 3*b*2, 3*b*4 similar to those of Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 17

Referring to FIG. 88 (parts (a) and (b)), structures of the Embodiment 17 will be described. Part (a) of FIG. 88 is a schematic perspective view of the developer supply container 1, (b) is an enlarged sectional view of the developer supply container 1, (c)-(e) are schematic enlarged views of a drive converting mechanism. In this example, the same reference numerals as in the foregoing embodiments are assigned to the elements having the corresponding functions in this embodiment, and the detailed description thereof is omitted.

In this example, the pump portion is reciprocated in a direction perpendicular to a rotational axis direction, as is contrasted to the foregoing embodiments.

(Drive Converting Mechanism)

In this example, as shown in parts (a)-(e) of FIG. 88, at an upper portion of the flange portion 21, that is, the discharging portion 21*h*, a pump portion 21*f* of bellow type is connected. In addition, to a top end portion of the pump portion 21*f*, a cam projection 21*g* functioning as a drive converting portion is fixed by bonding. On the other hand, at one longitudinal end surface of the developer accommodating portion 20, a cam groove 20*e* engageable with a cam projection 21*g* is formed and it function as a drive converting portion.

As shown in part (b) of FIG. 88, the developer accommodating portion 20 is fixed so as to be rotatable relative to discharging portion 21*h* in the state that a discharging portion 21*h* side end compresses a sealing member 27 provided on an inner surface of the flange portion 21.

Also in this example, with the mounting operation of the developer supply container 1, both sides of the discharging portion 21*h* (opposite end surfaces with respect to a direction perpendicular to the rotational axis direction X) are supported by the developer receiving apparatus 8. Therefore, during the developer supply operation, the discharging portion 21*h* is substantially non-rotatable.

Also in this example, the mounting portion 8*f* of the developer receiving apparatus 8 is provided with a developer receiving portion 11 (FIG. 40 or FIG. 66) for receiving the developer discharged from the developer supply container 1 through the discharge opening (opening) 21*a* which will be described hereinafter. The structure of the developer receiving portion 11 is similar to the those of Embodiment 1 or Embodiment 2, and therefore, the description thereof is omitted.

In addition, the flange portion 21 of the developer supply container is provided with engaging portions 3*b*2 and 3*b*4 engageable with the developer receiving portion 11 displaceably provided on the developer receiving apparatus 8 similarly to the above-described Embodiment 1 or Embodiment 2. The structures of the engaging portions 3*b*2, 3*b*4 are similar to those of above-described Embodiment 1 or Embodiment 2, and therefore, the description is omitted.

Here, the configuration of the cam groove 20*e* is elliptical configuration as shown in (c)-(e) of FIG. 88, and the cam projection 21*g* moving along the cam groove 20*e* changes in the distance from the rotational axis of the developer accommodating portion (minimum distance in the diametrical direction).

As shown in (b) of FIG. 88, a plate-like partition wall 32 is provided and is effective to feed, to the discharging portion 21*h*, a developer fed by a helical projection (feeding portion) 20*c* from the cylindrical portion 20*k*. The partition wall 32 divides a part of the developer accommodating portion 20 substantially into two parts and is rotatable integrally with the developer accommodating portion 20. The partition wall 32 is provided with an inclined projection 32*a* slanted relative to the rotational axis direction of the developer supply container 1. The inclined projection 32*a* is connected with an inlet portion of the discharging portion 21*h*.

Therefore, the developer fed from the feeding portion 20*c* is scooped up by the partition wall 32 in interrelation with the rotation of the cylindrical portion 20*k*. Thereafter, with a further rotation of the cylindrical portion 20*k*, the developer slide down on the surface of the partition wall 32 by the gravity, and is fed to the discharging portion 21*h* side by the inclined projection 32*a*. The inclined projection 32*a* is provided on each of the sides of the partition wall 32 so that the developer is fed into the discharging portion 21*h* every one half rotation of the cylindrical portion 20*k*.

(Developer Supplying Step)

The description will be made as to developer supplying step from the developer supply container 1 in this example When the operator mounts the developer supply container 1 to the developer receiving apparatus 8, the flange portion 21 (discharging portion 21*h*) is prevented from movement in the rotational moving direction and in the rotational axis direction by the developer receiving apparatus 8. In addition, the pump portion 21*f* and the cam projection 21*g* are fixed to the flange portion 21, and are prevented from movement in the rotational moving direction and in the rotational axis direction, similarly.

And, by the rotational force inputted from a driving gear 9 (FIGS. 67 and 68) to a gear portion 20*a*, the developer accommodating portion 20 rotates, and therefore, the cam groove 20*e* also rotates. On the other hand, the cam projection 21*g* which is fixed so as to be non-rotatable receives the force through the cam groove 20*e*, so that the rotational force inputted to the gear portion 20*a* is converted to a force reciprocating the pump portion 21*f* substantially vertically. Here, part (d) of FIG. 88 illustrates a state in which the pump portion 21*f* is most expanded, that is, the cam projection 21*g* is at the intersection between the ellipse of the cam groove 20*e* and the major axis La (point Y in (c) of FIG. 88). Part (e) of FIG. 88 illustrates a state in which the pump portion 21*f* is most contracted, that is, the cam projection 21*g* is at the intersection between the ellipse of the cam groove 20*e* and the minor axis La (point Z in (c) of FIG. 53).

The state of (d) of FIG. 88 and the state of (e) of FIG. 88 are repeated alternately at predetermined cyclic period so that the pump portion 21*f* effects the suction and discharging operation. That is the developer is discharged smoothly.

With such rotation of the cylindrical portion 20*k*, the developer is fed to the discharging portion 21*h* by the feeding portion 20*c* and the inclined projection 32*a*, and the developer in the discharging portion 21*h* is finally discharged through the discharge opening 21*a* by the suction and discharging operation of the pump portion 21*f*.

As described in the foregoing, also in this embodiment, one pump is enough to effect the sucking operation and the discharging operation, and therefore, the structure of the developer discharging mechanism can be simplified. In addition, by the sucking operation through the discharge opening, a pressure reduction state (negative pressure state) can be provided in the developer supply container, and therefore, the developer can be efficiently loosened.

In addition, also in this example, similarly to the Embodiment 8-Embodiment 16, both of the reciprocation of the pump portion 21*f* and the rotating operation of the feeding portion 20*c* (cylindrical portion 20*k*) can be effected by gear portion 20*a* receiving the rotational force from the developer receiving apparatus 8.

Since, in this example, the pump portion 21*f* is provided at a top of the discharging portion 21*h* (in the state that the developer supply container 1 is mounted to the developer receiving apparatus 8), the amount of the developer unavoidably remaining in the pump portion 21*f* can be minimized as compared with Embodiment 8.

In this example, the pump portion 21*f* is a bellow-like pump, but it may be replaced with a film-like pump described in Embodiment 13.

In this example, the cam projection 21*g* as the drive transmitting portion is fixed by an adhesive material to the upper surface of the pump portion 21*f*, but the cam projection 21*g* is not necessarily fixed to the pump portion 21*f*. For example, a known snap hook engagement is usable, or a round rod-like cam projection 21*g* and a pump portion 3*f* having a hole engageable with the cam projection 21*g* may be used in combination. With such a structure, the similar advantageous effects can be provided.

In addition, in this example, similarly to the foregoing embodiments, the flange portion 21 of the developer supply container 1 is provided with the engaging portions 3*b*2, 3*b*4 similar to those of Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 18

Referring to FIGS. 89-91, the description will be made as to structures of Embodiment 18. Part of (a) of FIG. 89 is a schematic perspective view of a developer supply container 1, (b) is a schematic perspective view of a flange portion 21, (c) is a schematic perspective view of a cylindrical portion 20*k*, part art (a)-(b) of FIG. 90 are enlarged sectional views of the developer supply container 1, and FIG. 91 is a schematic view of a pump portion 21*f*. In this example, the same reference numerals as in the foregoing embodiments are assigned to the elements having the corresponding functions in this embodiment, and the detailed description thereof is omitted.

In this example, a rotational force is converted to a force for forward operation of the pump portion 21*f* without converting the rotational force to a force for backward operation of the pump portion, as is contrasted to the foregoing embodiments.

In this example, as shown in FIGS. 89-91, a bellow type pump portion 21*f* is provided at a side of the flange portion 21 adjacent the cylindrical portion 20*k*. An outer surface of the cylindrical portion 20*k* is provided with a gear portion 20*a* which extends on the full circumference. At an end of the cylindrical portion 20*k* adjacent a discharging portion 21*h*, two compressing projections 21 for compressing the pump portion 21*f* by abutting to the pump portion 21*f* by the rotation of the cylindrical portion 20*k* are provided at diametrically opposite positions, respectively. A configuration of the compressing projection 201 at a downstream side with respect to the rotational moving direction is slanted to gradually compress the pump portion 21*f* so as to reduce the impact upon abutment to the pump portion 21*f*. On the other hand, a configuration of the compressing projection 201 at the upstream side with respect to the rotational moving direction is a surface perpendicular to the end surface of the cylindrical portion 20*k* to be substantially parallel with the rotational axis direction of the cylindrical portion 20*k* so that the pump portion 21*f* instantaneously expands by the restoring elastic force thereof.

Similarly to Embodiment 13, the inside of the cylindrical portion 20*k* is provided with a plate-like partition wall 32 for feeding the developer fed by a helical projection 20*c* to the discharging portion 21*h*.

Also in this example, the mounting portion 8*f* of the developer receiving apparatus 8 is provided with a developer receiving portion 11 (FIG. 40 or FIG. 66) for receiving the developer discharged from the developer supply container 1 through the discharge opening (opening) 21*a* which will be described hereinafter. The structure of the developer receiving portion 11 is similar to the those of Embodiment 1 or Embodiment 2, and therefore, the description thereof is omitted.

In addition, the flange portion 21 of the developer supply container is provided with engaging portions 3*b*2 and 3*b*4 engageable with the developer receiving portion 11 displaceably provided on the developer receiving apparatus 8 similarly to the above-described Embodiment 1 or Embodiment 2. The structures of the engaging portions 3*b*2, 3*b*4 are similar to those of above-described Embodiment 1 or Embodiment 2, and therefore, the description is omitted.

In addition, also in this example, the flange portion 21 is substantial stationary (non-rotatable) when the developer supply container 1 is mounted to the mounting portion 8*f* of the developer receiving apparatus 8. Therefore, during the developer supply, the flange portion 21 does not substantially rotate.

The description will be made as to developer supplying step from the developer supply container 1 in this example.

After the developer supply container 1 is mounted to the developer receiving apparatus 8, cylindrical portion 20*k* which is the developer accommodating portion 20 rotates by the rotational force inputted from the driving gear 300 to the gear portion 20*a*, so that the compressing projection 21 rotates. At this time, when the compressing projections 21 abut to the pump portion 21*f*, the pump portion 21*f* is compressed in the direction of a arrow $\gamma$, as shown in part (a) of FIG. 90, so that a discharging operation is effected.

On the other hand, when the rotation of the cylindrical portion 20*k* continues until the pump portion 21*f* is released from the compressing projection 21, the pump portion 21*f* expands in the direction of an arrow $\omega$ by the self-restoring force, as shown in part (b) of FIG. 90, so that it restores to the original shape, by which the sucking operation is effected.

The states shown in (a) and (b) of FIG. 90 are alternately repeated, by which the pump portion 21*f* effects the suction and discharging operations. That is the developer is discharged smoothly.

With the rotation of the cylindrical portion 20*k* in this manner, the developer is fed to the discharging portion 21*h* by the helical projection (feeding portion) 20*c* and the inclined projection (feeding portion) 32*a* (FIG. 88). The developer in the discharging portion 21*h* is finally discharged through the discharge opening 21*a* by the discharging operation of the pump portion 21*f*.

As described in the foregoing, also in this embodiment, one pump is enough to effect the sucking operation and the discharging operation, and therefore, the structure of the developer discharging mechanism can be simplified. In addition, by the sucking operation through the discharge opening, a pressure reduction state (negative pressure state) can be provided in the developer supply container, and therefore, the developer can be efficiently loosened.

In addition, also in this example, similarly to the Embodiment 8-Embodiment 17, both of the reciprocation of the pump portion 21*f* and the rotating operation of the developer supply container 1 can be effected by the rotational force received from the developer receiving apparatus 8.

In this example, the pump portion 21*f* is compressed by the contact to the compressing projection 201, and expands by the self-restoring force of the pump portion 21*f* when it is released from the compressing projection 21, but the structure may be opposite.

More particularly, when the pump portion 21*f* is contacted by the compressing projection 21, they are locked, and with the rotation of the cylindrical portion 20*k*, the pump portion 21*f* is forcedly expanded. With further rotation of the cylindrical portion 20*k*, the pump portion 21*f* is released, by which the pump portion 21*f* restores to the original shape by the self-restoring force (restoring elastic force). Thus, the sucking operation and the discharging operation are alternately repeated.

In the case of this example, the self restoring power of the pump portion 21*f* is likely to be deteriorated by repetition of the expansion and contraction of the pump portion 21*f* for a long term, and from this standpoint, the structures of Embodiments 8-17 are preferable. Or, by employing the structure of FIG. 91, the likelihood can be avoided.

As shown in FIG. 91, compression plate 20*q* is fixed to an end surface of the pump portion 21*f* adjacent the cylindrical portion 20*k*. Between the outer surface of the flange portion 21 and the compression plate 20*q*, a spring 20*r* functioning as an urging member is provided covering the pump portion 21*f*. The spring 20*r* normally urges the pump portion 21*f* in the expanding direction.

With such a structure, the self restoration of the pump portion 21*f* at the time when the contact between the compression projection 201 and the pump position is released can be assisted, the sucking operation can be carried out assuredly even when the expansion and contraction of the pump portion 21*f* is repeated for a long term.

In this example, two compressing projections 201 functioning as the drive converting mechanism are provided at the diametrically opposite positions, but this is not inevitable, and the number thereof may be one or three, for example. In addition, in place of one compressing projection, the following structure may be employed as the drive converting mechanism. For example, the configuration of the end surface opposing the pump portion 21*f* of the cylindrical portion 20*k* is not a perpendicular surface relative to the rotational axis of the cylindrical portion 20*k* as in this example, but is a surface inclined relative to the rotational axis. In this case, the inclined surface acts on the pump portion 21*f* to be equivalent to the compressing projection. In another alternative, a shaft portion is extended from a rotation axis at the end surface of the cylindrical portion 20*k* opposed to the pump portion 21*f* toward the pump portion 21*f* in the rotational axis direction, and a swash plate (disk) inclined relative to the rotational axis of the shaft portion is provided. In this case, the swash plate acts on the pump portion 21*f*, and therefore, it is equivalent to the compressing projection.

In addition, in this example, similarly to the foregoing embodiments, the flange portion 21 of the developer supply container 1 is provided with the engaging portions 3*b*2, 3*b*4 similar to those of Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 19

Referring to FIG. 92 (parts (a) and (b)), structures of the Embodiment 19 will be described. Parts (a) and (b) of FIG. 92 are sectional views schematically illustrating a developer supply container 1.

In this example, the pump portion 21*f* is provided at the cylindrical portion 20*k*, and the pump portion 21*f* rotates together with the cylindrical portion 20*k*. In addition, in this example, the pump portion 21*f* is provided with a weight 20*v*, by which the pump portion 21*f* reciprocates with the rotation. The other structures of this example are similar to those of Embodiment 17 (FIG. 88), and the detailed description thereof is omitted by assigning the same reference numerals to the corresponding elements.

As shown in part (a) of FIG. 92, the cylindrical portion 20*k*, the flange portion 21 and the pump portion 21*f* function as a developer accommodating space of the developer supply container 1. The pump portion 21*f* is connected to an outer periphery portion of the cylindrical portion 20*k*, and the action of the pump portion 21*f* works to the cylindrical portion 20*k* and the discharging portion 21*h*.

A drive converting mechanism of this example will be described.

One end surface of the cylindrical portion 20*k* with respect to the rotational axis direction is provided with coupling portion (rectangular configuration projection) 20*s* functioning as a drive inputting portion, and the coupling portion 20*s* receives a rotational force from the developer receiving apparatus 8. On the top of one end of the pump portion 21*f* with respect to the reciprocating direction, the weight 20*v* is fixed. In this example, the weight 20*v* functions as the drive converting mechanism.

Thus, with the integral rotation of the cylindrical portion 20*k* and the pump portion 21*f*, the pump portion 21*f* expands and contract in the up and down directions by the gravitation to the weight 20*v*.

More particularly, in the state of part (a) of FIG. 92, the weight takes a position upper than the pump portion 21*f*, and the pump portion 21*f* is contracted by the weight 20*v* in the direction of the gravitation (white arrow). At this time, the developer is discharged through the discharge opening 21*a* (black arrow).

On the other hand, in the state of part (b) of FIG. 92, weight takes a position lower than the pump portion 21*f*, and the pump portion 21*f* is expanded by the weight 20*v* in the direction of the gravitation (white arrow). At this time, the sucking operation is effected through the discharge opening 21*a* (black arrow), by which the developer is loosened.

As described in the foregoing, also in this embodiment, one pump is enough to effect the sucking operation and the discharging operation, and therefore, the structure of the developer discharging mechanism can be simplified. In addition, by the sucking operation through the discharge opening, a pressure reduction state (negative pressure state) can be provided in the developer supply container, and therefore, the developer can be efficiently loosened.

In addition, also in this example, similarly to the Embodiment 8-Embodiment 18, both of the reciprocation of the pump portion 21*f* and the rotating operation of the developer supply container 1 can be effected by the rotational force received from the developer receiving apparatus 8.

In this example, the pump portion 21*f* rotates about the cylindrical portion 20*k*, and therefore, the space required by the mounting portion 8*f* of the developer receiving apparatus 8 is relatively large with the result of upsizing of the device, and from this standpoint, the structures of Embodiment 8-Embodiment 18 are preferable.

In addition, in this example, similarly to the foregoing embodiments, the flange portion 21 of the developer supply container 1 is provided with the engaging portions 3*b*2, 3*b*4 similar to those of Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 20

Referring to FIGS. 93-95, the description will be made as to structures of Embodiment 20. Part (a) of FIG. 93 is a perspective view of a cylindrical portion 20*k*, and (b) is a perspective view of a flange portion 21. Parts (a) and (b) of FIG. 94 are partially sectional perspective views of a developer supply container 1, and (a) shows a state in which a rotatable shutter is open, and (b) shows a state in which the rotatable shutter is closed. FIG. 95 is a timing chart illustrating a relation between operation timing of the pump portion 21*f* and timing of opening and closing of the rotatable shutter. In FIG. 95, contraction is a discharging step of the pump portion 21*f*, expansion is a suction step of the pump portion 21*f*.

In this example, a mechanism for separating between a discharging chamber 21*h* and the cylindrical portion 20*k* during the expanding-and-contracting operation of the pump portion 21*f* is provided, as is contrasted to the foregoing embodiments. In this example, a mechanism for separating between a discharging chamber 21*h* and the cylindrical portion 20*k* during the expanding-and-contracting operation of the pump portion 21*f* is provided.

The inside of the discharging portion 21*h* functions as a developer accommodating portion for receiving the developer fed from the cylindrical portion 20*k* as will be described hereinafter. The structures of this example in the other respects are substantially the same as those of Embodiment 17 (FIG. 88), and the description thereof is omitted by assigning the same reference numerals to the corresponding elements.

As shown in part (a) of FIG. 93, one longitudinal end surface of the cylindrical portion 20*k* functions as a rotatable shutter. More particularly, said one longitudinal end surface of the cylindrical portion 20*k* is provided with a communication opening 20*u* for discharging the developer to the flange portion 21, and is provided with a closing portion 20*h*. The communication opening 20*u* has a sector-shape.

On the other hand, as shown in part (b) of FIG. 93, the flange portion 21 is provided with a communication opening 21*k* for receiving the developer from the cylindrical portion 20*k*. The communication opening 21*k* has a sector-shape configuration similar to the communication opening 20*u*, and the portion other than that is closed to provide a closing portion 21*m*.

Parts (a)-(b) of FIG. 94 illustrate a state in which the cylindrical portion 20*k* shown in part (a) of FIG. 93 and the flange portion 21 shown in part (b) of FIG. 93 have been assembled. The communication opening 20*u* and the outer surface of the communication opening 21*k* are connected with each other so as to compress the sealing member 27, and the cylindrical portion 20*k* is rotatable relative to the stationary flange portion 21.

With such a structure, when the cylindrical portion 20*k* is rotated relatively by the rotational force received by the gear portion 20*a*, the relation between the cylindrical portion 20*k* and the flange portion 21 are alternately switched between the communication state and the non-passage continuing state.

That is, rotation of the cylindrical portion 20*k*, the communication opening 20*u* of the cylindrical portion 20*k* becomes aligned with the communication opening 21*k* of the flange portion 21 (part (a) of FIG. 94). With a further rotation of the cylindrical portion 20*k*, the communication opening 20*u* of the cylindrical portion 20*k* becomes into non-alignment with the communication opening 21*k*, so that the flange portion 21 is closed, by which the situation is switched to a non-communication state (part (b) of FIG. 94) in which the flange portion 21 is separated to substantially seal the flange portion 21.

Such a partitioning mechanism (rotatable shutter) for isolating the discharging portion 21*h* at least in the expanding-and-contracting operation of the pump portion 21*f* is provided for the following reasons.

The discharging of the developer from the developer supply container 1 is effected by making the internal pressure of the developer supply container 1 higher than the ambient pressure by contracting the pump portion 21*f*. Therefore, if the partitioning mechanism is not provided as in foregoing Embodiments 8-18, the space of which the internal pressure is changed is not limited to the inside space of the flange portion 21 but includes the inside space of the cylindrical portion 20*k*, and therefore, the amount of volume change of the pump portion 21*f* has to be made eager.

This is because a ratio of a volume of the inside space of the developer supply container 1 immediately after the pump portion 21*f* is contracted to its end to the volume of the inside space of the developer supply container 1 immediately before the pump portion 21*f* starts the contraction is influenced by the internal pressure.

However, when the partitioning mechanism is provided, there is no movement of the air from the flange portion 21 to the cylindrical portion 20*k*, and therefore, it is enough to change the pressure of the inside space of the flange portion 21. That is, under the condition of the same internal pressure value, the amount of the volume change of the pump portion 21*f* may be smaller when the original volume of the inside space is smaller.

In this example, more specifically, the volume of the discharging portion 21*h* separated by the rotatable shutter is 40 cm^3, and the volume change of the pump portion 21*f* (reciprocation movement distance) is 2 cm^3 (it is 15 cm^3 in Embodiment 5). Even with such a small volume change, developer supply by a sufficient suction and discharging effect can be effected, similarly to Embodiment 5.

As described in the foregoing, in this example, as compared with the structures of Embodiments 5-19, the volume change amount of the pump portion 21*f* can be minimized. As a result, the pump portion 21*f* can be downsized. In addition, the distance through which the pump portion 21*f* is reciprocated (volume change amount) can be made smaller. The provision of such a partitioning mechanism is effective particularly in the case that the capacity of the cylindrical portion 20*k* is large in order to make the filled amount of the developer in the developer supply container 1 is large.

Developer supplying steps in this example will be described.

In the state that developer supply container 1 is mounted to the developer receiving apparatus 8 and the flange portion 21 is fixed, drive is inputted to the gear portion 20*a* from the driving gear 300, by which the cylindrical portion 20*k* rotates, and the cam groove 20*e* rotates. On the other hand, the cam projection 21*g* fixed to the pump portion 21*f* non-rotatably supported by the developer receiving apparatus 8 with the flange portion 21 is moved by the cam groove 20*e*. Therefore, with the rotation of the cylindrical portion 20*k*, the pump portion 21*f* reciprocates in the up and down directions.

Referring to FIG. 95, the description will be made as to the timing of the pumping operation (sucking operation and discharging operation of the pump portion 21*f* and the timing of opening and closing of the rotatable shutter, in such a structure. FIG. 95 is a timing chart when the cylindrical portion 20*k* rotates one full turn. In FIG. 95, contraction means contracting operation of the pump portion 21*f* the discharging operation of the pump portion 21*f*), expansion means the expanding operation of the pump portion 21*f* (sucking operation of the pump portion 21*f*). In addition, stop means a rest state of the pump portion 21*f*. In addition, opening means the opening state of the rotatable shutter, and close means the closing state of the rotatable shutter.

As shown in FIG. 95, when the communication opening 21*k* and the communication opening 20*u* are aligned with each other, the drive converting mechanism converts the rotational force inputted to the gear portion 20*a* so that the pumping operation of the pump portion 21*f* stops. More specifically, in this example, the structure is such that when the communication opening 21*k* and the communication opening 20*u* are aligned with each other, a radius distance from the rotation axis of the cylindrical portion 20*k* to the cam groove 20*e* is constant so that the pump portion 21*f* does not operate even when the cylindrical portion 20*k* rotates.

At this time, the rotatable shutter is in the opening position, and therefore, the developer is fed from the cylindrical portion 20*k* to the flange portion 21. More particularly, with the rotation of the cylindrical portion 20*k*, the developer is scooped up by the partition wall 32, and thereafter, it slides down on the inclined projection 32*a* by the gravity, so that the developer moves via the communication opening 20*u* and the communication opening 21*k* to the flange 21.

As shown in FIG. 95, when the non-communication state in which the communication opening 21*k* and the communication opening 20*u* are out of alignment is established, the drive converting mechanism converts the rotational force inputted to the gear portion 20*b* so that the pumping operation of the pump portion 21*f* is effected.

That is, with further rotation of the cylindrical portion 20*k*, the rotational phase relation between the communication opening 21*k* and the communication opening 20*u* changes so that the communication opening 21*k* is closed by the stop portion 20*h* with the result that the inside space of the flange 3 is isolated (non-communication state).

At this time, with the rotation of the cylindrical portion 20*k*, the pump portion 21*f* is reciprocated in the state that the non-communication state is maintained (the rotatable shutter is in the closing position). More particularly, by the rotation of the cylindrical portion 20*k*, the cam groove 20*e* rotates, and the radius distance from the rotation axis of the cylindrical portion 20*k* to the cam groove 20*e* changes. By this, the pump portion 21*f* effects the pumping operation through the cam function.

Thereafter, with further rotation of the cylindrical portion 20*k*, the rotational phases are aligned again between the communication opening 21*k* and the communication opening 20*u*, so that the communicated state is established in the flange portion 21.

The developer supplying step from the developer supply container 1 is carried out while repeating these operations.

As described in the foregoing, also in this embodiment, one pump is enough to effect the sucking operation and the discharging operation, and therefore, the structure of the developer discharging mechanism can be simplified. In addition, by the sucking operation through the discharge opening 21*a*, a pressure reduction state (negative pressure state) can be provided in the developer supply container, and therefore, the developer can be efficiently loosened.

In addition, also in this example, by the gear portion 20*a* receiving the rotational force from the developer receiving apparatus 8, both of the rotating operation of the cylindrical portion 20*k* and the suction and discharging operation of the pump portion 21*f* can be effected.

Further, according to the structure of the example, the pump portion 21*f* can be downsized. Furthermore, the volume change amount (reciprocation movement distance) can be reduced, and as a result, the load required to reciprocate the pump portion 21*f* can be reduced.

Moreover, in this example, no additional structure is used to receive the driving force for rotating the rotatable shutter from the developer receiving apparatus 8, but the rotational force received for the feeding portion (cylindrical portion 20*k*, helical projection 20*c*) is used, and therefore, the partitioning mechanism is simplified.

As described above, the volume change amount of the pump portion 21*f* does not depend on the all volume of the developer supply container 1 including the cylindrical portion 20*k*, but it is selectable by the inside volume of the flange portion 21. Therefore, for example, in the case that the capacity (the diameter of the cylindrical portion 20*k* is changed when manufacturing developer supply containers having different developer filling capacity, a cost reduction effect can be expected. That is, the flange portion 21 including the pump portion 21*f* may be used as a common unit, which is assembled with different kinds of cylindrical portions 2*k*. By doing so, there is no need of increasing the number of kinds of the metal molds, thus reducing the manufacturing cost. In addition, in this example, during the non-communication state between the cylindrical portion 20*k* and the flange portion 21, the pump portion 21*f* is reciprocated by one cyclic period, but similarly to Embodiment 8, the pump portion 21*f* may be reciprocated by a plurality of cyclic periods.

Furthermore, in this example, throughout the contracting operation and the expanding operation of the pump portion, the discharging portion 21*h* is isolated, but this is not inevitable, and the following in an alternative. If the pump portion 21*f* can be downsized, and the volume change amount (reciprocation movement distance) of the pump portion 21*f* can be reduced, the discharging portion 21*h* may be opened slightly during the contracting operation and the expanding operation of the pump portion.

In addition, in this example, similarly to the foregoing embodiments, the flange portion 21 of the developer supply container 1 is provided with the engaging portions 3*b*2, 3*b*4 similar to those of Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 21

Referring to FIGS. 96-98, the description will be made as to structures of Embodiment 21. FIG. 96 is a partly sectional perspective view of a developer supply container 1. Parts (a)-(c) of FIG. 97 are a partial section illustrating an operation of a partitioning mechanism (stop valve 35). FIG. 98 is a timing chart showing timing of a pumping operation (contracting operation and expanding operation) of the pump portion 21*f* and opening and closing timing of the stop valve 35 which will be described hereinafter. In FIG. 98, contraction means contracting operation of the pump portion 21*f* the discharging operation of the pump portion 21*f*), expansion means the expanding operation of the pump portion 21*f* (sucking operation of the pump portion 21*f*). In addition, stop means a rest state of the pump portion 21*f*. In addition, opening means an open state of the stop valve 35 and close means a state in which the stop valve 35 is closed.

This example is significantly different from the above-described embodiments in that the stop valve is employed as a mechanism for separating between a discharging portion 21*h* and a cylindrical portion 20*k* in an expansion and contraction stroke of the pump portion 21*f*. The structures of this example in the other respects are substantially the same as those of Embodiment 12 (FIGS. 85 and 86), and the description thereof is omitted by assigning the same reference numerals to the corresponding elements. In this example, as contrasted to the structure of the Embodiment 15 shown in FIGS. 85 and 86, a plate-like partition wall 32 of Embodiment 17 shown in FIG. 88 is provided.

In the above-described Embodiment 20, a partitioning mechanism (rotatable shutter) using a rotation of the cylindrical portion 20*k* is employed, but in this example, a partitioning mechanism (stop valve) using reciprocation of the pump portion 21*f* is employed. This will be described in detail.

As shown in FIG. 96, a discharging portion 3*h* is provided between the cylindrical portion 20*k* and the pump portion 21*f*. A wall portion 33 is provided at a cylindrical portion 20*k* side of the discharging portion 3*h*, and a discharge opening 21*a* is provided lower at a left part of the wall portion 33 in the FIGURE. A stop valve 35 and an elastic member (seal) 34 as a partitioning mechanism for opening and closing a communication port 33*a* (FIG. 97) formed in the wall portion 33 are provided. The stop valve 35 is fixed to one internal end of the pump portion 20*b* (opposite the discharging portion 21*h*), and reciprocates in a rotational axis direction of the developer supply container 1 with expanding-and-contracting operations of the pump portion 21*f*. The seal 34 is fixed to the stop valve 35, and moves with the movement of the stop valve 35.

Referring to parts (a)-(c) of the FIG. 97 (FIG. 97 if necessary), operations of the stop valve in a developer supplying step will be described.

FIG. 97 illustrates in (a) a maximum expanded state of the pump portion 21*f* in which the stop valve is spaced from the wall portion 33 provided between the discharging portion 21*h* and the cylindrical portion 20*k*. At this time, the developer in the cylindrical portion 20*k* is fed into the discharging portion 21*h* through the communication port 33*a* by the inclined projection 32*a* with the rotation of the cylindrical portion 20*k*.

Thereafter, when the pump portion 21*f* contracts, the state becomes as shown in (b) of the FIG. 97. At this time, the seal 34 is contacted to the wall portion 33 to close the communication port 33*a*. That is, the discharging portion 21*h* becomes isolated from the cylindrical portion 20*k*.

When the pump portion 21*f* contracts further, the pump portion 21*f* becomes most contracted as shown in part (c) of FIG. 97.

During period from the state shown in part (b) of FIG. 97 to the state shown in part (c) of FIG. 97, the seal 34 remains contacting to the wall portion 33, and therefore, the discharging portion 21*h* is pressurized to be higher than the ambient pressure (positive pressure) so that the developer is discharged through the discharge opening 21*a*.

Thereafter, during expanding operation of the pump portion 21*f* from the state shown in (c) of FIG. 97 to the state shown in (b) of FIG. 97, the seal 34 remains contacting to the wall portion 33, and therefore, the internal pressure of the discharging portion 21*h* is reduced to be lower than the ambient pressure (negative pressure). Thus, the sucking operation is effected through the discharge opening 21*a*.

When the pump portion 21*f* further expands, it returns to the state shown in part (a) of FIG. 97. In this example, the foregoing operations are repeated to carry out the developer supplying step. In this manner, in this example, the stop valve 35 is moved using the reciprocation of the pump portion, and therefore, the stop valve is opening during an initial stage of the contracting operation (discharging operation) of the pump portion 21*f* and in the final stage of the expanding operation (sucking operation) thereof.

The seal 34 will be described in detail. The seal 34 is contacted to the wall portion 33 to assure the sealing property of the discharging portion 21*h*, and is compressed with the contracting operation of the pump portion 21*f*, and therefore, it is preferable to have both of sealing property and flexibility. In this example, as a sealing material having such properties, the use is made with polyurethane foam the available from Kabushiki Kaisha INOAC Corporation, Japan (tradename is MOLTOPREN, SM-55 having a thickness of 5 mm). The thickness of the sealing material in the maximum contraction state of the pump portion 21*f* is 2 mm (the compression amount of 3 mm).

As described in the foregoing, the volume variation (pump function) for the discharging portion 21*h* by the pump portion 21*f* is substantially limited to the duration after the seal 34 is contacted to the wall portion 33 until it is compressed to 3 mm, but the pump portion 21*f* works in the range limited by the stop valve 35. Therefore, even when such a stop valve 35 is used, the developer can be stably discharged.

As described in the foregoing, also in this embodiment, one pump is enough to effect the sucking operation and the discharging operation, and therefore, the structure of the developer discharging mechanism can be simplified. In addition, by the sucking operation through the discharge opening, a pressure reduction state (negative pressure state) can be provided in the developer supply container, and therefore, the developer can be efficiently loosened.

In addition, also in this example, similarly to the Embodiment 8-Embodiment 20, both of the suction and discharging operation of the pump portion 21*f* and the rotating operation of the cylindrical portion 20*k* can be carried out by the gear portion 20*a* receiving the rotational force from the developer receiving apparatus 8.

Furthermore, similarly to Embodiment 20, the pump portion 21*f* can be downsized, and the volume change volume of the pump portion 21*f* can be reduced. The cost reduction advantage by the common structure of the pump portion can be expected.

In addition, in this example, the driving force for operating the stop valve 35 does not particularly received from the developer receiving apparatus 8, but the reciprocation force for the pump portion 21*f* is utilized, so that the partitioning mechanism can be simplified.

In addition, in this example, similarly to the foregoing embodiments, the flange portion 21 of the developer supply container 1 is provided with the engaging portions 3*b*2, 3*b*4 similar to those of Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 22

Referring to FIG. 99 (parts (a) and (b)), structures of the Embodiment 22 will be described. Part (a) of FIG. 99 is a partially sectional perspective view of the developer supply container 1, and (b) is a perspective view of the flange portion 21, and (c) is a sectional view of the developer supply container.

This example is significantly different from the foregoing embodiments in that a buffer portion 23 is provided as a mechanism separating between discharging chamber 21*h* and the cylindrical portion 20*k*. The structures of this example in the other respects are substantially the same as those of Embodiment 17 (FIG. 88), and the description thereof is omitted by assigning the same reference numerals to the corresponding elements.

As shown in part (b) of FIG. 99, a buffer portion 23 is fixed to the flange portion 21 non-rotatably. The buffer portion 23 is provided with a receiving port 23*a* which opens upward and a supply port 23*b* which is in fluid communication with a discharging portion 21*h*.

As shown in part (a) and (c) of FIG. 99, such a flange portion 21 is mounted to the cylindrical portion 20*k* such that the buffer portion 23 is in the cylindrical portion 20*k*. The cylindrical portion 20*k* is connected to the flange portion 21 rotatably relative to the flange portion 21 immovably supported by the developer receiving apparatus 8. The connecting portion is provided with a ring seal to prevent leakage of air or developer.

In addition, in this example, as shown in part (a) of FIG. 99, an inclined projection 32*a* is provided on the partition wall 32 to feed the developer toward the receiving port 23*a* of the buffer portion 23.

In this example, until the developer supplying operation of the developer supply container 1 is completed, the developer in the developer accommodating portion 20 is fed through the receiving port 23*a* into the buffer portion 23 by the partition wall 32 and the inclined projection 32*a* with the rotation of the developer supply container1.

Therefore, as shown in part (c) of FIG. 99, the inside space of the buffer portion 23 is maintained full of the developer.

As a result, the developer filling the inside space of the buffer portion 23 substantially blocks the movement of the air toward the discharging portion 21*h* from the cylindrical portion 20*k*, so that the buffer portion 23 functions as a partitioning mechanism.

Therefore, when the pump portion 21*f* reciprocates, at least the discharging portion 21*h* can be isolated from the cylindrical portion 20*k*, and for this reason, the pump portion can be downsized, and the volume change of the pump portion can be reduced.

As described in the foregoing, also in this embodiment, one pump is enough to effect the sucking operation and the discharging operation, and therefore, the structure of the developer discharging mechanism can be simplified. In addition, by the sucking operation through the discharge opening, a pressure reduction state (negative pressure state) can be provided in the developer supply container, and therefore, the developer can be efficiently loosened.

In addition, also in this example, similarly to the Embodiment 8-Embodiment 21, both of the reciprocation of the pump portion 21*f* and the rotating operation of the feeding portion 20*c* (cylindrical portion 20*k*) can be carried out by the rotational force received from the developer receiving apparatus 8.

Furthermore, similarly to the Embodiment 20-Embodiment 21, the pump portion can be downsized, and the volume change amount of the pump portion can be reduced. The cost reduction advantage by the common structure of the pump portion can be expected.

Moreover, in this example, the developer is used as the partitioning mechanism, and therefore, the partitioning mechanism can be simplified.

In addition, in this example, similarly to the foregoing embodiments, the flange portion 21 of the developer supply container 1 is provided with the engaging portions 3*b*2, 3*b*4 similar to those of Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Embodiment 23

Referring to FIGS. 100-101, the description will be made as to structures of Embodiment 23. Part (a) of FIG. 100 is a perspective view of a developer supply container 1, and (b) is a sectional view of the developer supply container 1, and FIG. 101 is a sectional perspective view of a nozzle portion 47.

In this example, the nozzle portion 47 is connected to the pump portion 20*b*, and the developer once sucked in the nozzle portion 47 is discharged through the discharge opening 21*a*, as is contrasted to the foregoing embodiments. In the other respects, the structures are substantially the same as in Embodiment 14, and the detailed description thereof is omitted by assigning the same reference numerals to the corresponding elements.

As shown in part (a) of FIG. 100, the developer supply container 1 comprises a flange portion 21 and a developer accommodating portion 20. The developer accommodating portion 20 comprises a cylindrical portion 20*k*.

In the cylindrical portion 20*k*, as shown in (b) of FIG. 100, a partition wall 32 functioning as a feeding portion extends over the entire area in the rotational axis direction. One end surface of the partition wall 32 is provided with a plurality of inclined projections 32*a* at different positions in the rotational axis direction, and the developer is fed from one end with respect to the rotational axis direction to the other end (the side adjacent the flange portion 21). The inclined projections 32*a* are provided on the other end surface of the partition wall 32 similarly. In addition, between the adjacent inclined projections 32*a*, a through-opening 32*b* for permitting passing of the developer is provided. The through-opening 32*b* functions to stir the developer. The structure of the feeding portion may be a combination of the feeding portion (helical projection 20*c*) in the cylindrical portion 20*k* and a partition wall 32 for feeding the developer to the flange portion 21, as in the foregoing embodiments.

The flange portion 21 including the pump portion 20*b* will be described.

The flange portion 21 is connected to the cylindrical portion 20*k* rotatably through a small diameter portion 49 and a sealing member 48. In the state that the container is mounted to the developer receiving apparatus 8, the flange portion 21 is immovably held by the developer receiving apparatus 8 (rotating operation and reciprocation is not permitted).

In addition, as shown in part (a) of FIG. 66, in the flange portion 21, there is provided a supply amount adjusting portion (flow rate adjusting portion) 52 which receives the developer fed from the cylindrical portion 20*k*. In the supply amount adjusting portion 52, there is provided a nozzle portion 47 which extends from the pump portion 20*b* toward the discharge opening 21*a*. In addition, the rotation driving force received by the gear portion 20*a* is converted to a reciprocation force by a drive converting mechanism to vertically drive the pump portion 20*b*. Therefore, with the volume change of the pump portion 20*b*, the nozzle portion 47 sucks the developer in the supply amount adjusting portion 52, and discharges it through discharge opening 21*a*.

The structure for drive transmission to the pump portion 20*b* in this example will be described.

As described in the foregoing, the cylindrical portion 20*k* rotates when the gear portion 20*a* provided on the cylindrical portion 20*k* receives the rotation force from the driving gear 9. In addition, the rotation force is transmitted to the gear portion 43 through the gear portion 42 provided on the small diameter portion 49 of the cylindrical portion 20*k*. Here, the gear portion 43 is provided with a shaft portion 44 integrally rotatable with the gear portion 43.

One end of shaft portion 44 is rotatably supported by the housing 46. The shaft 44 is provided with an eccentric cam 45 at a position opposing the pump portion 20*b*, and the eccentric cam 45 is rotated along a track with a changing distance from the rotation axis of the shaft 44 by the rotational force transmitted thereto, so that the pump portion 20*b* is pushed down (reduced in the volume). By this, the developer in the nozzle portion 47 is discharged through the discharge opening 21*a*.

When the pump portion 20*b* is released from the eccentric cam 45, it restores to the original position by its restoring force (the volume expands). By the restoration of the pump portion (increase of the volume), sucking operation is effected through the discharge opening 21*a*, and the developer existing in the neighborhood of the discharge opening 21*a* can be loosened.

By repeating the operations, the developer is efficiently discharged by the volume change of the pump portion 20*b*. As described in the foregoing, the pump portion 20*b* may be provided with an urging member such as a spring to assist the restoration (or pushing down).

The hollow conical nozzle portion 47 will be described. The nozzle portion 47 is provided with an opening 53 in an outer periphery thereof, and the nozzle portion 47 is provided at its free end with an ejection outlet 54 for ejecting the developer toward the discharge opening 21*a*.

In the developer supplying step, at least the opening 53 of the nozzle portion 47 can be in the developer layer in the supply amount adjusting portion 52, by which the pressure produced by the pump portion 20*b* can be efficiently applied to the developer in the supply amount adjusting portion 52.

That is, the developer in the supply amount adjusting portion 52 (around the nozzle 47) functions as a partitioning mechanism relative to the cylindrical portion 20*k*, so that the effect of the volume change of the pump portion 20*b* is applied to the limited range, that is, within the supply amount adjusting portion 52.

With such structures, similarly to the partitioning mechanisms of Embodiments 20-22, the nozzle portion 47 can provide similar effects.

As described in the foregoing, also in this embodiment, one pump is enough to effect the sucking operation and the discharging operation, and therefore, the structure of the developer discharging mechanism can be simplified. In addition, by the sucking operation through the discharge opening, a pressure reduction state (negative pressure state) can be provided in the developer supply container, and therefore, the developer can be efficiently loosened.

In addition, in this example, similarly to Embodiments 5-19, by the rotational force received from the developer receiving apparatus 8, both of the rotating operations of the developer accommodating portion 20 (cylindrical portion 20*k*) and the reciprocation of the pump portion 20*b* are effected. Similarly to Embodiments 20-22, the pump portion 20*b* and/or flange portion 21 may be made common to the advantages.

In this example, the developer does not slide on the partitioning mechanism as is different from Embodiment 20-Embodiment 21, the damage to the developer can be avoided.

In addition, in this example, similarly to the foregoing embodiments, the flange portion 21 of the developer supply container 1 is provided with the engaging portions 3*b*2, 3*b*4 similar to those of Embodiments 1 and 2, and therefore, similarly to the above-described embodiment, the mechanism for connecting and spacing the developer receiving portion 11 of the developer receiving apparatus 8 relative to the developer supply container 1 by displacing the developer receiving portion 11 can be simplified. More particularly, a driving source and/or a drive transmission mechanism for moving the entirety of the developing device upwardly is unnecessary, and therefore, a complication of the structure of the image forming apparatus side and/or the increase in cost due to increase of the number of parts can be avoided.

The connection between the developer supply container 1 and the developer receiving apparatus 8 can be properly established using the mounting operation of the developer supply container 1 with minimum contamination with the developer. Similarly, utilizing the dismounting operation of the developer supply container 1, the spacing and resealing between the developer supply container 1 and the developer receiving apparatus 8 can be carried out with minimum contamination with the developer.

Comparison Example

Referring to FIG. 102, a comparison example will be described. Part (a) of FIG. 102 is a sectional view illustrating a state in which the air is fed into a developer supply container 150, and part (b) of FIG. 102 is a sectional view illustrating a state in which the air (developer) is discharged from the developer supply container 150. Part (c) of FIG. 102 is a sectional view illustrating a state in which the developer is fed into a hopper 8*c* from a storage portion 123, and part (d) of FIG. 102 is a sectional view illustrating a state in which the air is taken into the storage portion 123 from the hopper 8*c*. In the description of this comparison example, the same reference numerals as in the foregoing Embodiments are assigned to the elements having the corresponding functions in this embodiment, and the detailed description thereof is omitted for simplicity.

In this comparison example, the pump portion for effecting the suction and discharging, more specifically, a displacement type pump portion 122 is provided not on the side of the developer supply container 150 but on the side of the developer receiving apparatus 180.

The developer supply container 150 of the comparison example corresponds to the structure of FIG. 44 (Embodiment 8) from which the pump portion 5 and the locking portion 18 are removed, and the upper surface of the container body 1*a* which is the connecting portion with the pump portion 5 is closed. That is, the developer supply container 150 is provided with the container body 1*a*, a discharge opening 1*c*, an upper flange portion 1g, an opening seal (sealing member) 3*a*5 and a shutter 4 (omitted in FIG. 102).

In addition, the developer receiving apparatus 180 of this comparison example corresponds to the developer receiving apparatus 8 shown in FIGS. 38 and 40 (Embodiment 8) from which the locking member 10 and the mechanism for driving the locking member 10 are removed, and in place thereof, the pump portion, a storage portion and a valve mechanism or the like are added.

More specifically, the developer receiving apparatus 180 includes the bellow-like pump portion 122 of a displacement type for effecting suction and discharging, and the storage portion 123 positioned between the developer supply container 150 and the hopper 8*c* to temporarily storage the developer having been discharged from the developer supply container 150.

To the storage portion 123, there are connected a supply pipe portion for connecting with the developer supply container 150, and a supply pipe portion 127 for connecting with the hopper 8*c*. In addition, the pump portion 122 carries out the reciprocation (expanding-and-contracting operation) by a pump driving mechanism provided in the developer receiving apparatus 180.

Furthermore, the developer receiving apparatus 180 is provided with a valve 125 provided in a connecting portion between the storage portion 123 and the supply pipe portion 126 on the developer supply container 150 side, and a valve 124 provided in a connecting portion between the storage portion 123 and the hopper 8*c* side supply pipe portion 127. The valves 124, 125 are solenoid valves which are opened and closed by a valve driving mechanism provided in the developer receiving apparatus 180.

Developer discharging steps in the structure of the comparison example including is pump portion 122 on the developer receiving apparatus 180 side in this manner will be described.

As shown in part (a) of FIG. 102, the valve driving mechanism is operated to close the valve 124 and open the valve 125. In this state, the pump portion 122 is contracted by the pump driving mechanism. At this time, the contracting operation of of the storage portion 123 so that the air is fed from the storage portion 123 into the developer supply container 150. As a result, the developer adjacent to the discharge opening 1*c* in the developer supply container 150 is loosened.

Subsequently, as shown in part (b) of FIG. 102, the pump portion 122 is expanded by the pump driving mechanism, while the valve 124 is kept closed, and the valve 125 is kept opened. At this time, by the expanding operation of the pump portion 122, the internal pressure of the storage portion 123 decreases, so that the pressure of the air layer inside developer supply container 150 relatively rises. By a pressure difference between the storage portion 123 and the developer supply container 150, the air in the developer supply container 150 is discharged into the storage portion 123. With the operation, the developer is discharged together with the air from the discharge opening 1*c* of the developer supply container 150 and is stored in the storage portion 123 temporarily.

Then, as shown in part (c) of FIG. 102, the valve driving mechanism is operated to open the valve 124 and close the valve 125. In this state, the pump portion 122 is contracted by the pump driving mechanism. At this time, the contracting operation of of the storage portion 123 to feed and discharge the developer from the storage portion 123 into the hopper 8*c*.

Then, as shown in part (d) of FIG. 102, the pump portion 122 is expanded by the pump driving mechanism, while the valve 124 is kept opened, and the valve 125 is kept closed. At this time, by the expanding operation of the pump portion 122, the internal pressure of the storage portion 123 decreases, so that the air is taken into the storage portion 123 from the hopper 8*c*.

By repeating the steps of parts (a)-(d) of FIG. 102, the developer in the developer supply container 150 can be discharged through the discharge opening 1*c* of developer supply container 150 while fluidizing the developer.

However, with the structure of comparison example, the valves 124, 125 and the valve driving mechanism for controlling opening and closing of the valves as shown in parts (a)-(d) of FIG. 102 are required. In other words, the comparison example requires the complicated opening and closing control of the valves. Furthermore, the developer may be bitten between the valve and the seat with the result of stressed to the developer which may lead to formation of agglomeration masses. If this occurs, the properly opening and closing operation of the valves is not carried out, with the result that long term stability of the developer discharging is not expected.

In addition, in the comparison example, by the supply of the air from the outside of the developer supply container 150, the internal pressure of the developer supply container 150 is raised, tending to agglomerate the developer, and therefore, the loosening effect of the developer is very small as shown by above-described verification experiment (comparison between FIG. 55 and FIG. 56). Therefore, Embodiment 1-Embodiment 23 prefers to the comparison example because the developer can be discharged from the developer supply container after it is sufficiently loosened.

In addition, it may be considered to use a single shaft eccentric pump 400 is used in place of the pump 122 to effect the suction and discharging by the forward and backward rotations of the rotor 401, as shown in FIG. 103. However, in this case, the developer discharged from the developer supply container 150 may be stressed by sliding between the rotor 401 and a stator 402 of such a pump, with the result of production of agglomeration mass of the developer to an extent the image quality is deteriorated.

The structures of the foregoing embodiments are preferable to the comparison example, because the developer discharging mechanism can be simplified. As compared with the comparison example of FIG. 103, the stress imparted to the developer can be decreased in the foregoing embodiments.

While the invention has been described with reference to the structures disclosed herein, it is not confined to the details set forth, and this application is intended to cover such modification or changes as may come within the purposes of the improvements or the scope of the following claims.

INDUSTRIAL APPLICABILITY

According to the present invention, the mechanism for connecting the developer receiving portion to the developer supply container by displacing the developer receiving portion can be simplified. In addition, the connection state between the developer supply container and the developer receiving apparatus can be established properly using the mounting operation of the developer supply container.

The invention claimed is:

1. A developer supply container comprising:

a developer accommodating body configured to contain developer;

a developer discharging body in fluid communication with the developer accommodating body, the developer discharging body having a discharge opening, the discharge opening being configured to form at least a part of a discharge passageway through which developer may be discharged to outside of the developer supply container, with an end of the discharge passageway being positioned at a bottommost side of the developer supply container, and with the developer accommodating body being rotatable about a rotational axis thereof relative to the developer discharging body;

a track provided at a side of the developer discharging body, the track being positioned below a horizontal plane that (i) includes the rotational axis and (ii) divides the developer supply container into a lower section that includes the discharge opening and an upper section, the track including (i) a first part that extends from a first position to a second position, with the second position being closer to the horizontal plane than the first position is to the horizontal plane, and with the first part having a surface facing upward, and (ii) a second part extending from the second position of the first part such that a plane perpendicular to the rotational axis and passing through the second part passes through the end of the discharge passageway when the discharge passageway through which developer is discharged to outside of the developer supply container is formed; and a shutter movable relative to the developer discharging body between an open position wherein the discharge opening is open and a closed position wherein the discharge opening is closed by the shutter;

wherein the developer accommodating body is provided with a gear portion provided about the rotational axis, wherein the developer discharging body is provided with a shutter support movably supporting the shutter, and wherein, as viewed in a direction towards the bottommost side of the container, the shutter support extends at least from the discharge opening toward the developer accommodating body but does not overlap the gear.

2. The developer supply container according to claim 1, wherein the second part of the track extends along a straight line.

3. The developer supply container according to claim 1, wherein the second part of the track extends along a straight line that is parallel to the rotational axis.

4. The developer supply container according to claim 1, wherein the first part of the track extends along a straight line.

5. The developer supply container according to claim 1, wherein the first part of the track extends along an arcuate line.

6. The developer supply container according to claim 1, wherein the first part of the track extends stepwise.

7. The developer supply container according to claim 1, wherein the developer discharging body is provided with a shutter support movably supporting the shutter, and wherein the track is integrally molded with the shutter support.

8. The developer supply container according to claim 1, wherein the shutter including an opening, with the opening in the shutter being configured to form a part of the discharge passageway, and with the shutter being movable relative to the discharging body between (i) the open position wherein the opening in the shutter is aligned with the discharge opening to form the discharge passageway, and (ii) the closed position wherein the opening in the shutter is not aligned with the discharge opening to thereby close the discharge opening.

9. The developer supply container according to claim 1, further comprising a pump configured and positioned to force developer out of the developer discharging body through the discharge opening.

10. The developer supply container according to claim 1, wherein the discharge opening has an area of 0.002 $mm^2$ to 12.6 $mm^2$.

11. The developer supply container according to claim 1, wherein the first part of the track includes a lower part and an upper part, with the lower part being parallel to the upper part.

* * * * *